United States Patent
Taniguchi et al.

(10) Patent No.: US 10,344,211 B2
(45) Date of Patent: Jul. 9, 2019

(54) LIQUID CRYSTAL COMPOSITION AND LIQUID CRYSTAL DISPLAY ELEMENT USING SAME

(71) Applicant: DIC Corporation, Tokyo (JP)

(72) Inventors: Shiro Taniguchi, Kita-adachi-gun (JP); Joji Kawamura, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 34 days.

(21) Appl. No.: 15/536,942

(22) PCT Filed: Dec. 8, 2015

(86) PCT No.: PCT/JP2015/084382
§ 371 (c)(1),
(2) Date: Jun. 16, 2017

(87) PCT Pub. No.: WO2016/098637
PCT Pub. Date: Jun. 23, 2016

(65) Prior Publication Data
US 2017/0355906 A1    Dec. 14, 2017

(30) Foreign Application Priority Data

Dec. 18, 2014  (JP) ................ 2014-256149

(51) Int. Cl.
| | | |
|---|---|---|
| *G02F 1/1333* | (2006.01) | |
| *C09K 19/12* | (2006.01) | |
| *C09K 19/20* | (2006.01) | |
| *C09K 19/30* | (2006.01) | |
| *C09K 19/34* | (2006.01) | |
| *G02F 1/13* | (2006.01) | |
| *C09K 19/04* | (2006.01) | |
| *G02F 1/137* | (2006.01) | |

(52) U.S. Cl.
CPC ............ *C09K 19/12* (2013.01); *C09K 19/20* (2013.01); *C09K 19/30* (2013.01); *C09K 19/3003* (2013.01); *C09K 19/3066* (2013.01); *C09K 19/3068* (2013.01); *C09K 19/34* (2013.01); *G02F 1/13* (2013.01); *C09K 2019/0466* (2013.01); *C09K 2019/123* (2013.01); *C09K 2019/301* (2013.01); *C09K 2019/3004* (2013.01); *C09K 2019/3009* (2013.01); *C09K 2019/3078* (2013.01); *G02F 2001/13706* (2013.01); *G02F 2001/133397* (2013.01)

(58) Field of Classification Search
CPC ........ C09K 19/12; C09K 19/20; C09K 19/30; C09K 19/34; C09K 19/3003; C09K 19/3066; C09K 19/3068; C09K 2019/0466; C09K 2019/123; C09K 2019/3004; C09K 2019/3009; C09K 2019/301; C09K 2019/3078; G02F 1/13; G02F 1/1333; G02F 2001/13706; G02F 2001/133397
USPC .................................................... 252/299.66
See application file for complete search history.

(56) References Cited

U.S. PATENT DOCUMENTS

| | | | |
|---|---|---|---|
| 8,795,795 B2* | 8/2014 | Yanai ................ | C09K 19/3402 252/299.61 |
| 2009/0147210 A1 | 6/2009 | Saito | |
| 2012/0069275 A1 | 3/2012 | Saito | |
| 2012/0169974 A1 | 7/2012 | Hattori et al. | |
| 2012/0217438 A1 | 8/2012 | Hattori et al. | |

FOREIGN PATENT DOCUMENTS

| | | |
|---|---|---|
| JP | 2009-155642 A | 7/2009 |
| WO | 2010/131594 A1 | 11/2010 |
| WO | 2011/030708 A1 | 3/2011 |
| WO | 2011/036985 A1 | 3/2011 |

* cited by examiner

*Primary Examiner* — Geraldina Visconti
(74) *Attorney, Agent, or Firm* — Westerman, Hattori, Daniels & Adrian, LLP

(57) ABSTRACT

There is provided a liquid crystal composition including at least one compound represented by General Formula (i) and at least one compound represented by General Formula (N). The total amount of the compound represented by General Formula (i) is 10% by mass or greater. In the liquid crystal composition and the liquid crystal display element using the composition, the liquid crystal composition has a positive Δε and a flat transmission characteristic curve. Therefore, gradation characteristics are easily controlled. Furthermore, display defects due to burn-in, dropping marks, and the like can be suppressed, and therefore excellent display quality is exhibited. The liquid crystal display element using this liquid crystal composition can be also provided.

9 Claims, 4 Drawing Sheets

LIQUID CRYSTAL COMPOSITION AND LIQUID CRYSTAL DISPLAY ELEMENT USING SAME

TECHNICAL FIELD

The present invention relates to a nematic liquid crystal composition whose dielectric anisotropy (Δε) is a positive value, which is useful as a liquid crystal display material, and a liquid crystal display element using the same.

BACKGROUND ART

A liquid crystal display element has become used in watches, and electronic calculators, and also in various measurement instruments, automobile panels, word processors, electronic organizers, printers, computers, televisions, clocks, advertisement billboards, etc. The representative examples of the liquid crystal display method include a twisted nematic (TN) type, a super twisted nematic (STN) type, and a vertical alignment type using a thin film transistor (TFT), and an in-plane switching (IPS) type or a fringe field switching (FFS) type. The liquid crystal composition used in these liquid crystal display elements is required to be stable with respect to external impetuses such as water, air, heat, and light, and to exhibit a liquid crystal phase in a wider temperature range around room temperature as possible, and to have a low viscosity and a low driving voltage. Furthermore, the liquid crystal composition is constituted of several kinds of compounds to several dozens of compounds in order to make dielectric anisotropy (Δε) and refractive index anisotropy (Δn) optimal values in each display element. Furthermore, in all the driving methods including the vertical alignment (VA) type display as well as the horizontal alignment type display such as the TN type, the STN type, the IPS type or the FFS type, the liquid crystal composition which exhibits a low voltage driving, a high speed response, and a wide operating temperature range is required. In addition, it is necessary to adjust Δn of the liquid crystal composition to an appropriate range in accordance with the cell gap in order to set Δn×d which is the product of Δn and the cell gap (d) to a predetermined value. Additionally, in the case of applying the liquid crystal display element to a TV and the like, the liquid crystal composition is required to have a low rotational viscosity (γ1) since a high speed response property matters.

As a configuration of the p-type liquid crystal composition for such a high speed response property, for example, a liquid crystal composition including a compound represented by Formulas (A-1) and (A-2) which are liquid crystal compounds having a positive Δε and a liquid crystal compound (B) whose Δε is neutral in combination is disclosed. Characteristics of such a liquid crystal composition are that the liquid crystal compounds having positive Δε have a —CF$_2$O— structure and the liquid crystal compounds having neutral Δε have an alkenyl group, and these are widely known in the field of liquid crystal compositions (PTL 1).

[Chem. 1]

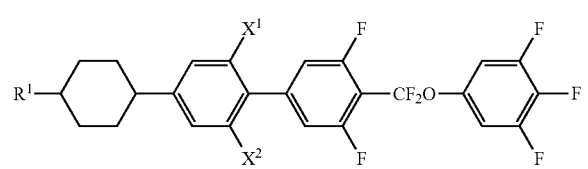
(A-1)

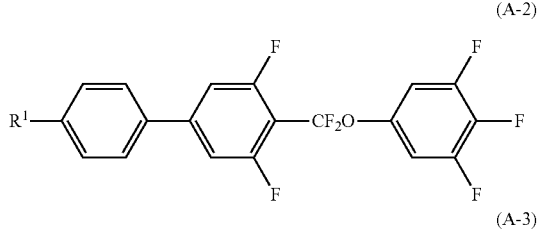
(A-2)

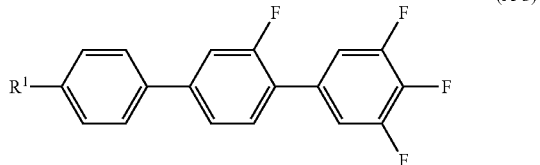
(A-3)

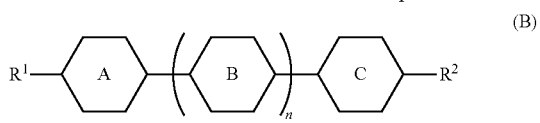
(B)

In addition, among factors that determine the image quality of the liquid crystal display used for liquid crystal televisions, smartphones, and the like, the stronger the three characteristics are exhibited, it is considered that the more the beauty increases in general, the three characteristics being the luminance which is the brightness of a screen, the contrast ratio which is the luminance ratio of white and black, and the gradation which controls the luminance of a pixel by the number of stages. Since the liquid crystal display is required to have visibility in a relatively bright place such as a living room, high level of luminance is required, and the larger the contrast is, the clearer the screen is. In addition, if the number of gradation increases, the number of colors that can be expressed also increases. For example, in general liquid crystal televisions, RGB pixels are controlled by 8 to 10 bits, respectively, and in the case of 8 bits, 16.78 million colors can be displayed in 256 gradations, and in the case of 10 bits, the number of colors that can be displayed in 1,024 gradations becomes about 1 billion colors. Accordingly, if the number of gradation simply increases, the image quality is also improved, but the shape of a transmittance-gradation voltage curve that divides the gradations also becomes an important factor.

That is, if the shape of a transmittance-gradation voltage curve is a slow curve such as linear shape, the divided gradation widths are equally spaced, and therefore the difference between the adjacent gradation voltages and the luminance displayed to correspond thereto becomes clear. However, if the vicinity of an inflection point of a transmittance-gradation voltage curve, or the curve is a curve shape of rapid change rate, the divided gradation widths are not equally spaced, and therefore the difference between the adjacent gradation voltages and the luminance displayed to correspond thereto is unlikely to occur. Due to this, the problem that the number of colors that can be displayed substantially decreases, occurs. Therefore, if there is a problem in expressive power of gradation, black defects in dark areas, halation in bright areas, or banding in intermediate gradation (vertical or horizontal streaks), color casts, and the like occur.

Examples of such a liquid crystal composition which makes the shape of a transmittance-gradation voltage curve flat include PTL 2. According to PTL 2, it is described that with a compound containing a —CH$_2$CH$_2$— linking group, a flat transmission characteristic curve is obtained.

CITATION LIST

Patent Literature

[PTL 1] JP-A-2011-052120
[PTL 2] JP-A-2011-122154

SUMMARY OF INVENTION

Technical Problem

PTL 1 above provides a composition with large dielectric anisotropy by focusing on the fact that large dielectric anisotropy of a composition contributes to a low threshold voltage, small power consumption and large contrast ratio in an element, and in the working examples of PTL 1, it is disclosed that a maximum $\Delta\varepsilon$ E is 12.6. In addition, in PTL 2, since the compound containing a —$CH_2CH_2$— linking group has a large $K_{33}/K_{11}$ value, a liquid crystal composition having a property that enables a flat transmission characteristic curve to be easily made is provided.

However, regarding the composition described in PTL 1, it is described that the contrast ratio is increased by adjusting the optical anisotropy ($\Delta n$), the dielectric anisotropy and the resistivity of the entire liquid crystal composition, but the transmittance-gradation voltage curve is not mentioned therein. In addition, PTL 2 attempts to obtain a flat transmission characteristic curve from the —$CH_2CH_2$-linking group-containing compound. However, depending on the ring structure of the compound into which the $CH_2CH_2$— linking group is introduced, a non-preferable effect such as a decrease in a N—I transition temperature and an increase in a melting point of the compound after the introduction is brought about, which adversely affects physical property values in the case of designing a practical composition. Specifically, in the case where the $CH_2CH_2$— linking group is introduced between a cyclohexane ring and a benzene ring, a preferable effect such as an increase in a N—I transition temperature and a decrease in a melting point is generally exhibited, but in the case where the $CH_2CH_2$— linking group is introduced between a benzene ring and a benzene ring, it is generally known that the N—I transition temperature remarkably decreases and the melting point increases. Therefore, introducing the $CH_2CH_2$— linking group into a liquid crystal compound having a biphenyl skeleton or a terphenyl skeleton with a high refractive index anisotropy ($\Delta n$) as a basis adversely affects the performance of the liquid crystal composition. On the other hand, regarding a cell gap (d) of a recent liquid crystal cell, a cell has become thinner for high-speed response, and since it is necessary to keep the $\Delta n \times d$ value constant in order to maintain a contrast and a viewing angle, the liquid crystal composition is required to have higher $\Delta n$. That is, flattening of the transmission characteristic curve by the $CH_2CH_2$— linking group can only effectively act on a liquid crystal cell having a large gap and a relatively low response speed.

In the liquid crystal composition and the liquid crystal display element using the composition according to the present invention, the liquid crystal composition has a positive $\Delta\varepsilon$ and a flat transmission characteristic curve, and therefore the liquid crystal composition whose gradation characteristics are easily controlled is provided. Furthermore, by using this, the liquid crystal display element in which display defects due to burn-in, dropping marks, and the like are suppressed and therefore excellent display quality is exhibited, is provided with a high yield, and the liquid crystal display element using this the liquid crystal composition is provided.

Solution to Problem

The present invention has found out that a liquid crystal composition whose gradation characteristics are easily controlled can be provided by adjusting the structure of an alkenyl group in the liquid crystal composition and the content ratio thereof, and therefore solved the above problems.

Advantageous Effects of Invention

According to the present invention, it is possible to provide a liquid crystal composition whose gradation characteristics are easily controlled, and a liquid crystal display element using the composition by providing a flat transmission characteristic curve.

DESCRIPTION OF EMBODIMENTS

Figure 1:
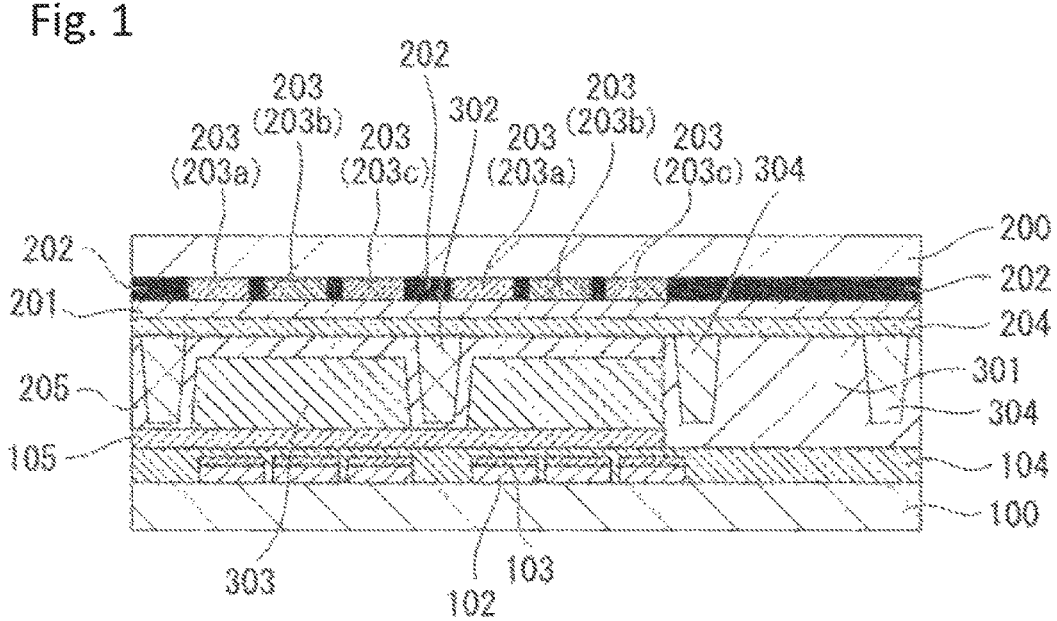
FIG. 1 is a view schematically showing one example of a configuration of a liquid crystal display element according to the present invention.

Hereinafter, preferable examples of the present invention will be described, and the present invention is not limited to these examples. The addition, omission and substitution of the configuration, and the other changes can be made within the range not departing from the scope of the present invention.

The first aspect of the present invention is a liquid crystal composition including a component having a liquid crystal compound having a positive dielectric anisotropy; and a component having a compound represented by General Formula (i) and a compound having an alkenyl group having two or more carbon atoms and a vinylene group, in which the total amount of the compound represented by General Formula Formula (i) is 10% by mass or greater.

[Chem. 2]

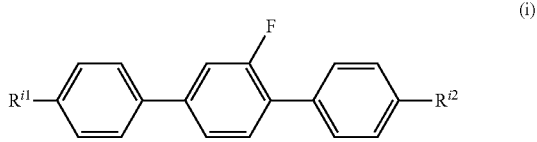

(i)

(In General Formula (i), $R^{i1}$ and $R^{i2}$ each independently represents an alkyl group having 1 to 10 carbon atoms, an alkenyl group having 2 to 10 carbon atoms, or an alkoxy group having 1 to 10 carbon atoms, and at least one of the $R^{i1}$ or $R^{i2}$ is the alkenyl group.)

That is, the liquid crystal composition according to the present invention is preferably a liquid crystal composition that includes a component A including a liquid crystal compound having a positive dielectric anisotropy; and a component B having a compound having a smaller dielectric anisotropy compared to the liquid crystal compound having a positive dielectric anisotropy, and that includes these component A and component B as host liquid crystal. The component A having a positive dielectric anisotropy is called a polar component, and the component B is called a non-polar component. The polar component preferably contains a liquid crystal compound having a dielectric anisotropy of +3 or greater and +40 or less. In addition, a liquid crystal compound having a dielectric anisotropy of −2.0 or greater and less than +3.0 is preferably contained as the nonpolar component, and a liquid crystal compound having a dielectric anisotropy of −2.0 or greater and +2.0 or less is more preferably contained. Furthermore, the liquid crystal composition according to the present invention is preferably a liquid crystal composition that includes the component A and the component B as the host liquid crystal, and a nematic liquid crystal composition is preferable.

By obtaining a flat transmission characteristic curve according to the above, it is possible to provide a liquid crystal composition whose gradation characteristics is easily controlled. That is, it was confirmed that a flat transmission characteristic curve can be obtained by a combination of the liquid crystal compounds of the nonpolar compounds having an alkenyl group having two different chemical skeletons (so-called a mesogen). In particular, it is preferable to combine a compound represented by General Formula (i) with a compound having an alkenyl group having two or more carbon atoms and a vinylene group as the nonpolar component (component B) because a flat transmittance-gradation voltage curve can be obtained.

The liquid crystal composition according to the present invention is preferably a p-type liquid crystal composition. The dielectric anisotropy (25° C.) of the liquid crystal composition is preferably 14 or less, more preferably 12 or less, still more preferably 11 or less, still more preferably 10 or less, still more preferably 8 or less, still more preferably 6 or less, and particularly preferably 5.8 or less.

If 11 or less, it is effective in suppressing phenomena such as flicker caused by waveform rounding of a voltage when voltage-writing and scanning to TFT and delay, and deterioration of the response speed. If 6 or less, which is relatively low dielectric anisotropy, it is possible to suppress the electrical capacity ($C_{LC}$) of the liquid crystal layer to a low level, and therefore phenomena such as flicker caused by waveform rounding of a voltage when voltage-writing and scanning to TFT and delay, and deterioration of the response speed, are further effectively suppressed.

Since the compound represented by General Formula (i) has significantly large refractive index anisotropy (Δn=about 0.25), and the compound represented by General Formula (L) also has the refractive index anisotropy that is about the same as or larger than the refractive index anisotropy generally required for the liquid crystal composition (Δn=about 0.1), it is possible to use relatively large amounts of a compound having a low Δn which is generally advantageous in terms of viscosity and solubility as other dielectrically neutral components, and to provide the liquid crystal composition that excels in solubility and has reduced viscosity. In addition, since the compound represented by General Formula (i) has relatively a high nematic phase upper limit temperature range which is 100 degrees or higher, in the case of using a biphenyl liquid crystal compound that is dielectric neutral and generally has low upper limit of a nematic temperature range in combination, it is possible to provide the liquid crystal composition that has a favorable nematic temperature range for a liquid crystal display element, and has large refractive index anisotropy suitable for a small cell gap.

In addition, it was confirmed that the response speed (return speed) is increased by combining the compound represented by General Formula (i) with the compound having an alkenyl group having two or more carbon atoms and a vinylene group.

The liquid crystal composition according to the present invention essentially contains one or more types of the compounds represented by General Formula (i). The types of compound capable of being combined are not limited and can be combined depending on the required performance such as solubility at a low temperature, a transition temperature, electrical reliability, birefringence, or the like. Examples thereof include one type or more and 10 types or less, two types or more and eight types or less, and three types or more and six types or less. If two types of the compounds represented by General Formula (i) are combined, it is easy to secure not only the number of gradation but also physical properties of the entire liquid crystal composition or the like. If three types are combined, the effect of securing the reliability of the entire liquid crystal composition in addition to the number of gradation, is exhibited.

The content of the compound according to the present invention represented by General Formula (i) needs to be suitably adjusted depending on the required performance such as solubility at a low temperature, a transition temperature, electrical reliability, birefringence, process compatibility, dropping marks, burn-in, or dielectric anisotropy. For example, the content (total) of the compound represented by General Formula (i) is preferably 10% to 70% by mass with respect to the total mass of the liquid crystal composition of the present invention. As more preferable content, 10.5% to 60% by mass, 11% to 50% by mass, 11.5% to 55% by mass, 12% to 50% by mass, 12.5% to 45% by mass, 13% to 43% by mass, 13.5% to 42% by mass, 14% to 42% by mass, 14.5% to 42% by mass, 15% to 42% by mass, 16% to 42% by mass, 17% to 42% by mass, and 17.5% to 42% by mass are preferable in order. In addition, if the lower limit of the content of the compound represented by General Formula (i) is 10% to 13% by mass, it is possible to adjust the dielectric anisotropy within the predetermined range, and if the lower limit of the content of the compound represented by General Formula (i) is 13% to 17% by mass, a transmittance-gradation voltage curve of the liquid crystal composition is likely to be a flat curve.

In the present specification, "alkyl group", "alkenyl group", "alkenyloxy group" and "alkoxy group" are preferably linear or branched, and more preferably linear.

In the compound represented by General Formula (i) according to the present invention, examples of the alkenyl group having 2 to 10 carbon atoms include a vinyl group, an allyl group, a 1-propenyl group, an isopropenyl group, a 2-butenyl group, a 3-butenyl group, a 1,3-butadienyl group, a 2-pentenyl group, a 3-pentenyl group, a 2-hexenyl group and the like, and a linear or branched one is preferable and a linear one is more preferable.

Examples of the "alkyl group having 1 to 10 carbon atoms" according to the present invention include a methyl group, an ethyl group, a propyl group, a butyl group, an isopropyl group, an isobutyl group, a t-butyl group, a 3-pentyl group, an isopentyl group, a neopentyl group, a pentyl group, a hexyl group, a heptyl group, an octyl group, a nonyl group, a decyl group, a dodecyl group, a pentadecyl group, and the like. Moreover, in the specification, the examples of alkyl groups are common, and selection is suitably made from the above examples depending on the number of carbon atoms of each alkyl group. In addition, in the present specification, the alkenyl group having 1 to 10 carbon atoms according to the present invention is preferably linear or branched, and more preferably linear. In addition, more preferable alkenyl groups in the present invention are represented by Formula (xi) (a vinyl group), Formula (xii) (a 1-propenyl group), Formula (xiii) (a 3-butenyl group), and Formula (xiv) (a 3-pentenyl group) described below.

[Chem. 3]

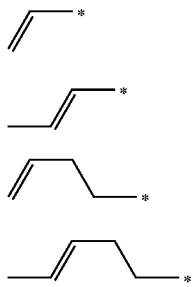

(In Formulas (xi) to (xiv), * indicates a bonding site to a ring structure.)

Examples of the "alkyl group having 1 to 10 carbon atoms" according to the present invention include a methyl group, an ethyl group, a propyl group, a butyl group, an isopropyl group, an isobutyl group, a t-butyl group, a 3-pentyl group, an isopentyl group, a neopentyl group, a pentyl group, a hexyl group, a heptyl group, an octyl group, a nonyl group, a decyl group, and the like. Moreover, in the specification, the examples of alkyl groups are common, and selection is suitably made from the above examples depending on the number of carbon atoms of each alkyl group. In addition, the alkyl group having 1 to 10 carbon atoms according to the present invention is preferably linear or branched, and more preferably linear.

Furthermore, for example, the compound represented by General Formula (i) is preferably a compound represented by Formulas (i.1) to (i.20), and among these, is preferably a compound represented by Formulas (i.1), (i.2), (i.5), (i.6), (i.11), and (i.12).

[Chem. 4]

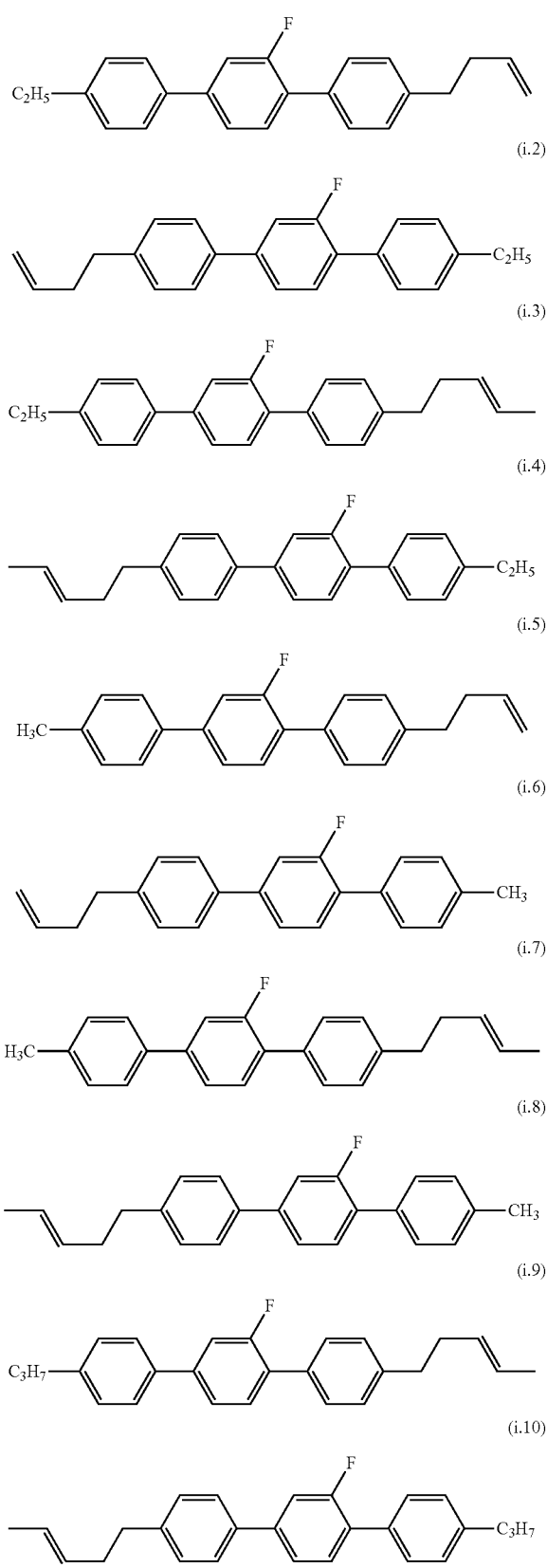

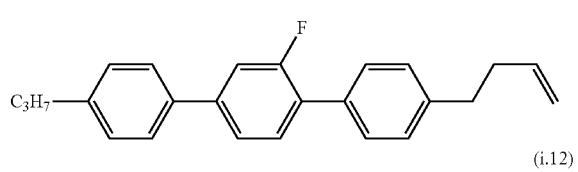
(i.11)

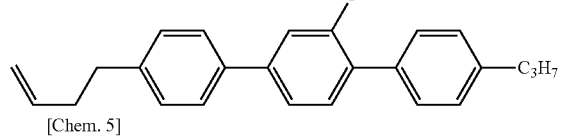
(i.12)

[Chem. 5]

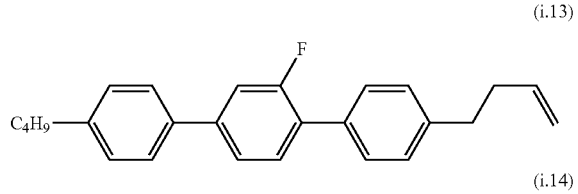
(i.13)

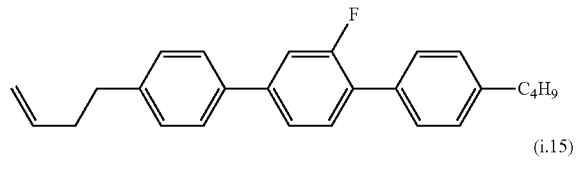
(i.14)

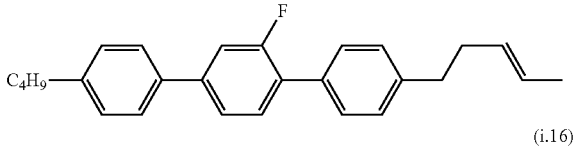
(i.15)

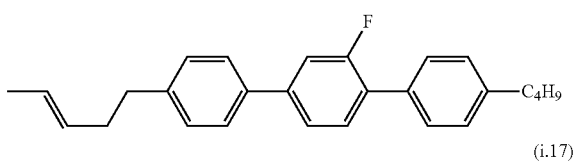
(i.16)

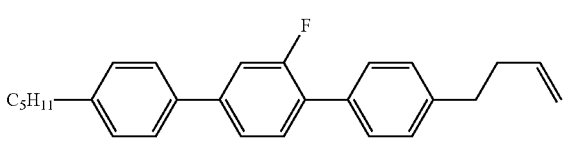
(i.17)

(i.18)

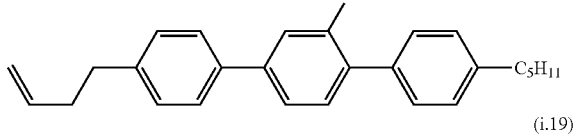
(i.19)

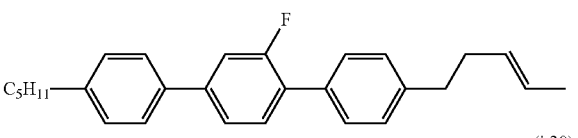
(i.20)

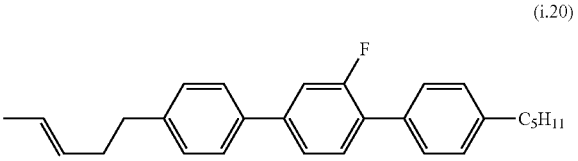

As the types of the compound represented by General Formula (i) contained in the liquid crystal composition according to the present invention, there is, for example, one type in one embodiment of the present invention. Alternatively, there are one or two types in another embodiment of the present invention. There are one to three types in still another embodiment of the present invention. There are one to five types in still further another embodiment of the present invention. There are two to five types in still another embodiment of the present invention. There are two to four types in still another embodiment of the present invention. There are two to three types in still another embodiment of the present invention.

Since it is also effective for solubility that the molecular weight distribution of a compound selected as the component of the liquid crystal composition is wide, for example, one compound represented by Formula (i.1) or (i.2), one compound represented by Formula (i.5) or (i.6), and one compound represented by Formula (i.11) or (i.12) are selected, and it is particularly preferable that these compounds are suitably combined.

The liquid crystal composition according to the present invention preferably includes a compound represented by General Formula (i) and a compound having an alkenyl group having two or more carbon atoms and a vinylene group. That is, by combining a compound represented by General Formula (i) with a compound having an alkenyl group having two or more carbon atoms and a vinylene group as the nonpolar component B having a dielectric anisotropy of about −2 to 2, a flat transmission characteristic curve is obtained by which gradation characteristics is easily controlled. In addition, because an elastic constant of the liquid crystal composition is improved, the relaxation time of liquid crystal molecules is particularly shortened.

The alkenyl group having two or more carbon atoms and a vinylene group according to the present invention is preferably an alkenyl group with an unsaturated hydrocarbon of one carbon-carbon double bond.

As an alkenyl group having two or more carbon atoms and a vinylene group in the compound having the alkenyl group having two or more carbon atoms and a vinylene group, an alkenyl group having Formula (ii) below is preferable, and a compound having the alkenyl group is preferably a compound in which the alkenyl group is bonded to a ring structure (cyclohexane ring).

[Chem. 6]

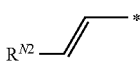
(ii)

(In General Formula (ii), $R^{N2}$ represents a hydrogen atom or an alkyl group having 1 to 3 carbon atoms, and * indicates bonding to a ring structure.)

By combining a compound represented by General Formula (i) with a compound having a vinylene group having two or more carbon atoms as the nonpolar component B having a dielectric anisotropy of about −2 to 2, a flat transmission characteristic curve is obtained by which gradation characteristics is easily controlled. In addition, because an elastic constant of the liquid crystal composition is improved, the relaxation time of liquid crystal molecules is particularly shortened.

The compound having the alkenyl group having two or more carbon atoms and a vinylene group according to the present invention is preferably at least one type of compounds selected from the group consisting of the compounds represented by General Formula (N).

[Chem. 7]

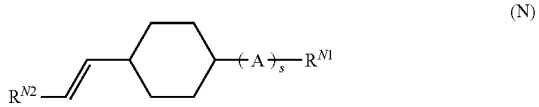

(N)

(In General Formula (N), ring A each independently represents a group selected from the group consisting of (a) a 1,4-cyclohexylene group (one —$CH_2$— or at least two non-adjacent —$CH_2$—'s present in the group may be substituted with —O—), and (b) a 1,4-phenylene group (one —CH═ or at least two non-adjacent —CH═'s present in the group may be substituted with —N═), the groups (a) and (b) each may be independently substituted with a fluorine atom, $R^{N1}$ represents an alkyl group having 1 to 10 carbon atoms, an alkenyl group having 2 to 10 carbon atoms, an alkoxy group having 1 to 10 carbon atoms, or a fluorine atom, and $R^{N2}$ represents a hydrogen atom or an alkyl group having 1 to 3 carbon atoms, and s represents an integer of 1 to 3.)

In General Formula (N), $R^{N2}$ is preferably a hydrogen atom or an alkyl group having 1 to 3 carbon atoms, $R^{N2}$ is more preferably a hydrogen atom, a methyl group, an ethyl group or a propyl group, still more preferably a hydrogen atom or a methyl group, and particularly preferably a methyl group from the viewpoint of improving Kavg.

In General Formula (N), s is preferably 1 to 2. In the case where s is 2 or greater, two or more of A's may be the same as or different from each other.

In General Formula (N), in the case where s is 2 or greater, one of two or more A's is preferably a benzene ring.

In General Formula (N), in the case where s is 1, A is preferably a cyclohexane ring.

The content of the compound represented by General Formula (N) according to the present invention needs to be suitably adjusted depending on the required performance such as solubility at a low temperature, a transition temperature, electrical reliability, birefringence, process compatibility, dropping marks, burn-in, or dielectric anisotropy. For example, the content (total) of the compound represented by General Formula (N) is preferably 1% to 70% by mass with respect to the total mass of the liquid crystal composition of the present invention. As more preferable content, 3% to 60% by mass, 5% to 50% by mass, 7% to 55% by mass, 8% to 50% by mass, 9% to 45% by mass, 10% to 43% by mass, 13% to 42% by mass, 15% to 42% by mass, and 17% to 42% by mass are preferable in order. In addition, if the lower limit of the content of the compound represented by General Formula (N) is 1% to 10% by mass, it is easy to adjust the dielectric anisotropy, and if the lower limit of the content of the compound represented by General Formula (N) is 11% to 17% by mass, a transmittance-gradation voltage curve of the liquid crystal composition is likely to be a flat curve. Furthermore, if the upper limit of the content of the compound represented by General Formula (N) is 10% to 20% by mass, it is easy to adjust the dielectric anisotropy, and if the upper limit of the content of the compound represented by General Formula (N) is 21% to 70% by mass, a transmittance-gradation voltage curve of the liquid crystal composition is likely to be a flat curve.

In the liquid crystal composition according to the present invention, the content of the compound represented by General Formula (N) in which $R^{N2}$ is a hydrogen atom is preferably 5% by mass or greater and 70% by mass or less, preferably 6% by mass or greater and 67% by mass or less, preferably 7% by mass or greater and 65% by mass or less, preferably 8% by mass and 62% by mass or less, preferably 9% by mass or greater and 60% by mass or less, preferably 10% by mass or greater and 57% by mass or less, preferably 5% by mass or greater and 55% by mass or less, preferably 5% by mass or greater and 53% by mass or less, preferably 8% by mass and 52% by mass or less, preferably 8% by mass or greater and 50% by mass or less, preferably 15% by mass or greater and 57% by mass or less, preferably 15% by mass or greater and 55% by mass or less, preferably 15% by mass or greater and 53% by mass or less, preferably 10% by mass or greater and 48% by mass or less, preferably 10% by mass or greater and 45% by mass or less, preferably 8% by mass or greater and 43% by mass or less, preferably 7% by mass or greater and 40% by mass or less, preferably 8% by mass or greater and 38% by mass or less, preferably 8% by mass or greater and 35% by mass or less, preferably 9% by mass or greater and 35% by mass or less, preferably 10% by mass or greater and 33% by mass or less, preferably 11% by mass or greater and 30% by mass or less, preferably 12% by mass or greater and 28% by mass or less, preferably 8% by mass or greater and 25% by mass or less, preferably 12% by mass or greater and 24% by mass or less, preferably 5% by mass or greater and 22% by mass or less, preferably 7% by mass or greater and 20% by mass or less, and preferably 8% by mass or greater and 36% by mass or less, with respect to the total mass of the liquid crystal composition of the present invention.

In the liquid crystal composition according to the present invention, the total content of the compound represented by General Formula (N) in which $R^{N2}$ is a methyl group is preferably 1% by mass or greater and 70% by mass or less, preferably 1% by mass or greater and 67% by mass or less, preferably 1% by mass or greater and 65% by mass or less, preferably 2% by mass and 62% by mass or less, preferably 3% by mass or greater and 60% by mass or less, preferably 3% by mass or greater and 57% by mass or less, preferably 3% by mass or greater and 55% by mass or less, preferably 3% by mass or greater and 53% by mass or less, preferably 4% by mass and 52% by mass or less, preferably 5% by mass or greater and 50% by mass or less, preferably 3% by mass or greater and 57% by mass or less, preferably 3% by mass or greater and 55% by mass or less, preferably 3% by mass or greater and 53% by mass or less, preferably 4% by mass or greater and 55% by mass or less, preferably 5% by mass or greater and 55% by mass or less, preferably 6% by mass or greater and 55% by mass or less, preferably 7% by mass or greater and 55% by mass or less, preferably 8% by mass or greater and 55% by mass or less, preferably 8% by mass or greater and 50% by mass or less, preferably 9% by mass or greater and 45% by mass or less, preferably 10% by mass or greater and 43% by mass or less, preferably 11% by mass or greater and 43% by mass or less, preferably 12% by mass or greater and 50% by mass or less, preferably 12% by mass or greater and 45% by mass or less, preferably 12% by mass or greater and 44% by mass or less, preferably 12% by mass or greater and 42% by mass or less, preferably 13% to 42% by mass or less, preferably 15% to 42% by mass or less, preferably 15% to 40% by mass or less, preferably 17% to 42% by mass or less, preferably 3% by mass or greater and 35% by mass or less, preferably 3% by mass or greater and 33% by mass or less, preferably 3% by mass or greater and 30% by mass or less, preferably 5% by mass or greater and 28% by mass or less, preferably 5% by mass or greater and 25% by mass or less, preferably 5% by mass or greater and 23% by mass or less, preferably 5% by mass or greater and 20% by mass or less, preferably 5% by mass or greater and 18% by mass or less, preferably 5% by mass or greater and 17% by mass or less, preferably 6% by mass or greater and 28% by mass or less, and preferably 7% by mass or greater and 25% by mass or less, with respect to the total mass of the liquid crystal composition of the present invention.

In the liquid crystal composition of the present invention, each content of the compounds represented by Formula (N) is preferably 1% by mass or greater and 55% by mass or less, preferably 1% by mass or greater and 35% by mass or less, and preferably 1% by mass or greater and 25% by mass or less, with respect to the total mass of the liquid crystal composition of the present invention. Among these, 1% by mass and 20% by mass or less, 2% by mass or greater and 19% by mass or less, 3% by mass or greater and 18% by mass or less, 3% by mass or greater and 16% by mass or less, 4% by mass or greater and 15% by mass or less, and 5% by mass or greater and 15% by mass or less are preferable.

The compound represented by General Formula (N) according to the present invention is preferably at least one type selected from the group consisting of the compounds represented by Formulas (N. 1) to (N. 56).

The compound represented by General Formula (N) according to the present invention is preferably a compound represented by Formulas (N. 1) to (N. 46), for example. Among these, it is preferable that a compound is represented by Formulas (N. 2) to (N. 5), (N. 10) to (N. 12), (N. 14) to (N. 16), (N. 19) and (N. 20), (N. 30) and (N. 31), (N. 36), and (N. 42) to (N. 46).

[Chem. 8]

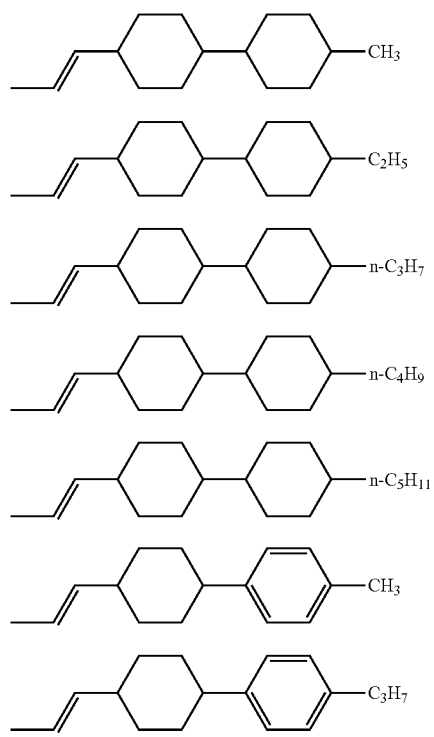

[Chem. 9]

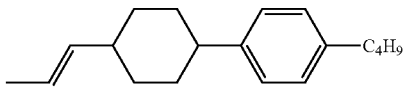

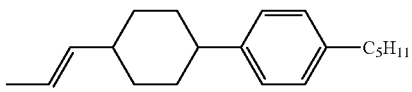

[Chem. 10]

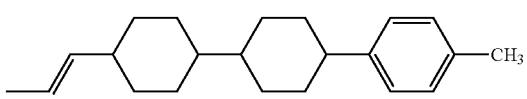

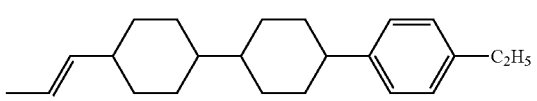

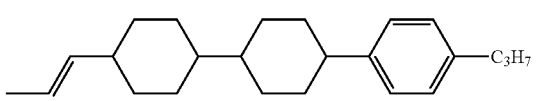

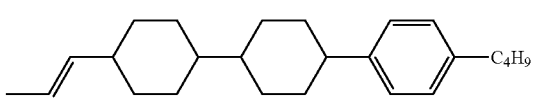

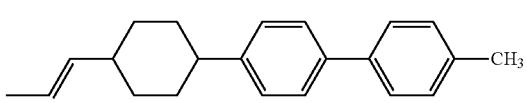

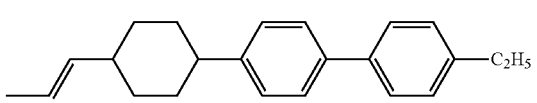

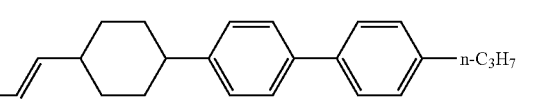

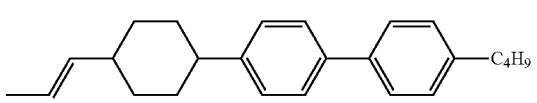

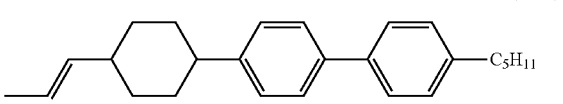

[Chem. 11]

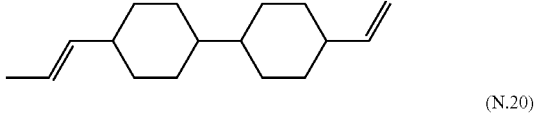

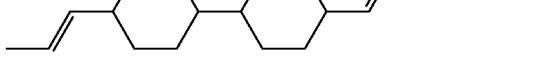

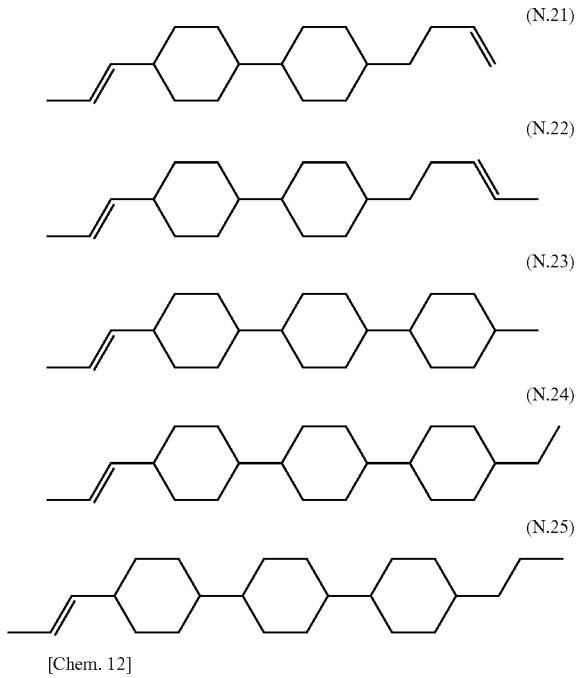
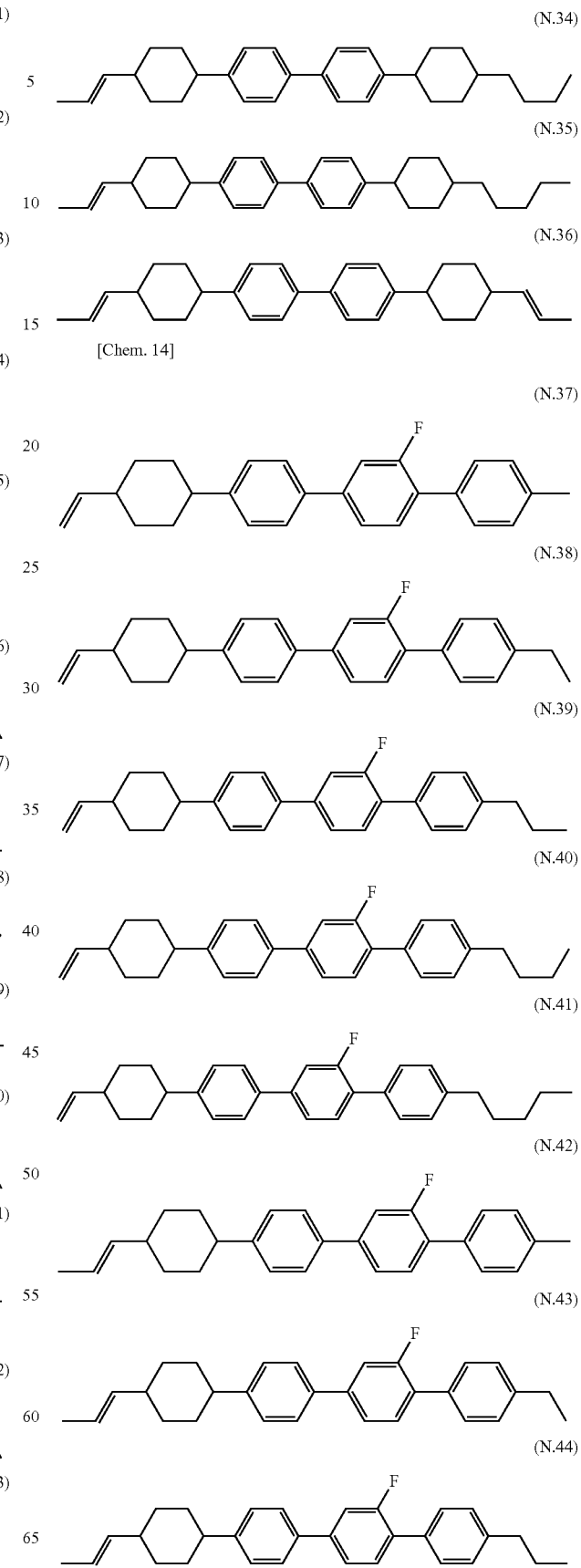

(N.45)

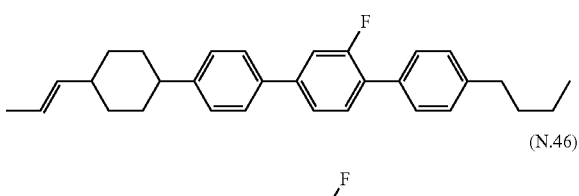

(N.46)

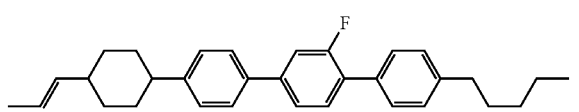

The compound represented by General Formula (N) according to the present invention is preferably a compound selected from the compound group of the compounds represented by Formulas (N. 47) to (N. 50). A compound represented by Formula (N. 48) is particularly preferable for particularly improve a response speed of the composition of the present invention. In addition, if high Tni is required rather than the response speed, it is preferable to use a compound represented by Formula (N. 49) or (N. 50). Regarding the content of the compound represented by Formula (N. 49) or (N. 50), 30% or greater is not preferable in terms of improving solubility at a low temperature.

[Chem. 15]

(N.47)

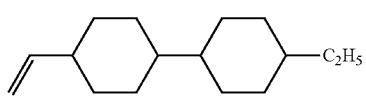

(N.48)

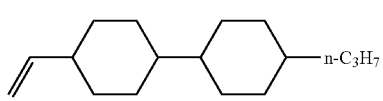

(N.49)

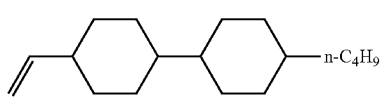

(N.50)

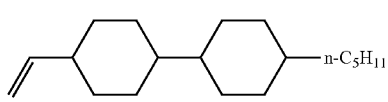

The compound represented by General Formula (N) according to the present invention is preferably a compound represented by Formulas (N. 51) to (N. 56), for example.

[Chem. 16]

(N.51)

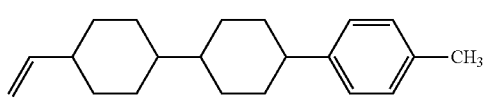

(N.52)

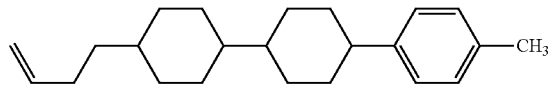

(N.53)

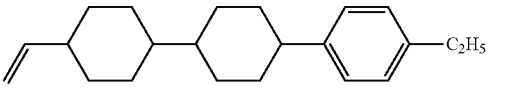

(N.54)

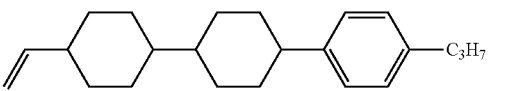

(N.55)

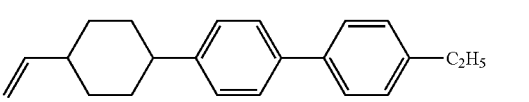

(N.56)

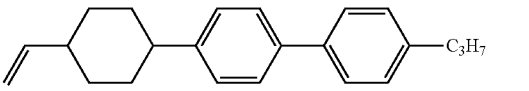

As the types of the compound represented by General Formula (N) contained in the liquid crystal composition according to the present invention, there is, for example, one type in one embodiment of the present invention. Alternatively, there are one or two types in another embodiment of the present invention. There are one to three types in still another embodiment of the present invention. There are one to five types in still further another embodiment of the present invention. There are two to five types in still another embodiment of the present invention. There are two to four types in still another embodiment of the present invention. There are two to six types in still another embodiment of the present invention.

As described above, it is preferable to combine a compound represented by General Formula (i) with a compound having an alkenyl group having two or more carbon atoms and a vinylene group as the nonpolar component (component B) since a flat transmittance-gradation voltage curve can be obtained. That is, it was confirmed that a flat transmission characteristic curve can be obtained by a combination of liquid crystal compounds of nonpolar compounds having an alkenyl group having two different chemical skeletons (so-called a mesogen).

The liquid crystal composition according to the present invention has a dielectric anisotropy of more than 0 and 14 or less at 25° C., which makes it possible to suppress the electrical capacity ($C_{LC}$) of the liquid crystal layer to a low level, and therefore is effective in suppressing phenomena such as flicker and deterioration of the response speed. On the other hand, applications of liquid crystal display elements have been expanded recently, which also leads to major changes in the usage method and the manufacturing method thereof. In order to deal with these changes, it is required to optimize characteristics other than fundamental physical property values known in the related art. That is, in accordance with an increase in the size of the liquid crystal display element to 50 inches or greater, a method for injecting the liquid crystal composition into the substrate also changes, and the one drop fill (ODF) method has become mainstream of the injection method from the vacuum injection method of the related art. However, the problem has been raised that deterioration in display quality is caused by dropping marks occurred when the liquid crystal composition is dropped onto the substrate.

Furthermore, in the liquid crystal display element manufacturing step by the ODF method, an optimal dropping amount needs to be dropped according to the size of the liquid crystal display element. If the dropping amount greatly deviates from the optimal value, the balance of the refractive index and the driving electric field of the liquid crystal display element which is designed in advance is lost, and display defects such as generation of spots and poor contrast occur. In particular, in a small-sized liquid crystal display element which is frequently used in smartphones in vogue recently, it is difficult to control deviation from the optimal value to be within a certain range since the optimal liquid crystal dropping amount is small. Therefore, in order to maintain a high manufacturing yield of the liquid crystal display element, for example, it is required that the liquid crystal composition is less affected by rapid pressure change or impact in the dropping apparatus which occurs when the liquid crystal is dropped, and that continuous and stable dropping is possible over a long period of time.

Another object of the liquid crystal composition of the invention of the present application is to solve the problem occurring from the fact that the compound represented by General Formula (i) and the compound represented by General Formula (N) are essential.

The liquid crystal composition of the invention of the present application may contain the compound represented by the following General Formula (L) as an optional component in the component B as the nonpolar component, and the compound represented by the General Formula (L) is preferably a nonpolar compound (dielectric anisotropy is −2.0 to 2.0).

A compound represented by the following General Formula (L) (excluding the compound represented by General Formula (i) and General Formula (N)) is preferably included.

[Chem. 17]

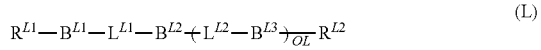
(L)

(In General Formula (L), $R^{L1}$ and $R^{L2}$ each independently represents an alkyl group having 1 to 8 carbon atoms, and one or at least two non-adjacent —$CH_2$—'s in the alkyl group each may be independently substituted with —CH=CH—, —C≡C—, —O—, —CO—, —COO—, or —OCO—;

OL represents 0, 1, 2, or 3;

$B^{L1}$, $B^{L2}$, and $B^{L3}$ each independently represents a group selected from the group consisting of:

(a) a 1,4-cyclohexylene group (one —$CH_2$— or at least two non-adjacent —$CH_2$—'s present in the group may be substituted with —O—), (b) a 1,4-phenylene group (one —CH= or at least two non-adjacent —CH='s present in the group may be substituted with —N=), and the groups (a) and (b) each may be independently substituted with a cyano group, a fluorine atom, or a chlorine atom; and $L^{L1}$ and $L^{L2}$ each independently represents a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, in the case where OL is 2 or 3 and plural $L^{L2}$'s are present, plural $L^{L2}$'s may be the same as or different from each other, and in the case where since OL is 2 or 3 and plural $B^{L3}$'s are present, plural $B^{L3}$'s may be the same as or different from each other.)

In addition, in General Formula (L), $R^{L1}$ and $R^{L2}$ each independently represents an alkyl group having 1 to 8 carbon atoms, and each one or at least two non-adjacent —$CH_2$—'s in the alkyl group is preferably independently substituted with —CH=CH—, —C≡C—, —O—, —CO—, —COO—, or —OCO—. It is preferable that $R^{L1}$ and $R^{L2}$ each independently represents an alkyl group having 1 to 8 carbon atoms, an alkoxy group having 1 to 8 carbon atoms, or an alkenyl group having 2 to 10 carbon atoms. The same applied to General Formula (M) described below.

The liquid crystal composition according to the present invention can contain one or more types of the compounds represented by General Formula (L). The types of compound capable of being combined are not limited and can be suitably combined depending on the required performance such as solubility at a low temperature, a transition temperature, electrical reliability, birefringence, or the like. As the types of the compound used, there is, for example, one type in one embodiment of the present invention. Alternatively, there are two types in another embodiment of the present invention. There are three types in still another embodiment of the present invention. There are five types in still further another embodiment of the present invention. There are six types in still another embodiment of the present invention. There are seven types in still another embodiment of the present invention. There are eight types in still another embodiment of the present invention. There are nine types in still another embodiment of the present invention. There are ten types instill another embodiment of the present invention. There are twelve or more types in still another embodiment of the present invention. In addition, it is preferable that one to 15 types of the compounds represented by General Formula (L) are contained, it is more preferable that three to 14 types of the compounds represented by General Formula (L) are contained, and it is still more preferable that five to 12 types of the compounds represented by General Formula (L) are contained.

In the liquid crystal composition of the present invention, the content of the compound represented by General Formula (L) needs to be suitably adjusted depending on the required performance such as solubility at a low temperature, a transition temperature, electrical reliability, birefringence, process compatibility, dropping marks, burn-in, or dielectric anisotropy.

For example, the content of the compound represented by General Formula (L) is 20% to 98% by mass with respect to the total mass of the liquid crystal composition of the present invention in one embodiment of the present invention. In another embodiment of the present invention, the content is 30% to 90% by mass. In still another embodiment of the present invention, the content is 40% to 85% by mass. In still another embodiment of the present invention, the content is 45% to 85% by mass. Instill another embodiment of the present invention, the content is 50% to 75% by mass. In still another embodiment of the present invention, the content is 55% to 70% by mass. In still another embodiment of the present invention, the content is 56% to 65% by mass. In still another embodiment of the present invention, the content is 25% to 85% by mass. In still another embodiment of the present invention, the content is 30% to 80% by mass. In still another embodiment of the present invention, the content is 47% to 75% by mass. In still another embodiment of the present invention, the content is 53% to 70% by mass. In still another embodiment of the present invention, the content is 60% to 98% by mass. In still another embodiment of the present invention, the content is 62% to 95% by mass. In still another embodiment of the present invention, the content is 58% to 78% by mass. In still another embodiment of the present invention, the content is 65% to 85% by mass. In still another embodiment of the present invention, the content is 70% to 98% by mass. In still another embodiment of the present invention, the content is 47% to 97.5% by mass.

In the case where it is required that the viscosity of the liquid crystal composition of the present invention be kept low and the liquid crystal composition have a high response speed, it is preferable that the lower limit value is great and the upper limit value is great. In the case where it is required that Tni of the liquid crystal composition of the present invention be kept high and the liquid crystal composition have good temperature stability, it is preferable that the lower limit value is great and the upper limit value is great. In addition, when it is desired to increase the dielectric anisotropy in order to keep the driving voltage low, it is preferable that the lower limit value is small and the upper limit value is small.

In the case where the ring structure to which $R^{L1}$ or $R^{L2}$ is bonded is a phenyl group (aromatic group), $R^{L1}$ or $R^{L2}$ each is preferably a linear alkyl group having 1 to 5 carbon atoms, a linear alkoxy group having 1 to 4 carbon atoms (or more), or an alkenyl group having 4 or 5 carbon atoms, and in the case where the ring structure to which $R^{L1}$ or $R^{L2}$ is bonded is a saturated ring structure such as cyclohexane, pyran, or dioxane, $R^{L1}$ or $R^{L2}$ each is preferably a linear alkyl group having 1 to 5 carbon atoms, a linear alkoxy group having 1 to 4 carbon atoms (or more), or a linear alkenyl group having 2 to 5 carbon atoms.

In the case where chemical stability of the liquid crystal composition is required, the compound represented by General Formula (L) according to the present invention preferably does not have a chlorine atom in the molecule.

The compound represented by General Formula (L) according to the present invention is, for example, preferably a compound selected from the compound group of compounds represented by General Formula (I) (excluding the compound represented by General Formula (N)).

[Chem. 18]

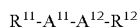

$$R^{11}\text{-}A^{11}\text{-}A^{12}\text{-}R^{12} \quad \text{(I)}$$

(In General Formula (I), $R^{11}$ and $R^{12}$ each independently represents an alkyl group having 1 to 8 carbon atoms, an alkoxy group having 1 to 8 carbon atoms, or an alkenyl group having 2 to 8 carbon atoms, one or more hydrogen atoms in the alkyl group, the alkenyl group, the alkoxy group, or the alkenyloxy group may be substituted with (a) fluorine atom(s), the methylene group in the alkyl group, the alkenyl group, the alkoxy group, or the alkenyloxy group may be substituted with oxygen atoms as long as the oxygen atoms are not continuously bonded or may be substituted with carbonyl groups as long as the carbonyl groups are not continuously bonded, and $A^{11}$ and $A^{12}$ each independently represents a 1,4-cyclohexylene group, a 1,4-phenylene group, a 2-fluoro-1,4-phenylene group, or a 3-fluoro-1,4-phenylene group.)

The types of compound capable of being combined with the compound group of the compounds represented by General Formula (I) are not particularly limited, and a compound is suitably combined and used depending on the required performance such as solubility at a low temperature, viscosity, a transition temperature, electrical reliability, or birefringence. The type of compound used is, for example, one type in one embodiment of the present invention. In another embodiment of the present invention, two types are used. Instill another embodiment of the present invention, three types are used. In still another embodiment of the present invention, four types are used. In still another embodiment of the present invention, five types are used. In addition, in still another embodiment of the present invention, six or more types are used.

The content of the so-called bicyclic compound represented by General Formula (I) in the liquid crystal composition of the present invention needs to be suitably adjusted depending on the required performance such as solubility at a low temperature, viscosity, a transition temperature, electrical reliability, birefringence, process compatibility, dropping marks, burn-in, or dielectric anisotropy.

For example, the content of the compound represented by General Formula (I) is 10% to 75% by mass with respect to the total mass of the liquid crystal composition of the present invention in one embodiment of the present invention. In another embodiment of the present invention, the content is 10% to 70% by mass. In still another embodiment of the present invention, the content is 10% to 65% by mass. In still another embodiment of the present invention, the content is 10% to 60% by mass. Instill another embodiment of the present invention, the content is 15% to 60% by mass. In still another embodiment of the present invention, the content is 15% to 59% by mass. In still another embodiment of the present invention, the content is 15% to 56% by mass. In still another embodiment of the present invention, the content is 15% to 52% by mass. In still another embodiment of the present invention, the content is 15% to 51% by mass. In still another embodiment of the present invention, the content is 15% to 49% by mass. In still another embodiment of the present invention, the content is 15% to 48% by mass. In still another embodiment of the present invention, the content is 15% to 47% by mass. In still another embodiment of the present invention, the content is 15% to 45% by mass. In still another embodiment of the present invention, the content is 15% to 44% by mass. In still another embodiment of the present invention, the content is 15% to 43% by mass. In still another embodiment of the present invention, the content is 15% to 41% by mass. In still another embodiment of the present invention, the content is 15% to 39% by mass. In still another embodiment of the present invention, the content is 15% to 38% by mass. In still another embodiment of the present invention, the content is 15% to 35% by mass. In still another embodiment of the present invention, the content is 15% to 33% by mass. In still another embodiment of the present invention, the content is 15% to 31% by mass. In still another embodiment of the present invention, the content is 15% to 30% by mass. In still another embodiment of the present invention, the content is 15% to 29% by mass. In still another embodiment of the present invention, the content is 15% to 28% by mass. In still another embodiment of the present invention, the content is 15% to 20% by mass. In still another embodiment of the present invention, the content is 17% to 60% by mass. In still another embodiment of the present invention, the content is 20% to 60% by mass. In still another embodiment of the present invention, the content is 27% to 60% by mass. In still another embodiment of the present invention, the content is 28% to 60% by mass. In still another embodiment of the present invention, the content is 30% to 60% by mass. In still another embodiment of the present invention, the content is 31% to 60% by mass. In still another embodiment of the present invention, the content is 32% to 60% by mass. In still another embodiment of the present invention, the content is 33% to 60% by mass. In still another embodiment of the present invention, the content is 34% to 60% by mass. In still another embodiment of the present invention, the content is 35% to 60% by mass. In still another embodiment of the present invention, the content is 36% to 60% by mass. In still another embodiment of the present invention, the content is 37% to 60% by mass. In still another embodiment of the present invention, the content is 39% to 60% by mass. In still another embodiment of the present invention, the content is 41% to 60% by mass. In still another embodiment of the present invention, the content is 42% to 60% by mass. In still another embodiment of the present invention, the content is 43% to 60% by mass. In still another embodiment of the present invention, the content is 44% to 60% by mass. In still another embodiment of the present invention, the content is 46% to 60% by mass. In still another embodiment of the present invention, the content is 47% to 60% by mass. In still another embodiment of the present invention, the content is 48% to 60% by mass. In still another embodiment of the present invention, the content is 49% to 60% by mass. In still another embodiment of the present invention, the content is 51% to 60% by mass. In still another embodiment of the present invention, the content is 17% to 45% by mass. In still another embodiment of the present invention, the content is 27% to 29% by mass. In still another embodiment of the present invention, the content is 32% to 43% by mass. In still another embodiment of the present invention, the content is 34% to 38% by mass. In still another embodiment of the present invention, the content is 36% to 45% by mass. In still another embodiment of the present invention, the content is 37% to 48% by mass. In still another embodiment of the present invention, the content is 42% to 56% by mass. In still another embodiment of the present invention, the content is 43% to 52% by mass. In still another embodiment of the present invention, the content is 43% to 49% by mass. In still another embodiment of the present invention, the content is 43% to 44% by mass. In still another embodiment of the present invention, the content is 44% to 48% by mass. In addition, in still another embodiment of the present invention, the content is 47% to 51% by mass.

In the liquid crystal composition according to the present invention, the compound group of the compounds represented by General Formula (I) is particularly preferably contained, from the viewpoint of being capable of keeping viscosity low and providing a liquid crystal composition having a high response speed.

In the case where it is required that the viscosity of the liquid crystal composition of the present invention be kept low and a liquid crystal composition have a high response speed, it is preferable that the lower limit value of the content of the compound (group) represented by General Formula (I) is great and the upper limit value thereof is great.

Furthermore, the compound represented by General Formula (I) is preferably a compound selected from the compound group of the compounds represented by General Formula (I-1).

[Chem. 19]

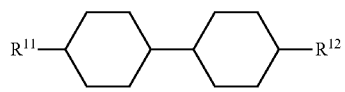

(I-1)

(In General Formula (I-1), $R^{11}$ and $R^{12}$ each has the same meaning as that in General Formula (I), but the compounds represented by General Formula (N) are excluded.)

In the liquid crystal composition of the present invention, as the compound represented by General Formula (I-1), 1 to 10 types, 1 to 9 types, 1 to 8 types, 1 to 7 types, 1 to 6 types, 2 to 9 types, 2 to 8 types, 2 to 6 types, 3 to 9 types, 3 to 7 types, 3 to 6 types, or 4 to 6 types are preferably contained in combination.

In the liquid crystal composition according to the present invention, the compound group of the compounds represented by General Formula (I-1) is particularly preferably contained, from the viewpoint of being capable of keeping viscosity low and providing a liquid crystal composition having a high response speed.

For example, the content of the compound represented by General Formula (I-1) is 10% to 70% by mass with respect to the total mass of the liquid crystal composition of the present invention in one embodiment of the present invention. In another embodiment of the present invention, the content is 10% to 60% by mass. In still another embodiment of the present invention, the content is 15% to 60% by mass. In still another embodiment of the present invention, the content is 15% to 59% by mass. In still another embodiment of the present invention, the content is 15% to 56% by mass. In still another embodiment of the present invention, the content is 15% to 52% by mass. In still another embodiment of the present invention, the content is 15% to 50% by mass. In still another embodiment of the present invention, the content is 15% to 49% by mass. In still another embodiment of the present invention, the content is 15% to 48% by mass. In still another embodiment of the present invention, the content is 15% to 47% by mass. In still another embodiment of the present invention, the content is 15% to 46% by mass. In still another embodiment of the present invention, the content is 15% to 45% by mass. In still another embodiment of the present invention, the content is 15% to 39% by mass. In still another embodiment of the present invention, the content is 15% to 38% by mass. In still another embodiment of the present invention, the content is 15% to 35% by mass. In still another embodiment of the present invention, the content is 15% to 33% by mass. In still another embodiment of the present invention, the content is 15% to 30% by mass. In still another embodiment of the present invention, the content is 15% to 28% by mass. In still another embodiment of the present invention, the content is 15% to 26% by mass. In still another embodiment of the present invention, the content is 15% to 20% by mass. In still another embodiment of the present invention, the content is 17% to 60% by mass. In still another embodiment of the present invention, the content is 20% to 60% by mass. In still another embodiment of the present invention, the content is 21% to 60% by mass. In still another embodiment of the present invention, the content is 23% to 60% by mass. In still another embodiment of the present invention, the content is 26% to 60% by mass. In still another embodiment of the present invention, the content is 27% to 60% by mass. In still another embodiment of the present invention, the content is 2% to 60% by mass. In still another embodiment of the present invention, the content is 30% to 60% by mass. In still another embodiment of the present invention, the content is 33% to 60% by mass. In still another embodiment of the present invention, the content is 34% to 60% by mass. In still another embodiment of the present invention, the content is 35% to 60% by mass. In still another embodiment of the present invention, the content is 36% to 60% by mass. In still another embodiment of the present invention, the content is 37% to 60% by mass.

Instill another embodiment of the present invention, the content is 38% to 60% by mass. In still another embodiment of the present invention, the content is 39% to 60% by mass. In still another embodiment of the present invention, the content is 42% to 60% by mass. In still another embodiment of the present invention, the content is 43% to 60% by mass. In still another embodiment of the present invention, the content is 46% to 60% by mass. In still another embodiment of the present invention, the content is 47% to 60% by mass. In still another embodiment of the present invention, the content is 49% to 60% by mass. In still another embodiment of the present invention, the content is 50% to 60% by mass. In still another embodiment of the present invention, the content is 17% to 45% by mass. In still another embodiment of the present invention, the content is 21% to 24% by mass. In still another embodiment of the present invention, the content is 27% to 38% by mass. In still another embodiment of the present invention, the content is 28% to 29% by mass. In still another embodiment of the present invention, the content is 23% to 46% by mass. In still another embodiment of the present invention, the content is 34% to 38% by mass. In still another embodiment of the present invention, the content is 36% to 45% by mass. In still another embodiment of the present invention, the content is 37% to 48% by mass. In still another embodiment of the present invention, the content is 42% to 48% by mass. In still another embodiment of the present invention, the content is 38% to 49% by mass. In still another embodiment of the present invention, the content is 42% to 56% by mass. In still another embodiment of the present invention, the content is 42% to 50% by mass. In still another embodiment of the present invention, the content is 43% to 52% by mass. In addition, in still another embodiment of the present invention, the content is 46% to 47% by mass.

In the case where it is required that the viscosity of the liquid crystal composition of the present invention be kept low and the liquid crystal composition have a high response speed, it is preferable that the lower limit value is great and the upper limit value is great.

Furthermore, the compound represented by General Formula (I-1) is preferably a compound selected from the compound group of the compounds represented by General Formula (I-1-1).

[Chem. 20]

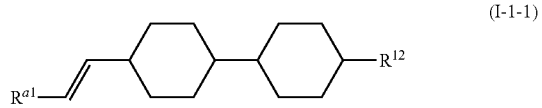

(I-1-1)

(In General Formula (I-1-1), $R^{12}$ has the same meaning as that in General Formula (I), and $R^{a1}$ is a hydrogen atom or an alkyl group having 1 to 6 carbon atoms, but the compounds represented by General Formula (N) are excluded.)

In the liquid crystal composition according to the present invention, the compound group of the compounds represented by General Formula (I-1-1) is particularly preferably contained, from the viewpoint of being capable of keeping viscosity low and providing a liquid crystal composition having a high response speed.

For example, the content of the compound represented by General Formula (I-1-1) is 1% to 45% by mass with respect to the total mass of the liquid crystal composition of the present invention in one embodiment of the present invention. In another embodiment of the present invention, the content is 1% to 35% by mass. In still another embodiment of the present invention, the content is 1% to 30% by mass. In still another embodiment of the present invention, the content is 1% to 26% by mass. In still another embodiment of the present invention, the content is 1% to 21% by mass. In still another embodiment of the present invention, the content is 1% to 16% by mass. In still another embodiment of the present invention, the content is 1% to 15% by mass. In still another embodiment of the present invention, the content is 1% to 13% by mass. In still another embodiment of the present invention, the content is 1% to 12% by mass. In still another embodiment of the present invention, the content is 1% to 11% by mass. In still another embodiment of the present invention, the content is 1% to 10% by mass. In still another embodiment of the present invention, the content is 1% to 8% by mass. In still another embodiment of the present invention, the content is 1% to 7% by mass. In still another embodiment of the present invention, the content is 1% to 5% by mass. In still another embodiment of the present invention, the content is 1% to 4% by mass. In still another embodiment of the present invention, the content is 3% to 30% by mass. In still another embodiment of the present invention, the content is 4% to 30% by mass. In still another embodiment of the present invention, the content is 5% to 30% by mass. In still another embodiment of the present invention, the content is 6% to 30% by mass. In still another embodiment of the present invention, the content is 7% to 30% by mass. In still another embodiment of the present invention, the content is 8% to 30% by mass. In still another embodiment of the present invention, the content is 9% to 30% by mass. In still another embodiment of the present invention, the content is 10% to 30% by mass. In still another embodiment of the present invention, the content is 11% to 30% by mass. In still another embodiment of the present invention, the content is 12% to 30% by mass. In still another embodiment of the present invention, the content is 13% to 30% by mass. In still another embodiment of the present invention, the content is 3% to 26% by mass. In still another embodiment of the present invention, the content is 3% to 13% by mass. In still another embodiment of the present invention, the content is 3% to 8% by mass. In still another embodiment of the present invention, the content is 4% to 7% by mass. In still another embodiment of the present invention, the content is 5% to 12% by mass. In still another embodiment of the present invention, the content is 9% to 12% by mass. In still another embodiment of the present invention, the content is 6% to 16% by mass. In still another embodiment of the present invention, the content is 7% to 16% by mass. In still another embodiment of the present invention, the content is 7% to 10% by mass. In still another embodiment of the present invention, the content is 8% to 26% by mass. In still another embodiment of the present invention, the content is 8% to 15% by mass. In still another embodiment of the present invention, the content is 8% to 13% by mass. In still another embodiment of the present invention, the content is 9% to 25% by mass. In still another embodiment of the present invention, the content is 10% to 21% by mass. In still another embodiment of the present invention, the content is 12% to 21% by mass. In still another embodiment of the present invention, the content is 13% to 16% by mass. In addition, in still another embodiment of the present invention, the content is 11% to 26% by mass.

The liquid crystal composition of the present invention can also further contain the compound represented by Formula (2.5).

[Chem. 21]

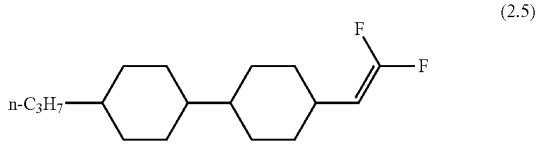

(2.5)

The content of the compound represented by Formula (2.5) is preferably adjusted depending on the required performance such as solubility at a low temperature, a transition temperature, electrical reliability, or birefringence, and the preferable range of the content is as shown in the table described below.

The content of the compound represented by Formula (2.5) is preferably adjusted depending on the required performance such as solubility at a low temperature, a transition temperature, electrical reliability, and birefringence, and the content of the compound is preferably 0% to 40% by mass, preferably 1% to 35% by mass, preferably 1% to 30% by mass, preferably 5% to 30% by mass, preferably 10% to 30% by mass, preferably 15% to 30% by mass, preferably 20% to 30% by mass, and preferably 25% to 30% by mass, with respect to the total mass of the liquid crystal composition of the present invention.

Furthermore, the compound represented by General Formula (I) according to the present invention is preferably a compound selected from the compound group of the compounds represented by General Formula (I-2).

[Chem. 22]

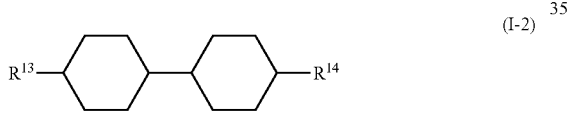

(I-2)

(In General Formula (I-2), $R^{13}$ and $R^{14}$ each independently represents an alkyl group having 1 to 5 carbon atoms.)

The types of compound capable of being combined are not particularly limited, and a compound is combined depending on the required performance such as solubility at a low temperature, a transition temperature, electrical reliability, or birefringence. The type of compound used is, for example, one type in one embodiment of the present invention. In another embodiment of the present invention, two types are used. In addition, in still another embodiment of the present invention, three types are used.

In the liquid crystal composition of the present invention, the content of the compound represented by General Formula (I-2) needs to be suitably adjusted depending on the required performance such as solubility at a low temperature, a transition temperature, electrical reliability, birefringence, process compatibility, dropping marks, burn-in, or dielectric anisotropy.

For example, the content of the compound represented by General Formula (I-2) is 1% to 30% by mass with respect to the total mass of the liquid crystal composition of the present invention in one embodiment of the present invention. In another embodiment of the present invention, the content is 2% to 30% by mass. In still another embodiment of the present invention, the content is 4% to 30% by mass. In still another embodiment of the present invention, the content is 4% to 25% by mass. In addition, in still another embodiment of the present invention, the content is 4% to 23% by mass.

Furthermore, the compound represented by General Formula (I-2) is preferably a compound selected from the compound group of the compounds represented by Formulas (3.1) to (3.4), and preferably the compound represented by Formula (3.1), (3.3), or (3.4). In particular, the compound represented by Formula (3.2) is preferable since the compound particularly improves the response speed of the liquid crystal composition of the present invention. When a higher Tni than the response speed is required, the compound represented by Formula (3.3) or (3.4) is preferably used. The content of the compound represented by Formula (3.3) or (3.4) is preferably less than 20% to improve the solubility at a low temperature.

Furthermore, the compound represented by General Formula (I-2) is preferably a compound selected from the compound group of the compounds represented by Formulas (3.1) to (3.4), and preferably the compound represented by each of Formulas (3.1), (3.3), and/or (3.4).

[Chem. 23]

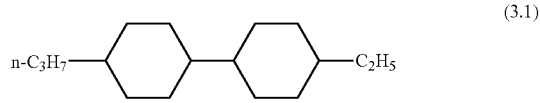

(3.1)

[Chem. 24]

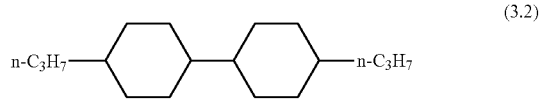

(3.2)

[Chem. 25]

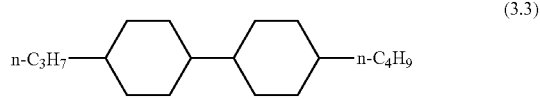

(3.3)

[Chem. 26]

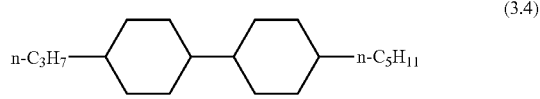

(3.4)

In the liquid crystal composition of the present invention, the content of the compound represented by Formula (3.3) is preferably 1% by mass or greater and 25% by mass or less, preferably 1% by mass or greater and 20% by mass or less, preferably 1% by mass or greater and 15% by mass or less, preferably 1% by mass or greater and 10% by mass or less, and preferably 1% by mass or greater and 5% by mass or less, with respect to the total mass of the liquid crystal composition of the present invention.

Furthermore, the compound represented by General Formula (I) according to the present invention is preferably a compound selected from the compound group of the compounds represented by General Formula (I-3).

[Chem. 27]

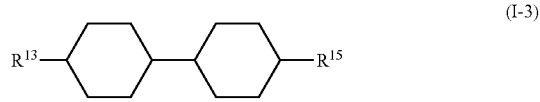

(I-3)

(In General Formula (I-3), $R^{15}$ is an alkoxy group having 1 to 10 carbon atoms, and $R^{13}$ has the same meaning as that in General Formula (I-2).)

The types of compound capable of being combined are not particularly limited, and a compound is combined depending on the required performance such as solubility at a low temperature, a transition temperature, electrical reliability, or birefringence. The type of compound used is, for example, one type in one embodiment of the present invention. In another embodiment of the present invention, two types are used. In addition, in still another embodiment of the present invention, three types are used.

In the liquid crystal composition of the present invention, the content of the compound represented by General Formula (I-3) needs to be suitably adjusted depending on the required performance such as solubility at a low temperature, a transition temperature, electrical reliability, birefringence, process compatibility, dropping marks, burn-in, or dielectric anisotropy.

The preferable range of the content is as shown in the table described below.

For example, the content of the compound represented by General Formula (I-3) is 3% to 30% by mass with respect to the total mass of the liquid crystal composition of the present invention in one embodiment of the present invention. In another embodiment of the present invention, the content is 4% to 30% by mass. In still another embodiment of the present invention, the content is 15% to 30% by mass. In still another embodiment of the present invention, the content is 25% to 30% by mass. Instill another embodiment of the present invention, the content is 3% to 25% by mass. In still another embodiment of the present invention, the content is 3% to 20% by mass. In still another embodiment of the present invention, the content is 3% to 15% by mass. In addition, in still another embodiment of the present invention, the content is 3% to 5% by mass.

In the case where the solubility at a low temperature matters, when the content is set to be great, effects are higher, and in contrast, in the case where the response speed matters, when the content is set to be small, effects are higher. Furthermore, in the case of improving dropping marks or burn-in characteristics, the range of the content is preferably set to a middle value.

Furthermore, the compound represented by General Formula (I-3) is preferably a compound selected from the compound group of the compounds represented by Formulas (4.1) to (4.3), and preferably the compound represented by Formula (4.3).

[Chem. 28]

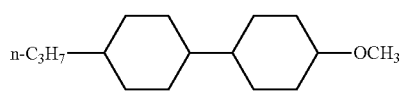

(4.1)

[Chem. 29]

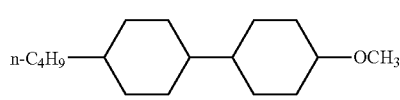

(4.2)

[Chem. 30]

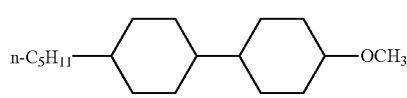

(4.3)

The content of the compound represented by Formula (4.3) is preferably 2% by mass or greater and 30% by mass or less, preferably 4% by mass or greater and 30% by mass or less, preferably 6% by mass or greater and 30% by mass or less, preferably 8% by mass or greater and 30% by mass or less, preferably 10% by mass or greater and 30% by mass or less, preferably 12% by mass or greater and 30% by mass or less, preferably 14% by mass or greater and 30% by mass or less, preferably 16% by mass or greater and 30% by mass or less, preferably 18% by mass or greater and 25% by mass or less, preferably 20% by mass or greater and 24% by mass or less, and preferably 22% by mass or greater and 23% by mass or less, with respect to the total mass of the liquid crystal composition of the present invention.

Furthermore, the compound represented by General Formula (I) according to the present invention is preferably a compound selected from the compound group of the compounds represented by General Formula (I-0).

[Chem. 31]

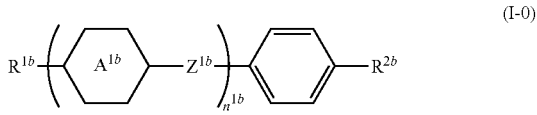

(I-0)

It is preferable that at least one type is selected from the compound group of the compounds represented by General Formula (I-0) where $R^{1b}$ has the same meaning as $R^1$ in General Formula (L), $R^{2b}$ has the same meaning as $R^2$ in General Formula (L), $n^{1b}$ represents 1 or 2, $A^{1b}$ has the same meaning as $A^1$ in General Formula (L), and $Z^{1b}$ has the same meaning as $Z^1$ in General Formula (L), but the compounds represented by General Formula (N) are excluded.

In the liquid crystal composition of the present invention, the content of the compound represented by General Formula (I-0) is preferably 1% by mass or greater and 55% by mass or less, preferably 1% by mass or greater and 50% by mass or less, and preferably 5% by mass or greater and 50% by mass or less, with respect to the total mass of the liquid crystal composition of the present invention. Within the content ranges, 9% by mass or greater and 47% by mass or less, 9% by mass or greater and 15% by mass or less, 11% by mass or greater and 44% by mass or less, 15% by mass or greater and 32% by mass or less, 20% by mass or greater and 35% by mass or less, 23% by mass or greater and 26% by mass or less, 24% by mass or greater and 40% by mass or less, 25% by mass or greater and 36% by mass or less, 28% by mass or greater and 38% by mass or less, 30% by mass or greater and 40% by mass or less, 30% by mass or greater and 39% by mass or less, 30% by mass or greater and 38% by mass or less, 33% by mass or greater and 47% by mass or less, 35% by mass or greater and 44% by mass or less, 35% by mass or greater and 40% by mass or less, 38% by mass or greater and 45% by mass or less, or 39% by mass or greater and 47% by mass or less is preferable.

In the liquid crystal composition of the present invention, the content of the compound represented by Formula (2.3) is preferably 1% by mass and 30% by mass or less, preferably 1% by mass or greater and 25% by mass or less, preferably 3% by mass or greater and 25% by mass or less, preferably 4% by mass or greater and 22% by mass or less, preferably 5% by mass or greater and 22% by mass or less, preferably 11% by mass or greater and 22% by mass or less, preferably 13% by mass or greater and 22% by mass or less, preferably 4% by mass or greater and 16% by mass or less, preferably 4% by mass or greater and 15% by mass or less, preferably 4% by mass or greater and 10% by mass or less, preferably 5% by mass or greater and 10% by mass or less, preferably 12% by mass or greater and 15% by mass or less, and preferably 13% by mass or greater and 16% by mass or less, with respect to the total mass of the liquid crystal composition of the present invention.

In the liquid crystal composition of the present invention, the content of the compound represented by General Formula (I-0) needs to be suitably adjusted depending on the required performance such as solubility at a low temperature, a transition temperature, electrical reliability, birefringence, process compatibility, viscosity, dropping marks, burn-in, or dielectric anisotropy.

In particular, if the compound represented by General Formula (II-2) described below is contained in the composition, it is preferable from the viewpoint of increase in the response speed of the liquid crystal composition.

Furthermore, the compound represented by General Formula (I) according to the present invention is preferably a compound selected from the compound group of the compounds represented by General Formula (I-4).

[Chem. 32]

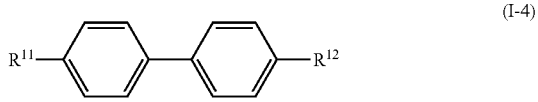

(I-4)

(In General Formula (I-4), $R^{11}$ and $R^{12}$ each has the same meaning as that in General Formula (L).)

The types of compound capable of being combined are not particularly limited, and a compound is combined depending on the required performance such as solubility at a low temperature, a transition temperature, electrical reliability, or birefringence. The type of compound used is, for example, one type in one embodiment of the present invention. In another embodiment of the present invention, two types are used.

In the liquid crystal composition of the present invention, the content of the compound represented by General Formula (I-4) needs to be suitably adjusted depending on the required performance such as solubility at a low temperature, a transition temperature, electrical reliability, birefringence, process compatibility, dropping marks, burn-in, or dielectric anisotropy.

In particular, in the case where the compound represented by Formula (5.4) described below is contained in the composition, this is preferable from the viewpoint of increase in the response speed of the liquid crystal composition. In addition, this is also preferable from the viewpoint of even-odd effects or an elastic constant ($K_{33}$).

For example, the content of the compound represented by General Formula (I-4) is 2% to 30% by mass with respect to the total mass of the liquid crystal composition of the present invention in one embodiment of the present invention. In another embodiment of the present invention, the content is 5% to 30% by mass. In still another embodiment of the present invention, the content is 6% to 30% by mass. In still another embodiment of the present invention, the content is 8% to 30% by mass. Instill another embodiment of the present invention, the content is 10% to 30% by mass. In still another embodiment of the present invention, the content is 12% to 30% by mass. In still another embodiment of the present invention, the content is 15% to 30% by mass. In still another embodiment of the present invention, the content is 20% to 30% by mass. In still another embodiment of the present invention, the content is 25% to 30% by mass. In still another embodiment of the present invention, the content is 2% to 25% by mass. In still another embodiment of the present invention, the content is 2% to 20% by mass. In still another embodiment of the present invention, the content is 2% to 15% by mass. In still another embodiment of the present invention, the content is 2% to 10% by mass. In addition, in still another embodiment of the present invention, the content is 5% to 8% by mass.

In the liquid crystal composition of the present invention, the types of compound capable of being combined in the compound represented by General Formula (I-4) are not particularly limited, and a compound is combined depending on the required performance such as solubility at a low temperature, a transition temperature, electrical reliability, or birefringence. The type of compound used is, for example, one to ten types in one embodiment of the present invention. In another embodiment of the present invention, one to eight types are used. Furthermore, in another embodiment of the present invention, one to five types are used. In another embodiment of the present invention, one to three types are used.

In the case of obtaining a high birefringence, when the content is set to be great, effects are higher, and in contrast, in the case where a high Tni matters, when the content is set to be small, effects are higher. Furthermore, in the case of improving dropping marks or burn-in characteristics, the range of the content is preferably set to a middle value.

Furthermore, the compound represented by General Formula (I-4) is preferably a compound selected from the compound group of the compounds represented by Formulas (5.1) to (5.4), more preferably the compound represented by each of Formulas (5.2) to (5.7), and still more preferably include at least one of compound selected from the group consisting of Formulas (5.2) to (5.4).

It is preferable that an alkenyl group having 1 to 8 carbon atoms is included in one of the substituents of the end portions of the skeleton represented by General Formula (I-4) from the viewpoint of the high speed response property of the liquid crystal composition.

[Chem. 33]

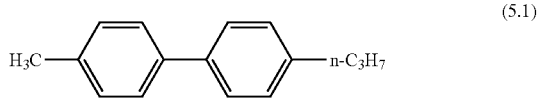

(5.1)

[Chem. 34]

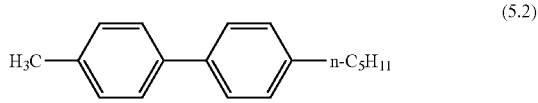

(5.2)

[Chem. 35]

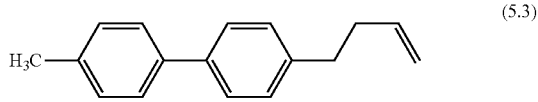

(5.3)

[Chem. 36]

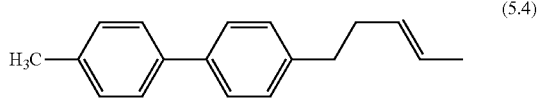

(5.4)

-continued

[Chem. 37]

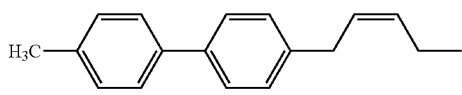
(5.5)

[Chem. 38]

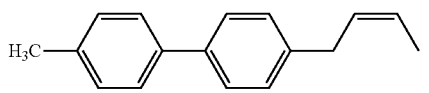
(5.6)

[Chem. 39]

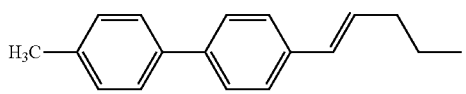
(5.7)

In particular, the content of the compound represented by Formulas (5.1) to (5.7) is preferably 1% by mass or greater and 30% by mass or less with respect to the total mass of the liquid crystal composition of the present invention. Within the content range, for example, 4% by mass or greater and 30% by mass or less, 6% by mass or greater and 30% by mass or less, 8% by mass or greater and 30% by mass or less, 10% by mass or greater and 30% by mass or less, 12% by mass or greater and 30% by mass or less, 14% by mass or greater and 30% by mass or less, 16% by mass or greater and 30% by mass or less, 18% by mass or greater and 30% by mass or less, 20% by mass or greater and 30% by mass or less, 22% by mass or greater and 30% by mass or less, 23% by mass or greater and 30% by mass or less, 24% by mass or greater and 30% by mass or less, 25% by mass or greater and 30% by mass or less, or, 4% by mass or greater and 6% by mass or less, 4% by mass or greater and 8% by mass or less, 4% by mass or greater and 10% by mass or less, 4% by mass or greater and 12% by mass or less, 4% by mass or greater and 14% by mass or less, 4% by mass or greater and 16% by mass or less, 4% by mass or greater and 18% by mass or less, 4% by mass or greater and 20% by mass or less, 4% by mass or greater and 22% by mass or less, 4% by mass or greater and 23% by mass or less, 4% by mass or greater and 24% by mass or less, 4% by mass or greater and 25% by mass or less, 2% by mass or greater and 25% by mass or less, 2% by mass or greater and 20% by mass or less, or 2% by mass or greater and 15% by mass or less is preferable.

Furthermore, the compound represented by General Formula (I) according to the present invention is preferably a compound selected from the compound group of the compounds represented by General Formula (I-5).

[Chem. 40]

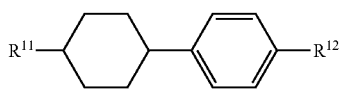
(I-5)

(In General Formula (I-5), $R^{11}$ and $R^{12}$ each has the same meaning as that in General Formula (I), but the compounds represented by General Formula (N) are excluded.)

The types of compound capable of being combined are not particularly limited, and a compound is combined depending on the required performance such as solubility at a low temperature, a transition temperature, electrical reliability, or birefringence. The type of compound used is, for example, one type in one embodiment of the present invention. In another embodiment of the present invention, two types are used.

In the liquid crystal composition of the present invention, the content of the compound represented by General Formula (I-5) needs to be suitably adjusted depending on the required performance such as solubility at a low temperature, a transition temperature, electrical reliability, birefringence, process compatibility, dropping marks, burn-in, or dielectric anisotropy.

The preferable range of the content is as shown in the table described below.

For example, the content of the compound represented by General Formula (I-5) is 1% to 30% by mass with respect to the total mass of the liquid crystal composition of the present invention in one embodiment of the present invention. In another embodiment of the present invention, the content is 1% to 25% by mass. In still another embodiment of the present invention, the content is 1% to 20% by mass. In still another embodiment of the present invention, the content is 1% to 15% by mass. Instill another embodiment of the present invention, the content is 1% to 11% by mass. In still another embodiment of the present invention, the content is 1% to 8% by mass. In still another embodiment of the present invention, the content is 1% to 5% by mass. In still another embodiment of the present invention, the content is 1% to 4% by mass. In still another embodiment of the present invention, the content is 4% to 11% by mass. In still another embodiment of the present invention, the content is 5% to 11% by mass. In still another embodiment of the present invention, the content is 8% to 11% by mass. In addition, in still another embodiment of the present invention, the content is 10% to 11% by mass.

In the case where the solubility at a low temperature matters, when the content is set to be great, effects are higher, and in contrast, in the case where the response speed matters, when the content is set to be small, effects are higher. Furthermore, in the case of improving dropping marks or burn-in characteristics, the range of the content is preferably set to a middle value.

Furthermore, the compound represented by General Formula (I-5) is preferably a compound selected from the compound group of the compounds represented by Formulas (6.1) to (6.6), and preferably the compound represented by Formula (6.3), (6.4), or (6.6).

[Chem. 41]

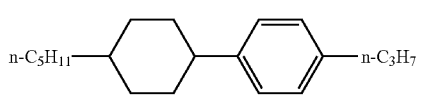
(6.1)

[Chem. 42]

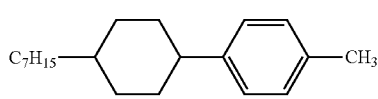
(6.2)

[Chem. 43]

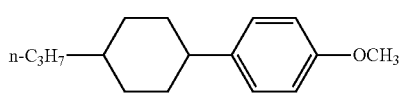
(6.3)

[Chem. 44]

-continued

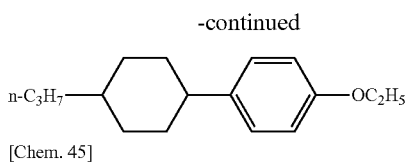

(6.4)

[Chem. 45]

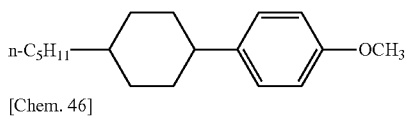

(6.5)

[Chem. 46]

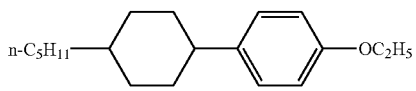

(6.6)

For example, the content of the compounds represented by General Formulas (6.1) to (6.6) is 1% to 30% by mass in one embodiment of the present invention. In another embodiment of the present invention, the content is 1% to 25% by mass. In still another embodiment of the present invention, the content is 1% to 20% by mass. In still another embodiment of the present invention, the content is 1% to 15% by mass. In still another embodiment of the present invention, the content is 1% to 11% by mass. In still another embodiment of the present invention, the content is 1% to 8% by mass. In still another embodiment of the present invention, the content is 1% to 5% by mass. In still another embodiment of the present invention, the content is 1% to 4% by mass. In still another embodiment of the present invention, the content is 4% to 11% by mass. In still another embodiment of the present invention, the content is 5% to 11% by mass. In still another embodiment of the present invention, the content is 6% to 11% by mass. In still another embodiment of the present invention, the content is 8% to 11% by mass.

Furthermore, the compound represented by General Formula (A) according to the present invention is preferably a compound selected from the compound group of the compounds represented by General Formula (I-6).

[Chem. 47]

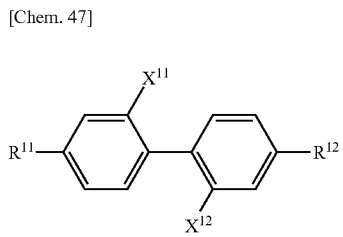

(I-6)

(In General Formula (I-6), $R^{11}$ and $R^{12}$ each has the same meaning as that in General Formula (I).)

The content of the compound represented by General Formula (I-6) is preferably 2% by mass or greater and 30% by mass or less, preferably 4% by mass or greater and 30% by mass or less, preferably 5% by mass or greater and 30% by mass or less, preferably 6% by mass or greater and 30% by mass or less, preferably 9% by mass or greater and 30% by mass or less, preferably 12% by mass or greater and 30% by mass or less, preferably 14% by mass or greater and 30% by mass or less, preferably 16% by mass or greater and 30% by mass or less, preferably 18% by mass or greater and 25% by mass or less, preferably 20% by mass or greater and 24% by mass or less, and preferably 22% by mass or greater and 23% by mass or less, with respect to the total mass of the liquid crystal composition of the present invention. Furthermore, the compound represented by General Formula (I-6) is preferably the compound represented by Formula (7.1).

[Chem. 48]

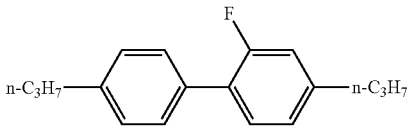

(7.1)

Furthermore, the compound represented by General Formula (I) is preferably a compound selected from the compound group of the compounds represented by General Formula (I-7).

[Chem. 49]

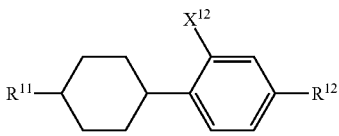

(I-7)

(In the formula, $R^{11}$ and $R^{12}$ each has the same meaning as that in General Formula (I), but the compounds represented by General Formula (N) are excluded.)

The content of the compound represented by General Formula (I-7) with respect to the total mass of the liquid crystal composition of the present invention is preferably 1% by mass or greater and 20% by mass or less, preferably 1% by mass or greater and 15% by mass or less, preferably 1% by mass or greater and 10% by mass or less, and preferably 1% by mass or greater and 5% by mass or less.

Furthermore, the compound represented by General Formula (I-7) is preferably the compound represented by Formula (8.1).

[Chem. 50]

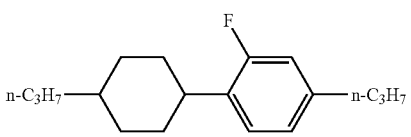

(8.1)

Furthermore, the compound represented by General Formula (L) according to the present invention is, for example, preferably a compound selected from the compounds represented by General Formula (II).

[Chem. 51]

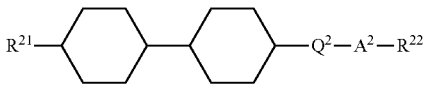

(II)

(In General Formula (II), $R^{21}$ and $R^{22}$ each independently represents an alkenyl group having 2 to 5 carbon atoms, an alkyl group having 1 to 5 carbon atoms, or an alkoxy group having 1 to 4 carbon atoms, $A^2$ represents a 1,4-cyclohexylene group or a 1,4-phenylene group, and $Q^2$ represents a single bond, —COO—, —CH$_2$—CH$_2$—, or —CF$_2$O—, but the compounds represented by General Formula (N) are excluded.)

The types of compound capable of being combined are not particularly limited, and a compound is combined depending on the required performance such as solubility at a low temperature, a transition temperature, electrical reliability, or birefringence. The type of compound used is, for example, one type in one embodiment of the present invention. In another embodiment of the present invention, two types are used. In still another embodiment of the present invention, three types are used. In addition, in still another embodiment of the present invention, four or more types are used.

In the liquid crystal composition of the present invention, the content of the compound represented by General Formula (II) needs to be suitably adjusted depending on the required performance such as solubility at a low temperature, a transition temperature, electrical reliability, birefringence, process compatibility, dropping marks, burn-in, or dielectric anisotropy.

For example, the content of the compound represented by General Formula (II) is 3% to 35% by mass with respect to the total mass of the liquid crystal composition of the present invention in one embodiment of the present invention. In another embodiment of the present invention, the content is 3% to 30% by mass. In still another embodiment of the present invention, the content is 3% to 25% by mass. In still another embodiment of the present invention, the content is 3% to 21% by mass. In still another embodiment of the present invention, the content is 3% to 20% by mass. In still another embodiment of the present invention, the content is 3% to 18% by mass. In still another embodiment of the present invention, the content is 3% to 15% by mass. In still another embodiment of the present invention, the content is 3% to 12% by mass. In still another embodiment of the present invention, the content is 4% to 21% by mass. In still another embodiment of the present invention, the content is 11% to 21% by mass. In still another embodiment of the present invention, the content is 13% to 21% by mass. In still another embodiment of the present invention, the content is 15% to 21% by mass. In still another embodiment of the present invention, the content is 16% to 21% by mass. In still another embodiment of the present invention, the content is 4% to 12% by mass. In still another embodiment of the present invention, the content is 11% to 20% by mass. In still another embodiment of the present invention, the content is 13% to 15% by mass. In addition, in still another embodiment of the present invention, the content is 15% to 18% by mass.

Furthermore, the compound represented by General Formula (II) is, for example, preferably a compound selected from the compound group of the compounds represented by General Formula (II-1).

[Chem. 52]

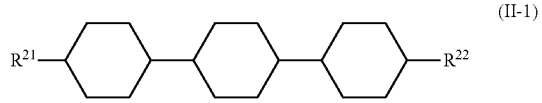

(II-1)

(In General Formula (II-1), $R^{21}$ and $R^{22}$ each has the same meaning as that in General Formula (II), but the compounds represented by General Formula (N) are excluded.)

The content of the compound represented by General Formula (II-1) is preferably adjusted depending on the required performance such as solubility at a low temperature, a transition temperature, electrical reliability, or birefringence.

The preferable range of the content is as shown in the table described below.

The content of the compound represented by General Formula (II-1) is preferably adjusted depending on the required performance such as solubility at a low temperature, a transition temperature, electrical reliability, or birefringence, and the content is preferably 4% by mass or greater and 24% by mass or less, preferably 8% by mass or greater and 18% by mass or less, and more preferably 12% by mass or greater and 14% by mass or less.

Furthermore, the compound represented by General Formula (II) according to the present invention is, for example, preferably a compound selected from the compound group of the compounds represented by General Formula (II-2).

[Chem. 53]

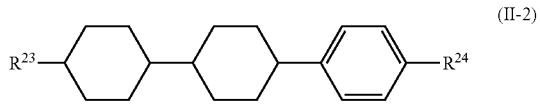

(II-2)

(In General Formula (II-2), $R^{23}$ represents an alkenyl group having 2 to 5 carbon atoms, and $R^{24}$ represents an alkyl group having 1 to 5 carbon atoms or an alkoxy group having 1 to 4 carbon atoms, but the compounds represented by General Formula (N) are excluded.)

The types of compound capable of being combined are not particularly limited, and a compound is combined depending on the required performance such as solubility at a low temperature, a transition temperature, electrical reliability, or birefringence. In the case where Formula (11.1) or (11.2) is included in the liquid crystal composition, this contributes to improvement of the parameters relating to the high speed response of the liquid crystal composition. In addition, the type of compound used is, for example, one type in one embodiment of the present invention. In another embodiment of the present invention, two or more types are used.

In the liquid crystal composition of the present invention, the content of the compound represented by General Formula (II-2) needs to be suitably adjusted depending on the required performance such as solubility at a low temperature, a transition temperature, electrical reliability, birefringence, process compatibility, dropping marks, burn-in, a high speed response property, or dielectric anisotropy.

The preferable content of the compound represented by General Formula (II-2) is, for example, 2% to 45% by mass with respect to the total mass of the liquid crystal composition of the present invention. Within the content range, for example, 5% to 45% by mass, 8% to 45% by mass, 11% to 45% by mass, 14% to 45% by mass, 17% to 35% by mass, 17% to 31% by mass, 18% to 28% by mass, 18% to 27% by mass, 18% to 26% by mass, or 2% to 45% by mass, 3% to 40% by mass, 4% to 35% by mass, 5% to 30% by mass, 6% to 25% by mass, 7% to 24% by mass, 8% to 23% by mass, or 9% to 23% by mass is preferable.

Furthermore, the compound represented by General Formula (II-2) according to the present invention is, for example, preferably the compound represented by each of Formulas (11.1) to (11.9).

[Chem. 54]

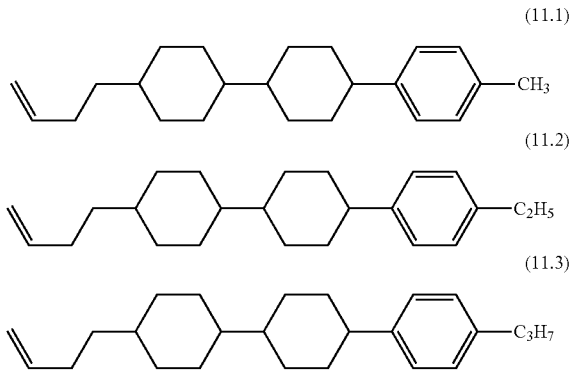

Depending on the required performance such as solubility at a low temperature, a transition temperature, electrical reliability, or birefringence, one compound represented by each of Formulas (11.1) to (11.3) may be contained, two compounds represented by each of Formulas (11.1) to (11.3) may be contained, three compounds represented by each of Formulas (11.1) to (11.3) may be contained, one type of compound represented by Formula (11.1) may be contained, one type of compound represented by Formula (11.3) may be contained, both the compound represented by Formula (11.1) and the compound represented by Formula (11.2) may be contained, or all of the compounds represented by Formulas (11.1) to (11.3) may be contained. The compound represented by each of Formula (11.1) and/or (11.2) is more preferably contained, and the preferable range of each content is as shown in the table described below.

In the liquid crystal composition of the present invention, the content of each compound represented by Formula (11.1) is preferably 1% by mass or greater and 55% by mass or less, preferably 1% by mass or greater and 35% by mass or less, and preferably 1% by mass or greater and 25% by mass or less, with respect to the total mass of the liquid crystal composition of the present invention. Within the content ranges, 1% by mass and 20% by mass or less, 2% by mass or greater and 19% by mass or less, 3% by mass or greater and 18% by mass or less, 3% by mass or greater and 16% by mass or less, or 4% by mass or greater and 15% by mass or less is preferable.

In the liquid crystal composition of the present invention, each content of the compound represented by Formula (11.2) is preferably 1% by mass or greater and 55% by mass or less, preferably 1% by mass or greater and 35% by mass or less, and preferably 1% by mass or greater and 25% by mass or less, with respect to the total mass of the liquid crystal composition of the present invention. Among these, 1% by mass and 20% by mass or less, 2% by mass or greater and 19% by mass or less, 3% by mass or greater and 18% by mass or less, 3% by mass or greater and 16% by mass or less, and 4% by mass or greater and 15% by mass or less are preferable.

In the liquid crystal composition according to the present invention, the case where both the compound represented by Formula (11.1) and the compound represented by Formula (11.2) are contained is preferable from the viewpoint of compatibility. In the case where both the compound represented by Formula (11.1) and the compound represented by Formula (11.2) are contained, the preferable range of the total content of both compounds is preferably 5% by mass or greater and 35% by mass or less, preferably 6% by mass or greater and 30% by mass or less, and preferably 7% by mass or greater and 28% by mass or less, with respect to the total mass of the liquid crystal composition of the present invention. Within the content ranges, 8% by mass and 27% by mass or less, 9% by mass or greater and 28% by mass or less, or 10% by mass or greater and 25% by mass or less is preferable.

Furthermore, the compound represented by General Formula (II) is, for example, preferably a compound selected from the compound group of the compounds represented by General Formula (II-3).

[Chem. 55]

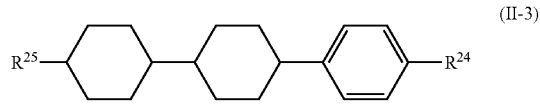

(In General Formula (II-3), $R^{25}$ represents an alkyl group having 1 to 5 carbon atoms, and $R^{24}$ represents an alkyl group having 1 to 5 carbon atoms, or an alkoxy group having 1 to 4 carbon atoms.)

The types of compound capable of being combined are not particularly limited, and one to three types of these compounds are preferably contained depending on the required performance such as solubility at a low temperature, a transition temperature, electrical reliability, or birefringence.

The content of the compound represented by General Formula (II-3) needs to be suitably adjusted depending on the required performance such as solubility at a low temperature, a transition temperature, electrical reliability, birefringence, process compatibility, dropping marks, burn-in, or dielectric anisotropy.

The preferable content of the compound represented by General Formula (II-3) is, for example, 2% to 45% by mass with respect to the total mass of the liquid crystal composition of the present invention. Within the content range, for example, 5% to 45% by mass, 8% to 45% by mass, 11% to 45% by mass, 14% to 45% by mass, 17% to 45% by mass, 20% to 45% by mass, 23% to 45% by mass, 26% to 45% by mass, 29% to 45% by mass, or 2% to 45% by mass, 2% to 40% by mass, 2% to 35% by mass, 2% to 30% by mass, 2% to 25% by mass, 2% to 20% by mass, 2% to 15% by mass, or 2% to 10% by mass is preferable.

Furthermore, the compound represented by General Formula (II-3) is, for example, preferably the compound represented by each of Formulas (12.1) to (12.3).

[Chem. 56]

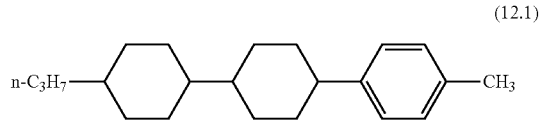

[Chem. 57]

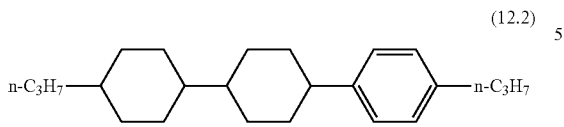

(12.2)

[Chem. 58]

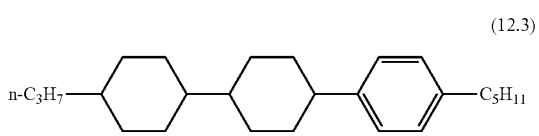

(12.3)

The liquid crystal composition of the present invention may contain the compound represented by Formula (12.1), the compound represented by Formula (12.2), or both the compound represented by Formula (12.1) and the compound represented by Formula (12.2) depending on the required performance such as solubility at a low temperature, a transition temperature, electrical reliability, or birefringence. The compound represented by Formula (12.3) may be an optically active compound.

The preferable content of the compound represented by General Formulas (12.1) to (12.3) is, for example, 1% to 15% by mass with respect to the total mass of the liquid crystal composition of the present invention. Among these, for example, 1% to 13% by mass, 1% to 10% by mass, 2% to 15% by mass, 2% to 14% by mass, 2% to 11% by mass and 3% to 10% by mass are preferable.

Furthermore, the compound represented by General Formula (II-3) according to the present invention is, for example, preferably a compound selected from the compound group of the compounds represented by General Formula (II-3-1).

[Chem. 59]

(II-3-1)

(In General Formula (II-3-1), $R^{25}$ represents an alkyl group having 1 to 5 carbon atoms, and $R^{26}$ represents an alkoxy group having 1 to 4 carbon atoms.)

The content of the compound represented by General Formula (II-3-1) is preferably adjusted depending on the required performance such as solubility at a low temperature, a transition temperature, electrical reliability, or birefringence, and the content is preferably 1% by mass to 24% by mass, preferably 4% by mass to 18% by mass, and preferably 6% by mass to 14% by mass.

Furthermore, the compound represented by General Formula (II-3-1), for example, is preferably the compound represented by each of Formulas (13.1) to (13.4), and in particular, preferably the compound represented by Formula (13.3).

[Chem. 60]

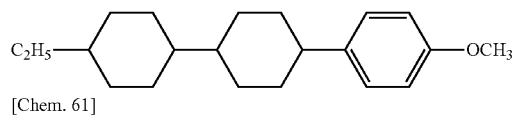

(13.1)

[Chem. 61]

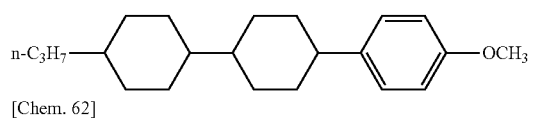

(13.2)

[Chem. 62]

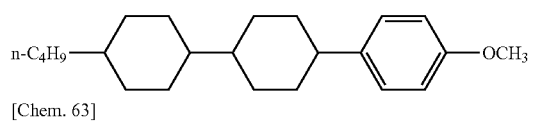

(13.3)

[Chem. 63]

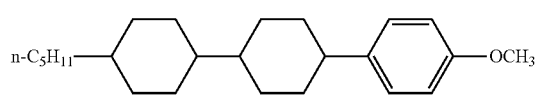

(13.4)

Furthermore, the compound represented by General Formula (II) according to the present invention is, for example, preferably a compound selected from the compound group of the compounds represented by General Formula (II-4).

[Chem. 64]

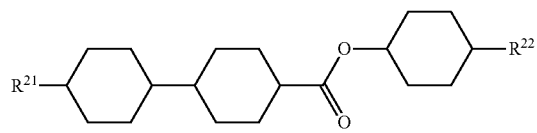

(II-4)

(In General Formula (II-4), $R^{21}$ and $R^{22}$ each independently represents an alkenyl group having 2 to 5 carbon atoms, an alkyl group having 1 to 5 carbon atoms, or an alkoxy group having 1 to 4 carbon atoms.)

Only one type of these compounds may be contained or two or more types may be contained, and these compounds are preferably suitably combined depending on the required performance. The types of compound capable of being combined are not particularly limited, and one and two types of these compounds are preferably contained, and one to three types are more preferably contained depending on the required performance such as solubility at a low temperature, a transition temperature, electrical reliability, or birefringence.

The content of the compound represented by General Formula (II-4) is preferably 1% by mass to 15% by mass, preferably 2% by mass to 15% by mass, preferably 3% by mass to 15% by mass, preferably 4% by mass to 12% by mass, and preferably 5% by mass to 7% by mass, with respect to the total mass of the liquid crystal composition of the present invention.

Furthermore, the compound represented by General Formula (II-4), for example, is preferably the compound represented by each of Formulas (14.1) to (14.5), and in particular, preferably the compound represented by Formula (14.2) or/and (14.5).

[Chem. 65]

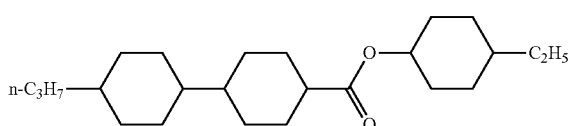
(14.1)

[Chem. 66]

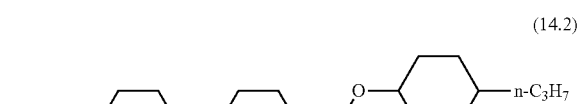
(14.2)

[Chem. 67]

(14.3)

[Chem. 68]

(14.4)

[Chem. 69]

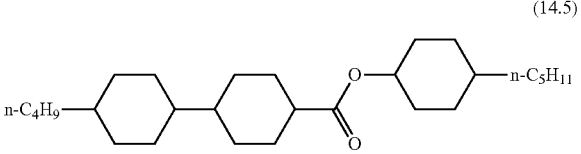
(14.5)

Furthermore, the compound represented by General Formula (L) according to the present invention is preferably a compound selected from the compound group of the compounds represented by General Formula (III).

[Chem. 70]

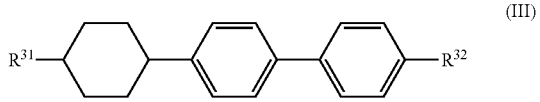
(III)

(In General Formula (III), $R^{31}$ and $R^{32}$ each independently represents an alkenyl group having 2 to 5 carbon atoms, an alkyl group having 1 to 5 carbon atoms, or an alkoxy group having 1 to 4 carbon atoms, but the compounds represented by General Formula (N) are excluded.)

The content of the compound represented by General Formula (III) is preferably 1% by mass to 25% by mass, preferably 2% by mass to 20% by mass, preferably 2% by mass to 15% by mass, preferably 2% by mass to 10% by mass, and preferably 4% by mass to 6% by mass, with respect to the total mass of the liquid crystal composition of the present invention, in consideration of the required solubility and birefringence.

Furthermore, the compound represented by General Formula (III), for example, is preferably the compound represented by Formula (15.1) or (15.2), and in particular, preferably the compound represented by Formula (15.1).

[Chem. 71]

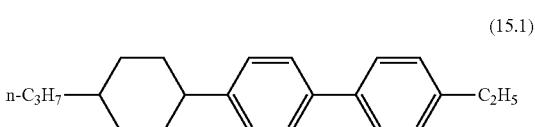
(15.1)

[Chem. 72]

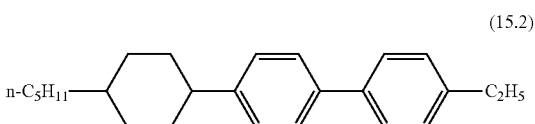
(15.2)

Furthermore, the compound represented by General Formula (III) is preferably a compound selected from the compound group of the compounds represented by General Formula (III-2).

[Chem. 73]

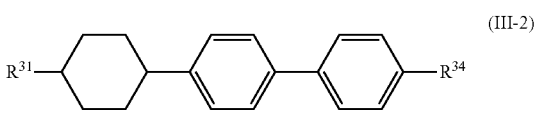
(III-2)

(In General Formula (III-2), $R^{31}$ has the same meaning as that in General Formula (III), but the compounds represented by General Formula (N) are excluded.)

The content of the compound represented by General Formula (III-2) is preferably adjusted depending on the required performance such as solubility at a low temperature, a transition temperature, electrical reliability, or birefringence, and the content is preferably 4% by mass to 23% by mass, preferably 6% by mass to 18% by mass, and preferably 10% by mass to 13% by mass, with respect to the total mass of the liquid crystal composition of the present invention.

Furthermore, the compound represented by General Formula (III-2) is preferably a compound selected from the compound group of the compounds represented by Formulas (17.1) to (17.3), and in particular, preferably the compound represented by Formula (17.3).

[Chem. 74]

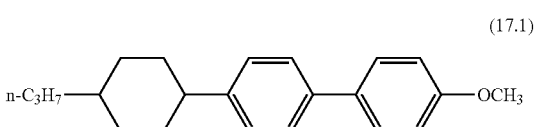
(17.1)

[Chem. 75]

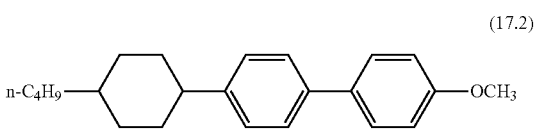
(17.2)

-continued

[Chem. 76]

(17.3)

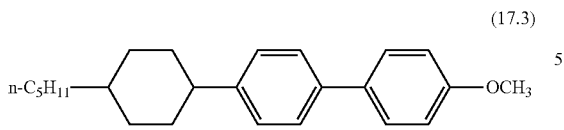

The compound represented by General Formula (L) according to the present invention is preferably selected from the group represented by General Formula (IV).

[Chem. 77]

(IV)

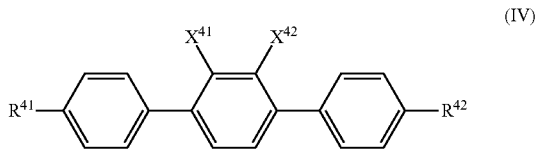

(In General Formula (IV), $R^{41}$ and $R^{42}$ each independently represents an alkyl group having 1 to 5 carbon atoms or an alkenyl group having 2 to 5 carbon atoms, and $X^{41}$ and $X^{42}$ each independently represents a hydrogen atom or a fluorine atom.)

The types of compounds with which the compound represented by General Formula (IV) can be combined are not particularly limited, and a compound is suitable combined depending on the required performance such as solubility at a low temperature, a transition temperature, electrical reliability, or birefringence. When a compound having the structure of General Formula (IV) such as compounds represented by General Formulas (18.1) to (18.9) described below is added to the liquid crystal composition, Δn of the liquid crystal composition and the solubility with other components configuring the liquid crystal composition are improved.

The type of compound used is, for example, one to six types in one embodiment of the present invention.

For example, the content of the compound represented by General Formula (IV) is 1% to 35% by mass with respect to the total mass of the liquid crystal composition of the present invention in one embodiment. In another embodiment of the present invention, the content is 1% to 30% by mass. In still another embodiment of the present invention, the content is 1% to 26% by mass. In still another embodiment of the present invention, the content is 1% to 22% by mass. In still another embodiment of the present invention, the content is 1% to 10% by mass. In still another embodiment of the present invention, the content is 1% to 8% by mass. In still another embodiment of the present invention, the content is 1% to 6% by mass. In still another embodiment of the present invention, the content is 2% to 26% by mass. In still another embodiment of the present invention, the content is 3% to 26% by mass. In still another embodiment of the present invention, the content is 11% to 26% by mass. In still another embodiment of the present invention, the content is 20% to 26% by mass. In still another embodiment of the present invention, the content is 2% to 8% by mass. In still another embodiment of the present invention, the content is 2% to 6% by mass. In addition, in still another embodiment of the present invention, the content is 11% to 22% by mass.

Furthermore, the compound represented by General Formula (IV) is, for example, preferably a compound selected from the compound group of the compounds represented by General Formula (IV-1).

[Chem. 78]

(IV-1)

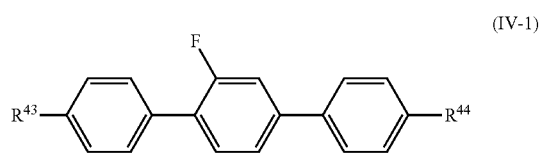

(In General Formula (IV), $R^{43}$ and $R^{44}$ each independently represents an alkyl group having 1 to 5 carbon atoms.)

The content of the compound represented by General Formula (IV-1) needs to be suitably adjusted depending on the required performance such as solubility at a low temperature, a transition temperature, electrical reliability, birefringence, process compatibility, dropping marks, burn-in, or dielectric anisotropy.

For example, the content of the compound represented by General Formula (IV-1) is 1 to 35% by mass with respect to the total mass of the liquid crystal composition of the present invention in one embodiment. In another embodiment of the present invention, the content is 1 to 30% by mass. In still another embodiment of the present invention, the content is 1 to 26% by mass. In still another embodiment of the present invention, the content is 1 to 22% by mass. In still another embodiment of the present invention, the content is 1 to 10% by mass. In still another embodiment of the present invention, the content is 1 to 8% by mass. In still another embodiment of the present invention, the content is 1 to 6% by mass. In still another embodiment of the present invention, the content is 2 to 26% by mass. In still another embodiment of the present invention, the content is 3 to 26% by mass. In still another embodiment of the present invention, the content is 11 to 26% by mass. In still another embodiment of the present invention, the content is 20 to 26% by mass. In still another embodiment of the present invention, the content is 2 to 8% by mass. In still another embodiment of the present invention, the content is 2 to 6% by mass. In addition, in still another embodiment of the present invention, the content is 11 to 22% by mass.

Furthermore, the compound represented by General Formula (IV-1) is, for example, preferably the compound represented by each of Formulas (18.1) to (18.9).

[Chem. 79]

(18.1)

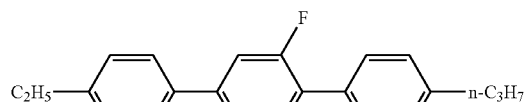

[Chem. 80]

(18.2)

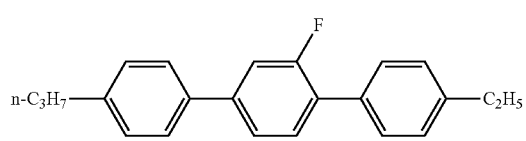

-continued

[Chem. 81]

(18.3)
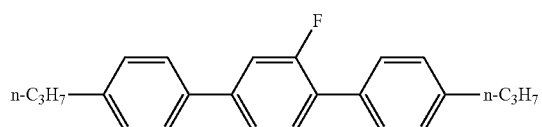

[Chem. 82]

(18.4)
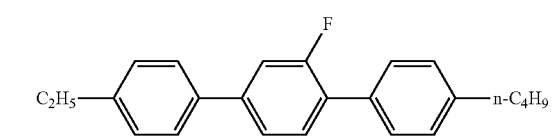

[Chem. 83]

(18.5)
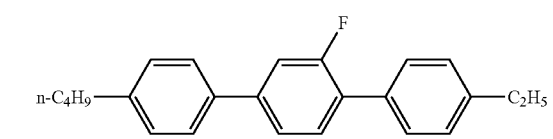

[Chem. 84]

(18.6)
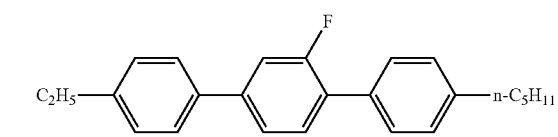

[Chem. 85]

(18.7)
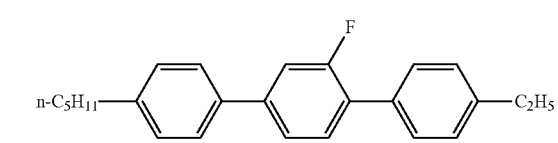

[Chem. 86]

(18.8)
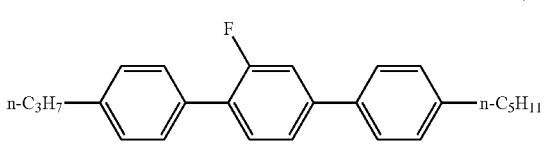

[Chem. 87]

(18.9)
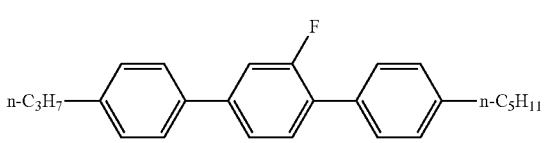

In the compound represented by General Formula (IV-1), the types of compounds capable of being combined are not particularly limited, and one to three types of these compounds are preferably contained, and one to four types of these compounds are more preferably contained. In addition, since it is also effective for solubility that the molecular weight distribution of a compound selected from the compound group of the compounds represented by General Formula (IV-1) be wide, for example, one compound represented by Formula (18.1) or (18.2), one compound represented by Formula (18.4) or (18.5), one compound represented by Formula (18.6) or (18.7), and one compound represented by Formula (18.8) or (18.9) are selected, and these compounds are preferably suitably combined. Among these, the compounds represented by Formula (18.1), (18.3), (18.4), (18.6), and (18.9) are preferably included.

Furthermore, the compound represented by General Formula (L) according to the present invention is preferably a compound selected from the group represented by General Formula (V).

[Chem. 88]

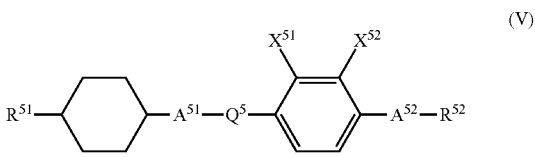

(V)

(In General Formula (V), $R^{51}$ and $R^{52}$ each independently represents an alkyl group having 1 to 5 carbon atoms, an alkenyl group having 2 to 5 carbon atoms, or an alkoxy group having 1 to 4 carbon atoms, $A^{51}$ and $A^{52}$ each independently represents a 1,4-cyclohexylene group or a 1,4-phenylene group, $Q^5$ represents a single bond or —COO—, and $X^{51}$ and $X^{52}$ each independently represents a fluorine atom or a hydrogen atom, but the compounds represented by General Formula (N) are excluded.)

The types of compound capable of being combined are not particularly limited, and a compound is suitably combined depending on the required performance such as solubility at a low temperature, a transition temperature, electrical reliability, or birefringence. The type of compound used is, for example, one type in one embodiment of the present invention. In another embodiment of the present invention, two types are used. In still another embodiment of the present invention, three types are used. In addition, in still another embodiment of the present invention, four types are used.

For example, the content of the compound represented by General Formula (V) is 1% to 25% by mass with respect to the total mass of the liquid crystal composition according to the present invention in one embodiment. In another embodiment of the present invention, the content is 1% to 20% by mass. In still another embodiment of the present invention, the content is 1% to 19% by mass. In still another embodiment of the present invention, the content is 1% to 10% by mass. In still another embodiment of the present invention, the content is 1% to 9% by mass. In still another embodiment of the present invention, the content is 1% to 8% by mass. In still another embodiment of the present invention, the content is 1% to 7% by mass. In another embodiment of the present invention, the content is 1% to 5% by mass. In still another embodiment of the present invention, the content is 1% to 3% by mass. In still another embodiment of the present invention, the content is 1% to 2% by mass. In still another embodiment of the present invention, the content is 2% to 19% by mass. In still another embodiment of the present invention, the content is 5% to 19% by mass. In still another embodiment of the present invention, the content is 9% to 19% by mass. In still another embodiment of the present invention, the content is 2% to 8% by mass. In addition, in still another embodiment of the present invention, the content is 6% to 8% by mass.

Furthermore, the compound represented by General Formula (V) according to the present invention is preferably the compound represented by General Formula (V-1).

[Chem. 89]

(V-1)

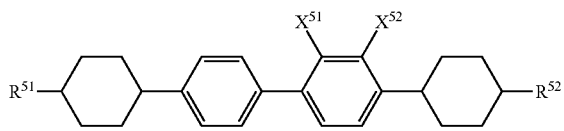

(In General Formula (V-1), $R^{51}$, $R^{52}$, $X^{51}$, and $X^{52}$ each has the same meaning as that in General Formula (V), but General Formula (N) is excluded.)

Furthermore, the compound represented by General Formula (V-1) is preferably the compound represented by General Formula (V-1-1).

[Chem. 90]

(V-1-1)

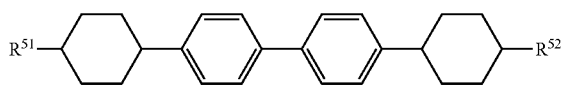

(In General Formula (V-1-1), $R^{51}$ and $R^{52}$ each has the same meaning as that in General Formula (V), but General Formula (N) is excluded.)

The compound represented by General Formula (V-1-1) is preferably contained in 1% by mass or greater and 15% by mass or less, preferably contained in 1% by mass or greater and 10% by mass or less, preferably contained in 3% by mass or greater and 10% by mass or less, preferably contained in 3% by mass or greater and 7% by mass or less, preferably contained in 3% by mass or greater and 5% by mass or less, and preferably contained in 3% by mass or greater and 4% by mass or less, with respect to the total mass of the liquid crystal composition of the present invention.

Furthermore, the compound represented by General Formula (V-1-1) is preferably the compound represented by each of Formulas (20.1) to (20.4), and preferably the compound represented by Formula (20.2).

[Chem. 90]

(20.1)

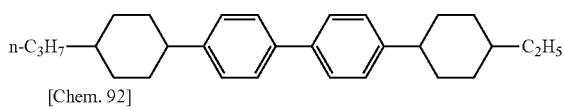

[Chem. 92]

(20.2)

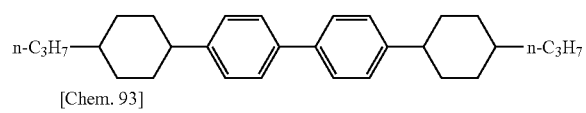

[Chem. 93]

(20.3)

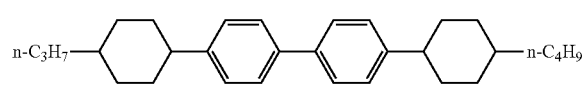

[Chem. 94]

(20.4)

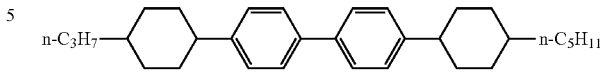

Furthermore, the compound represented by General Formula (V-1) according to the present invention is preferably the compound represented by General Formula (V-1-2).

[Chem. 95]

(V-1-2)

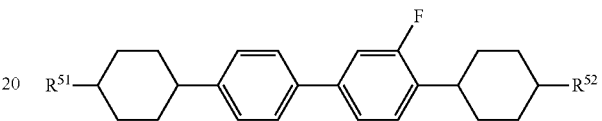

(In General Formula (V-1-2), $R^{51}$ and $R^{52}$ each has the same meaning as that in General Formula (V), but the compounds represented by General Formula (N) are excluded.)

The compound represented by General Formula (V-1-2) is preferably contained in 1% by mass to 15% by mass, preferably contained in 1% by mass to 10% by mass, preferably contained in 1% by mass to 7% by mass, and preferably contained in 1% by mass to 5% by mass, with respect to the total mass of the liquid crystal composition of the present invention.

Furthermore, the compound represented by General Formula (V-1-2) is preferably the compound represented by each of Formulas (21.1) to (21.3), and preferably the compound represented by Formula (21.1).

[Chem. 96]

(21.1)

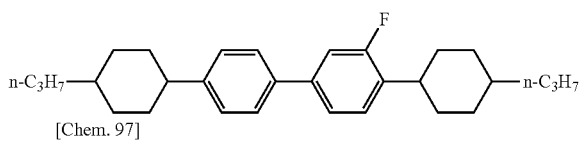

[Chem. 97]

(21.2)

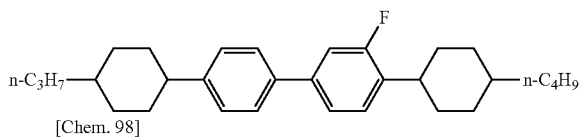

[Chem. 98]

(21.3)

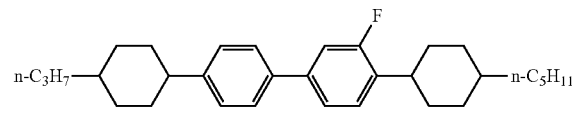

Furthermore, the compound represented by General Formula (V-1) according to the present invention is preferably the compound represented by General Formula (V-1-3).

[Chem. 99]

(V-1-3)

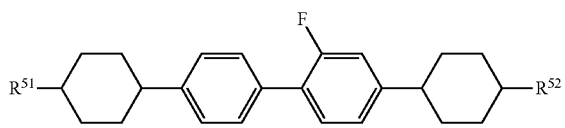

(In General Formula (V-1-3), $R^{51}$ and $R^{52}$ each has the same meaning as that in General Formula (V), but the compounds represented by General Formula (N) are excluded.)

The compound represented by General Formula (V-1-3) is preferably contained in 1% by mass or greater and 15% by mass or less, preferably contained in 2% by mass or greater and 15% by mass or less, preferably contained in 3% by mass or greater and 10% by mass or less, and preferably contained in 4% by mass or greater and 8% by mass or less, with respect to the total mass of the liquid crystal composition of the present invention.

Furthermore, the compound represented by General Formula (V-1-3) is the compound represented by each of Formulas (22.1) to (22.3), and preferably the compound represented by Formula (22.1).

[Chem. 100]

(22.1)

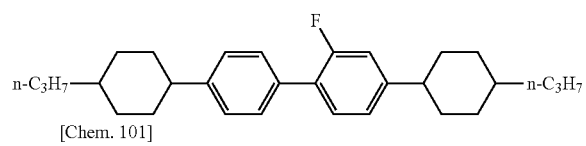

[Chem. 101]

(22.2)

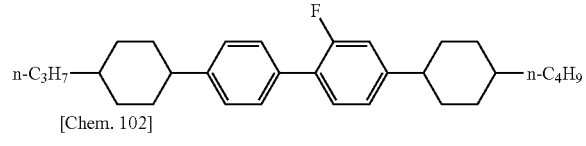

[Chem. 102]

(22.3)

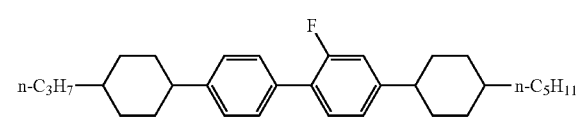

Furthermore, the compound represented by General Formula (V) according to the present invention is preferably the compound represented by General Formula (V-2).

[Chem. 103]

(V-2)

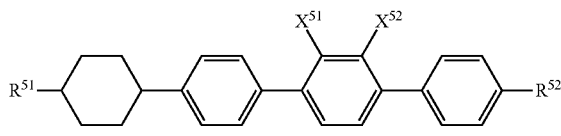

(In General Formula (V-2), $R^{51}$, $R^{52}$, $X^{51}$, and $X^{52}$ each has the same meaning as that in General Formula (V), but the compounds represented by General Formula (N) are excluded.)

The types of compound capable of being combined are not particularly limited, and a compound is suitably combined depending on the required performance such as solubility at a low temperature, a transition temperature, electrical reliability, or birefringence. The type of compound used is, for example, one type in one embodiment of the present invention. In another embodiment of the present invention, two or more types are used.

For example, the content of the compound represented by General Formula (V-2) is 1% to 30% by mass with respect to the total mass of the liquid crystal composition of the present invention in one embodiment. In another embodiment of the present invention, the content of the compound is 2% to 25% by mass. In still another embodiment of the present invention, the content of the compound is 5% to 19% by mass. In still another embodiment of the present invention, the content of the compound is 6% to 10% by mass. In still another embodiment of the present invention, the content of the compound is 10% to 19% by mass. In addition, in still another embodiment of the present invention, the content of the compound is 4% to 8% by mass.

In the case of desiring an embodiment in which the liquid crystal composition of the present invention has a high Tni, it is preferable to increase the content of the compound represented by Formula (V-2), and in the case of desiring an embodiment having a low viscosity, it is preferable to decrease the content.

Furthermore, the compound represented by General Formula (V-2) according to the present invention is preferably the compound represented by General Formula (V-2-1).

[Chem. 104]

(V-2-1)

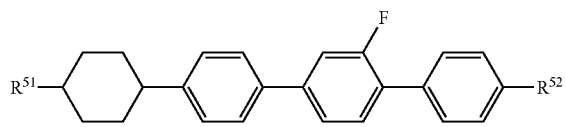

(In General Formula (V-2), $R^{51}$ and $R^{52}$ each has the same meaning as that in General Formula (V), but the compounds represented by General Formula (N) are excluded.)

Furthermore, the compound represented by General Formula (V-2-1) is preferably the compound represented by each of Formulas (23.1) to (23.4), and preferably the compound represented by Formula (23.1) or/and (23.2).

[Chem. 105]

(23.1)

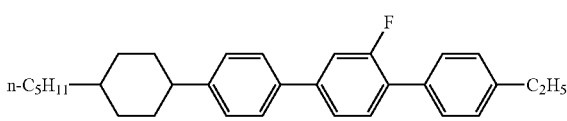

[Chem. 106]

(23.2)

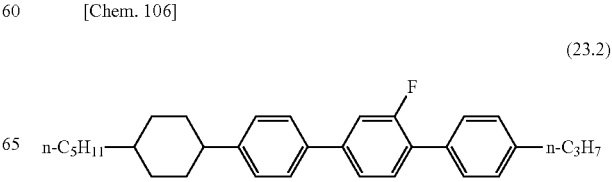

[Chem. 107]

(23.3)

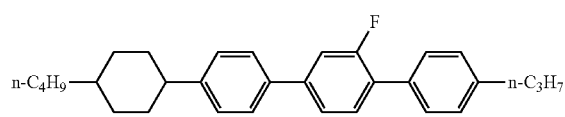

[Chem. 108]

(23.4)

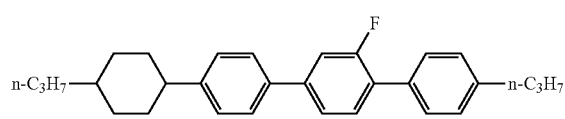

Furthermore, the compound represented by General Formula (V-2) according to the present invention is preferably the compound represented by General Formula (V-2-2).

[Chem. 109]

(V-2-2)

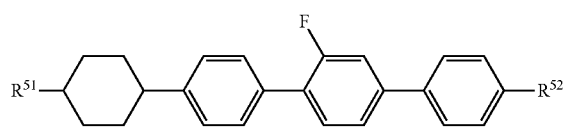

(In General Formula (V-2-2), $R^{51}$ and $R^{52}$ each has the same meaning as that in General Formula (V), but the compounds represented by General Formula (N) are excluded.)

Furthermore, the compound represented by General Formula (V-2-2) is preferably the compound represented by each of Formulas (24.1) to (24.4), and preferably the compound represented by Formula (24.1) or/and (24.2).

[Chem. 110]

(24.1)

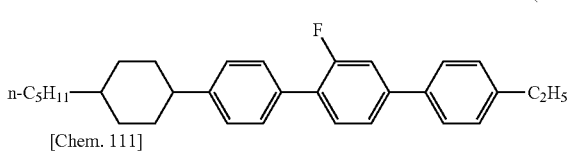

[Chem. 111]

(24.2)

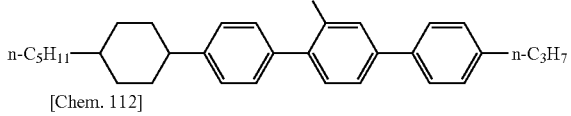

[Chem. 112]

(24.3)

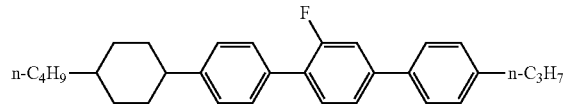

[Chem. 113]

(24.4)

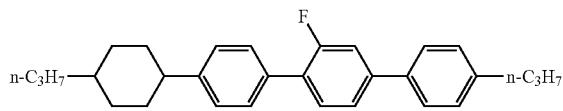

Furthermore, the compound represented by General Formula (V) according to the present invention is preferably the compound represented by General Formula (V-3).

[Chem. 114]

(V-3)

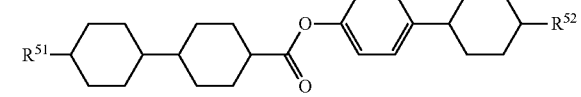

(In General Formula (V-3), $R^{51}$ and $R^{52}$ each has the same meaning as that in General Formula (V).)

The types of compound capable of being combined are not particularly limited, and a compound is suitably combined depending on the required performance such as solubility at a low temperature, a transition temperature, electrical reliability, or birefringence. The type of compound used is, for example, one type in one embodiment of the present invention. In another embodiment of the present invention, two types are used. In addition, in still another embodiment of the present invention, three or more types are used.

The compound represented by General Formula (V-3) is preferably contained in 1% by mass to 16% by mass, preferably 1% by mass to 13% by mass, preferably 1% by mass to 9% by mass, and preferably 3% by mass to 9% by mass, with respect to the total mass of the liquid crystal composition of the present invention.

Furthermore, the compound represented by General Formula (V-3) is preferably the compound represented by each of Formulas (25.1) to (24.3).

[Chem. 115]

(25.1)

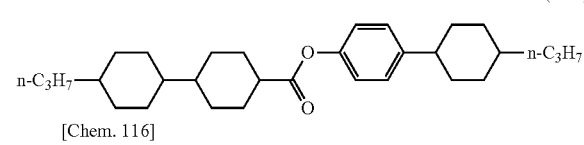

[Chem. 116]

(25.2)

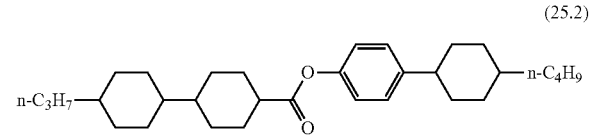

[Chem. 117]

(25.3)

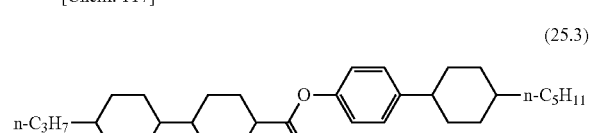

The compound represented by General Formula (V) according to the present invention is preferably the compound represented by General Formula (V-4).

[Chem. 118]

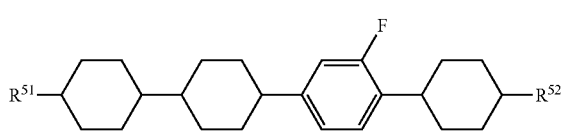

(V-4)

(In General Formula (V-4), $R^{51}$ and $R^{52}$ each independently represents an alkyl group having 1 to 5 carbon atoms, an alkenyl group having 2 to 5 carbon atoms, or an alkoxy group having 1 to 4 carbon atoms, but the compounds represented by General Formula (N) are excluded.)

The compound represented by General Formula (V-4) is preferably contained in 1% by mass to 15% by mass, preferably contained in 2% by mass to 15% by mass, preferably contained in 3% by mass to 10% by mass, and preferably contained in 4% by mass to 8% by mass, with respect to the total mass of the liquid crystal composition of the present invention.

Furthermore, the compound represented by General Formula (V-4) is preferably at least one compound selected from the compound group of the compounds represented by Formulas (25.11) to (25.13), and more preferably the compound represented by Formula (25.13).

[Chem. 119]

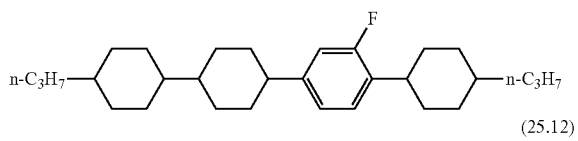

(25.11)

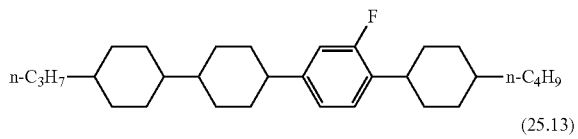

(25.12)

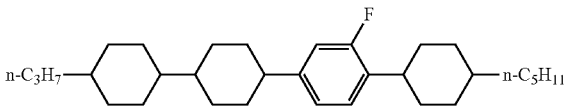

(25.13)

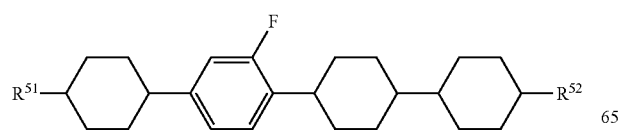

The compound represented by General Formula (L) according to the present invention is preferably the compound represented by General Formula (V'-5).

[Chem. 120]

(V'-5)

(In General Formula (V'-5), $R^{51}$ and $R^{52}$ each independently represents an alkyl group having 1 to 5 carbon atoms, an alkenyl group having 2 to 5 carbon atoms, or an alkoxy group having 1 to 4 carbon atoms, but the compounds represented by General Formula (N) are excluded.)

The compound represented by General Formula (V'-5) is preferably contained in 1% by mass to 15% by mass, preferably contained in 2% by mass to 15% by mass, preferably contained in 2% by mass to 10% by mass, and preferably contained in 5% by mass to 10% by mass, with respect to the total mass of the liquid crystal composition of the present invention.

Furthermore, the compound represented by General Formula (V'-5) is preferably at least one compound selected from the compound group of the compounds represented by Formulas (25.21) to (25.24), and more preferably the compound represented by each of Formulas (25.21) and/or (25.23).

[Chem. 121]

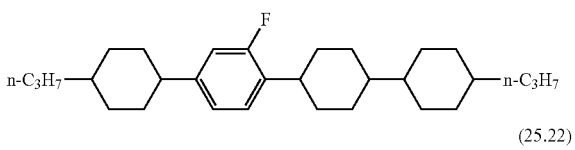

(25.21)

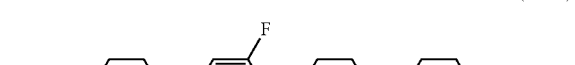

(25.22)

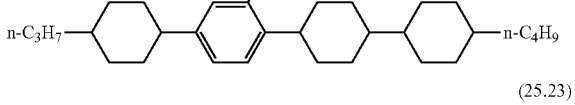

(25.23)

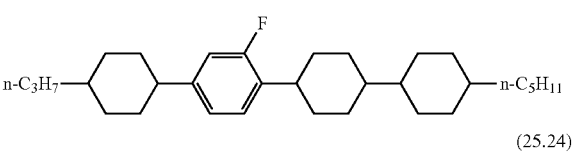

(25.24)

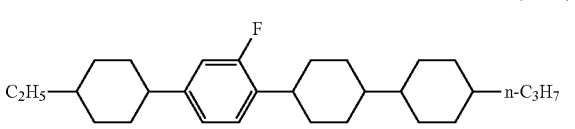

The liquid crystal composition of the present invention preferably further contains at least one or more types selected from the group consisting of the compound represented by General Formula (VI) and the compound represented by General Formula (VII). Furthermore, the compound represented by General Formula (L) according to the present invention is preferably the compound represented by General Formula (VI) and/or the compound represented by General Formula (VII).

[Chem. 122]

(VI)

$R^{61}$—⟨ ⟩—$R^{62}$

[Chem. 123]
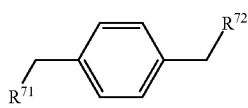
(VII)
(In General Formulas (VI) and (VII), $R^{61}$, $R^{62}$, $R^{71}$, and $R^{72}$ each independently represents a linear alkyl group having 1 to 10 carbon atoms, a linear alkoxy group having 1 to 10 carbon atoms, or a linear alkenyl group having 2 to 10 carbon atoms.)
As the compound represented by General Formula (VI), specifically, the following compounds can be suitably used.
[Chem. 124]
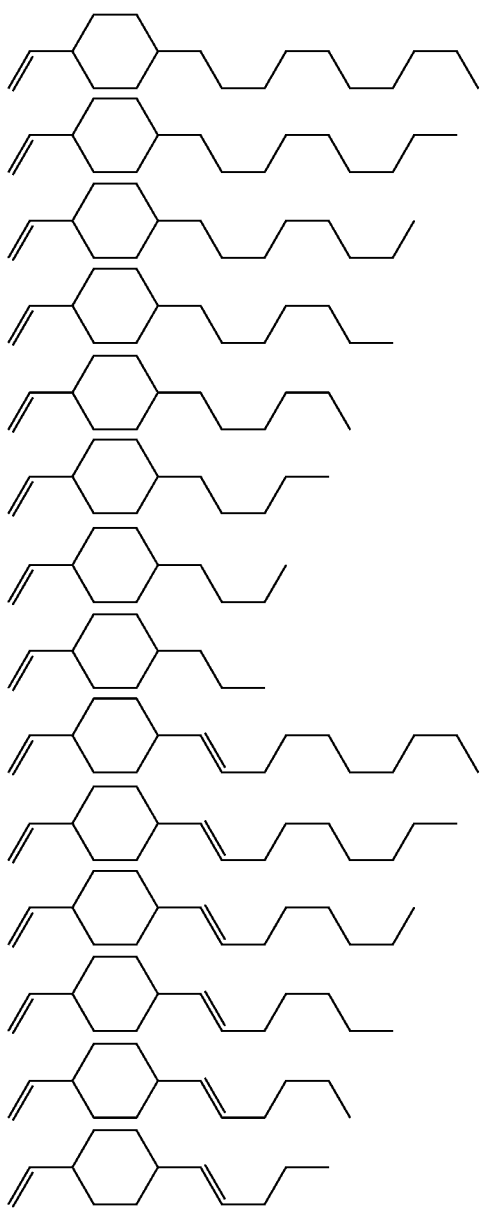
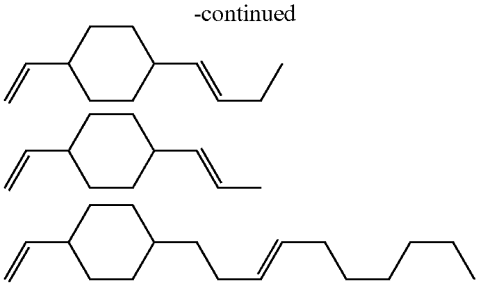
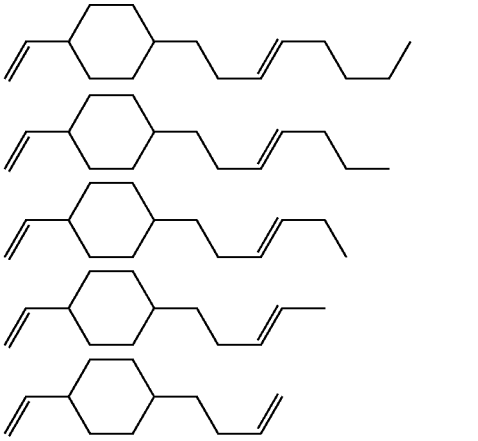
[Chem. 125]
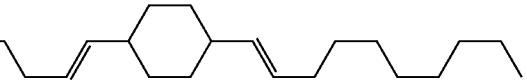
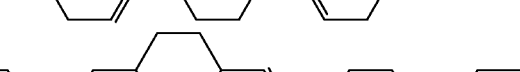
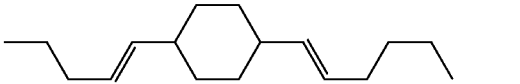
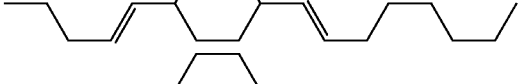
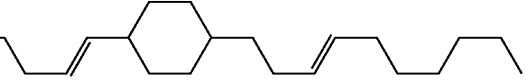
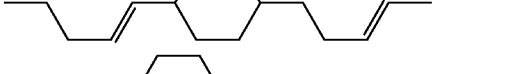
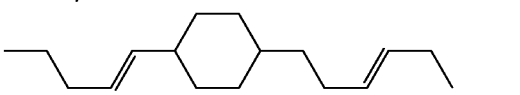

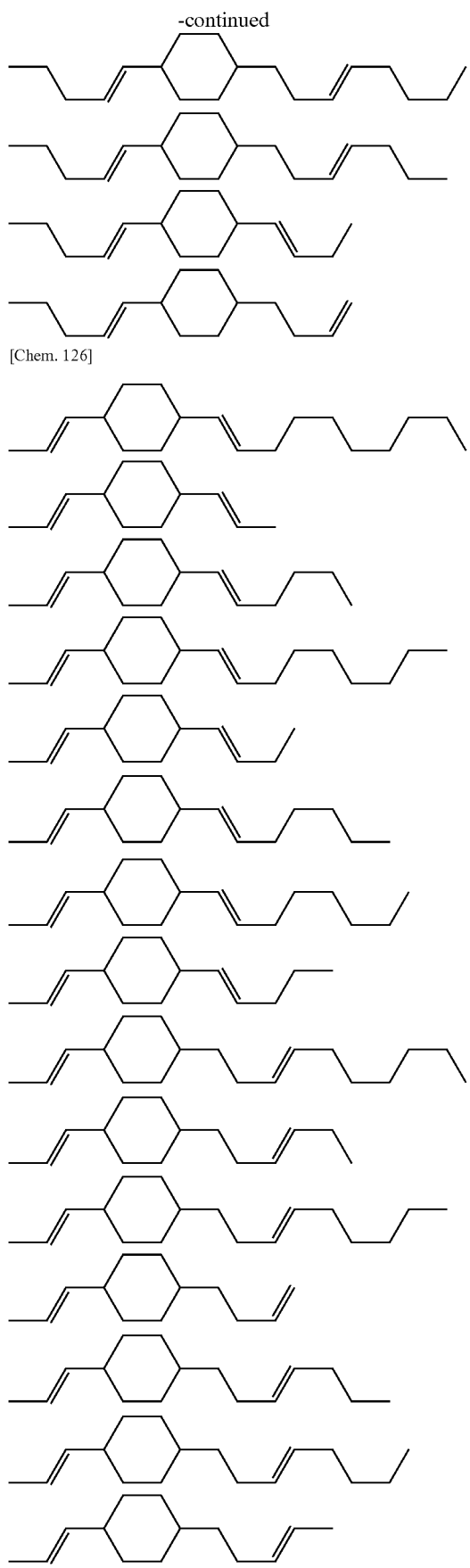
[Chem. 126]
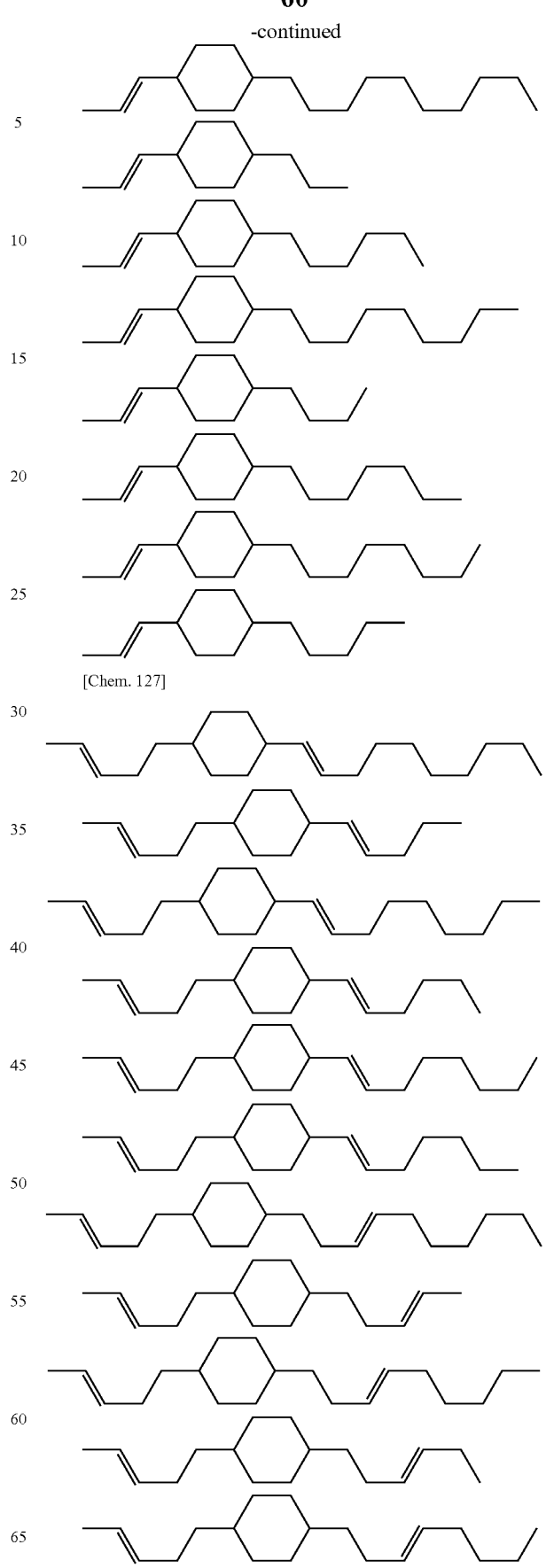
[Chem. 127]

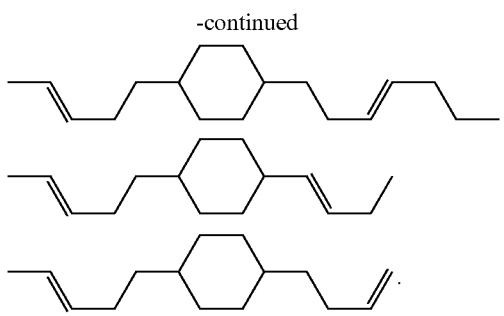

As the compound represented by General Formula (VII), specifically, the following compounds can be suitably used.

[Chem. 128]

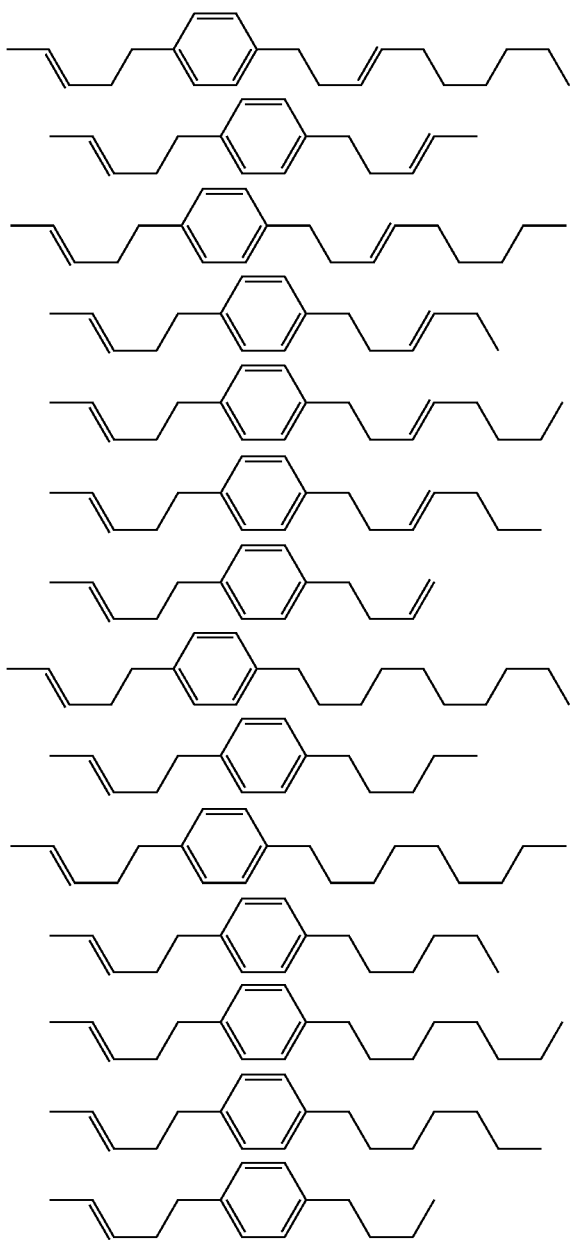

In each satisfying the compound represented by General Formula (VI) or (VII), combinable types of compounds which satisfy each structural formula are not particularly limited, and one to three types of these compounds are preferably mixed, one to four types are more preferably contained, and one to five of more types are particularly preferably contained, depending on the required performance such as solubility at a low temperature, a transition temperature, electrical reliability, or birefringence.

The content of the compound represented by General Formula (VI) is preferably 0 to 35% by mass, preferably 0 to 25% by mass, and preferably 0 to 15% by mass, with respect to the total mass of the liquid crystal composition of the present invention.

The content of the compound represented by General Formula (VII) is preferably 0 to 35% by mass, more preferably 0 to 25% by mass, and preferably 0 to 15% by mass, with respect to the total mass of the liquid crystal composition of the present invention.

The liquid crystal compound having a dielectric anisotropy of +3 to +40 according to the present invention is preferably at least one type selected from the group consisting of the compound represented by the following General Formula (M) and the compound represented by the following General Formula (K).

In the liquid crystal composition according to the present invention, the polar component A may contain the compound represented by the following General Formula (M) as the compound having a dielectric anisotropy of +3 to +40, and the compound represented by the following General Formula (M) is more preferably a polar compound (having a dielectric anisotropy of +5 to +30).

General Formula (M) according to the present invention is a compound represented as follows.

[Chem. 129]

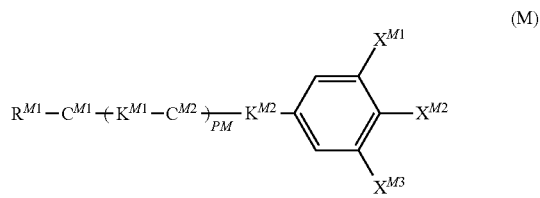

(In General Formula (M), $R^{M1}$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, the alkenyl group, the alkoxy group, or the alkenyloxy group may be substituted with (a) fluorine atom (s), one —$CH_2$— or two or more non-adjacent —$CH_2$—'s in the alkyl group, the alkenyl group, the alkoxy group, or the alkenyloxy group each may be independently substituted with —CH=CH—, —C≡C—, —O—, —CO—, —COO—, or —OCO—, PM represents 0, 1, 2, 3 or 4, $C^{M1}$ and $C^{M2}$ each independently represents a group selected from the group consisting of the following (d) and (e), (d) a 1,4-cyclohexylene group (one —CH$_2$— or two or more non-adjacent —CH$_2$—'s present in the group may be substituted with —O— or —S—) and (e) a 1,4-phenylene group (one —CH= group or two or more non-adjacent —CH='s present in the group may be substituted with —N=), the groups (d) and (e) each may be independently substituted with a cyano group, a fluorine atom, or a chlorine atom, $K^{M1}$ and $K^{M2}$ each independently represents a single bond, —CH$_2$CH$_2$—, —(CH$_2$)$_4$—, —OCH$_2$—, —CH$_2$O—, —OCF$_2$—, —CF$_2$O, —COO—, —OCO—, or —C≡C—, in the case where since PM is 2, 3, or 4 and plural $K^{M1}$'s are present, plural $K^{M1}$'s may be the same as or different from each other, in the case where since PM is 2, 3, or 4 and plural $C^{M2}$'s are present, plural $C^{M2}$'s may be the same as or different from each other, each $X^{M1}$ and $X^{M3}$ independently represents a hydrogen atom, a chlorine atom, or a fluorine atom, $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group, but the compounds represented by General Formula (i), General Formula (N) and General Formula (L) are excluded.)

The types of compound represented by General Formula (M) capable of being combined as the second component are not particularly limited, and a compound is combined and used depending on the desired performance such as solubility at a low temperature, a transition temperature, electrical reliability, a dielectric constant, or birefringence. The type of compound used is, for example, one type in one embodiment of the present invention. In another embodiment of the present invention, two types are used. Instill another embodiment of the present invention, three types are used. In still another embodiment of the present invention, four types are used. In still another embodiment of the present invention, five types are used. In still another embodiment of the present invention, six types are used. In addition, in still another embodiment of the present invention, seven or more types are used.

In the liquid crystal composition of the present invention, the content of the compound represented by General Formula (M) needs to be suitably adjusted depending on the required performance such as solubility at a low temperature, a transition temperature, electrical reliability, birefringence, process compatibility, dropping marks, burn-in, or dielectric anisotropy.

The content of the compound represented by General Formula (M) is 0.5% to 50% by mass with respect to the total mass of the liquid crystal composition of the present invention in one embodiment of the present invention. For example, in another embodiment of the present invention, the content of the compound is 1% to 47% by mass. For example, in still another embodiment of the present invention, the content of the compound is 3% to 44% by mass. For example, in still another embodiment of the present invention, the content of the compound is 5% to 41% by mass. For example, in still another embodiment of the present invention, the content of the compound is 7% to 38% by mass. For example, in still another embodiment of the present invention, the content of the compound is 8% to 35% by mass. For example, in still another embodiment of the present invention, the content of the compound is 9% to 32% by mass. For example, in still another embodiment of the present invention, the content of the compound is 10% to 29% by mass. For example, in still another embodiment of the present invention, the content of the compound is 11% to 26% by mass. For example, in still another embodiment of the present invention, the content of the compound is 12% to 23% by mass. For example, in still another embodiment of the present invention, the content of the compound is 13% to 20% by mass.

In the case where it is required that the viscosity of the liquid crystal composition of the present invention be kept low and the liquid crystal composition have a high response speed, it is preferable that the lower limit value is small and the upper limit value is small. In the case where it is required that Tni of the liquid crystal composition of the present invention be kept high and the liquid crystal composition have good temperature stability, it is preferable that the lower limit value is small and the upper limit value is small. In addition, when it is desired to increase the dielectric anisotropy in order to keep the driving voltage low, it is preferable that the lower limit value is great and the upper limit value is great.

In the case where the ring structure to which $R^{M1}$ is bonded is a phenyl group (aromatic group), $R^{M1}$ is preferably a linear alkyl group having 1 to 5 carbon atoms, a linear alkoxy group having 1 to 4 carbon atoms, or an alkenyl group having 4 or 5 carbon atoms, and in the case where the ring structure to which $R^{M1}$ is bonded is a saturated ring structure such as cyclohexane, pyran, or dioxane, $R^{M1}$ is preferably a linear alkyl group having 1 to 5 carbon atoms, a linear alkoxy group having 1 to 4 carbon atoms, or a linear alkenyl group having 2 to 5 carbon atoms.

In the case where chemical stability of the liquid crystal composition is required, the compound represented by General Formula (M) according to the present invention preferably does not have a chlorine atom in the molecule. The content of the compound having a chlorine atom in the liquid crystal composition is preferably 5% or less, preferably 3% or less, preferably 1% or less, and preferably 0.5% or less, and the compound having a chlorine atom is preferably substantially not contained. Here, the "substantially does not contain" means that only the compound which unintentionally includes a chlorine atom, such as a compound produced as an impurity at the time of manufacturing a compound is mixed in the liquid crystal composition.

The compound represented by General Formula (M) according to the present invention is preferably a compound represented by General Formula (B).

[Chem. 130]

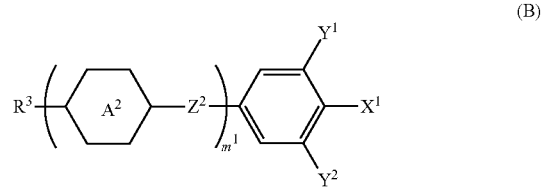

(B)

(In General Formula (B), $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, the alkenyl group, the alkoxy group, or the alkenyloxy group may be substituted with (a) fluorine atom(s), the methylene group in the alkyl group, the alkenyl group, the alkoxy group, or the alkenyloxy group may be substituted with oxygen atoms as long as the oxygen atoms are not continuously bonded or may be substituted with carbonyl groups as long as the carbonyl groups are not continuously bonded, $A^2$ each independently represents a 1,4-cyclohexylene cyclohexylene group, a 1,4-phenylene group, a tetrahydropyran-2,5-diyl group, a dioxane-2,5-diyl group, or a pyrimidine-2,5-diyl group, and in the case where $A^1$ represents a 1,4-phenylene group, one or more hydrogen atoms in the 1,4-phenylene group may be substituted with a fluorine atom, $Z^2$ each independently represents a single bond, —OCH$_2$—, —OCF$_2$—, —CH$_2$O—, or —CF$_2$O—, $Y^1$ and $Y^2$ each independently represents a fluorine atom or a hydrogen atom, and $X^1$ represents a fluorine atom, a —CN group, or an —OCF$_3$ group, and $m^1$ represents 1, 2, 3, or 4.)

In addition, in the compound represented by General Formula (B) according to the present invention, $m^1$ is preferably 2 or 3. When $m^1$ is 2, there is a characteristic that the driving voltage is lower. In addition, when $m^1$ is 3, there is a characteristic that the transition temperature is higher.

As the compound represented by General Formula (B), the following Formulas (B.1) to (B.24) are preferable. In addition, three rings (B.1 to B.6, B.13 to B.18) are more preferable.

[Chem. 131]

(B.1)

(B.2)

(B.3)

(B.4)

-continued (B.5)

(B.6)

[Chem. 132]

(B.7)

(B.8)

(B.9)

(B.10)

(B.11)

(B.12)

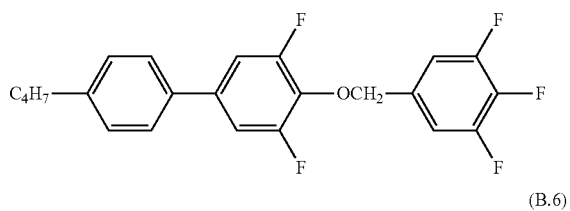
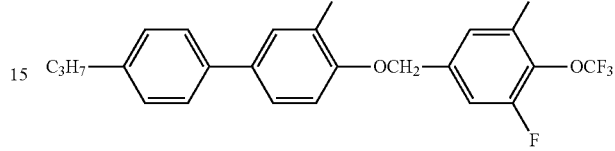
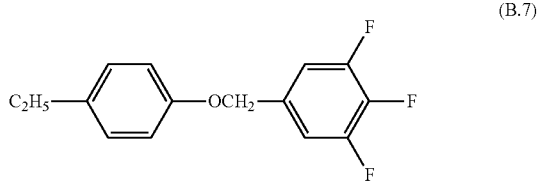
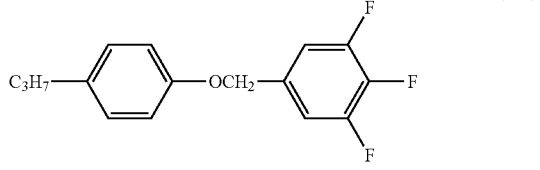
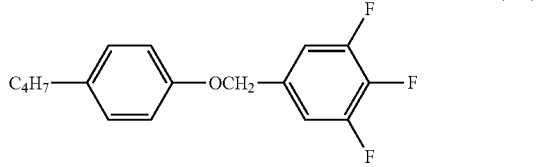
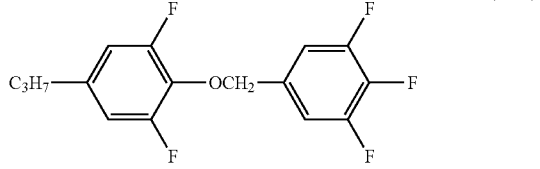
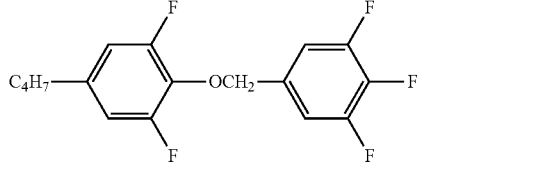
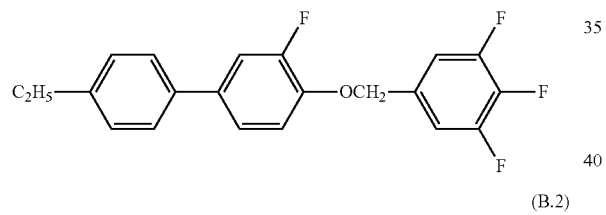
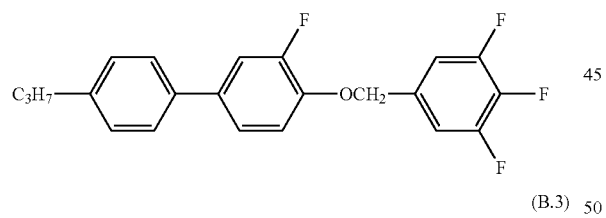
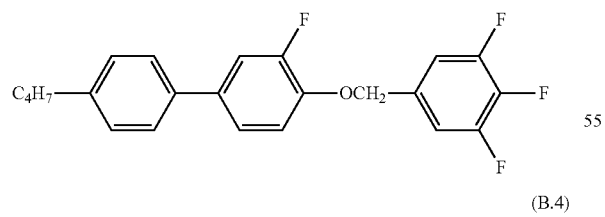
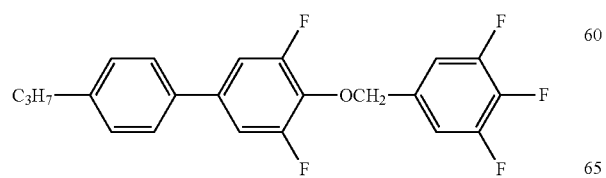

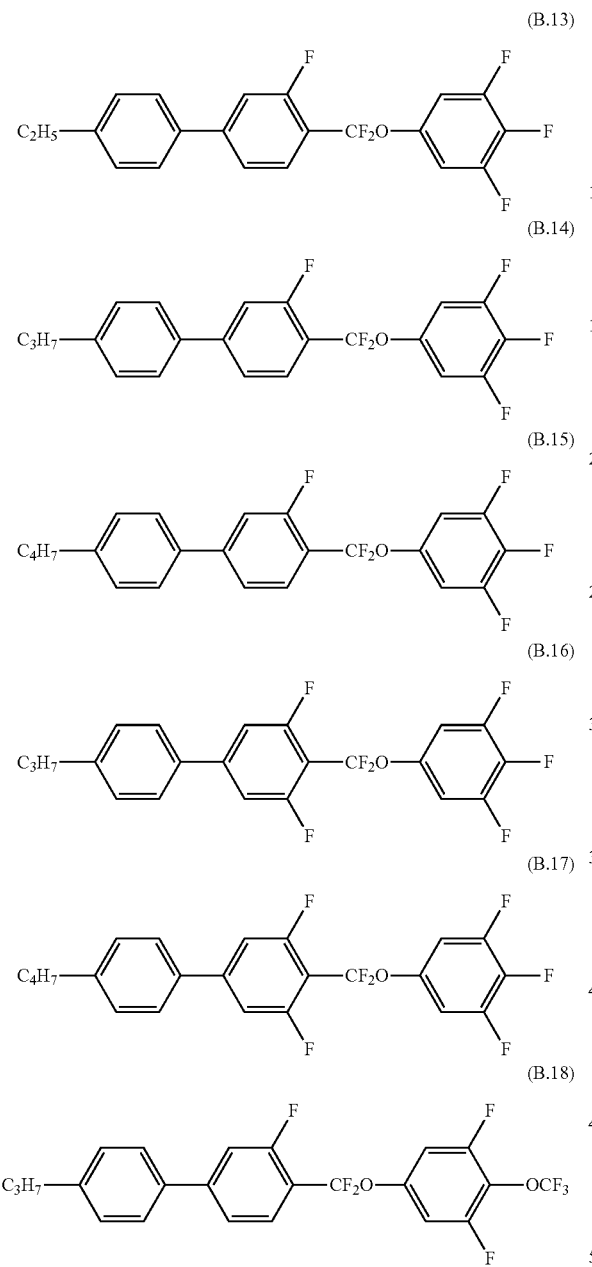

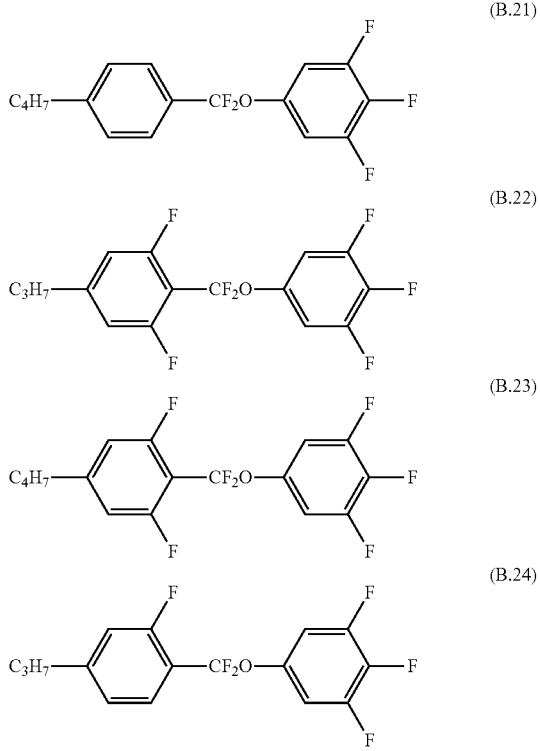

The content of the compounds represented by Formulas (B.1) to (B.6) and (B.13) to (B.18) is 0.5% to 35% by mass with respect to the total mass of the liquid crystal composition of the present invention in one embodiment of the present invention. In another embodiment of the present invention, the content of the compound is 1% to 30% by mass, for example. In still another embodiment of the present invention, the content of the compound is 2% to 25% by mass, for example. In still another embodiment of the present invention, the content of the compound is 3% to 20% by mass, for example. In still another embodiment of the present invention, the content of the compound is 4% to 18% by mass, for example. In still another embodiment of the present invention, the content of the compound is 5% to 16% by mass, for example. In still another embodiment of the present invention, the content of the compound is 6% to 15% by mass, for example. In still another embodiment of the present invention, the content of the compound is 11% to 23% by mass.

The content of the compounds represented by the above three rings (B.1 to B.6 and B.13 to B.18) is 0.5% to 35% by mass with respect to the total mass of the liquid crystal composition of the present invention in one embodiment of the present invention. In another embodiment of the present invention, the content of the compound is 1% to 30% by mass, for example. In still another embodiment of the present invention, the content of the compound is 2% to 25% by mass, for example. In still another embodiment of the present invention, the content of the compound is 3% to 20% by mass, for example. In still another embodiment of the present invention, the content of the compound is 4% to 23% by mass, for example. In still another embodiment of the present invention, the content of the compound is 5% to 22% by mass, for example. In still another embodiment of the present invention, the content of the compound is 6% to 21% by mass, for example. In still another embodiment of the present invention, the content of the compound is 10% to 18% by mass.

The compound represented by General Formula (M) according to the present invention is preferably the compound represented by General Formula (X).

[Chem. 135]

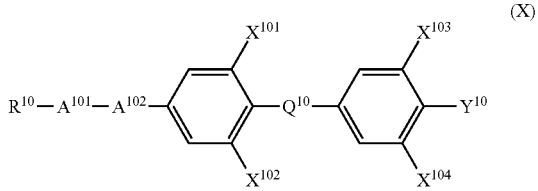

(In General Formula (X), $X^{101}$ to $X^{104}$ each independently represents a fluorine atom or a hydrogen atom, $Y^{10}$ represents a fluorine atom, a chlorine atom, or —$OCF_3$, $Q^{10}$ represents a single bond or —$CF_2O$—, $R^{10}$ represents an alkyl group having 1 to 5 carbon atoms, an alkenyl group having 2 to 5 carbon atoms, or an alkoxy group having 1 to 4 carbon atoms, $A^{101}$ and $A^{102}$ each independently represents a 1,4-cyclohexylene group, a 1,4-phenylene group, or any one of groups represented by the following formulas, and here, a hydrogen atom of the 1,4-phenylene group may be substituted with a fluorine atom.)

[Chem. 136]

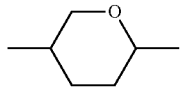

[Chem. 137]

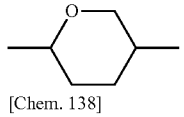

[Chem. 138]

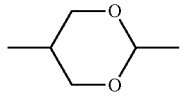

The compound capable of being combined in the compounds represented by General Formula (X) is not particularly limited, and in consideration of solubility at a low temperature, a transition temperature, electrical reliability, and birefringence, a compound is suitably combined. For example, in one embodiment of the present invention, one type is combined. In another embodiment of the present invention, two types are combined. In still another embodiment of the present invention, three types are combined. In still another embodiment of the present invention, four types are combined. In addition, in still another embodiment of the present invention, five or more types are combined.

The content of the compound represented by General Formula (X) is suitably adjusted with respect to each embodiment in consideration of characteristics such as solubility at a low temperature, a transition temperature, electrical reliability, and birefringence. For example, the content of the compound represented by General Formula (X) is 1% to 35% by mass in one embodiment of the present invention, 1% to 30% by mass in another embodiment, 1% to 25% by mass in still another embodiment, 1% to 24% by mass in still another embodiment, 1% to 20% by mass in still another embodiment, 1% to 19% by mass in still another embodiment, 1% to 16% by mass in still another embodiment, 1% to 12% by mass in still another embodiment, 1% to 11% by mass in still another embodiment, 1% to 10% by mass in still another embodiment, 1% to 9% by mass in still another embodiment, 1% to 8% by mass in still another embodiment, 1% to 7% by mass in still another embodiment, 1% to 3% by mass in still another embodiment, 3% to 24% by mass in still another embodiment, 5% to 24% by mass in still another embodiment, 6% to 24% by mass in still another embodiment, 8% to 24% by mass in still another embodiment, 11% to 24% by mass in still another embodiment, 13% to 24% by mass in still another embodiment, 15% to 24% by mass in still another embodiment, 17% to 24% by mass in still another embodiment, 3% to 7% by mass in still another embodiment, 5% to 10% by mass in still another embodiment, 6% to 9% by mass in still another embodiment, 6% to 8% by mass in still another embodiment, 8% to 11% by mass in still another embodiment, 11% to 19% by mass in still another embodiment, 11% to 12% by mass in still another embodiment, 13% to 16% by mass in still another embodiment, 15% to 19% by mass in still another embodiment, and 17% to 20% by mass in still another embodiment, with respect to the total mass of the liquid crystal composition.

In the case where it is required that the viscosity of the liquid crystal composition of the present invention be kept low and the liquid crystal composition have a high response speed, it is preferable that the lower limit value is small and the upper limit value is small. In the case where it is required that the liquid crystal composition is less likely to generate burn-in, it is preferable that the lower limit value is small and the upper limit value is small. In addition, when it is desired to increase the dielectric anisotropy in order to keep the driving voltage low, it is preferable that the lower limit value is great and the upper limit value is great.

The compound represented by General Formula (M) according to the present invention is preferably the compound represented by General Formula (X-1).

[Chem. 139]

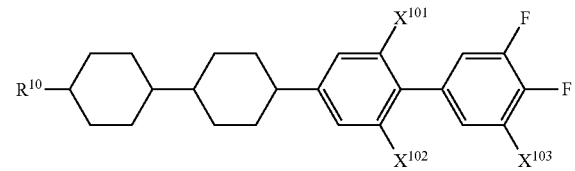

(In General Formula (X-1), $X^{101}$ to $X^{103}$ and $R^{10}$ each has the same meaning as that in General Formula (X).)

The compounds capable of being combined are not particularly limited, and in consideration of solubility at a low temperature, a transition temperature, electrical reliability, and birefringence, a compound is suitably combined with respect to each embodiment. For example, in one embodiment of the present invention, one type is combined. In another embodiment of the present invention, two types are combined. In still another embodiment of the present invention, three types are combined. In still another embodiment of the present invention, four types are combined. In addition, in still another embodiment of the present invention, five or more types are combined.

The content of the compound represented by General Formula (X-1) is suitably adjusted in consideration of characteristics such as solubility at a low temperature, a transition temperature, electrical reliability, and birefringence.

For example, the content of the compound represented by General Formula (X-1) is 1% to 20% by mass in one embodiment of the present invention, 1% to 15% by mass in another embodiment, 1% to 10% by mass in still another embodiment, 1% to 9% by mass in still another embodiment, 1% to 8% by mass in still another embodiment, 1% to 7% by mass in still another embodiment, 1% to 6% by mass in still another embodiment, 1% to 3% by mass in still another embodiment, 3% to 9% by mass in still another embodiment, 4% to 9% by mass in still another embodiment, 5% to 9% by mass in still another embodiment, 6% to 9% by mass in still another embodiment, 8% to 9% by mass in still another embodiment, 3% to 7% by mass in still another embodiment, 5% to 7% by mass in still another embodiment, and 6% to 7% by mass in still another embodiment, with respect to the total mass of the liquid crystal composition.

Furthermore, the compound represented by General Formula (X-1) according to the present invention is preferably the compound represented by General Formula (X-1-1).

[Chem. 140]

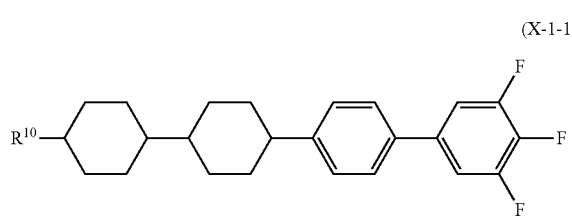

(X-1-1)

(In General Formula (X-1-1), $R^{10}$ has the same meaning as that in General Formula (X).)

The content of the compound represented by General Formula (X-1-1) is suitably adjusted in consideration of characteristics such as solubility at a low temperature, a transition temperature, electrical reliability, and birefringence.

For example, the content of the compound represented by General Formula (X-1-1) is 1 to 25% by mass in one embodiment of the present invention, 1 to 20% by mass in another embodiment, 1 to 15% by mass in still another embodiment, 1 to 10% by mass in still another embodiment, 3 to 10% by mass in still another embodiment, and 5 to 10% by mass in still another embodiment, with respect to the total mass of the liquid crystal composition of the present invention.

Furthermore, the compound represented by General Formula (X-1-1) used in the liquid crystal composition of the present invention, specifically, is preferably the compound represented by each of Formulas (36.1) to (36.4), and among these, preferably contains the compound represented by each of Formulas (36.1) and/or (36.2).

[Chem. 141]

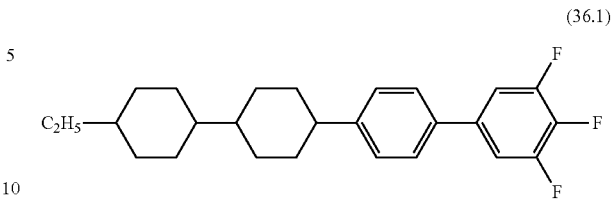

(36.1)

[Chem. 142]

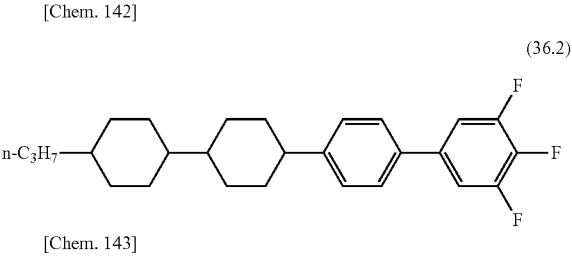

(36.2)

[Chem. 143]

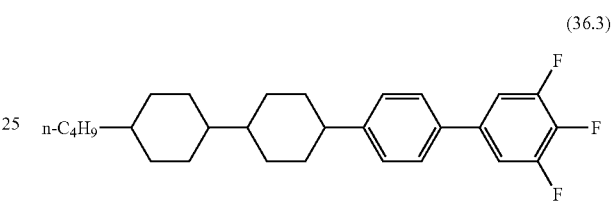

(36.3)

[Chem. 144]

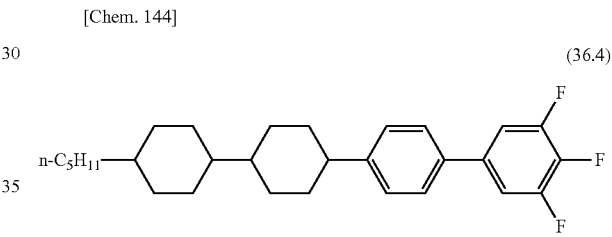

(36.4)

The compound represented by General Formula (X-1) used in the liquid crystal composition of the present invention is preferably the compound represented by General Formula (X-1-2).

[Chem. 145]

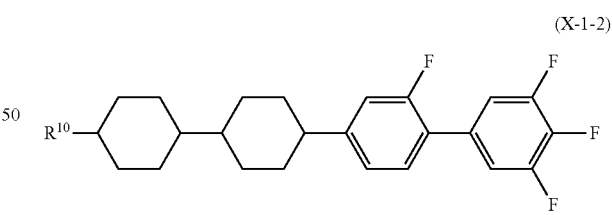

(X-1-2)

(In General Formula (X-1-2), $R^{10}$ represents an alkyl group having 1 to 5 carbon atoms, an alkenyl group having 2 to 5 carbon atoms, or an alkoxy group having 1 to 4 carbon atoms.)

The content of the compound represented by General Formula (X-1-2) is preferably 1% by mass or greater, more preferably 2% by mass or greater, and still more preferably 6% by mass or greater, with respect to the total amount of liquid crystal composition of the present invention. In addition, in consideration of solubility at a low temperature, a transition temperature, and electrical reliability, the maximum ratio is preferably 20% by mass or less, more preferably 16% by mass or less, still more preferably 12% by mass or less, and particularly preferably 10% by mass or less.

Furthermore, the compound represented by General Formula (X-1-2), specifically, is preferably the compound represented by each of Formulas (37.1) to (37.4), and among these, preferably contains the compound represented by Formula (37.2).

[Chem. 146]

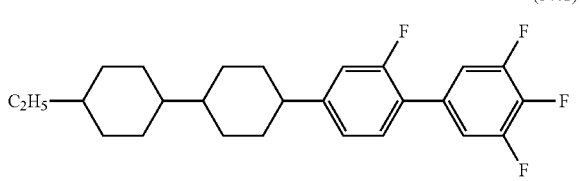

(37.1)

[Chem. 147]

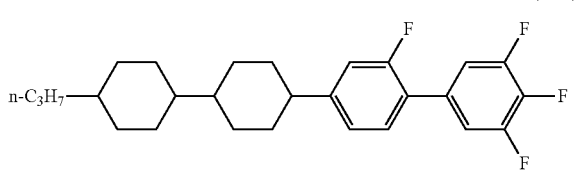

(37.2)

[Chem. 148]

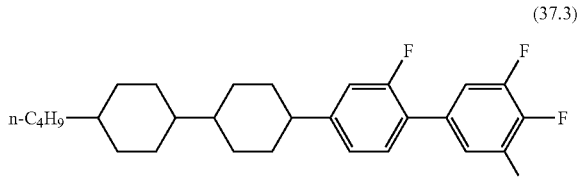

(37.3)

[Chem. 149]

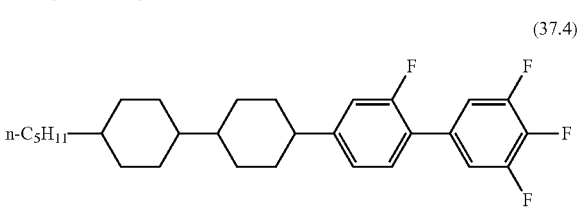

(37.4)

Furthermore, the compound represented by General Formula (X-1) according to the present invention is preferably the compound represented by General Formula (X-1-3).

[Chem. 150]

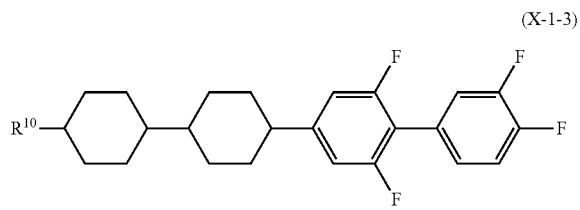

(X-1-3)

(In General Formula (X-1-3), $R^{10}$ represents an alkyl group having 1 to 5 carbon atoms, an alkenyl group having 2 to 5 carbon atoms, or an alkoxy group having 1 to 4 carbon atoms.)

The compounds capable of being combined are not particularly limited, and in consideration of solubility at a low temperature, a transition temperature, electrical reliability, or birefringence, one type or two or more types are preferably combined.

The content of the compound represented by General Formula (X-1-3) is preferably 1% by mass or greater, more preferably 2% by mass or greater, and still more preferably 6% by mass or greater, with respect to the total amount of liquid crystal composition of the present invention. In addition, in consideration of solubility at a low temperature, a transition temperature, and electrical reliability, the maximum ratio is preferably 20% by mass or less, more preferably 16% by mass or less, still more preferably 12% by mass or less, and particularly preferably 10% by mass or less.

Furthermore, the compound represented by General Formula (X-1-3) used in the liquid crystal composition of the present invention, specifically, is preferably the compound represented by each of Formulas (38.1) to (38.4), and among these, preferably contains the compound represented by Formula (38.2).

[Chem. 151]

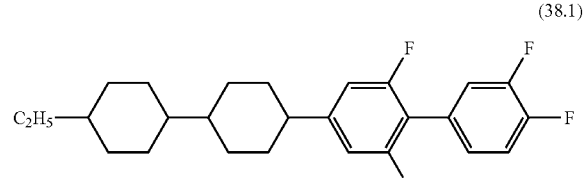

(38.1)

[Chem. 152]

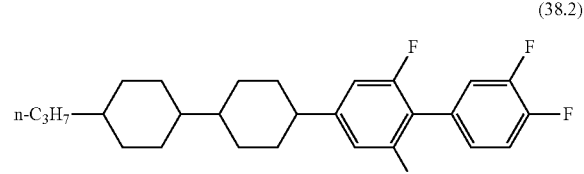

(38.2)

[Chem. 153]

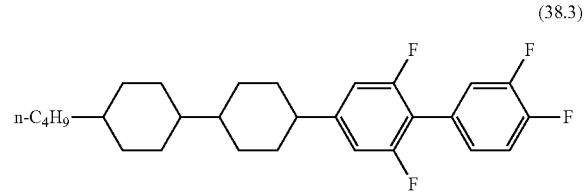

(38.3)

[Chem. 154]

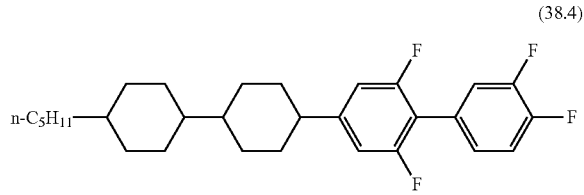

(38.4)

The compound represented by General Formula (X) according to the liquid crystal composition of the present invention is preferably the compound represented by General Formula (X-2).

[Chem. 155]

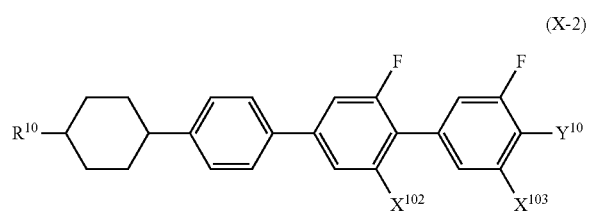

(X-2)

(In General Formula (X-2), $X^{102}$ and $X^{103}$ each independently represents a fluorine atom or a hydrogen atom, $Y^{10}$ represents a fluorine atom, a chlorine atom, or —$OCF_3$, $R^{10}$ represents an alkyl group having 1 to 5 carbon atoms, an alkenyl group having 2 to 5 carbon atoms, or an alkoxy group having 1 to 4 carbon atoms.)

The compounds capable of being combined are not particularly limited, and in consideration of solubility at a low temperature, a transition temperature, electrical reliability, or birefringence, one type or two or more types are preferably combined.

The content of the compound represented by General Formula (X-2) is preferably 1% by mass or greater, more preferably 2% by mass or greater, and still more preferably 3% by mass or greater, with respect to the total amount of liquid crystal composition of the present invention. In addition, in consideration of solubility at a low temperature, a transition temperature, and electrical reliability, the maximum ratio is preferably 15% by mass or less, more preferably 12% by mass or less, still more preferably 10% by mass or less, and particularly preferably 8% by mass or less.

Furthermore, the compound represented by General Formula (X-2) according to the present invention is preferably the compound represented by General Formula (X-2-1).

[Chem. 156]

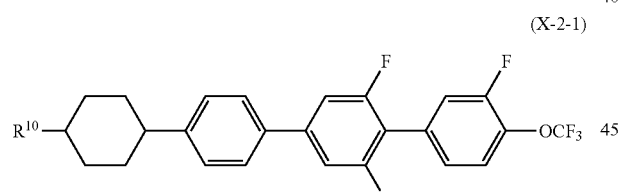

(X-2-1)

(In General Formula (X-2-1), $R^{10}$ represents an alkyl group having 1 to 5 carbon atoms, an alkenyl group having 2 to 5 carbon atoms, or an alkoxy group having 1 to 4 carbon atoms.)

The compounds capable of being combined are not particularly limited, and in consideration of solubility at a low temperature, a transition temperature, electrical reliability, or birefringence, one type or two or more types are preferably combined, and one to three or more types are more preferably combined.

The content of the compound represented by General Formula (X-2-1) is preferably 1% by mass or greater, more preferably 2% by mass or greater, and still more preferably 3% by mass or greater, with respect to the total amount of liquid crystal composition of the present invention. In addition, in consideration of solubility at a low temperature, a transition temperature, and electrical reliability, the maximum ratio is preferably 20% by mass or less, more preferably 16% by mass or less, still more preferably 12% by mass or less, and particularly preferably 10% by mass or less.

Furthermore, the compound represented by General Formula (X-2-1) used in the liquid crystal composition of the present invention, specifically, is preferably the compound represented by each of Formulas (39.1) to (39.4), and among these, preferably contains the compound represented by Formula (39.2).

[Chem. 157]

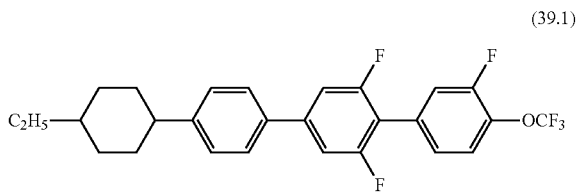

(39.1)

[Chem. 158]

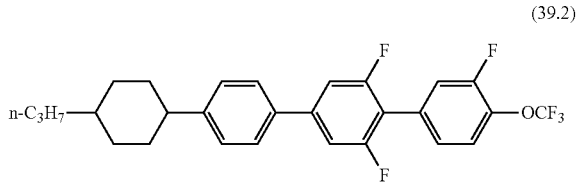

(39.2)

[Chem. 159]

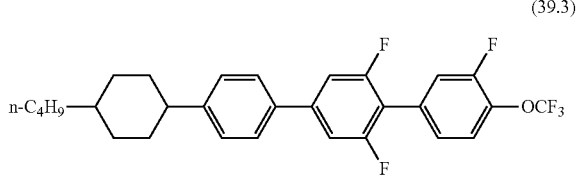

(39.3)

[Chem. 160]

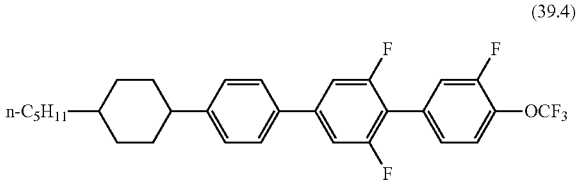

(39.4)

Furthermore, the compound represented by General Formula (X-2) according to the present invention is preferably the compound represented by General Formula (X-2-2).

[Chem. 161]

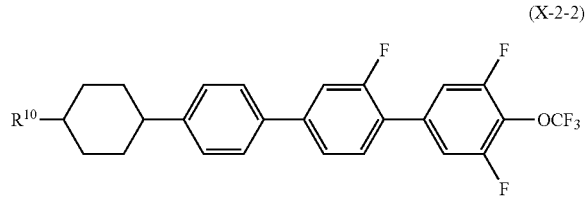

(X-2-2)

(In General Formula (X-2-2), $R^{10}$ represents an alkyl group having 1 to 5 carbon atoms, an alkenyl group having 2 to 5 carbon atoms, or an alkoxy group having 1 to 4 carbon atoms.)

The compounds capable of being combined are not particularly limited, and in consideration of solubility at a low temperature, a transition temperature, electrical reliability, or birefringence, one type or two or more types are preferably combined. The content of the compound represented by General Formula (X-2-2) is preferably 1% by mass or greater, more preferably 2% by mass or greater, and still more preferably 3% by mass or greater, with respect to the total amount of liquid crystal composition of the present invention. In addition, in consideration of solubility at a low temperature, a transition temperature, and electrical reliability, the maximum ratio is preferably 20% by mass or less, more preferably 16% by mass or less, still more preferably 12% by mass or less, and particularly preferably 10% by mass or less.

Furthermore, the compound represented by General Formula (X-2-2) used in the liquid crystal composition of the present invention, specifically, is preferably the compound represented by each of Formulas (40.1) to (40.4), and among these, preferably contains the compound represented by Formula (40.2).

[Chem. 162]

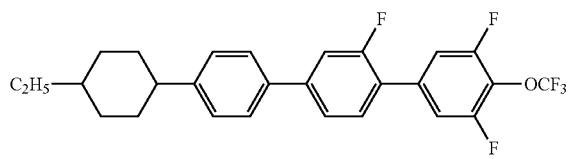

(40.1)

[Chem. 163]

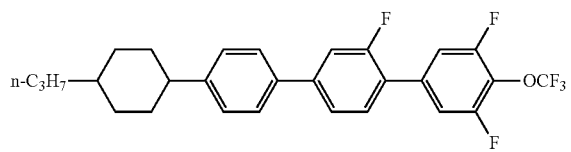

(40.2)

[Chem. 164]

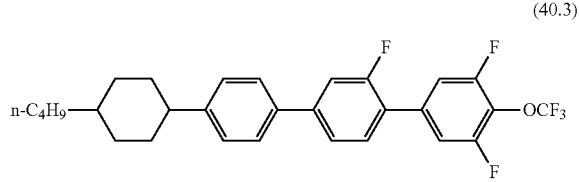

(40.3)

[Chem. 165]

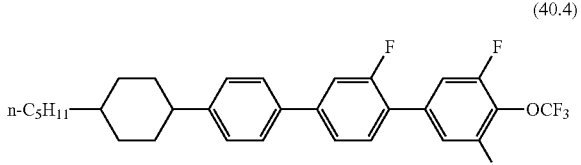

(40.4)

The compound represented by General Formula (M) according to the present invention is preferably the compound represented by General Formula (IIb).

[Chem. 166]

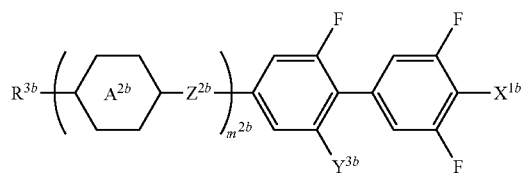

(IIb)

In General Formula (IIb), $R^{3b}$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, the alkenyl group, the alkoxy group, or the alkenyloxy group may be substituted with (a) fluorine atom (s), the methylene group in the alkyl group, the alkenyl group, the alkoxy group, or the alkenyloxy group may be substituted with oxygen atoms as long as the oxygen atoms are not continuously bonded or may be substituted with carbonyl groups as long as the carbonyl groups are not continuously bonded, $A^{2b}$ each independently represents a 1,4-cyclohexylene cyclohexylene group, a 1,4-phenylene group, a tetrahydropyran-2,5-diyl group, a dioxane-2,5-diyl group, or a pyrimidine-2,5-diyl group, and in the case where $A^{2b}$ represents a 1,4-phenylene group, one or more hydrogen atoms in the 1,4-phenylene group may be substituted with a fluorine atom, $Z^{2b}$ each independently represents a single bond, —OCH$_2$—, —OCF$_2$—, —CH$_2$O—, or —CF$_2$O—, $m^{2b}$ represents 1, 2, 3, or 4, $Y^{3b}$ each independently represents a fluorine atom or a hydrogen atom, and $X^{1b}$ represents a fluorine atom, a —CN group, or an —OCF$_3$ group.

At least one compound is preferably selected from the compound group of the compounds represented by General Formula (IIb) and $m^{2b}$ is more preferably 2 or 3.

The content of the compound represented by General Formula (IIb) has the upper limit value and the lower limit value in each embodiment in consideration of characteristics such as solubility at a low temperature, a transition temperature, electrical reliability, and birefringence. For example, the lower limit value of the content of the compound is 0.01% in one embodiment of the present invention, 0.05% in another embodiment, 0.1% in still another embodiment, 0.2% in still another embodiment, 0.3% in still another embodiment, 0.4% in still another embodiment, and 0.5% in still another embodiment, with respect to the total amount of liquid crystal composition of the present invention. In addition, for example, the upper limit value of the content of the compound represented by General Formula (IIb) is, for example, 10% in one embodiment of the present invention, 8% in another embodiment, 2% instill another embodiment, 1% instill another embodiment, 0.8% in still another embodiment, and 0.7% in still another embodiment.

When the compound represented by General Formula (IIa) is included in the liquid crystal composition, dielectricity such as Δε can be ensured, and compatibility with General Formula (L) is also not impaired.

The compound represented by General Formula (X) according to the present invention is preferably the compound represented by General Formula (X-3).

[Chem. 167]

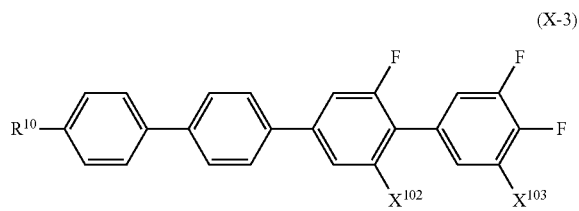

(X-3)

(In General Formula (X-3), $X^{102}$ and $X^{103}$ each independently represents a fluorine atom or a hydrogen atom, and $R^{10}$ represents an alkyl group having 1 to 5 carbon atoms, an alkenyl group having 2 to 5 carbon atoms, or an alkoxy group having 1 to 4 carbon atoms.)

The compounds capable of being combined are not particularly limited, and in consideration of solubility at a low temperature, a transition temperature, electrical reliability, or birefringence, one type or two or more types are preferably combined. When the compound represented by General Formula (X-3) is included in the liquid crystal composition, dielectricity such as Δε can be ensured, and compatibility with the first component such as General Formula (L) is also not impaired.

The content of the compound represented by General Formula (X-3) is preferably 0.1% by mass or greater, more preferably 0.2% by mass or greater, and still more preferably 0.3% by mass or greater, with respect to the total amount of liquid crystal composition of the present invention. In addition, in consideration of solubility at a low temperature, a transition temperature, and electrical reliability, the maximum ratio is preferably 8% by mass or less, more preferably 5% by mass or less, still more preferably 2% by mass or less, and particularly preferably 1% by mass or less.

Furthermore, the compound represented by General Formula (X-3) used in the liquid crystal composition of the present invention is preferably the compound represented by General Formula (X-3-1).

[Chem. 168]

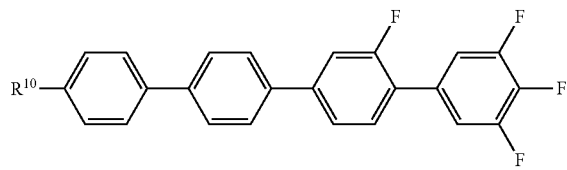

(X-3-1)

(In General Formula (X-3-1), $R^{10}$ represents an alkyl group having 1 to 5 carbon atoms, an alkenyl group having 2 to 5 carbon atoms, or an alkoxy group having 1 to 4 carbon atoms.)

In the compound which satisfies General Formula (X-3-1), the compounds capable of being combined are not particularly limited, and in consideration of solubility at a low temperature, a transition temperature, electrical reliability, or birefringence, one type or two or more types are preferably combined.

The content of the compound represented by General Formula (X-3-1) is preferably 0.05% by mass or greater, more preferably 0.2% by mass or greater, and still more preferably 0.3% by mass or greater, with respect to the total amount of liquid crystal composition of the present invention. In addition, in consideration of solubility at a low temperature, a transition temperature, and electrical reliability, the maximum ratio is preferably 5% by mass or less, more preferably 3% by mass or less, still more preferably 2% by mass or less, and particularly preferably 1% by mass or less.

Furthermore, the compound represented by General Formula (X-3-1) used in the liquid crystal composition of the present invention, specifically, is preferably the compound represented by each of Formulas (41.1) to (41.4), and among these, preferably contains the compound represented by Formula (41.2). When the compound represented by each of Formulas (41.1) to (41.4) is included in the liquid crystal composition, dielectricity such as Δε can be ensured, and compatibility with the first component which is non-polar is also not impaired.

[Chem. 169]

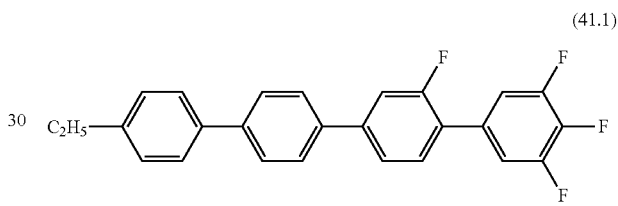

(41.1)

[Chem. 170]

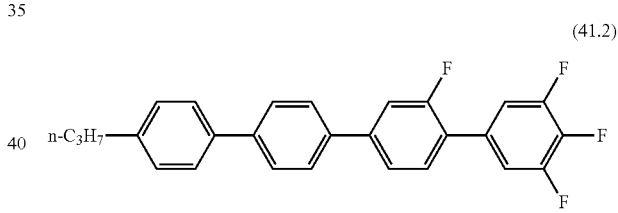

(41.2)

[Chem. 171]

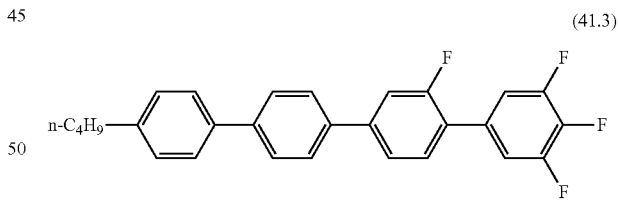

(41.3)

[Chem. 172]

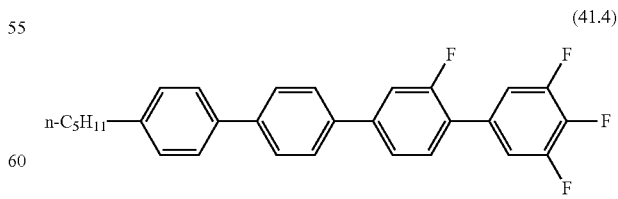

(41.4)

Furthermore, the compound represented by General Formula (X-3) which is used in the liquid crystal composition of the present invention is preferably the compound represented by General Formula (X-3-1).

[Chem. 173]

(X-3-2)

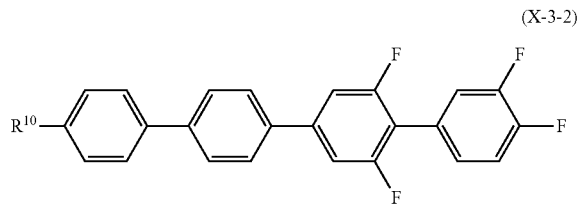

(In General Formula (X-3-2), $R^{10}$ represents an alkyl group having 1 to 5 carbon atoms, an alkenyl group having 2 to 5 carbon atoms, or an alkoxy group having 1 to 4 carbon atoms.)

In the compound which satisfies General Formula (X-3-2), the compounds capable of being combined are not particularly limited, and in consideration of solubility at a low temperature, a transition temperature, electrical reliability, or birefringence, one type or two or more types are preferably combined.

The content of the compound represented by General Formula (X-3-2) is preferably 0.05% by mass or greater, more preferably 0.2% by mass or greater, and still more preferably 0.3% by mass or greater, with respect to the total amount of liquid crystal composition of the present invention. In addition, in consideration of solubility at a low temperature, a transition temperature, and electrical reliability, the maximum ratio is preferably 5% by mass or less, more preferably 3% by mass or less, still more preferably 2% by mass or less, and particularly preferably 1.5% by mass or less.

Furthermore, specifically, the compound represented by General Formula (X-3-2) used in the liquid crystal composition of the present invention is preferably the compound represented by Formulas (41.5) to (41.8), and among these, preferably contains the compound represented by Formula (41.6). When the compound represented by Formulas (41.5) to (41.7) is included in the liquid crystal composition, dielectricity such as Δε can be ensured, and compatibility with the first component which is non-polar is also not impaired.

[Chem. 174]

(41.5)

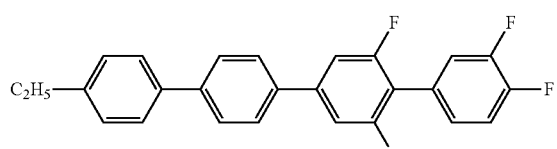

[Chem. 175]

(41.6)

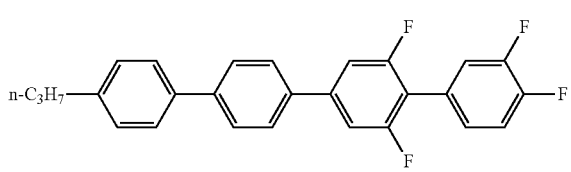

[Chem. 176]

(41.7)

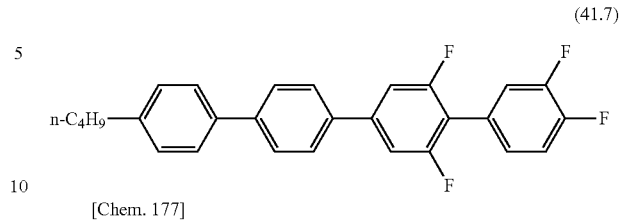

[Chem. 177]

(41.8)

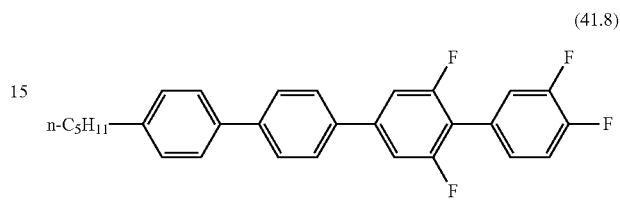

Furthermore, the compound represented by General Formula (X) is preferably the compound represented by General Formula (X-4).

[Chem. 178]

(X-4)

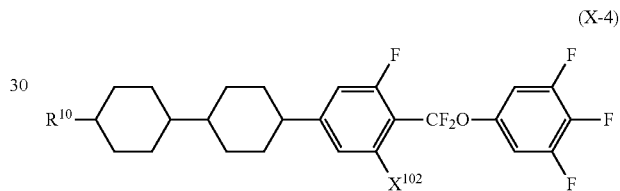

(In General Formula (X-4), $X^{102}$ represents a fluorine atom or a hydrogen atom, $R^{10}$ represents an alkyl group having 1 to 5 carbon atoms, an alkenyl group having 2 to 5 carbon atoms, or an alkoxy group having 1 to 4 carbon atoms.)

The compounds capable of being combined are not particularly limited, and in consideration of solubility at a low temperature, a transition temperature, electrical reliability, or birefringence, one type or two or more types are preferably combined, and one to three or more types are more preferably combined.

Furthermore, the compound represented by General Formula (X-4) according to the present invention is preferably the compound represented by General Formula (X-4-1).

[Chem. 179]

(X-4-1)

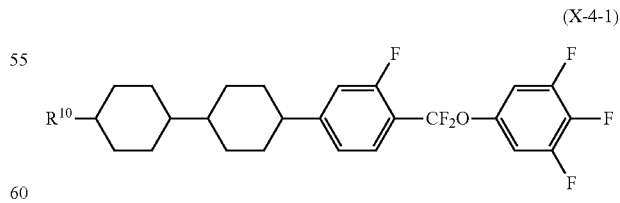

(In General Formula (X-4-1), $R^{10}$ represents an alkyl group having 1 to 5 carbon atoms, an alkenyl group having 2 to 5 carbon atoms, or an alkoxy group having 1 to 4 carbon atoms.)

The compounds capable of being combined are not particularly limited, and in consideration of solubility at a low temperature, a transition temperature, electrical reliability, or birefringence, one type or two or more types are preferably combined, and one to three or more types are more preferably combined.

The content of the compound represented by General Formula (X-4-1) is preferably 2% by mass or greater, more preferably 5% by mass or greater, and still more preferably 10% by mass or greater, with respect to the total amount of liquid crystal composition of the present invention. In addition, in consideration of solubility at a low temperature, a transition temperature, and electrical reliability, the maximum ratio is preferably 20% by mass or less, more preferably 17% by mass or less, still more preferably 15% by mass or less, and particularly preferably 13% by mass or less.

Furthermore, the compound represented by General Formula (X-4-1) used in the liquid crystal composition of the present invention, specifically, is preferably the compound represented by each of Formulas (42.1) to (42.4), and among these, preferably contains the compound represented by Formula (42.3).

[Chem. 180]

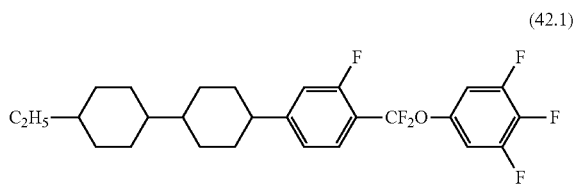

(42.1)

[Chem. 181]

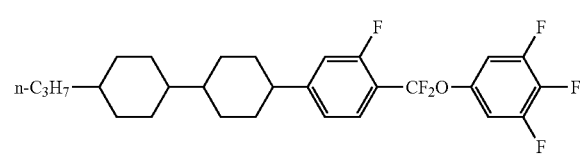

(42.2)

[Chem. 182]

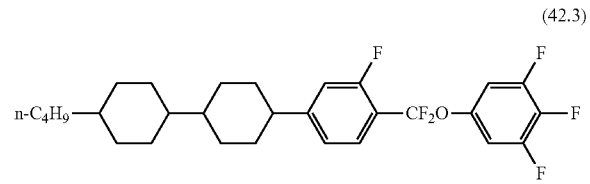

(42.3)

[Chem. 183]

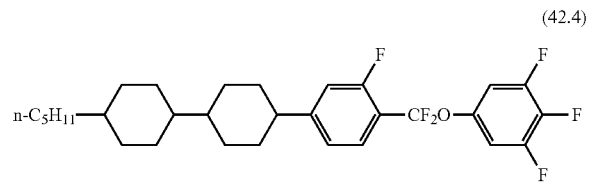

(42.4)

Furthermore, the compound represented by General Formula (X) according to the present invention is preferably the compound represented by General Formula (X-5).

[Chem. 184]

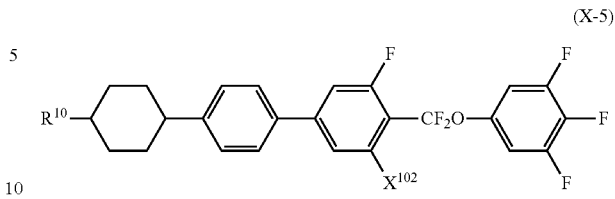

(X-5)

(In General Formula (X-5), $X^{102}$ represents a fluorine atom or a hydrogen atom, $R^{10}$ represents an alkyl group having 1 to 5 carbon atoms, an alkenyl group having 2 to 5 carbon atoms, or an alkoxy group having 1 to 4 carbon atoms.)

The compounds capable of being combined are not particularly limited, and in consideration of solubility at a low temperature, a transition temperature, electrical reliability, or birefringence, one type or two or more types are preferably combined, and one to three or more types are more preferably combined.

Furthermore, the compound represented by General Formula (X-5) used in the liquid crystal composition of the present invention is preferably the compound represented by General Formula (X-5-1).

[Chem. 185]

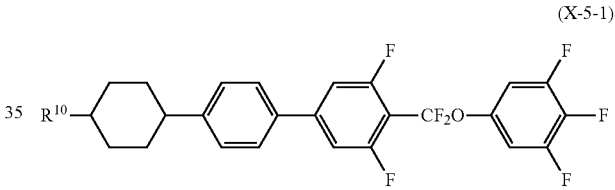

(X-5-1)

(In General Formula (X-5-1), $R^{10}$ represents an alkyl group having 1 to 5 carbon atoms, an alkenyl group having 2 to 5 carbon atoms, or an alkoxy group having 1 to 4 carbon atoms.)

The compounds capable of being combined are not particularly limited, and in consideration of solubility at a low temperature, a transition temperature, electrical reliability, or birefringence, one type or two or more types are preferably combined, and one to three or more types are more preferably combined.

Furthermore, the compound represented by General Formula (X-5-1) used in the liquid crystal composition of the present invention, specifically, is preferably the compound represented by each of Formulas (43.1) to (43.4), and among these, preferably contains the compound represented by Formula (43.2).

[Chem. 186]

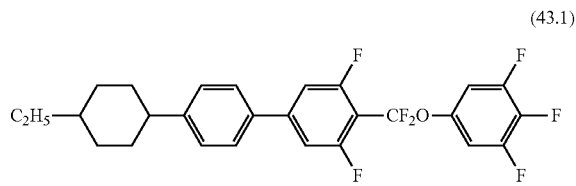

(43.1)

-continued

[Chem. 187]

(43.2)

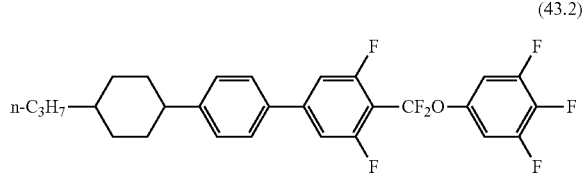

[Chem. 188]

(43.3)

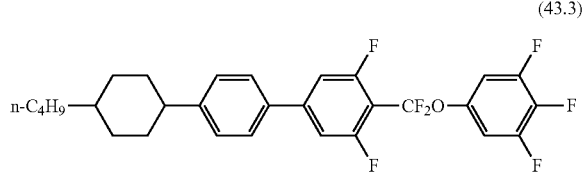

[Chem. 189]

(43.4)

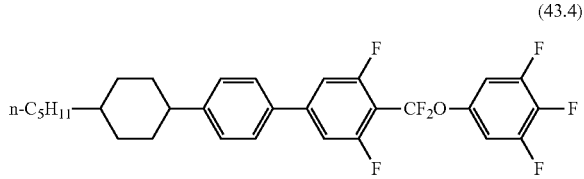

The content of the compound represented by Formulas (43.1) to (43.4) is preferably 1% by mass or greater, more preferably 2% by mass or greater, and still more preferably 3% by mass or greater, with respect to the total amount of liquid crystal composition of the present invention. In addition, in consideration of solubility at a low temperature, a transition temperature, and electrical reliability, the maximum ratio is preferably 18% by mass or less, more preferably 15% by mass or less, still more preferably 12% by mass or less, and particularly preferably 10% by mass or less.

The compound represented by General Formula (M) used in the liquid crystal composition of the present invention is preferably the compound represented by General Formula (IIa).

[Chem. 190]

(IIa)

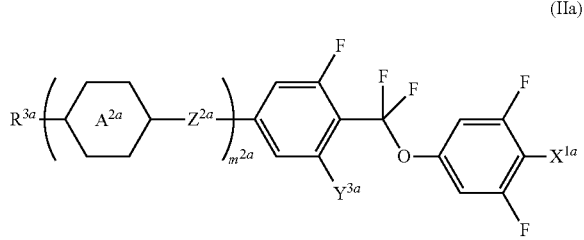

At least one type of compound is preferably selected from the compound group of the compounds represented by (in General Formula (IIa), $R^{3a}$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, the alkenyl group, the alkoxy group, or the alkenyloxy group may be substituted with (a) fluorine atom(s), the methylene group in the alkyl group, the alkenyl group, the alkoxy group, or the alkenyloxy group may be substituted with oxygen atoms as long as the oxygen atoms are not continuously bonded or may be substituted with carbonyl groups as long as the carbonyl groups are not continuously bonded, $A^{2a}$ each independently represents a 1,4-cyclohexylene cyclohexylene group, a 1,4-phenylene group, a tetrahydropyran-2,5-diyl group, a dioxane-2,5-diyl group, or a pyrimidine-2,5-diyl group, and in the case where $A^{2a}$ represents a 1,4-phenylene group, one or more hydrogen atoms in the 1,4-phenylene group may be substituted with a fluorine atom, $Z^{2a}$ each independently represents a single bond, —OCH$_2$—, —OCF$_2$—, —CH$_2$O—, or —CF$_2$O—, $m^{2a}$ represents 1, 2, 3, or 4, $Y^{3a}$ each independently represents a fluorine atom or a hydrogen atom, and $X^{1a}$ represents a fluorine atom, a —CN group, or an —OCF$_3$ group.) and at least two types of compounds is more preferably selected from the compound group of the compounds represented by General Formula (IIa). In addition, in General Formula (IIa), $m^{2a}$ is more preferably 2, 3, or 4, $m^{2a}$ is still more preferably 2 or 3, and $m^{2a}$ is particularly preferably 3.

It was confirmed that compatibility is significantly improved by a combination of compounds having commonality of the chemical skeleton or characteristics of the chemical skeleton. Among these, in the liquid crystal composition of the present invention including a component containing the compound represented by General Formula (M-1) described above which are subordinate concepts of the compound represented by General Formula (IIa), and a component containing the compound represented by General Formula (i), precipitation of the liquid crystal compound which had been a problem in the related art was solved.

The content of the compound represented by General Formula (IIa) has the upper limit value and the lower limit value in each embodiment in consideration of characteristics such as solubility at a low temperature, a transition temperature, electrical reliability, and birefringence (the range of the upper limit value and the lower limit value is the same in the other parts of the present specification). For example, the lower limit value of the content of the compound is 2% in one embodiment of the present invention, 3% in another embodiment, 4% in still another embodiment, 5% in still another embodiment, 6% in still another embodiment, 7% in still another embodiment, and 8% in still another embodiment, with respect to the total amount of liquid crystal composition of the present invention. In addition, the lower limit value is 9% in still another embodiment. The lower limit value is 11% in still another embodiment, 15% in still another embodiment, and 18% in still another embodiment. In addition, for example, the upper limit value of the content of the compound represented by General Formula (IIa) is 30% in one embodiment of the present invention, 20% in another embodiment, 13% in still another embodiment, 10% in still another embodiment, 7% in still another embodiment, and 3% in still another embodiment.

Furthermore, the compound represented by General Formula (X) is preferably a compound selected from the group represented by General Formula (XI).

[Chem. 191]

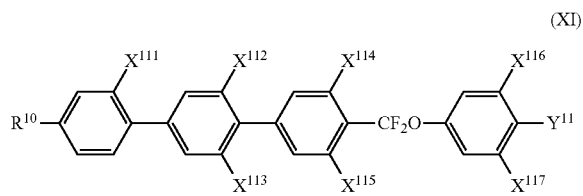

(XI)

(In General Formula (XI), $X^{111}$ to $X^{117}$ each independently represents a fluorine atom or a hydrogen atom, at least one of $X^{111}$ to $X^{117}$ represents a fluorine atom, $R^{11}$ represents an alkyl group having 1 to 5 carbon atoms, an alkenyl group having 2 to 5 carbon atoms, or an alkoxy group having 1 to 4 carbon atoms, and $Y^{11}$ represents a fluorine atom or —$OCF_3$.)

The compounds capable of being combined are not particularly limited, and in consideration of solubility at a low temperature, a transition temperature, electrical reliability, or birefringence, one type to three or more types are preferably combined.

When the compound represented by General Formula (XI) is present in the liquid crystal composition, it is confirmed that a high transition point, a great Δε dielectric constant, a high Δn, and in a tetracyclic compound, low viscosity are observed. Furthermore, it is confirmed that the compound represented by General Formula (XI) exhibits good compatibility with respect to the compound represented by General Formulas (i) and (N). Thus, in the liquid crystal composition according to the present invention, it is more preferable that General Formula (XI) is contained as General Formula (M) as long as Δε does not exceed 5.

The content of the compound represented by General Formula (XI) has the upper limit value and the lower limit value in each embodiment in consideration of characteristics such as solubility at a low temperature, a transition temperature, electrical reliability, and birefringence. For example, the lower limit value of the content is 2% in one embodiment of the present invention, 4% in another embodiment, 5% in still another embodiment, 7% instill another embodiment, 9% instill another embodiment, 10% in still another embodiment, and 12% in still another embodiment, with respect to the total amount of liquid crystal composition of the present invention. In addition, the lower limit value is 13% in still another embodiment. In addition, the lower limit value is 15% instill another embodiment. In addition, the lower limit value is 18% in still another embodiment.

In addition, for example, the upper limit value of the content is 30% in one embodiment of the present invention, 25% in another embodiment, 20% in still another embodiment, 15% in still another embodiment, 10% in still another embodiment, and 5% in still another embodiment.

In the case where the liquid crystal composition of the present invention is used in a liquid crystal display element having a small cell gap, it is suitable that the content of the compound represented by General Formula (XI) is great. In the case where the liquid crystal composition of the present invention is used in a liquid crystal display element having a low driving voltage, it is suitable that the content of the compound represented by General Formula (XI) is great. In the case where the liquid crystal composition of the present invention is used in a liquid crystal display element which is used in a low temperature environment, it is suitable that the content of the compound represented by General Formula (XI) is small. In the case where the liquid crystal composition of the present invention is used in a liquid crystal display element having a high response speed, it is suitable that the content of the compound represented by General Formula (XI) is small.

Moreover, the cell gap in the specification refers to an average distance between the alignment layers facing each other, and in other words, refers to the average thickness of a liquid crystal layer filled with the liquid crystal composition (for example, the thickness is obtained by averaging 10 points).

Furthermore, the compound represented by General Formula (XI) used in the liquid crystal composition of the present invention is preferably the compound represented by General Formula (XI-1).

[Chem. 192]

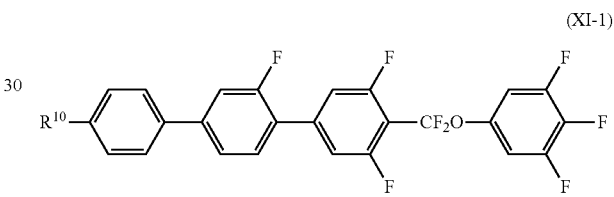

(XI-1)

(In General Formula (XI-1), $R^{11}$ represents an alkyl group having 1 to 5 carbon atoms, an alkenyl group having 2 to 5 carbon atoms, or an alkoxy group having 1 to 4 carbon atoms.)

The compounds capable of being combined are not particularly limited, and in consideration of solubility at a low temperature, a transition temperature, electrical reliability, or birefringence, a compound is suitably combined with respect to each embodiment. For example, in one embodiment of the present invention, one type thereof is combined, in another embodiment, two types thereof are combined, and in still another embodiment, three or more types thereof are combined.

In addition, it is also thought that the fluorine atom on the second benzene ring from the left in the compound represented by General Formula (XI-1) particularly contributes to the compatibility, and it is confirmed that a high transition point, a great Δε dielectric constant, a high Δn, and in a tetracyclic compound, low viscosity are observed. Furthermore, it is confirmed that the compound represented by General Formula (XI-1) exhibits good compatibility with respect to a composition including the compound represented by General Formulas (i), (M-1) and (N).

The content of the compound represented by General Formula (XI-1) is preferably 1% by mass or greater, more preferably 2% by mass or greater, still more preferably 3% by mass or greater, still more preferably 4% by mass or greater, and particularly preferably 5% by mass or greater, with respect to the total amount of liquid crystal composition of the present invention. In addition, in consideration of solubility at a low temperature, a transition temperature, and electrical reliability, the maximum ratio is preferably 20% by mass or less, more preferably 15% by mass or less, still more preferably 12% by mass or less, and particularly preferably 10% by mass or less.

Furthermore, the compound represented by General Formula (XI-1) used in the liquid crystal composition of the present invention, specifically, is preferably the compound represented by each of Formulas (45.1) to (45.4), and among these, the compound represented by Formulas (45.2) to (45.4) is preferably contained, and the compound represented by Formula (45.2) is more preferably contained.

[Chem. 193]

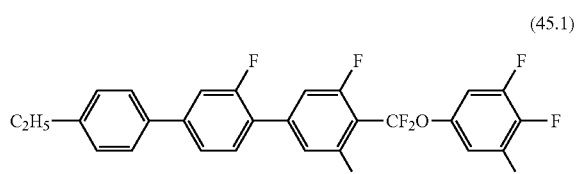

(45.1)

[Chem. 194]

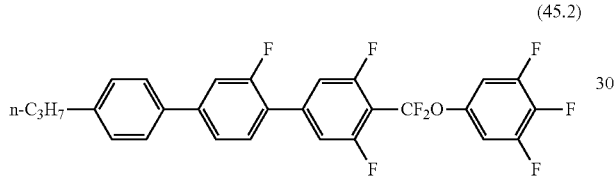

(45.2)

[Chem. 195]

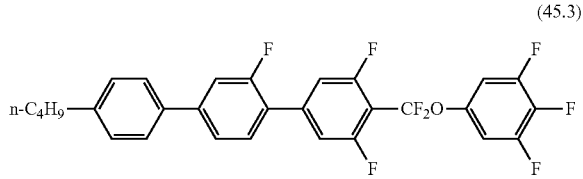

(45.3)

[Chem. 196]

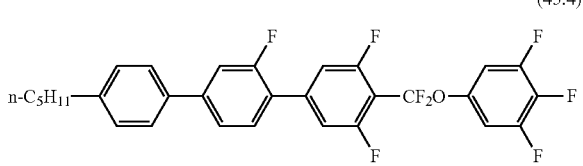

(45.4)

The content of the compound represented by Formulas (45.1) to (45.4) is preferably 1% by mass or greater, more preferably 1.5% by mass or greater, still more preferably 2% by mass or greater, still more preferably 2.5% by mass or greater, and particularly preferably 3% by mass or greater with respect to the total amount of liquid crystal composition of the present invention. In addition, in consideration of solubility at a low temperature, a transition temperature, and electrical reliability, the maximum ratio is preferably 18% by mass or less, more preferably 15% by mass or less, still more preferably 12% by mass or less, and particularly preferably 10% by mass or less.

Furthermore, the compound represented by General Formula (X) is preferably a compound selected from the group represented by General Formula (XII).

[Chem. 197]

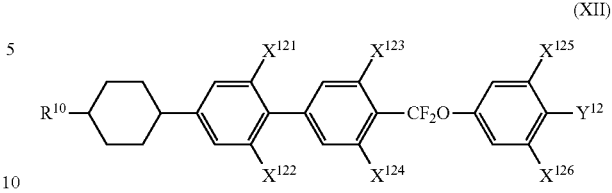

(XII)

(In General Formula (XII), $X^{121}$ to $X^{126}$ each independently represents a fluorine atom or a hydrogen atom, $R^{12}$ represents an alkyl group having 1 to 5 carbon atoms, an alkenyl group having 2 to 5 carbon atoms, or an alkoxy group having 1 to 4 carbon atoms, and $Y^{12}$ represents a fluorine atom or —$OCF_3$.)

The compounds capable of being combined are not particularly limited, and in consideration of solubility at a low temperature, a transition temperature, electrical reliability, or birefringence, one type to three or more types are preferably combined, and one to four or more types are more preferably combined.

The compound represented by General Formula (XII) used in the liquid crystal composition of the present invention is preferably the compound represented by General Formula (XII-1).

[Chem. 198]

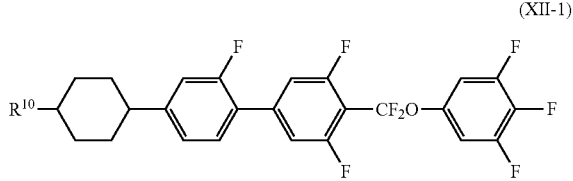

(XII-1)

(In General Formula (XII-1), $R^{12}$ represents an alkyl group having 1 to 5 carbon atoms, an alkenyl group having 2 to 5 carbon atoms, or an alkoxy group having 1 to 4 carbon atoms.)

The compounds capable of being combined are not particularly limited, and in consideration of solubility at a low temperature, a transition temperature, electrical reliability, or birefringence, one type or two or more types are preferably combined, and one to three or more types are more preferably combined.

The content of the compound represented by General Formula (XII-1) is preferably 1% by mass or greater, more preferably 2% by mass or greater, still more preferably 3% by mass or greater, and particularly preferably 4% by mass or greater, with respect to the total amount of liquid crystal composition of the present invention. In addition, in consideration of solubility at a low temperature, a transition temperature, and electrical reliability, the maximum ratio is preferably 15% by mass or less, more preferably 10% by mass or less, still more preferably 8% by mass or less, and particularly preferably 6% by mass or less.

Furthermore, the compound represented by General Formula (XII-1) used in the liquid crystal composition of the present invention, specifically, is preferably the compound represented by each of Formulas (46.1) to (46.4), and among these, preferably contains the compound represented by each of Formulas (46.2) to (46.4).

[Chem. 199]

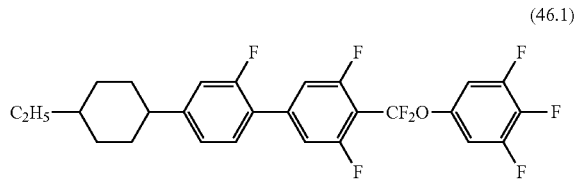
(46.1)

[Chem. 200]

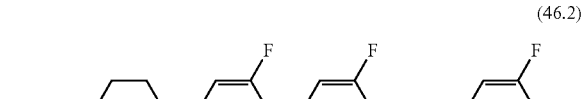
(46.2)

[Chem. 201]

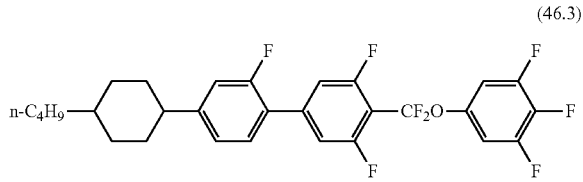
(46.3)

[Chem. 202]

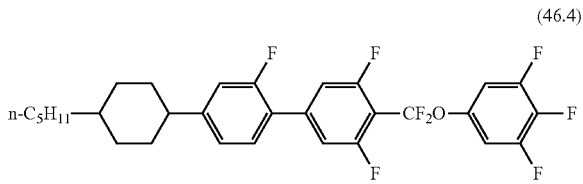
(46.4)

Furthermore, the compound represented by General Formula (XII) is preferably the compound represented by General Formula (XII-2).

[Chem. 203]

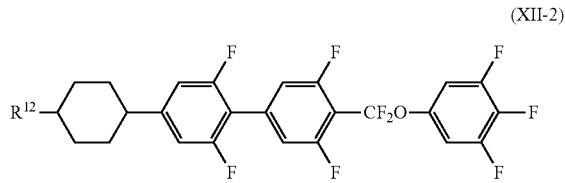
(XII-2)

(In General Formula (XII-2), $R^{12}$ represents an alkyl group having 1 to 5 carbon atoms, an alkenyl group having 2 to 5 carbon atoms, or an alkoxy group having 1 to 4 carbon atoms.)

The compounds capable of being combined are not particularly limited, and in consideration of solubility at a low temperature, a transition temperature, electrical reliability, or birefringence, one type or two or more types are preferably combined, and one to three or more types are more preferably combined.

The content of the compound represented by General Formula (XII-2) is preferably 1% by mass or greater, more preferably 3% by mass or greater, still more preferably 4% by mass or greater, still more preferably 6% by mass or greater, and particularly preferably 9% by mass or greater, with respect to the total amount of liquid crystal composition of the present invention. In addition, in consideration of solubility at a low temperature, a transition temperature, and electrical reliability, the maximum ratio is preferably 20% by mass or less, more preferably 17% by mass or less, still more preferably 15% by mass or less, and particularly preferably 13% by mass or less.

Furthermore, the compound represented by General Formula (XII-2) used in the liquid crystal composition of the present invention, specifically, is preferably the compound represented by each of Formulas (47.1) to (47.4), and among these, preferably contains the compound represented by each of Formulas (47.2) to (47.4).

[Chem. 204]

(47.1)

[Chem. 205]

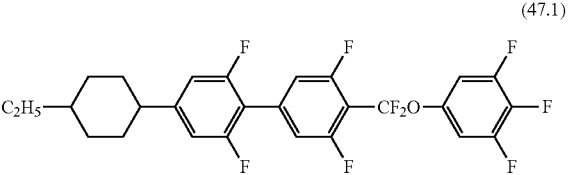
(47.2)

[Chem. 206]

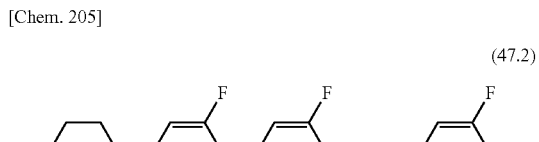
(47.3)

[Chem. 207]

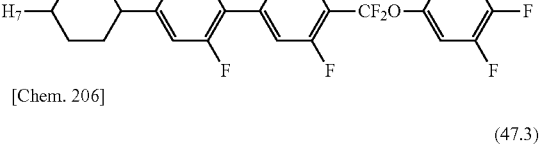
(47.4)

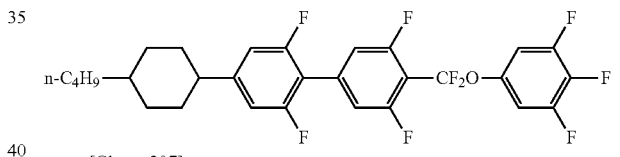

The compound represented by General Formula (M) according to the present invention is, for example, preferably a compound selected from the compound group of the compounds represented by General Formula (VIII).

[Chem. 208]

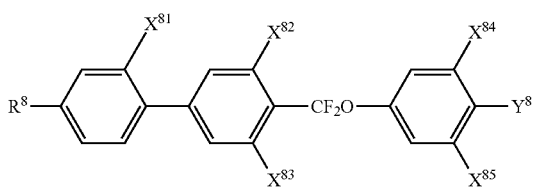
(VIII)

(In General Formula (VIII), $R^8$ represents an alkyl group having 1 to 5 carbon atoms, an alkenyl group having 2 to 5 carbon atoms, or an alkoxy group having 1 to 4 carbon atoms, $X^{81}$ to $X^{83}$ each independently represents a hydrogen atom or a fluorine atom, and $Y^8$ represents a fluorine atom or $—OCF_3$.)

The types of compound capable of being combined are not particularly limited, and a compound is suitably combined and used depending on the desired performance such as solubility at a low temperature, a transition temperature, electrical reliability, or birefringence. The type of compound used is, for example, one type in one embodiment of the present invention. In another embodiment of the present invention, two types are used. In addition, in still another embodiment of the present invention, three or more types are used. When the compound represented by General Formula (VIII) is present in the liquid crystal composition, a high Δn is exhibited, and action and effect in which the transition point is likely to be controlled by a ratio adjustment with other 4-ring compounds are exhibited.

In the liquid crystal composition of the present invention, the content of the compound represented by General Formula (VIII) needs to be suitably adjusted depending on the required performance such as solubility at a low temperature, a transition temperature, electrical reliability, birefringence, process compatibility, dropping marks, burn-in, or dielectric anisotropy.

For example, the content of the compound represented by General Formula (VIII) is 1% to 25% by mass with respect to the total mass of the liquid crystal composition of the present invention in one embodiment of the present invention. For example, in another embodiment of the present invention, the content of the compound is 1% to 20% by mass. For example, in still another embodiment of the present invention, the content of the compound is 1% to 15% by mass. For example, in still another embodiment of the present invention, the content of the compound is 1% to 10% by mass. For example, in still another embodiment of the present invention, the content of the compound is 1% to 7% by mass. For example, in still another embodiment of the present invention, the content of the compound is 1% to 6% by mass. For example, in still another embodiment of the present invention, the content of the compound is 1% to 5% by mass. For example, instill another embodiment of the present invention, the content of the compound is 1% to 4% by mass. For example, in still another embodiment of the present invention, the content of the compound is 3% to 7% by mass. For example, in still another embodiment of the present invention, the content of the compound is 3% to 6% by mass. In addition, for example, in still another embodiment of the present invention, the content of the compound is 4% to 7% by mass.

In the case where it is required that the viscosity of the liquid crystal composition of the present invention be kept low and the liquid crystal composition have a high response speed, it is preferable that the lower limit value is small and the upper limit value is small. In the case where it is required that Tni of the liquid crystal composition of the present invention be kept high and the liquid crystal composition have good temperature stability, it is preferable that the lower limit value is small and the upper limit value is small. In addition, when it is desired to increase the dielectric anisotropy in order to keep the driving voltage low, it is preferable that the lower limit value is great and the upper limit value is great.

Furthermore, the compound represented by General Formula (VIII) according to the present invention is preferably the compound represented by General Formula (VIII-1).

[Chem. 209]

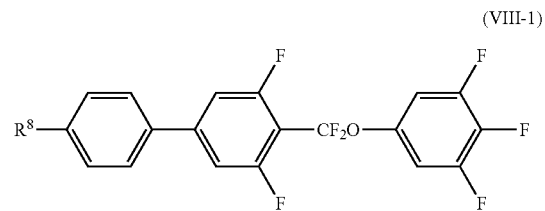

(VIII-1)

(In General Formula (VIII-1), $R^8$ has the same meaning as that in General Formula (VIII).)

The compound represented by General Formula (VIII-1) is, specifically, preferably the compound represented by each of Formulas (26.1) to (26.4), preferably the compound represented by Formula (26.1) or (26.2), and more preferably the compound represented by Formula (26.2).

[Chem. 210]

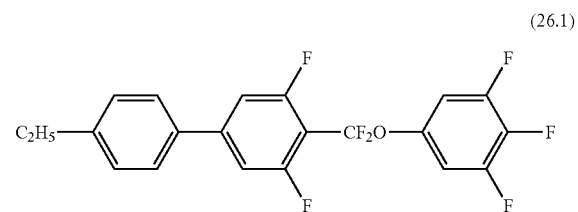

(26.1)

[Chem. 211]

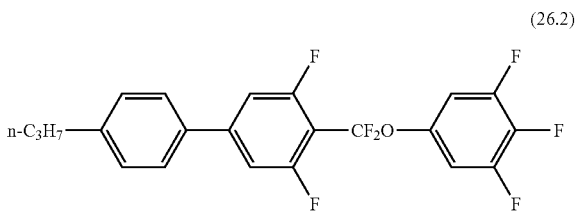

(26.2)

[Chem. 212]

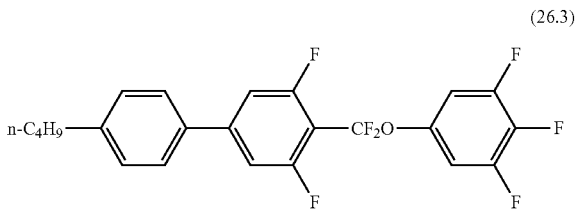

(26.3)

[Chem. 213]

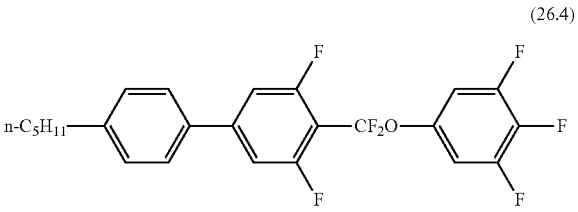

(26.4)

The content of the compound represented by General Formulas (26.1) to (26.4) is preferably 1% by mass to 20% by mass, more preferably 1% by mass to 15% by mass, still more preferably 1% by mass to 10% by mass, and preferably 1% by mass to 7% by mass, with respect to the total mass of the liquid crystal composition of the present invention, in consideration of solubility at a low temperature, a transition temperature, electrical reliability, and birefringence. Within the above ranges, for example, 1% by mass to 6% by mass, 1% by mass to 5% by mass, 3% by mass to 7% by mass, 3% by mass to 6% by mass, or 4% by mass to 7% by mass is preferable.

Furthermore, the compound represented by General Formula (VIII) according to the present invention is preferably the compound represented by General Formula (VIII-2).

[Chem. 214]

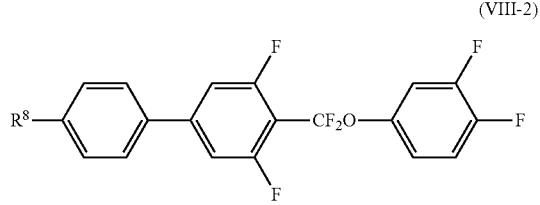

(VIII-2)

(In General Formula (VIII-2), $R^8$ has the same meaning as that in General Formula (VIII).)

The types of compound capable of being combined as General Formula (VIII-2) are not particularly limited, and a compound is suitably combined and used depending on the desired performance such as solubility at a low temperature, a transition temperature, electrical reliability, or birefringence. The type of compound used is, for example, one type in one embodiment of the present invention. In another embodiment of the present invention, two types are used. In addition, in still another embodiment of the present invention, three or more types are used.

The content of the compound represented by General Formula (VIII-2) is preferably 2.5% by mass to 25% by mass, preferably 8% by mass to 25% by mass, preferably 10% by mass to 20% by mass, and preferably 12% by mass to 15% by mass, with respect to the total mass of the liquid crystal composition of the present invention, in consideration of solubility at a low temperature, a transition temperature, electrical reliability, and birefringence.

Furthermore, the compound represented by General Formula (VIII-2), for example, is preferably the compound represented by each of Formulas (27.1) to (27.4), and preferably the compound represented by Formula (27.2).

[Chem. 215]

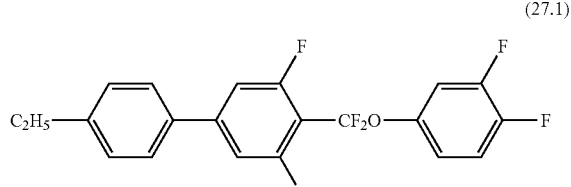

(27.1)

[Chem. 216]

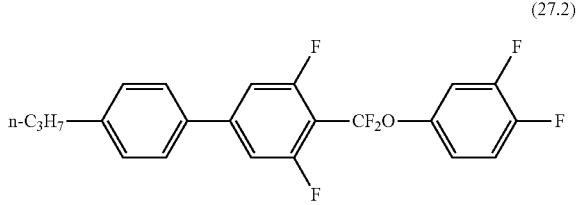

(27.2)

[Chem. 217]

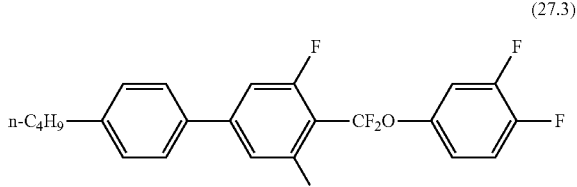

(27.3)

[Chem. 218]

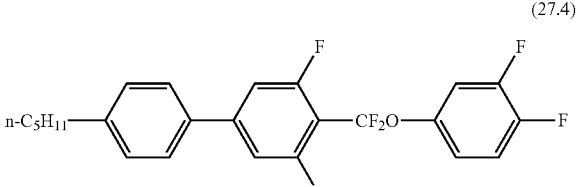

(27.4)

Furthermore, the compound represented by General Formula (M) according to the present invention is, for example, preferably a compound selected from the compound group of the compounds represented by General Formula (IX).

[Chem. 219]

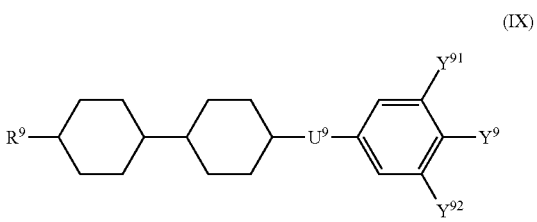

(IX)

(In General Formula (IX), $R^9$ represents an alkyl group having 1 to 5 carbon atoms, an alkenyl group having 2 to 5 carbon atoms, or an alkoxy group having 1 to 4 carbon atoms, $X^{91}$ and $X^{92}$ each independently represents a hydrogen atom or a fluorine atom, $Y^9$ represents a fluorine atom, a chlorine atom, or —$OCF_3$, and $U^9$ represents a single bond, —COO—, or —$CF_2O$—.)

The types of compound capable of being combined are not particularly limited, and a compound is suitably combined and used depending on the desired performance such as solubility at a low temperature, a transition temperature, electrical reliability, or birefringence. The type of compound used is, for example, one type in one embodiment of the present invention. In another embodiment of the present invention, two or more types are used.

The content of the compound represented by General Formula (VIII-3) is preferably 0.5% by mass to 15% by mass, preferably 0.5% by mass to 10% by mass, preferably 0.5% by mass to 5% by mass, and preferably 1% by mass to 5% by mass, with respect to the total mass of the liquid crystal composition of the present invention, in consideration of solubility at a low temperature, a transition temperature, electrical reliability, and birefringence.

In the case where it is required that the viscosity of the liquid crystal composition of the present invention be kept low and the liquid crystal composition have a high response speed, it is preferable that the lower limit value is small and the upper limit value is small. In the case where it is required that Tni of the liquid crystal composition of the present invention be kept high and the liquid crystal composition is less likely to generate burn-in, it is preferable that the lower limit value is small and the upper limit value is small. In addition, when it is desired to increase the dielectric anisotropy in order to keep the driving voltage low, it is preferable that the lower limit value is great and the upper limit value is great.

Furthermore, the compound represented by General Formula (IX) according to the present invention is preferably the compound represented by General Formula (IX-1).

[Chem. 220]

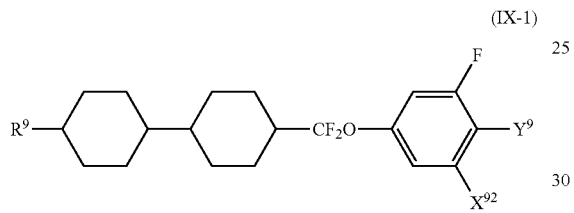

(IX-1)

(In General Formula (IX-1), $R^9$ and $X^{92}$ each has the same meaning as that in General Formula (IX).)

Furthermore, the compound represented by General Formula (IX-1) according to the present invention is preferably the compound represented by General Formula (IX-1-1).

[Chem. 221]

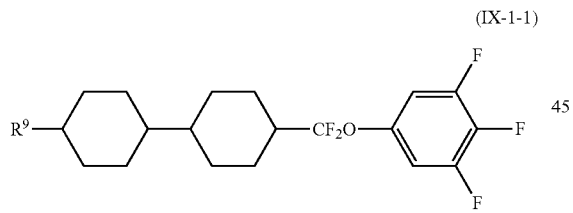

(IX-1-1)

(In General Formula (IX-1-1), $R^9$ has the same meaning as that in General Formula (IX).)

The types of compound capable of being combined are not particularly limited, and a compound is suitably combined and used depending on the desired performance such as solubility at a low temperature, a transition temperature, electrical reliability, or birefringence. The type of compound used is, for example, one type in one embodiment of the present invention. In another embodiment of the present invention, two types are used. In addition, in still another embodiment of the present invention, three or more types are used.

The content of the compound represented by General Formula (IX-1-1) is suitably adjusted depending on an embodiment in consideration of solubility at a low temperature, a transition temperature, electrical reliability, or birefringence.

For example, the content of the compound represented by General Formula (IX-1-1) is 1% to 30% by mass with respect to the total mass of the liquid crystal composition of the present invention in one embodiment of the present invention. For example, in another embodiment of the present invention, the content of the compound is 2% to 25% by mass. For example, in still another embodiment of the present invention, the content of the compound is 3% to 20% by mass. For example, in still another embodiment of the present invention, the content of the compound is 4% to 15% by mass. For example, in still another embodiment of the present invention, the content of the compound is 5% to 10% by mass. For example, in still another embodiment of the present invention, the content of the compound is 7% to 20% by mass.

Furthermore, the compound represented by General Formula (IX-1-1) is preferably the compound represented by each of Formulas (28.1) to (28.5), and preferably the compound represented by Formula (28.3) or/and (28.5).

[Chem. 222]

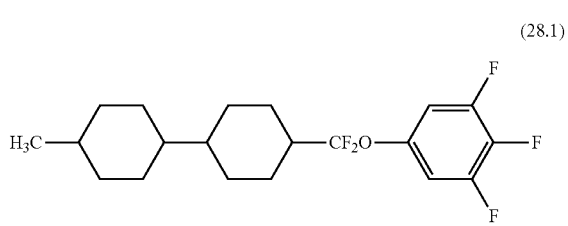

(28.1)

[Chem. 223]

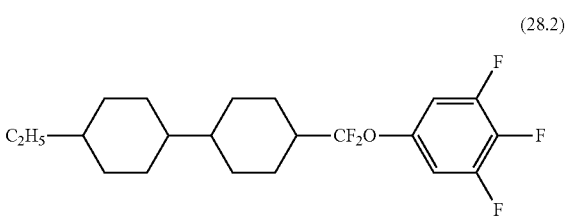

(28.2)

[Chem. 224]

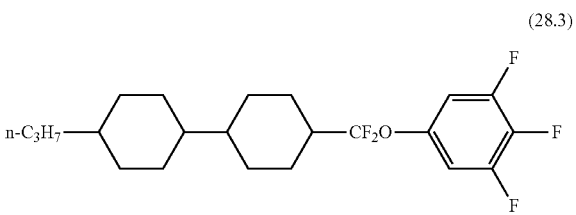

(28.3)

[Chem. 225]

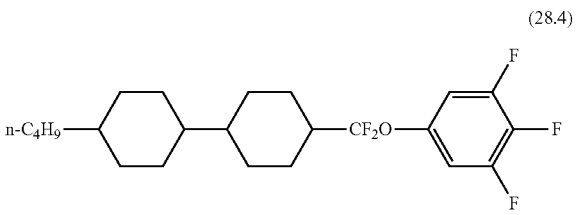

(28.4)

[Chem. 226]

(28.5)

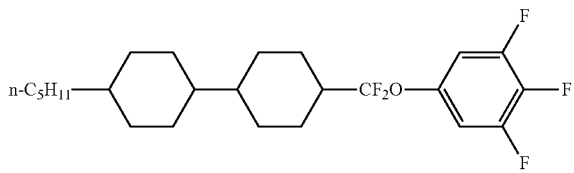

Furthermore, the compound represented by General Formula (IX-1) according to the present invention is preferably the compound represented by General Formula (IX-1-2).

[Chem. 227]

(IX-1-2)

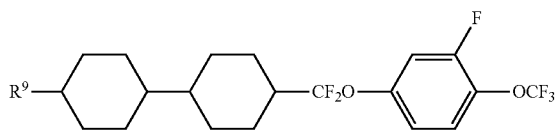

(In General Formula (IX-1-2), $R^9$ has the same meaning as that in General Formula (IX).)

The types of compound capable of being combined are not particularly limited, and in consideration of solubility at a low temperature, a transition temperature, electrical reliability, or birefringence, one to three types are preferably combined, and one to four types are more preferably combined.

The content of the compound represented by General Formula (IX-1-2) is preferably 1% by mass to 30% by mass, preferably 5% by mass to 25% by mass, and preferably 8% by mass to 20% by mass, with respect to the total mass of the liquid crystal composition of the present invention, in consideration of solubility at a low temperature, a transition temperature, and electrical reliability.

Furthermore, the compound represented by General Formula (IX-1-2) is preferably the compound represented by each of Formulas (29.1) to (29.4), and preferably the compound represented by Formula (29.2) or/and (29.4).

[Chem. 228]

(29.1)

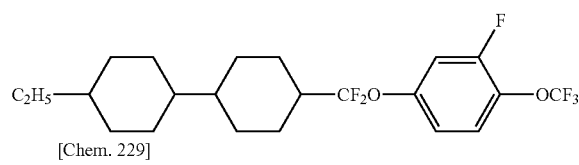

[Chem. 229]

(29.2)

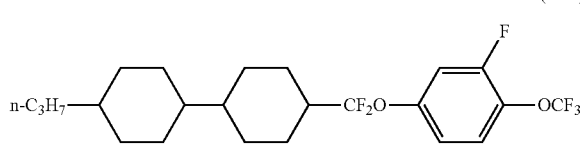

[Chem. 230]

(29.3)

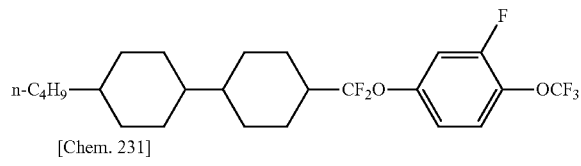

[Chem. 231]

(29.4)

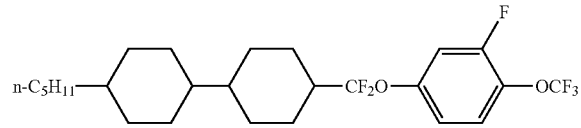

Furthermore, the compound represented by General Formula (IX) is preferably the compound represented by General Formula (IX-2).

[Chem. 232]

(IX-2)

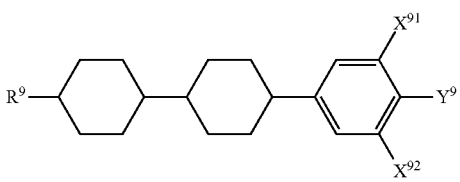

(In General Formula (IX-2), $R^9$, $X^{91}$, and $X^{92}$ each has the same meaning as that in General Formula (IX).)

Furthermore, the compound represented by General Formula (IX-2) according to the present invention is preferably the compound represented by General Formula (IX-2-1).

[Chem. 233]

(IX-2-1)

(In General Formula (IX-2-1), $R^9$ has the same meaning as that in General Formula (IX).)

For example, in one embodiment of the present invention, the content of the compound represented by General Formula (IX-2-1) is 1% to 25% by mass with respect to the total mass of the liquid crystal composition of the present invention. In another embodiment of the present invention, the content of the compound is 1% to 20% by mass. In still another embodiment of the present invention, the content of the compound is 1% to 15% by mass. In still another embodiment of the present invention, the content of the compound is 1% to 10% by mass. In still another embodiment of the present invention, the content of the compound is 1% to 5% by mass. In addition, in still another embodiment of the present invention, the content of the compound is 1% to 4% by mass.

Furthermore, the compound represented by General Formula (IX-2-1) is preferably the compound represented by each of Formulas (30.1) to (30.4), and preferably the compound represented by each of Formulas (30.1) to (30.2).

[Chem. 234]

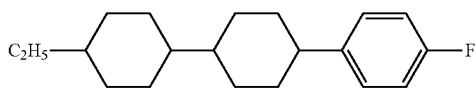
(30.1)

[Chem. 235]

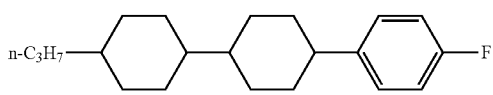
(30.2)

[Chem. 236]

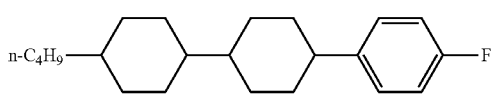
(30.3)

[Chem. 237]

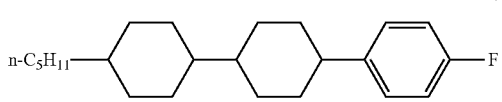
(30.4)

Furthermore, the compound represented by General Formula (IX-2) according to the present invention is preferably the compound represented by General Formula (IX-2-2).

[Chem. 238]

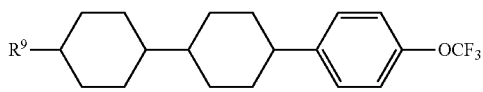
(IX-2-2)

(In General Formula (IX-2-2), $R^9$ has the same meaning as that in General Formula (IX).)

The content of the compound represented by General Formula (IX-2-2) is suitably adjusted with respect to each embodiment in consideration of characteristics such as solubility at a low temperature, a transition temperature, electrical reliability, and birefringence.

The content of the compound represented by General Formula (IX-2-2) is 1% to 30% by mass in one embodiment of the present invention, 1% to 25% by mass in another embodiment, 1% to 20% by mass in still another embodiment, 1% to 17% by mass in still another embodiment, 1% to 16% by mass in still another embodiment, 1% to 12% by mass in still another embodiment, 1% to 11% by mass in still another embodiment, 1% to 10% by mass in still another embodiment, 1% to 9% by mass in still another embodiment, 2% to 17% by mass in still another embodiment, 6% to 17% by mass in still another embodiment, 8% to 17% by mass in still another embodiment, 9% to 17% by mass in still another embodiment, 14% to 17% by mass in still another embodiment, 14% to 16% by mass in still another embodiment, 2% to 9% by mass in still another embodiment, 6% to 10% by mass in still another embodiment, 8% to 11% by mass in still another embodiment, and 9% to 12% by mass in still another embodiment, with respect to the total mass of the liquid crystal composition of the present invention.

Furthermore, the compound represented by General Formula (IX-2-2), for example, is preferably the compound represented by each of Formulas (31.1) to (31.4), and preferably the compound represented by each of Formulas (31.1) to (31.4).

[Chem. 239]

(31.1)

[Chem. 240]

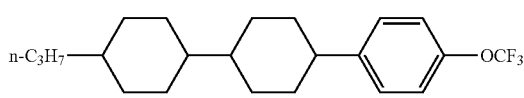
(31.2)

[Chem. 241]

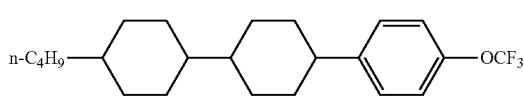
(31.3)

[Chem. 242]

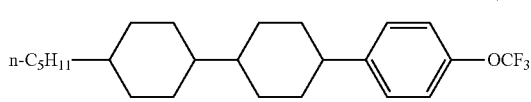
(31.4)

Furthermore, the compound represented by General Formula (IX-2) is preferably the compound represented by General Formula (IX-2-3).

[Chem. 243]

(IX-2-3)

(In General Formula (IX-2-3), $R^9$ has the same meaning as that in General Formula (IX).)

The types of compound capable of being combined are not particularly limited, and in consideration of solubility at a low temperature, a transition temperature, electrical reliability, and birefringence, one type or two types are preferably combined.

The content of the compound represented by General Formula (IX-2-3) is preferably 1% by mass to 30% by mass, more preferably 3% by mass to 20% by mass, still more preferably 6% by mass to 15% by mass, and still more preferably 8% by mass to 10% by mass, with respect to the total mass of the liquid crystal composition of the present invention, in consideration of solubility at a low temperature, a transition temperature, and electrical reliability.

Furthermore, the compound represented by General Formula (IX-2-3) is preferably the compound represented by each of Formulas (32.1) to (32.4), and preferably the compound represented by each of Formulas (32.2) and/or (32.4).

[Chem. 244]

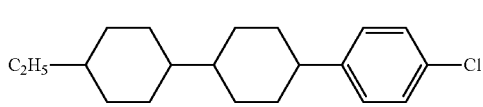
(32.1)

[Chem. 245]

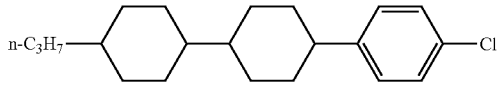
(32.2)

[Chem. 246]

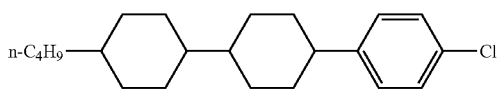
(32.3)

[Chem. 247]

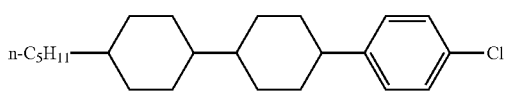
(32.4)

Furthermore, the compound represented by General Formula (IX-2) according to the present invention is preferably the compound represented by General Formula (IX-2-4).

[Chem. 248]

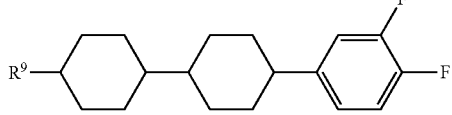
(IX-2-4)

(In General Formula (IX-2-4), $R^9$ has the same meaning as that in General Formula (IX).)

The content of the compound represented by General Formula (IX-2-4) is preferably 1% by mass or greater and 15% by mass or less, preferably 2% by mass or greater and 12% by mass or less, preferably 3% by mass or greater and 11% by mass or less, preferably 4% by mass or greater and 10% by mass or less, preferably 5% by mass or greater and 9% by mass or less, and preferably 5% by mass or greater and 8% by mass or less, with respect to the total mass of the liquid crystal composition of the present invention, in consideration of solubility at a low temperature, a transition temperature, and electrical reliability.

Furthermore, the compound represented by General Formula (IX-2-4) is preferably the compound represented by Formulas (33.1) to (33.8), and more preferably the compound represented by Formulas (33.1), (33.8) and (33.2) to (33.5).

[Chem. 249]

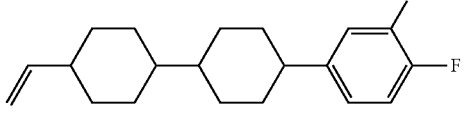
(33.1)

[Chem. 250]

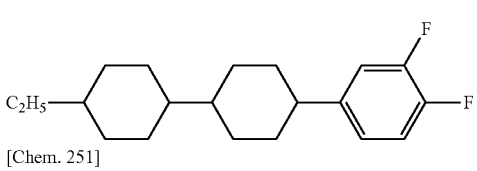
(33.2)

[Chem. 251]

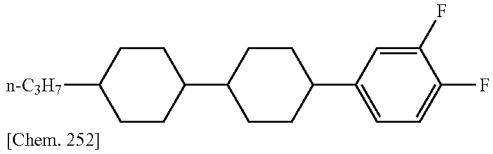
(33.3)

[Chem. 252]

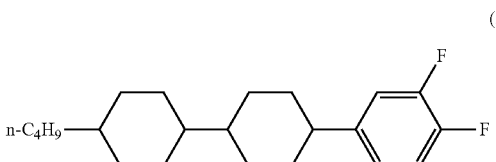
(33.4)

[Chem. 253]

(33.5)

[Chem. 254]

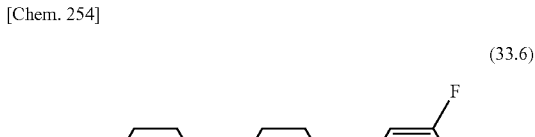
(33.6)

[Chem. 255]

(33.7)

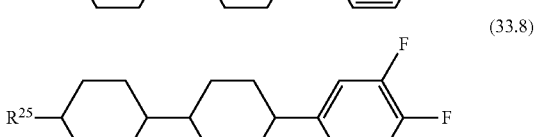
(33.8)

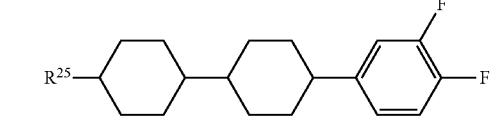

In Formula (33.8), $R^{25}$ is preferably an alkenyl group having 2 to 6 carbon atoms.

Furthermore, the compound represented by General Formula (IX-2) according to the present invention is preferably the compound represented by General Formula (IX-2-5).

[Chem. 256]

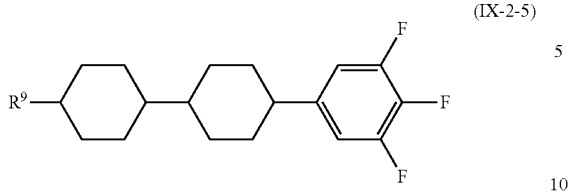

(IX-2-5)

(In General Formula (IX-2-5), $R^9$ has the same meaning as that in General Formula (IX).)

The types of compound capable of being combined are not limited, and in consideration of solubility at a low temperature, a transition temperature, electrical reliability, and birefringence, a compound is suitably combined and used with respect to each embodiment. For example, in one embodiment of the present invention, one type thereof is combined, in another embodiment, two types thereof are combined, in still another embodiment, three types thereof are combined, and in still another embodiment, four or more types thereof are combined.

The content of the compound represented by General Formula (IX-2-5) is suitably adjusted with respect to each embodiment in consideration of characteristics such as solubility at a low temperature, a transition temperature, electrical reliability, and birefringence.

For example, the content of the compound represented by General Formula (IX-2-5) is 0.1% to 30% by mass in one embodiment of the present invention, 0.3% to 25% by mass in another embodiment, 0.5% to 20% by mass in still another embodiment, 1% to 15% by mass in still another embodiment, 2% to 14% by mass in still another embodiment, 2.5% to 15% by mass in still another embodiment, and 3% to 12% by mass in still another embodiment, with respect to the total mass of the liquid crystal composition of the present invention.

In the case where it is required that the viscosity of the liquid crystal composition of the present invention be kept low and the liquid crystal composition have a high response speed, it is preferable that the lower limit value is small and the upper limit value is small. In the case where it is required that Tni of the liquid crystal composition of the present invention be kept high and the liquid crystal composition is less likely to generate burn-in, it is preferable that the lower limit value is small and the upper limit value is small. In addition, when it is desired to increase the dielectric anisotropy in order to keep the driving voltage low, it is preferable that the lower limit value is great and the upper limit value is great.

Furthermore, the compound represented by General Formula (IX-2-5) is preferably the compound represented by each of Formulas (34.1) to (34.5), and preferably the compound represented by each of Formulas (34.1), (34.2), (34.3) and/or (34.5).

[Chem. 257]

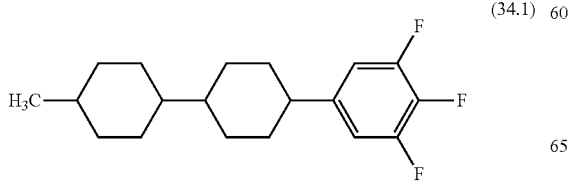

(34.1)

[Chem. 258]

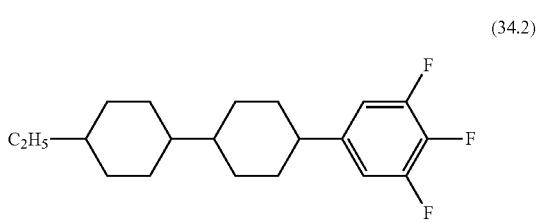

(34.2)

[Chem. 259]

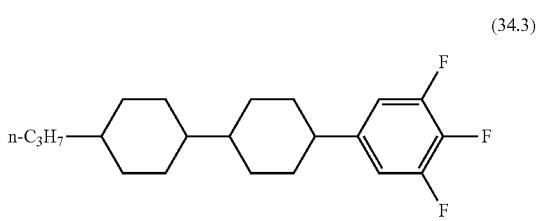

(34.3)

[Chem. 260]

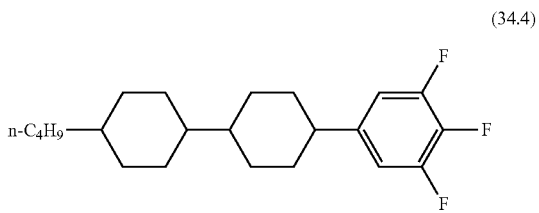

(34.4)

[Chem. 261]

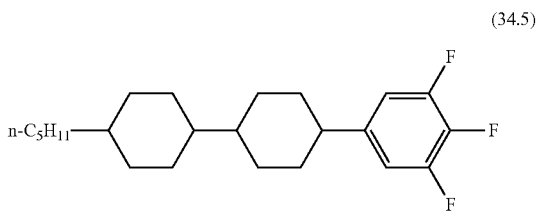

(34.5)

[Chem. 262]

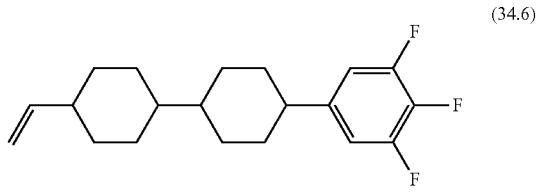

(34.6)

[Chem. 263]

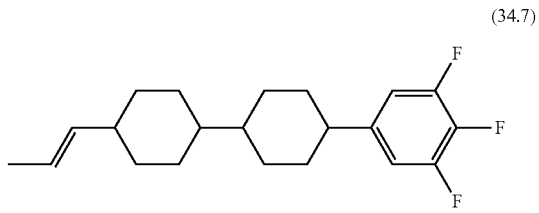

(34.7)

Furthermore, the compound represented by General Formula (IX) according to the present invention is preferably the compound represented by General Formula (IX-3).

[Chem. 264]

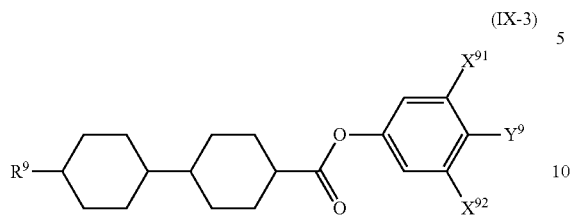

(IX-3)

(In General Formula (IX-3), $R^9$, $X^{91}$, and $X^{92}$ each has the same meaning as that in General Formula (IX).)

Furthermore, the compound represented by General Formula (IX-3) is preferably the compound represented by General Formula (IX-3-1).

[Chem. 265]

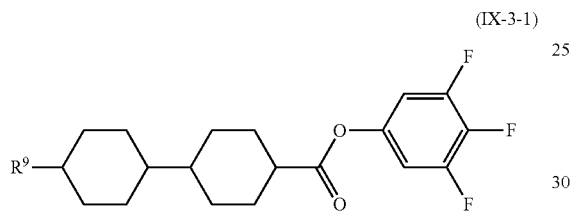

(IX-3-1)

(In General Formula (IX-3-1), $R^9$ has the same meaning as that in General Formula (IX).)

The types of compound capable of being combined are not particularly limited, and in consideration of solubility at a low temperature, a transition temperature, electrical reliability, and birefringence, one type or two types are preferably combined.

The content of the compound represented by General Formula (IX-3-1) is preferably 3% by mass to 30% by mass, preferably 7% by mass to 30% by mass, preferably 13% by mass to 20% by mass, and preferably 15% by mass to 18% by mass, with respect to the total mass of the liquid crystal composition of the present invention, in consideration of solubility at a low temperature, a transition temperature, and electrical reliability.

Furthermore, the compound represented by General Formula (IX-3-1) is preferably the compound represented by each of Formulas (35.1) to (35.4), and preferably the compound represented by each of Formulas (35.1) and/or (35.2).

[Chem. 266]

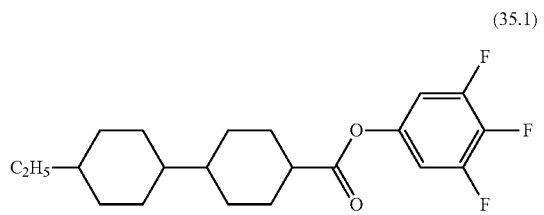

(35.1)

[Chem. 267]

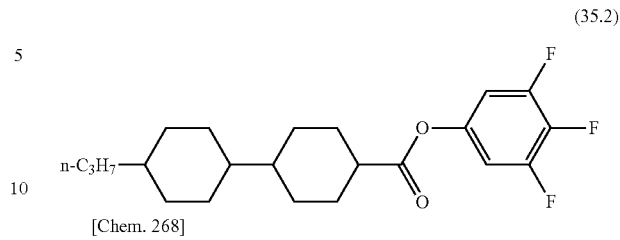

(35.2)

[Chem. 268]

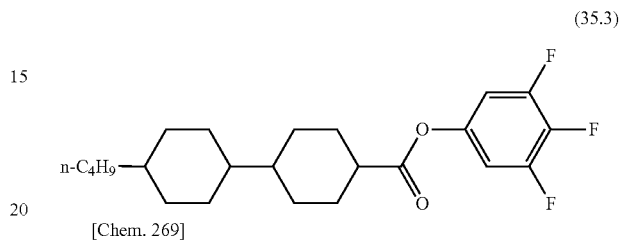

(35.3)

[Chem. 269]

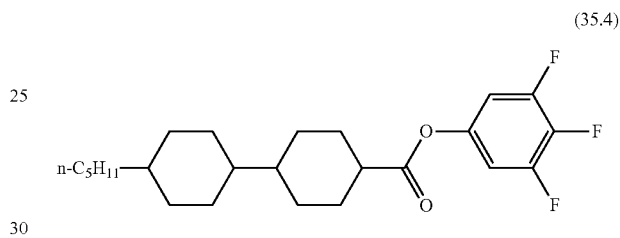

(35.4)

Furthermore, the compound represented by General Formula (M) according to the present invention is preferably a compound selected from the compound group of the compounds represented by General Formula (XIII).

[Chem. 270]

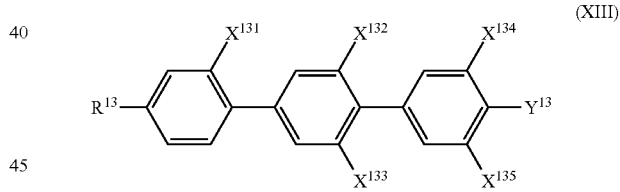

(XIII)

(In General Formula (XIII), $X^{131}$ to $X^{135}$ each independently represents a fluorine atom or a hydrogen atom, $R^{13}$ represents an alkyl group having 1 to 5 carbon atoms, an alkenyl group having 2 to 5 carbon atoms, or an alkoxy group having 1 to 4 carbon atoms, and $Y^{13}$ represents a fluorine atom or —$OCF_3$.)

The types of compounds capable of being combined are not particularly limited, and one type or two types of these compounds are preferably contained, one type to three types are more preferably contained, and one type to four types are still more preferably contained.

The content of the compound represented by General Formula (XIII) has the upper limit value and the lower limit value in each embodiment in consideration of characteristics such as solubility at a low temperature, a transition temperature, electrical reliability, and birefringence. For example, the lower limit value of the content is 2% in one embodiment of the present invention, 4% in another embodiment, 5% in still another embodiment, 7% in still another embodiment, 9% in still another embodiment, 11% in still another embodiment, and 13% in still another embodiment, with respect to the total amount of liquid crystal composition of the present invention. In addition, the lower limit value is 14% in still another embodiment. In addition, the lower limit value is 16% in still another embodiment. In addition, the lower limit value is 20% in still another embodiment.

In addition, for example, the upper limit value of the content is 30% in one embodiment of the present invention, 25% in another embodiment, 20% in still another embodiment, 15% by mass in still another embodiment, 10% in still another embodiment, and 5% in still another embodiment.

In the case where the liquid crystal composition of the present invention is used in a liquid crystal display element having a small cell gap, it is suitable that the content of the compound represented by General Formula (XIII) is great. In the case where the liquid crystal composition of the present invention is used in a liquid crystal display element having a low driving voltage, it is suitable that the content of the compound represented by General Formula (XIII) is great. In the case where the liquid crystal composition of the present invention is used in a liquid crystal display element which is used in a low temperature environment, it is suitable that the content of the compound represented by General Formula (XIII) is small. In the case where the liquid crystal composition of the present invention is used in a liquid crystal display element having a high response speed, it is suitable that the content of the compound represented by General Formula (XIII) is small.

Furthermore, the compound represented by General Formula (XIII) according to the present invention is preferably the compound represented by General Formula (XIII-1).

[Chem. 271]

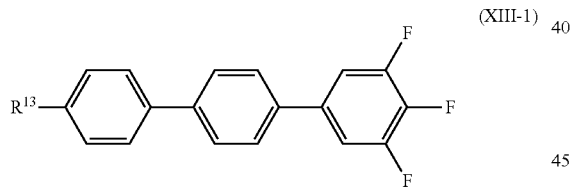

(XIII-1)

(In General Formula (XIII-1), R$^{13}$ represents an alkyl group having 1 to 5 carbon atoms, an alkenyl group having 2 to 5 carbon atoms, or an alkoxy group having 1 to 4 carbon atoms.)

The compound represented by General Formula (XIII-1) is preferably contained in 1% by mass or greater, more preferably contained in 3% by mass or greater, still more preferably contained in 5% by mass or greater, and particularly preferably contained in 10% by mass or greater, with respect to the total amount of the liquid crystal composition of the present invention. In addition, the maximum content ratio is preferably 25% by mass or less, more preferably 20% by mass or less, and still more preferably 15% by mass or less.

Furthermore, the compound represented by General Formula (XIII-1) is preferably the compound represented by each of Formulas (48.1) to (48.4), and preferably the compound represented by Formula (48.2).

[Chem. 272]

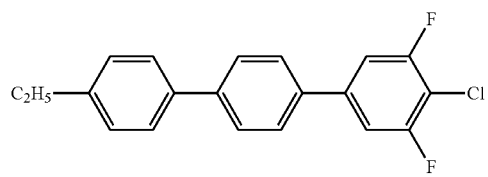

(48.1)

[Chem. 273]

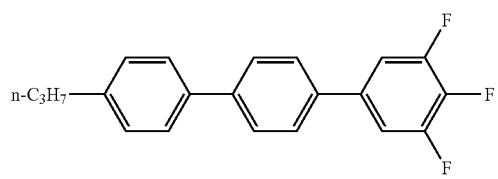

(48.2)

[Chem. 274]

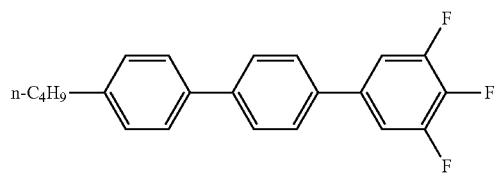

(48.3)

[Chem. 275]

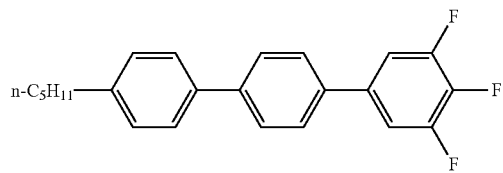

(48.4)

Furthermore, the compound represented by General Formula (XIII) according to the present invention is preferably the compound represented by General Formula (XIII-2).

[Chem. 276]

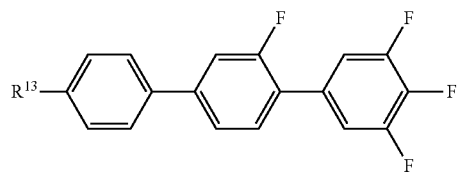

(XIII-2)

(In General Formula (XIII-2), R$^{13}$ represents an alkyl group having 1 to 5 carbon atoms, an alkenyl group having 2 to 5 carbon atoms, or an alkoxy group having 1 to 4 carbon atoms.)

The types of compounds capable of being combined are not particularly limited, and one type or two or more types of these compounds are preferably contained.

The compound represented by General Formula (XIII-2) is preferably contained in 5% by mass or greater, more preferably contained in 6% by mass or greater, still more preferably contained in 8% by mass or greater, and particularly preferably contained in 10% by mass or greater, with respect to the total amount of the liquid crystal composition of the present invention. In addition, the maximum content ratio is preferably 25% by mass or less, more preferably 20% by mass or less, and still more preferably 15% by mass or less.

Furthermore, the compound represented by General Formula (XIII-2) is preferably the compound represented by each of Formulas (49.1) to (49.4), and preferably the compound represented by Formula (49.1) or/and (49.2).

[Chem. 277]

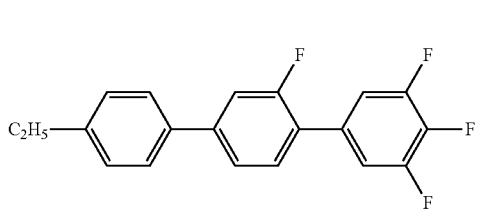
(49.1)

[Chem. 278]

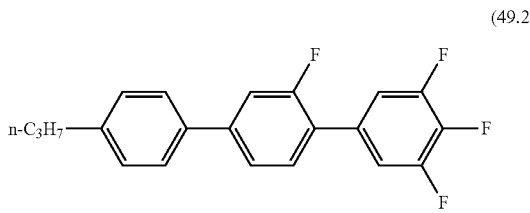
(49.2)

[Chem. 279]

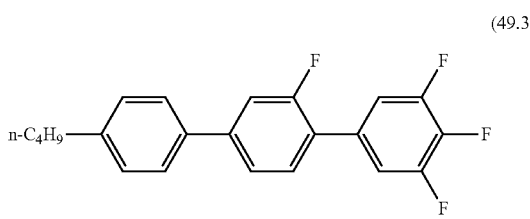
(49.3)

[Chem. 280]

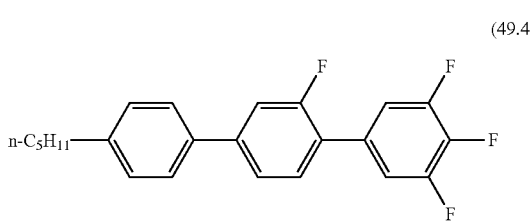
(49.4)

Furthermore, the compound represented by General Formula (XIII) according to the present invention is preferably the compound represented by General Formula (XIII-3).

[Chem. 281]

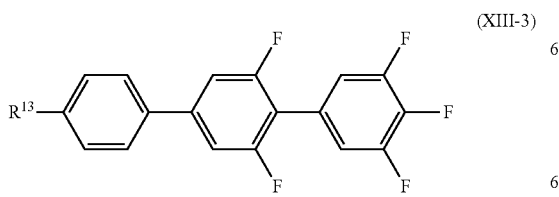
(XIII-3)

(In General Formula (XIII-3), $R^{13}$ represents an alkyl group having 1 to 5 carbon atoms, an alkenyl group having 2 to 5 carbon atoms, or an alkoxy group having 1 to 4 carbon atoms.)

The types of compounds capable of being combined are not particularly limited, and one type or two types of these compounds are preferably contained.

The compound represented by Formula (XIII-3) is preferably contained in 2% by mass or greater, more preferably contained in 4% by mass or greater, still more preferably contained in 9% by mass or greater, and particularly preferably contained in 11% by mass or greater, with respect to the total amount of the liquid crystal composition of the present invention. In addition, the maximum content ratio is preferably 20% by mass or less, more preferably 17% by mass or less, and still more preferably 14% by mass or less.

Furthermore, the compound represented by General Formula (XIII-3) is preferably the compound represented by each of Formulas (50.1) to (50.4), and preferably the compound represented by Formula (50.1) or/and (50.2).

[Chem. 282]

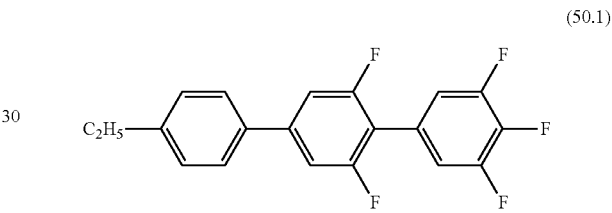
(50.1)

[Chem. 283]

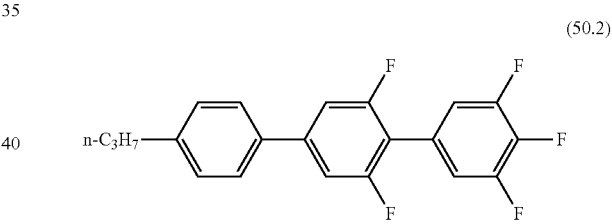
(50.2)

[Chem. 284]

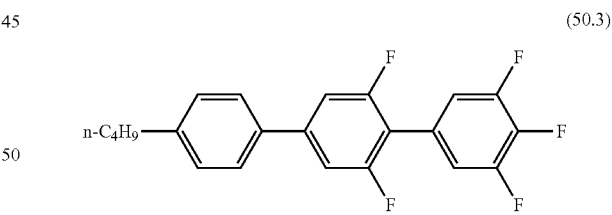
(50.3)

[Chem. 285]

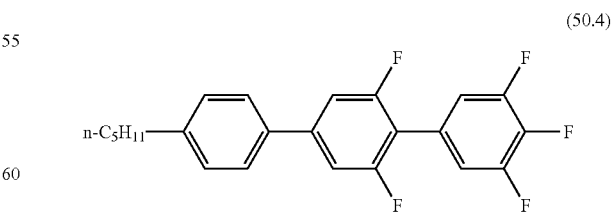
(50.4)

Furthermore, the compound represented by General Formula (M) according to the present invention is preferably a compound selected from the compound group of the compounds represented by General Formula (XIV).

[Chem. 286]

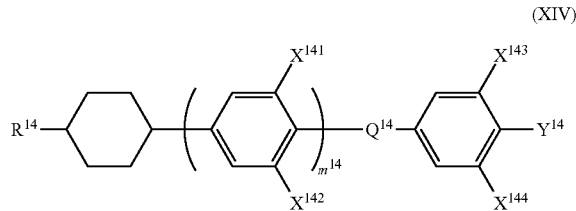
(XIV)

(In General Formula (XIV), $R^{14}$ represents an alkyl group having 1 to 7 carbon atoms, an alkenyl group having 2 to 7 carbon atoms, or an alkoxy group having 1 to 7 carbon atoms, $X^{141}$ to $X^{144}$ each independently represents a fluorine atom or a hydrogen atom, $Y^{14}$ represents a fluorine atom, a chlorine atom, or —$OCF_3$, $Q^{14}$ represents a single bond, —COO—, or —$CF_2O$—, and $m^{14}$ is 0 or 1.)

The types of compound capable of being combined are not limited, and in consideration of solubility at a low temperature, a transition temperature, electrical reliability, or birefringence, a compound is suitably combined with respect to each embodiment. For example, in one embodiment of the present invention, one type is used. In another embodiment of the present invention, two types are used. In still another embodiment of the present invention, three types are used. In still another embodiment of the present invention, four types are used. In still another embodiment of the present invention, five types are used. In addition, in still another embodiment of the present invention, six or more types are used.

The content of the compound represented by General Formula (XIV) has the upper limit value and the lower limit value in each embodiment in consideration of characteristics such as solubility at a low temperature, a transition temperature, electrical reliability, and birefringence. For example, the lower limit value of the content is 3% in one embodiment of the present invention, 7% in another embodiment, 8% in still another embodiment, 11% in still another embodiment, 12% in still another embodiment, 16% in still another embodiment, and 18% in still another embodiment, with respect to the total amount of liquid crystal composition of the present invention. In addition, the lower limit value is 19% instill another embodiment. In addition, the lower limit value is 22% in still another embodiment. In addition, the lower limit value is 25% in still another embodiment.

In addition, for example, the upper limit value of the content is 40% in one embodiment of the present invention, 35% in another embodiment, 30% in still another embodiment, 25% by mass in still another embodiment, 20% in still another embodiment, and 15% in still another embodiment.

In the case where the liquid crystal composition of the present invention is used in a liquid crystal display element having a low driving voltage, it is suitable that the content of the compound represented by General Formula (XIV) is great. In the case where the liquid crystal composition of the present invention is used in a liquid crystal display element having a high response speed, it is suitable that the content of the compound represented by General Formula (XIV) is small.

Furthermore, the compound represented by General Formula (XIV) according to the present invention is preferably the compound represented by General Formula (XIV-1).

[Chem. 287]

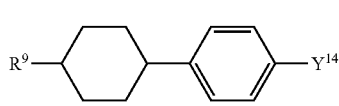
(XIV-1)

(In General Formula (XIV-1), $R^{14}$ represents an alkyl group having 1 to 7 carbon atoms, an alkenyl group having 2 to 7 carbon atoms, or an alkoxy group having 1 to 7 carbon atoms, and $Y^{14}$ represents a fluorine atom, a chlorine atom, or —$OCF_3$.)

The types of compound capable of being combined are not limited, and in consideration of solubility at a low temperature, a transition temperature, electrical reliability, or birefringence, one type to three types are preferably combined.

Furthermore, the compound represented by General Formula (XIV-1) is preferably the compound represented by General Formula (XIV-1-1).

[Chem. 288]

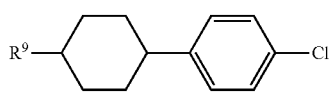
(XIV-1-1)

(In General Formula (XIV-1), $R^{14}$ represents an alkyl group having 1 to 7 carbon atoms, an alkenyl group having 2 to 7 carbon atoms, or an alkoxy group having 1 to 7 carbon atoms.)

The content of the compound represented by General Formula (XIV-1) is preferably 2% by mass or greater, more preferably 4% by mass or greater, still more preferably 7% by mass or greater, still more preferably 10% by mass or greater, and particularly preferably 18% by mass or greater, with respect to the total amount of liquid crystal composition of the present invention. In addition, in consideration of solubility at a low temperature, a transition temperature, and electrical reliability, the maximum ratio is preferably 30% by mass or less, more preferably 27% by mass or less, still more preferably 24% by mass or less, and particularly preferably less than 21% by mass.

Furthermore, the compound represented by General Formula (XIV-1-1), specifically, is preferably the compound represented by each of Formulas (51.1) to (51.4), and more preferably contains the compound represented by Formula (51.1).

[Chem. 289]

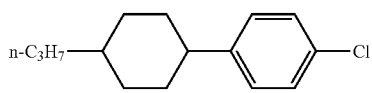
(51.1)

[Chem. 290]

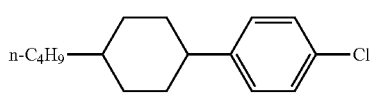
(51.2)

-continued

[Chem. 291]

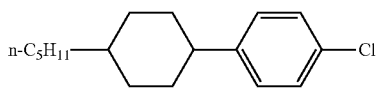

(51.3)

[Chem. 292]

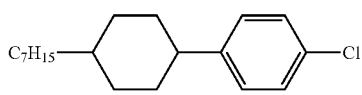

(51.4)

Furthermore, the compound represented by General Formula (XIV-1) is preferably the compound represented by General Formula (XIV-1-2).

[Chem. 293]

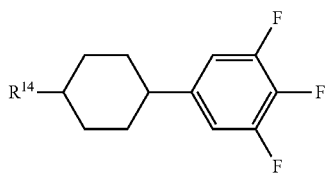

(XIV-1-2)

(In General Formula (XIV-1-2), $R^{14}$ represents an alkyl group having 1 to 7 carbon atoms, an alkenyl group having 2 to 7 carbon atoms, or an alkoxy group having 1 to 7 carbon atoms.)

The content of the compound represented by General Formula (XIV-1-2) is preferably 1% by mass or greater, more preferably 3% by mass or greater, still more preferably 5% by mass or greater, and particularly preferably 7% by mass or greater, with respect to the total amount of liquid crystal composition of the present invention. In addition, in consideration of solubility at a low temperature, a transition temperature, and electrical reliability, the maximum ratio is preferably 15% by mass or less, more preferably 13% by mass or less, still more preferably 11% by mass or less, and particularly preferably less than 9% by mass.

Furthermore, the compound represented by General Formula (XIV-1-2), specifically, is preferably the compound represented by each of Formulas (52.1) to (52.4), and among these, preferably contains the compound represented by Formula (52.4).

[Chem. 294]

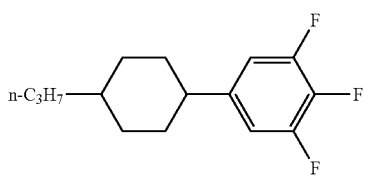

(52.1)

[Chem. 295]

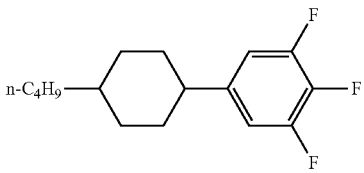

(52.2)

[Chem. 296]

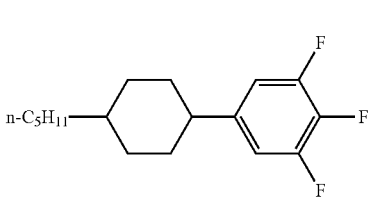

(52.3)

[Chem. 297]

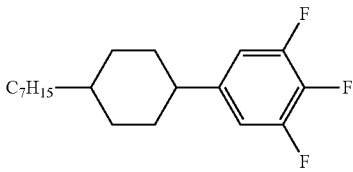

(52.4)

Furthermore, the compound represented by General Formula (XIV) according to the present invention is preferably the compound represented by General Formula (XIV-2).

[Chem. 298]

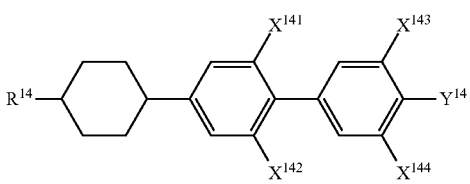

(XIV-2)

(In General Formula (XIV-2), $R^{14}$ represents an alkyl group having 1 to 5 carbon atoms, an alkenyl group having 2 to 5 carbon atoms, or an alkoxy group having 1 to 4 carbon atoms, $X^{141}$ to $X^{144}$ each independently represents a fluorine atom or a hydrogen atom, and $Y^{14}$ represents a fluorine atom, a chlorine atom, or —$OCF_3$.)

The types of compound capable of being combined are not limited, and in consideration of solubility at a low temperature, a transition temperature, electrical reliability, or birefringence, a compound is suitably combined with respect to each embodiment. For example, in one embodiment of the present invention, one type is used. In another embodiment of the present invention, two types are used. In still another embodiment of the present invention, three types are used. In still another embodiment of the present invention, four types are used. In addition, in still another embodiment of the present invention, five or more types are used.

The content of the compound represented by General Formula (XIV-2) has the upper limit value and the lower limit value in each embodiment in consideration of characteristics such as solubility at a low temperature, a transition temperature, electrical reliability, and birefringence. For example, the lower limit value of the content is 0.1% in one embodiment of the present invention, 0.5% in another embodiment, 1% in still another embodiment, 1.2% in still another embodiment, 1.5% in still another embodiment, 2% in still another embodiment, and 2.5% in still another embodiment, with respect to the total amount of liquid crystal composition of the present invention. In addition, the value is 3% instill another embodiment.

In addition, for example, the upper limit value of the content is 20% in one embodiment of the present invention, 18% in another embodiment, 12% in still another embodiment, 10% in still another embodiment, 8% in still another embodiment, and 7% in still another embodiment.

In the case where the liquid crystal composition of the present invention is used in a liquid crystal display element having a low driving voltage, it is suitable that the content of the compound represented by General Formula (XIV-2) is great. In the case where the liquid crystal composition of the present invention is used in a liquid crystal display element having a high response speed, it is suitable that the content of the compound represented by General Formula (XIV-2) is small.

Furthermore, the compound represented by General Formula (XIV-2) according to the present invention is preferably the compound represented by General Formula (XIV-2-1).

[Chem. 299]

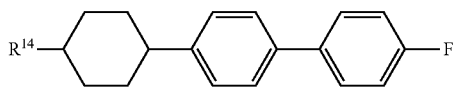

(XIV-2-1)

(In General Formula (XIV-2-1), $R^{14}$ represents an alkyl group having 1 to 5 carbon atoms, an alkenyl group having 2 to 5 carbon atoms, or an alkoxy group having 1 to 4 carbon atoms.)

The content of the compound represented by General Formula (XIV-2-1) is preferably 1% by mass or greater, more preferably 3% by mass or greater, still more preferably 5% by mass or greater, and particularly preferably 7% by mass or greater, with respect to the total amount of liquid crystal composition of the present invention. In addition, in consideration of solubility at a low temperature, a transition temperature, and electrical reliability, the maximum ratio is preferably 15% by mass or less, more preferably 13% by mass or less, still more preferably 11% by mass or less, and particularly preferably less than 9% by mass.

Furthermore, the compound represented by General Formula (XIV-2-1), specifically, is preferably the compound represented by each of Formulas (53.1) to (53.4), and among these, preferably contains the compound represented by Formula (53.4).

[Chem. 300]

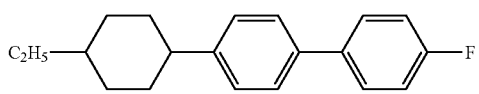

(53.1)

[Chem. 301]

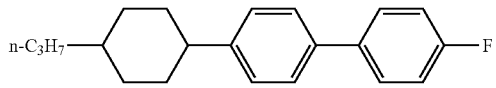

(53.2)

[Chem. 302]

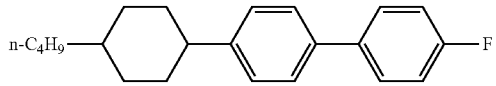

(53.3)

[Chem. 303]

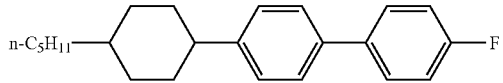

(53.4)

Furthermore, the compound represented by General Formula (XIV-2) is preferably the compound represented by General Formula (XIV-2-2).

[Chem. 304]

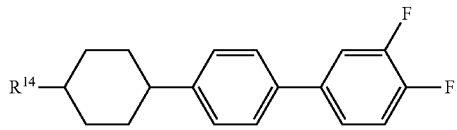

(XIV-2-2)

(In General Formula (XIV-2-2), $R^{14}$ represents an alkyl group having 1 to 5 carbon atoms, an alkenyl group having 2 to 5 carbon atoms, or an alkoxy group having 1 to 4 carbon atoms.)

The content of the compound represented by General Formula (XIV-2-2) is preferably 3% by mass or greater, more preferably 6% by mass or greater, still more preferably 9% by mass or greater, and particularly preferably 12% by mass or greater, with respect to the total amount of liquid crystal composition of the present invention. In addition, in consideration of solubility at a low temperature, a transition temperature, and electrical reliability, the maximum ratio is preferably 20% by mass or less, more preferably 17% by mass or less, still more preferably 15% by mass or less, and particularly preferably 14% by mass or less.

Furthermore, the compound represented by General Formula (XIV-2-2), specifically, is preferably the compound represented by each of Formulas (54.1) to (54.4), and among these, preferably contains the compound represented by each of Formulas (54.2) and/or (54.4).

[Chem. 305]

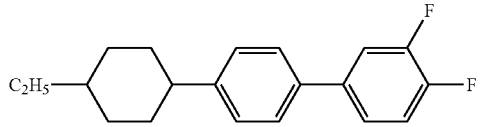

(54.1)

[Chem. 306]

(54.2)

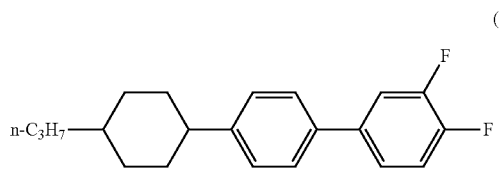

[Chem. 307]

(54.3)

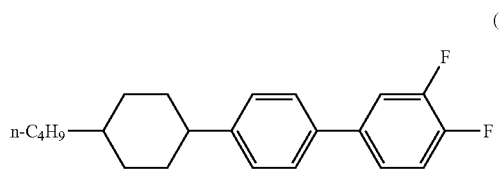

[Chem. 308]

(54.4)

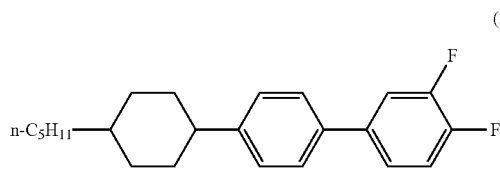

Furthermore, the compound represented by General Formula (XIV-2) is preferably the compound represented by General Formula (XIV-2-3).

[Chem. 309]

(XIV-2-3)

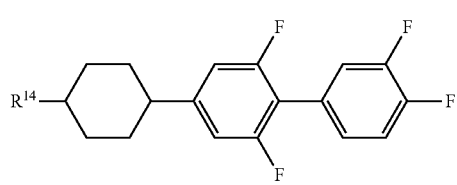

(In General Formula (XIV-2-3), $R^{14}$ represents an alkyl group having 1 to 5 carbon atoms, an alkenyl group having 2 to 5 carbon atoms, or an alkoxy group having 1 to 4 carbon atoms.)

The content of the compound represented by General Formula (XIV-2-3) is preferably 5% by mass or greater, more preferably 9% by mass or greater, and particularly preferably 12% by mass or greater, with respect to the total amount of liquid crystal composition of the present invention. In addition, in consideration of solubility at a low temperature, a transition temperature, and electrical reliability, the maximum ratio is preferably 30% by mass or less, more preferably less than 27% by mass, still more preferably 24% by mass or less, and particularly preferably less than 20% by mass.

Furthermore, the compound represented by General Formula (XIV-2-3), specifically, is preferably the compound represented by each of Formulas (55.1) to (55.4), and among these, preferably contains the compound represented by each of Formulas (55.2) and/or (55.4).

[Chem. 310]

(55.1)

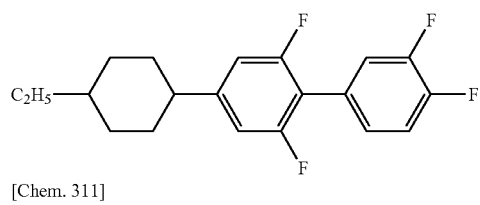

[Chem. 311]

(55.2)

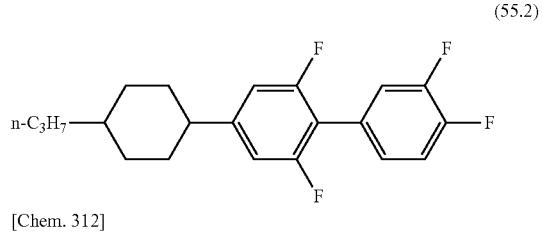

[Chem. 312]

(55.3)

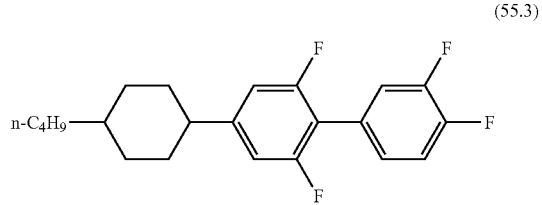

[Chem. 313]

(55.4)

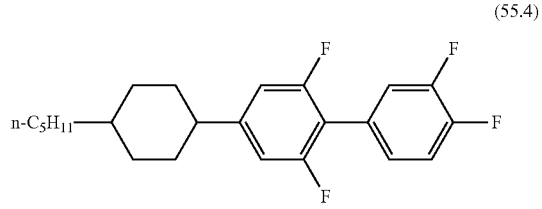

Furthermore, the compound represented by General Formula (XIV-2) is preferably the compound represented by General Formula (XIV-2-4).

[Chem. 314]

(XIV-2-4)

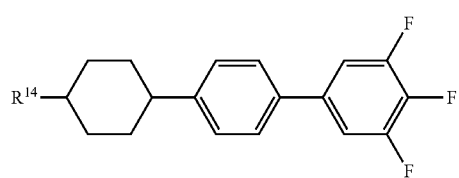

(In General Formula (XIV-2-4), $R^{14}$ represents an alkyl group having 1 to 5 carbon atoms, an alkenyl group having 2 to 5 carbon atoms, or an alkoxy group having 1 to 4 carbon atoms.)

The types of compound capable of being combined are not limited, and in consideration of solubility at a low temperature, a transition temperature, electrical reliability, or birefringence, a compound is suitably combined with respect to each embodiment. For example, in one embodiment of the present invention, one type is used. In another embodiment of the present invention, two types are used. In addition, in still another embodiment of the present invention, three or more types are used.

The content of the compound represented by General Formula (XIV-2-4) has the upper limit value and the lower limit value in each embodiment in consideration of characteristics such as solubility at a low temperature, a transition temperature, electrical reliability, and birefringence. For example, the lower limit value of the content is 0.1% in one embodiment of the present invention, 0.5% in another embodiment, 0.7% in still another embodiment, 1% in still another embodiment, 1.2% in still another embodiment, 1.8% in still another embodiment, and 2% in still another embodiment, with respect to the total amount of liquid crystal composition of the present invention. In addition, the value is 2.5% in still another embodiment. In addition, the value is 3% in still another embodiment.

In addition, for example, the upper limit value of the content is 15% in one embodiment of the present invention, 12% in another embodiment, 11% in still another embodiment, 10% in still another embodiment, 8% in still another embodiment, and 6% in still another embodiment.

In the case where the liquid crystal composition of the present invention is used in a liquid crystal display element having a low driving voltage, it is suitable that the content of the compound represented by General Formula (XIV-2-4) is great. In the case where the liquid crystal composition of the present invention is used in a liquid crystal display element having a high response speed, it is suitable that the content of the compound represented by General Formula (XIV-2-4) is small.

Furthermore, the compound represented by General Formula (XIV-2-4), specifically, is preferably the compound represented by each of Formulas (56.1) to (56.4), and among these, preferably contains the compound represented by each of Formulas (56.1), (56.2), and (56.4).

[Chem. 315]

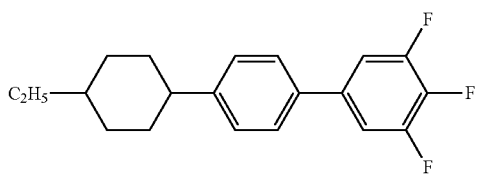

(56.1)

[Chem. 316]

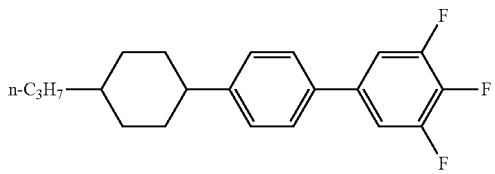

(56.2)

[Chem. 317]

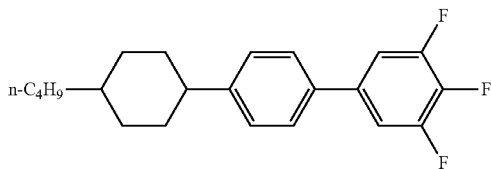

(56.3)

[Chem. 318]

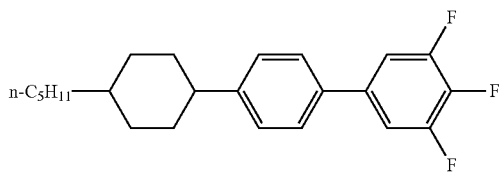

(56.4)

Furthermore, the compound represented by General Formula (XIV-2) is preferably the compound represented by General Formula (XIV-2-5).

[Chem. 319]

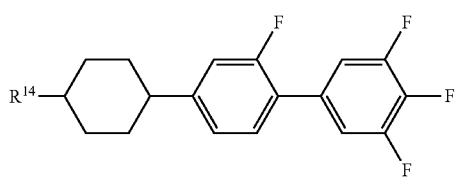

(XIV-2-5)

(In General Formula (XIV-2-5), $R^{14}$ represents an alkyl group having 1 to 5 carbon atoms, an alkenyl group having 2 to 5 carbon atoms, or an alkoxy group having 1 to 4 carbon atoms.)

The content of the compound represented by General Formula (XIV-2-5) is preferably 5% by mass or greater, more preferably 10% by mass or greater, and particularly preferably 13% by mass or greater, with respect to the total amount of liquid crystal composition of the present invention. In addition, in consideration of solubility at a low temperature, a transition temperature, and electrical reliability, the maximum ratio is preferably 25% by mass or less, more preferably less than 22% by mass, still more preferably 18% by mass or less, and particularly preferably less than 15% by mass.

Furthermore, the compound represented by General Formula (XIV-2-5) is, specifically, the compound represented by each of Formulas (57.1) to (57.4), and preferably contains the compound represented by Formula (57.1).

[Chem. 320]

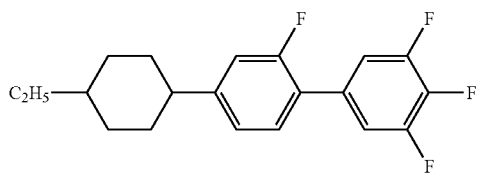

(57.1)

-continued

[Chem. 321]

(57.2)

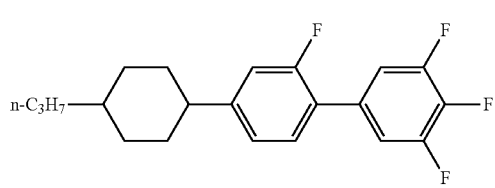

[Chem. 322]

(57.3)

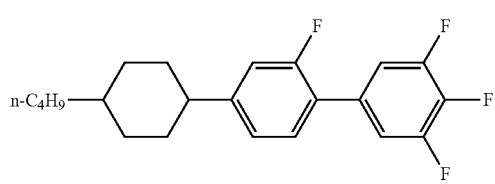

[Chem. 323]

(57.4)

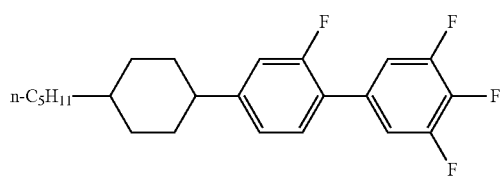

Furthermore, the compound represented by General Formula (XIV-2) is preferably the compound represented by General Formula (XIV-2-6).

[Chem. 324]

(XIV-2-6)

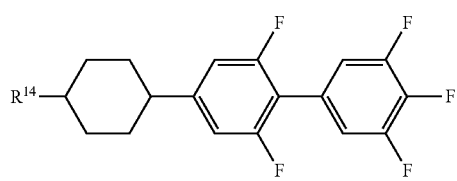

(In the formula, $R^{14}$ represents an alkyl group having 1 to 5 carbon atoms, an alkenyl group having 2 to 5 carbon atoms, or an alkoxy group having 1 to 4 carbon atoms.)

The content of the compound represented by General Formula (XIV-2-6) is preferably 5% by mass or greater, more preferably 10% by mass or greater, and particularly preferably 15% by mass or greater, with respect to the total amount of liquid crystal composition of the present invention. In addition, in consideration of solubility at a low temperature, a transition temperature, and electrical reliability, the maximum ratio is preferably 25% by mass or less, more preferably 22% by mass or less, still more preferably 20% by mass or less, and particularly preferably less than 17% by mass.

Furthermore, the compound represented by General Formula (XIV-2-6), specifically, is preferably the compound represented by each of Formulas (58.1) to (58.4), and among these, preferably contains the compound represented by Formula (58.2).

[Chem. 325]

(58.1)

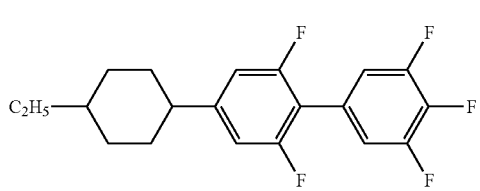

[Chem. 326]

(58.2)

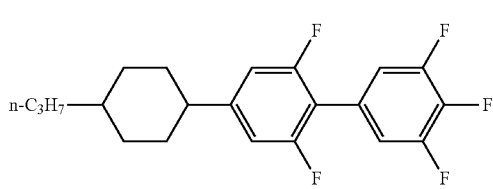

[Chem. 327]

(58.3)

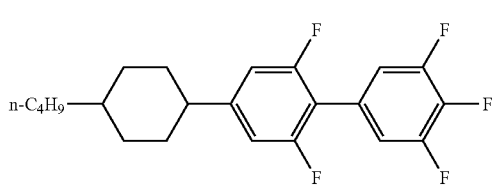

[Chem. 328]

(58.4)

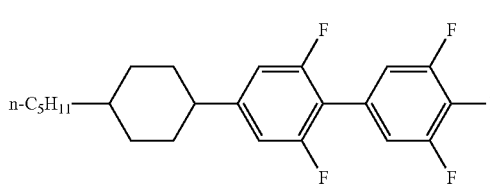

The compound used in the present invention does not have a peracid (—CO—OO—) structure in the molecule. In the case where the reliability or the long-term stability of the liquid crystal composition matters, it is preferable not to use a compound having a carbonyl group. In addition, in the case where the stability with respect to UV irradiation matters, it is desirable not to use a compound in which a chlorine atom has been substituted. The compound used in the present invention is also preferably only compound in which all the ring structures in the molecule are six-membered rings.

The compound represented by General Formula (M) according to the present invention is preferably a compound represented by General Formula (M-1).

[Chem. 329]

(M-1)

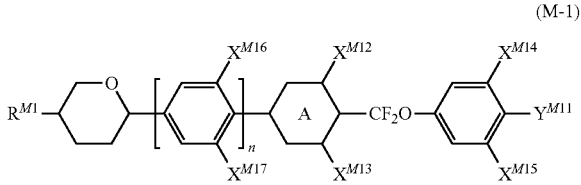

(In General Formula (M-1), $X^{M12}$, $X^{M13}$, $X^{M14}$, $X^{M15}$, $X^{M16}$ and $X^{M17}$ each independently represents a hydrogen atom or a fluorine atom, ring A each independently represents a group selected from the group consisting of (a) a 1,4-cyclohexylene group (one —CH$_2$— or at least two non-adjacent —CH$_2$—'s present in the group may be substituted with —O—), and (b) a 1,4-phenylene group (one —CH═ or at least two non-adjacent —CH═'s present in the group may be substituted with —N═), the above groups (a) and (b) each may be independently substituted with a cyano group, a fluorine atom, or a chlorine atom, $R^{M1}$ represents an alkyl group having 1 to 10 carbon atoms, an alkenyl group having 2 to 10 carbon atoms or an alkoxy group having 1 to 10 carbon atoms, $Y^{M11}$ represents an alkyl group having 1 to 10 carbon atoms, an alkenyl group having 2 to 10 carbon atoms, an alkoxy group having 1 to 10 carbon atoms, a hydrogen atom, a fluorine atom, a cyano group, —CF$_3$ or —OCF$_3$, and n represents an integer of 0 to 2)

As a preferable example of the compound represented by General Formula (M-1) according to the present invention, at least one type selected from the group consisting of the following General Formulas (m.1) to (m.28) is preferable.

[Chem. 330]

(m.15)
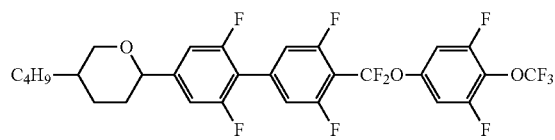

(m.16)
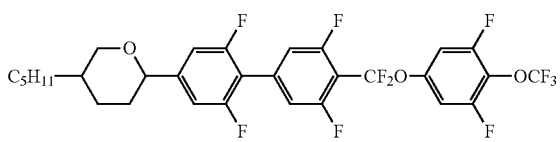

[Chem. 332]

(m.17)
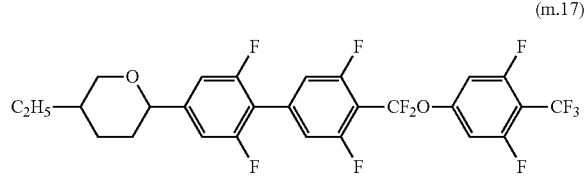

(m.18)
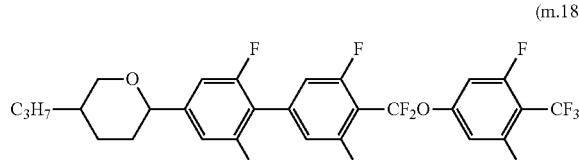

(m.19)
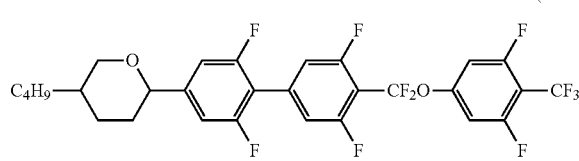

(m.20)
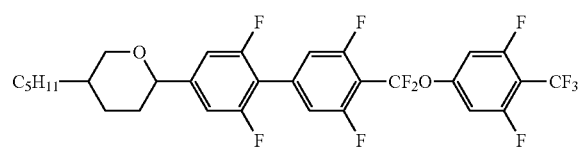

[Chem. 333]

(m.21)
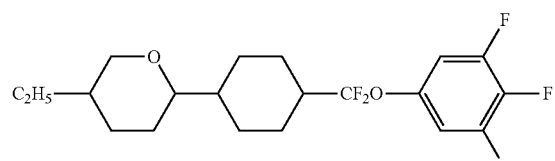

(m.22)
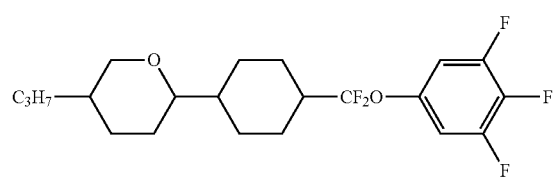

(m.23)
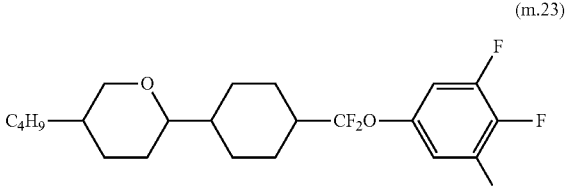

(m.24)
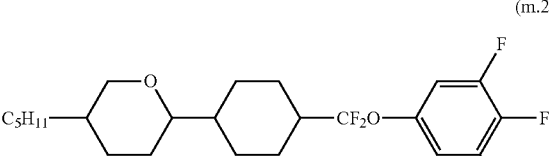

(m.25)
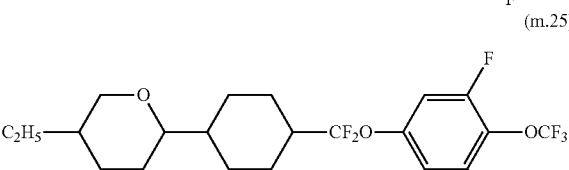

(m.26)
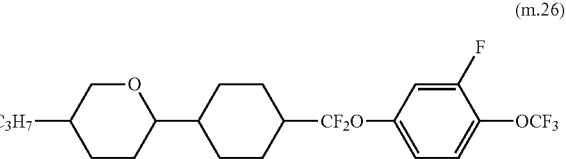

(m.27)
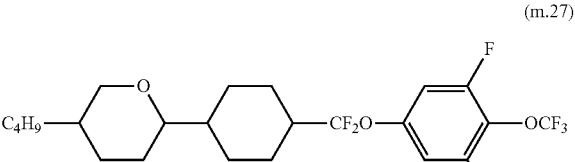

(m.28)
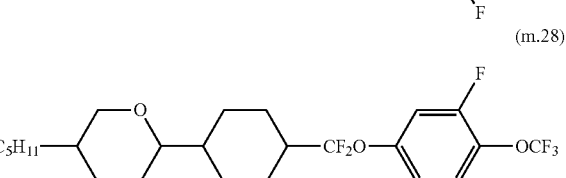

The content of the compound represented by General Formula (M-1) has the upper limit value and the lower limit value in each embodiment in consideration of characteristics such as solubility at a low temperature, a transition temperature, electrical reliability, and birefringence. For example, the lower limit value of the content is 0.1% in one embodiment of the present invention, 0.5% in another embodiment, 1% in still another embodiment, 1.2% in still another embodiment, 1.5% in still another embodiment, 2% in still another embodiment, and 2.5% in still another embodiment, with respect to the total amount of liquid crystal composition of the present invention. In addition, the value is 3% instill another embodiment.

In addition, for example, the upper limit value of the content is 20% in one embodiment of the present invention, 18% in another embodiment, 12% in still another embodiment, 10% by mass in still another embodiment, 9% in still another embodiment, and 8% in still another embodiment.

The liquid crystal composition according to the present invention may contain a compound selected from the compound group of the compounds represented by General Formula (K), as the polar component A.

[Chem. 334]

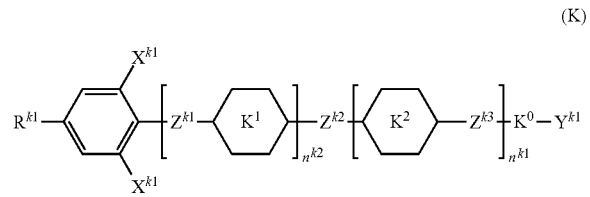

(K)

(in General Formula (K), $R^{K1}$ represents an alkyl group having 1 to 10 carbon atoms or an alkenyl group having 2 to 10 carbon atoms, one —$CH_2$— or at least two non-adjacent —$CH_2$—'s present in the group may be substituted with —C≡C—, —O—, —CO—, —COO—, or —OCO—, and one or more hydrogen atoms in the group may be independently substituted with a fluorine atom, ring $K^1$ and ring $K^2$ each independently represents a 1,4-cyclohexylene group (one —$CH_2$— or at least two non-adjacent —$CH_2$—'s present in the group may be independently substituted with —O— or —S—) or a 1,4-phenylene group (one —CH= or at least two non-adjacent —CH='s present in the group may be substituted with —N=), and at least one hydrogen atom in the group may be independently substituted with a cyano group, a fluorine atom, or a chlorine atom, $K^0$ represents a naphthalene-2,6-diyl group or a 1,4-phenylene group, and at least one hydrogen atom in the group may be independently substituted with a fluorine atom, $Z^{k1}$, $Z^{k2}$ and $Z^{k3}$ each independently represents a single bond, —$CH_2CH_2$—, —$(CH_2)_4$—, —$OCH_2$—, —$CH_2O$—, —$OCF_2$—, —$CF_2O$—, —$CH_2CH_2CF_2O$—, —COO—, —OCO— or —C≡C—, $n^{k1}$ and $n^{k2}$ each independently represents 0, 1, 2, 3 or 4, but when $n^{k1}$ and $n^{k2}$ are 2 or more, ring $K^2$ and ring $K^2$ may be the same or different, and $Z^{k1}$ and $Z^{k3}$ may be the same or different, $X^{k1}$ and $X^{k2}$ each independently represents a hydrogen atom, a chlorine atom or a fluorine atom, $Y^{k1}$ independently represents a chlorine atom, a fluorine atom, a cyano group, a trifluoromethyl group, a fluoromethoxy group, a difluoromethoxy group, a trifluoromethoxy group or a 2,2,2-trifluoroethyl group, but represents a fluorine atom, a trifluoromethyl group, a fluoromethoxy group, a difluoromethoxy group or a trifluoromethoxy group)

The compound represented by General Formula (K) according to the present invention is preferably at least one type selected from the group consisting of a compound represented by the following General Formulas (K1) to (K3).

[Chem. 335]

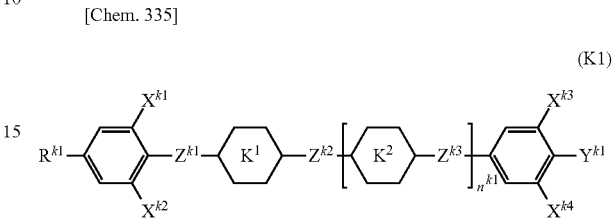

(K1)

(In General Formula (K1), $R^{k1}$, ring $K^1$, ring $k^2$, $n^{k1}$, $X^{k1}$, $X^{k2}$, $Y^{k1}$, $Z^{k1}$, $Z^{k2}$, and $Z^{k3}$ are omitted since these are the same as in General Formula (K) described above, and $X^{k3}$ and $X^{k4}$ each independently represents a hydrogen atom, a chlorine atom, and a fluorine atom)

[Chem. 336]

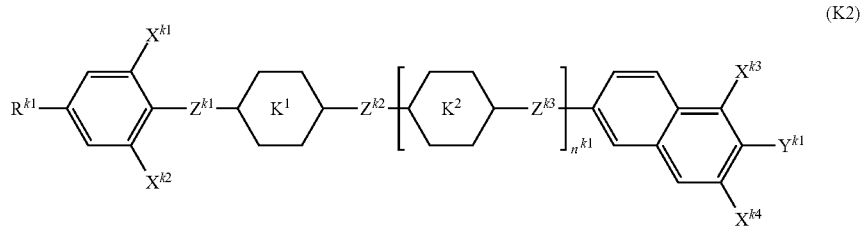

(K2)

(In General Formula (K2), $R^{k1}$, ring $K^1$, ring $k^2$, $n^{k1}$, $X^{k1}$, $X^{k2}$, $X^{k3}$, $X^{k4}$, $Y^{k1}$, $Z^{k1}$, $Z^{k2}$, and $Z^{k3}$ are omitted since these are the same as in General Formula (K1) described above)

[Chem. 337]

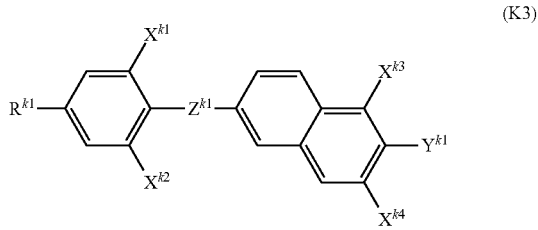

(K3)

(In General Formula (K3), $R^{k1}$, $X^{k1}$, $X^{k2}$, $X^{k3}$, $X^{k4}$, $Y^{k1}$, and $Z^{k1}$ are omitted since these are the same as in General Formula (K) described above)

In the liquid crystal composition according to the present invention, the content of the compound represented by General Formula (K1) is preferably 1% by mass or greater, preferably 3% by mass or greater, more preferably 5% by mass or greater, and still more preferably 10% by mass or greater. Specifically, the content is preferably 3% by mass to 70% by mass, more preferably 5% by mass to 60% by mass, still more preferably 10% by mass to 60% by mass, and still more preferably 10% by mass to 50% by mass.

The content of the compound represented by General Formula (K2) in the liquid crystal composition according to the present invention is preferably 1% by mass or greater, preferably 3% by mass or greater, more preferably 5% by mass or greater, and still more preferably 10% by mass or greater. Specifically, the content is preferably 3% by mass to 70% by mass, more preferably 5% by mass to 60% by mass, still more preferably 10% by mass to 60% by mass, and still more preferably 10% by mass to 50% by mass.

The content of the compound represented by General Formula (K3) in the liquid crystal composition according to the present invention is preferably 1% by mass or greater, preferably 2% by mass or greater, more preferably 3% by mass or greater, and still more preferably 4% by mass or greater. Specifically, the content is preferably 1% by mass to 30% by mass, more preferably 1.5% by mass to 20% by mass, still more preferably 1.8% by mass to 15% by mass, and still more preferably 2.2% by mass to 12% by mass.

In the liquid crystal composition according to the present invention, it is preferable that at least one selected from the group consisting of the compound represented by General Formula (K1), the compound represented by General Formula (K2), and the compound represented by General Formula (K3), is contained.

In the liquid crystal composition according to the present invention, it is preferable that one or more of the compounds represented by General Formula (K1) are contained, and it is more preferable that two to five are contained.

In the liquid crystal composition according to the present invention, it is preferable that one or more of the compounds represented by General Formula (K2) are contained, and it is more preferable that two to five are contained.

In the liquid crystal composition according to the present invention, it is preferable that one or more of the compounds represented by General Formula (K3) are contained, and it is more preferable that two to five are contained.

In the liquid crystal composition according to the present invention, it is preferable that a total of one or two or more of the compounds represented by General Formulas (K1), (K2), and (K3) are contained, it is more preferable that one to ten are contained, it is still more preferable that one to eight are contained, it is still more preferable that two to eight are contained, and it is particularly preferable that two to five are contained.

The compound represented by General Formula (K) according to the present invention is preferably a compound selected from the compound group of the compounds represented by the following General Formulas (K11) to (K28), more preferably a compound selected from the compound group of the compounds represented by General Formulas (K11) to (K17) and General Formulas (K25) to (K28), and particularly preferably a compound selected from the compound group of the compounds represented by General Formulas (K11) to (K17).

[Chem. 338]

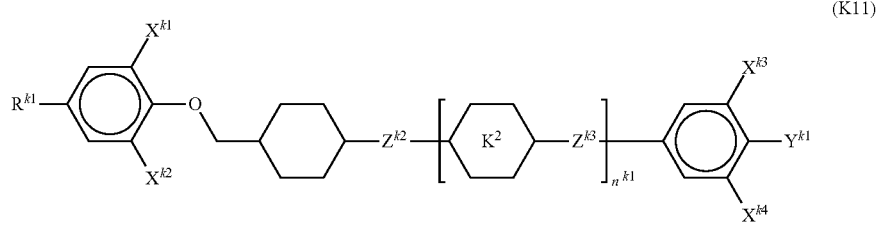

(K11)

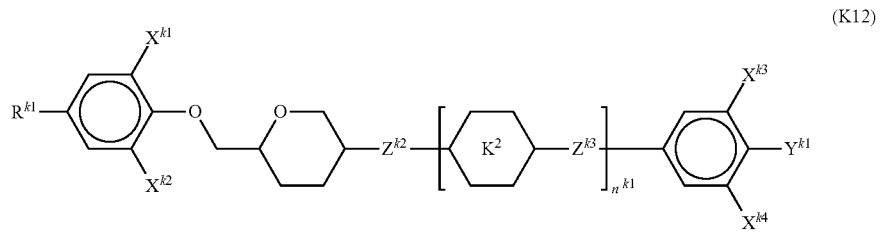

(K12)

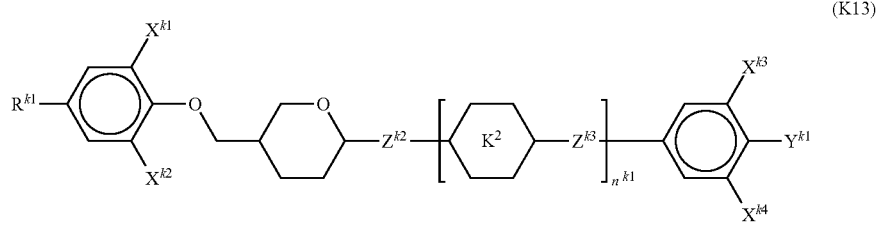

(K13)

-continued
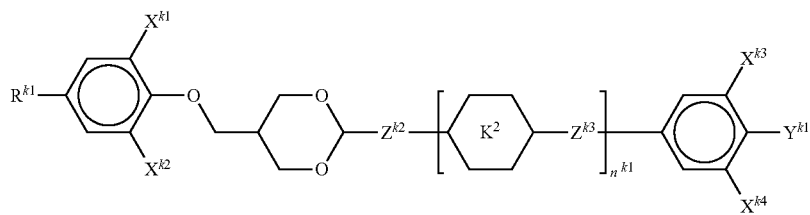
(K14)
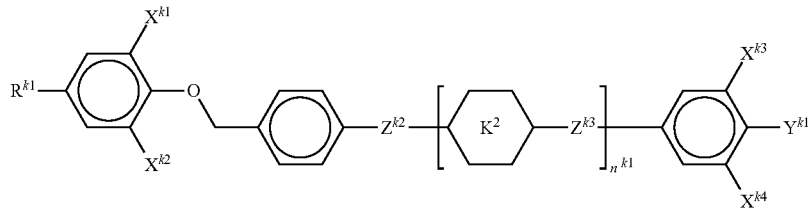
(K15)
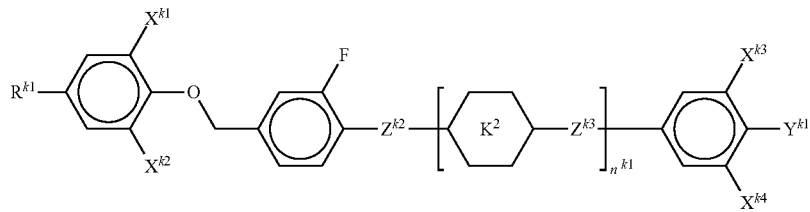
(K16)
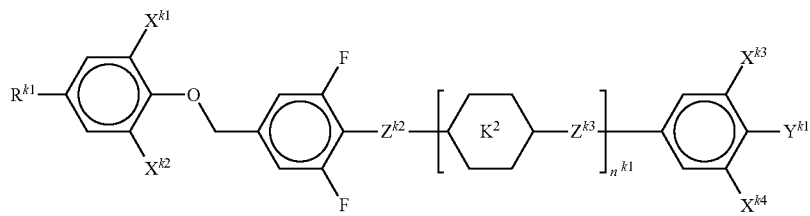
(K17)
[Chem. 339]
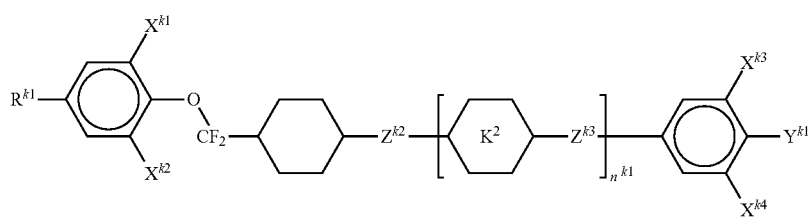
(K18)
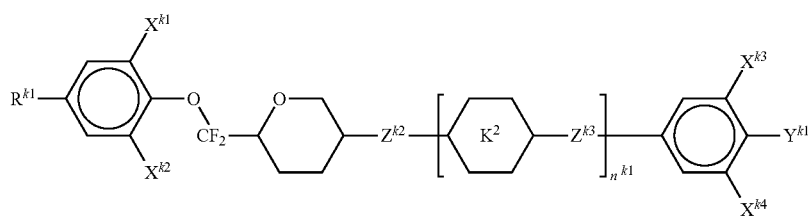
(K19)
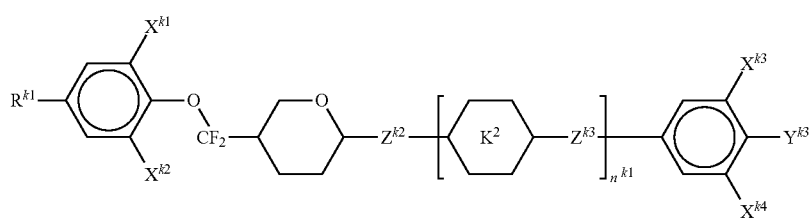
(K20)

-continued

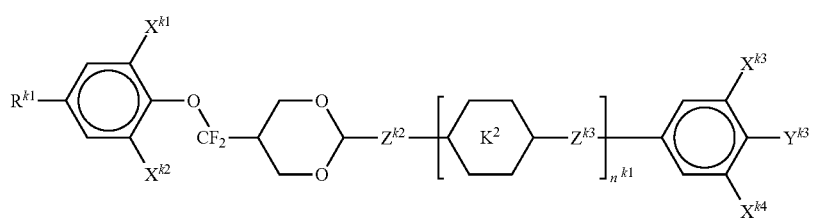
(K21)

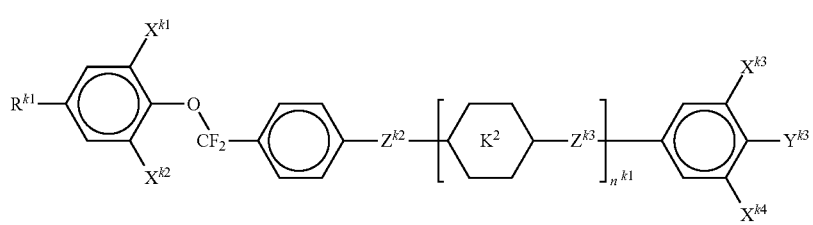
(K22)

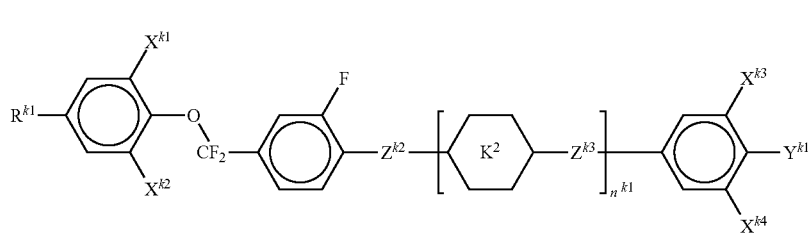
(K23)

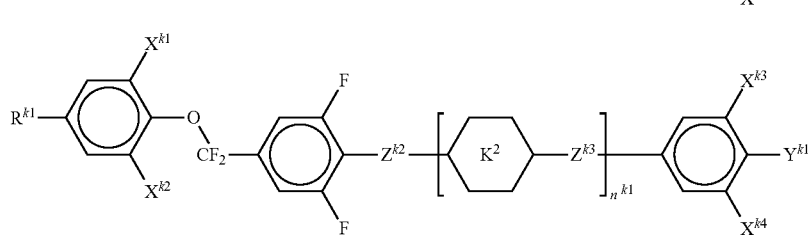
(K24)

(In General Formulas (K11) to (K24), $R^{k1}$, ring $k^2$, $Z^{k2}$, $Z^{k3}$, $n^{k1}$, $X^{k1}$, $X^{k2}$, $X^{k3}$, $X^{k4}$ and $Y^k$ are the same as described above)

[Chem. 340]

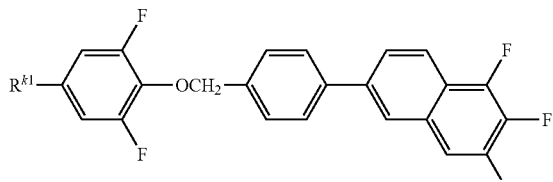
(K25)

[Chem. 341]

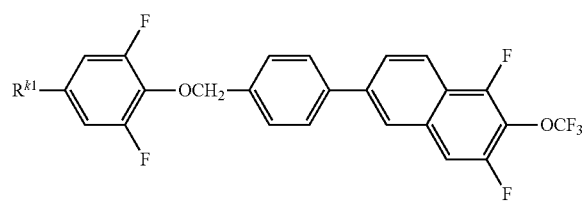
(K26)

[Chem. 342]

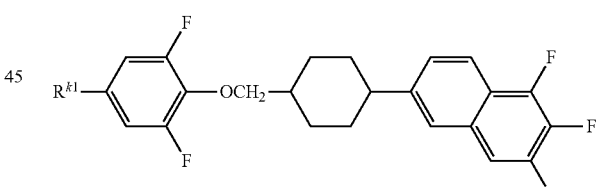
(K27)

[Chem. 343]

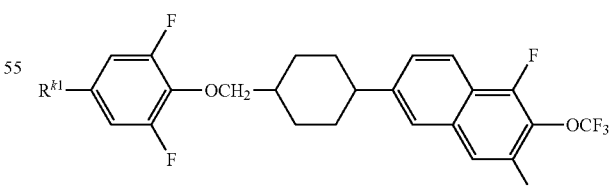
(K28)

In General Formulas (K11) to (K28), $R^{k1}$, $X^{k1}$, $X^{k2}$, $Z^{k2}$, ring $k^2$, $Z^{k3}$, $n^{k1}$, $X^{k3}$, $X^{k4}$ and $Y^{k1}$ are the same as described above, but $X^{k1}$ and $X^{k2}$ are particularly preferably a fluorine atom, $Z^{k2}$ and $Z^{k3}$ are particularly preferably a single bond, ring $k^2$ is preferably a 1,4-phenylene group, a 3-fluoro-1,4-phenylene group or a 3,5-difluoro-1,4-phenylene group and particularly preferably a 3,5-difluoro-1,4-phenylene group, $n^{k1}$ is preferably 0 or 1 and particularly preferably 1, $X^{k3}$ and $X^{k4}$ are particularly preferably a fluorine atom, and $Y^{k1}$ is preferably a fluorine atom or a trifluoromethoxy group and is particularly preferably a fluorine atom.

The content of the compound represented by General Formulas (K11) to (K17) in the liquid crystal composition according to the present invention is preferably 1% by mass or greater, preferably 3% by mass or greater, more preferably 5% by mass or greater, and still more preferably 10% by mass or greater. Specifically, the content is preferably 3% by mass to 70% by mass, more preferably 5% by mass to 60% by mass, still more preferably 10% by mass to 60% by mass, and still more preferably 10% by mass to 50% by mass.

The content of the compound represented by General Formulas (K25) to (K28) in the liquid crystal composition according to the present invention is preferably 1% by mass or greater, preferably 3% by mass or greater, more preferably 5% by mass or greater, and still more preferably 10% by mass or greater. Specifically, the content is preferably 3% by mass to 70% by mass, more preferably 5% by mass to 60% by mass, still more preferably 10% by mass to 60% by mass, and still more preferably 10% by mass to 50% by mass.

In the liquid crystal composition according to the present invention, it is preferable that one or two or more of the compounds represented by General Formulas (K11) to (K17) are contained, it is more preferable that one to ten are contained, it is still more preferable that one to eight are contained, it is still more preferable that two to eight are contained, and it is particularly preferable that two to five are contained.

In the liquid crystal composition according to the present invention, it is preferable that one or two or more of the compounds represented by General Formulas (K25) to (K28) are contained, it is more preferable that one to ten are contained, it is still more preferable that one to eight are contained, it is still more preferable that two to eight are contained, and it is particularly preferable that two to five are contained.

The liquid crystal composition according to the present invention may contain a compound represented by General Formula (PN), as a liquid crystal compound having a positive dielectric anisotropy whose absolute value is 4 or more.

[Chem. 344]

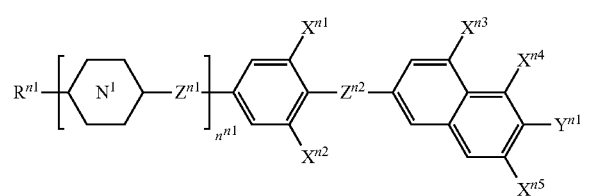

(PN)

In General Formula (PN), $R^{n1}$ represents an alkyl group having 1 to 10 carbon atoms or an alkenyl group having 2 to 10 carbon atoms, one —CH$_2$— or at least two non-adjacent —CH$_2$—'s present in the group may be independently substituted with —C≡C—, —O—, —CO—, —COO—, or —OCO—, and one or more of the hydrogen atoms in the group may be independently substituted with a fluorine atom.

In General Formula (PN), ring $N^1$ represents a 1,4-cyclohexylene group (one —CH$_2$— or two or more non-adjacent —CH$_2$—'s present in the group may be independently substituted with —O— or —S—) or a 1,4-phenylene group (one —CH= or two or more non-adjacent —CH='s present in the group may be independently substituted with —N=), and at least one hydrogen atom in the group may be independently substituted with a cyano group, or a fluorine atom.

In General Formula (PN), $Z^{n1}$ and $Z^{n2}$ each independently represents a single bond, —CH$_2$CH$_2$—, —(CH$_2$)$_4$—, —OCH$_2$—, —CH$_2$O—, —OCF$_2$—, —CF$_2$O—, —CH$_2$CH$_2$CF$_2$O—, —COO—, —OCO— or —C≡C—.

In General Formula (N1), $n^1$ each independently represents an integer of 0 to 4, but when $n^{n1}$ are 2 or more, ring $N^1$ may be the same or different, and $Z^{n1}$ may be the same or different.

In General Formula (PN), $X^{n1}$, $X^{n2}$, $X^{n3}$, $X^{n4}$, and $X^{n5}$ each independently represents a hydrogen atom or a fluorine atom.

In General Formula (PN), $Y^{n1}$ represents a fluorine atom, a cyano group, a trifluoromethyl group, a fluoromethoxy group, a difluoromethoxy group, a trifluoromethoxy group or a 2,2,2-trifluoroethyl group, but represents a fluorine atom, a trifluoromethyl group, a fluoromethoxy group, a difluoromethoxy group or a trifluoromethoxy group.

It is more preferable that the liquid crystal composition according to the present invention maintains a high refractive index anisotropy (Δn) and has excellent reliability by containing the compound represented by General Formula (PN).

The content of the compound represented by General Formula (PN) in the liquid crystal composition according to the present invention is preferably 0% by mass to 60% by mass, more preferably 1% by mass to 50% by mass, still more preferably 1% by mass to 40% by mass, still more preferably 5% by mass to 40% by mass, and still more preferably 10% by mass to 40% by mass.

In the liquid crystal composition according to the present invention, it is preferable that one or two or more of the compounds represented by General Formula (PN) are contained, it is more preferable that one to ten are contained, it is still more preferable that one to eight are contained, it is still more preferable that two to eight are contained, and it is particularly preferable that two to five are contained.

The compound represented by General Formula (PN) according to the present invention is preferably a compound selected from the group consisting of the compound represented by General Formulas (PN1) and (PN2), and more preferably a compound represented by General Formula (PN2).

[Chem. 345]

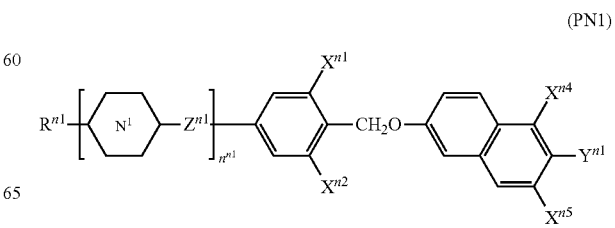

(PN1)

-continued (PN2)

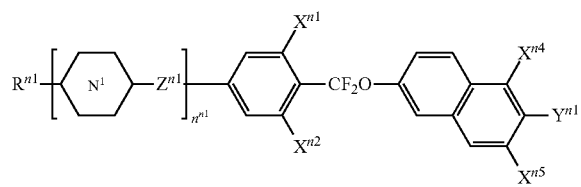

In General Formulas (PN1) and (PN2), $R^{n1}$, ring $N^1$, $Z^{n1}$, $n^{n1}$, $X^{n1}$, $X^{n2}$, $X^{n4}$, $X^{n5}$, and $Y^{n1}$ are the same as described above, but ring $N^1$ is preferably a 1,4-cyclohexylene group, a tetrahydropyran-2,5-diyl group, a 1,4-phenylene group, a 3-fluoro-1,4-phenylene group or a 3,5-difluoro-1,4-phenylene group or a dioxane group, and more preferably a 1,4-phenylene group, a 3-fluoro-1,4-phenylene group or a 3,5-difluoro-1,4-phenylene group, $Z^{n1}$ is particularly preferably a single bond, $n^{n1}$ is preferably 0 or 1, $X^{n2}$ and $X^{n2}$ are preferably a hydrogen atom or a fluorine atom, it is more preferably that at least one of $X^{n2}$ and $X^{n2}$ is a fluorine atom, it is particularly preferably that both are a fluorine atom, $X^{n4}$ and $X^{n5}$ are preferably a hydrogen atom or a fluorine atom, it is more preferably that at least one of $X^{n4}$ and $X^{n5}$ is a fluorine atom, it is particularly preferably that both are a fluorine atom, and $Y^{n1}$ is preferably a fluorine atom or a trifluoromethoxy group.

The content of the compound represented by General Formula (PN1) in the liquid crystal composition according to the present invention is preferably 0% by mass to 60% by mass, more preferably 1% by mass to 50% by mass, still more preferably 1% by mass to 40% by mass, still more preferably 5% by mass to 40% by mass, and particularly preferably 10% by mass to 40% by mass.

The content of the compound represented by General Formula (PN2) in the liquid crystal composition according to the present invention is preferably 0% by mass to 60% by mass, more preferably 1% by mass to 50% by mass, still more preferably 1% by mass to 40% by mass, still more preferably 5% by mass to 40% by mass, and particularly preferably 10% by mass to 40% by mass.

The compound represented by General Formula (PN) according to the present invention is preferably the following General Formula (PN3).

[Chem. 346]

(PN3)

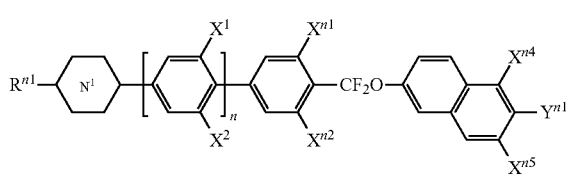

In General Formula (PN3), $R^{n1}$, ring $N^1$, $X^{n1}$, $X^{n2}$, $X^{n4}$, $X^{n5}$, and $Y^{n1}$ are the same as described above.

In General Formula (PN3), $X^2$ and $X^2$ each independently represents a hydrogen atom or a fluorine atom, but it is preferable that at least one of $X^1$ and $X^2$ is a fluorine atom, and it is also preferable that both are a fluorine atom.

In General Formula (PN3), ring $N^1$ represents a 1,4-cyclohexylene group, a tetrahydropyran-2,5-diyl group, a 1,4-phenylene group, a 3-fluoro-1,4-phenylene group or a 3,5-difluoro-1,4-phenylene group or a dioxane group, and is more preferably a 1,4-phenylene group, a 3-fluoro-1,4-phenylene group or a 3,5-difluoro-1,4-phenylene group.

In General Formula (PN3), n represents an integer of 0 to 2 but is preferably 0 or 1.

The content of the compound represented by General Formula (PN3) in the liquid crystal composition according to the present invention is preferably 0% by mass to 60% by mass, more preferably 1% by mass to 50% by mass, still more preferably 1% by mass to 40% by mass, still more preferably 5% by mass to 40% by mass, and particularly preferably 10% by mass to 40% by mass.

In the liquid crystal composition according to the present invention, it is preferable that one or two or more of the compounds represented by General Formula (PN3) are contained, it is more preferable that one to ten are contained, it is still more preferable that one to eight are contained, it is still more preferable that two to eight are contained, and it is particularly preferable that two to five are contained.

As the compound represented by General Formula (PN3) according to the present invention, the following (PN11) to (PN14) are preferable.

[Chem. 347]

(PN11)

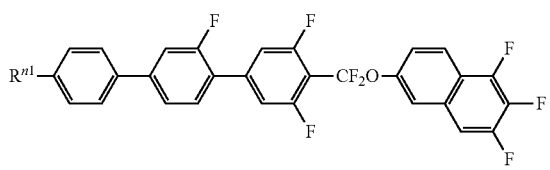

[Chem. 348]

(PN12)

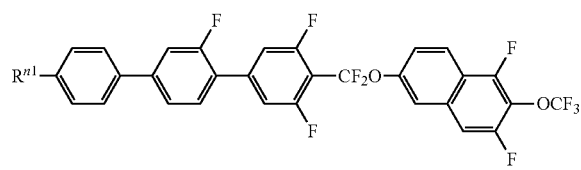

[Chem. 349]

(PN13)

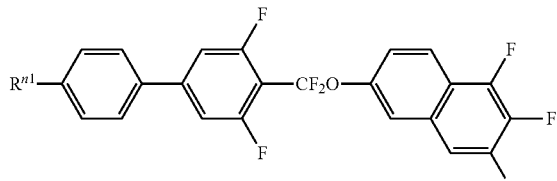

[Chem. 350]

(N14)

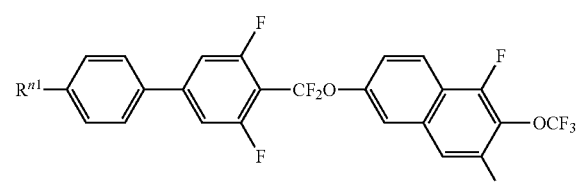

The content of the compound represented by General Formulas (PN11) to (PN14) in the liquid crystal composition according to the present invention is preferably 0% by mass to 60% by mass, more preferably 1% by mass to 50% by mass, still more preferably 1% by mass to 40% by mass, still more preferably 5% by mass to 40% by mass, and particularly preferably 10% by mass to 40% by mass.

In addition, as the compound represented by General Formula (PN), at least one selected from the group consisting of the following General Formulas (PN15) and (PN16) is preferable.

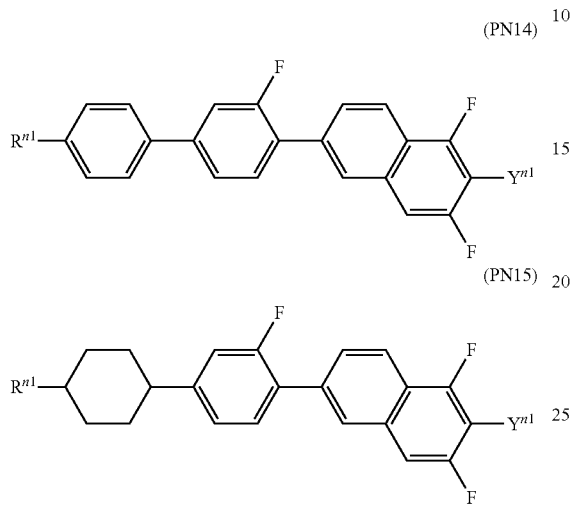

The preferable embodiment of the liquid crystal composition according to the present invention is a liquid crystal composition including at least one or more compound represented by General Formula (i), at least one or more compound represented by General Formula (N), and a compound represented by General Formula (M).

[Chem. 351]

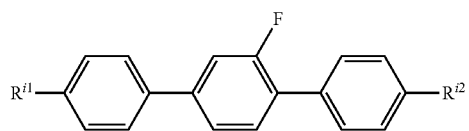

(In General Formula (i), $R^{i1}$ and $R^{i2}$ each independently represents an alkyl group having 1 to 10 carbon atoms, an alkenyl group having 2 to 10 carbon atoms, or an alkoxy group having 1 to 10 carbon atoms, and at least one of $R^{i1}$ and $R^{i2}$ is the alkenyl group.)

[Chem. 352]

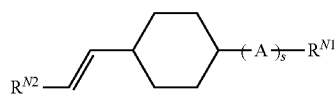

(In General Formula (N), ring A each independently represents a group selected from the group consisting of (a) a 1,4-cyclohexylene group (one —$CH_2$— or at least two non-adjacent —$CH_2$—'s present in the group may be substituted with —O—), and (b) a 1,4-phenylene group (one —CH= or at least two non-adjacent —CH='s present in the group may be substituted with —N=), the groups (a) and (b) each may be independently substituted with a fluorine atom, $R^{N1}$ represents an alkyl group having 1 to 10 carbon atoms, an alkenyl group having 2 to 10 carbon atoms, an alkoxy group having 1 to 10 carbon atoms, or a fluorine atom and $R^{N2}$ represents a hydrogen atom or an alkyl group having 1 to 3 carbon atoms, and s represents an integer of 1 to 3.)

[Chem. 353]

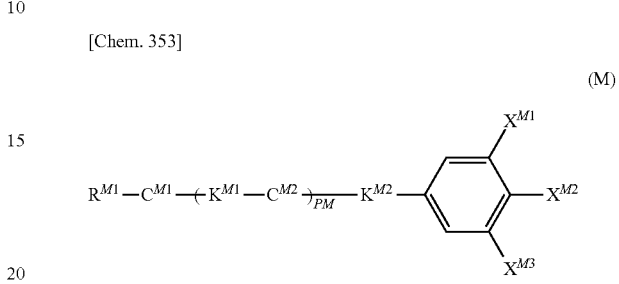

(in General Formula (M), $R^{M1}$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, the alkenyl group, the alkoxy group, or the alkenyloxy group may be substituted with (a) fluorine atom (s), and one —$CH_2$— or two or more non-adjacent —$CH_2$—'s present in the alkyl group, the alkenyl group, the alkoxy group, or the alkenyloxy group may be independently substituted with —CH=CH—, —C≡C—, —O—, —CO—, —COO—, or —OCO—, PM represents 0, 1, 2, 3, or 4, $C^{M1}$ and $C^{M2}$ each independently represents a group selected from the group consisting of (d) a 1,4-cyclohexylene group (one —$CH_2$— or two or more non-adjacent —$CH_2$—'s present in the group may be substituted with —O— or —S—), and (e) a 1,4-phenylene group (one —CH= or two or more non-adjacent —CH='s present in the group may be substituted with —N=), the above groups (d) and (e) each may be independently substituted with a cyano group, a fluorine atom, or a chlorine atom, $K^{M1}$ and $K^{M2}$ each independently represents a single bond, —$CH_2CH_2$—, —$(CH_2)_4$—, $OCH_2$, —$CH_2O$—, —$OCF_2$—, —$CF_2O$—, —COO—, —OCO—, or —C≡C—, and in the case where since PM is 2, 3, or 4 and plural $K^{M1}$'s are present, plural $K^{M1}$'s may be the same as or different from each other, and in the case where since PM is 2, 3, or 4 and plural $C^{M2}$'s are present, plural $C^{M2}$'s may be the same as or different from each other, $X^{M1}$ and $X^{M3}$ each independently represents a hydrogen atom, a fluorine atom, or a chlorine atom, and $X^{M2}$ represents a hydrogen atom, a fluorine atom, a chlorine atom, a cyano group, a trifluoromethyl group, a fluoromethoxy group, a difluoromethoxy group, a trifluoromethoxy group or a 2,2,2-trifluoroethyl group, but the compounds represented by General Formulas (i), (N), and (L) are excluded.)

In the preferable embodiment, the compounds represented by General Formulas (i) and (N) each is a nonpolar liquid crystal host component (component B), and the compound represented by General Formula (M) is a polar liquid crystal host component (component A).

That is, in the liquid crystal composition according to the present invention, if at least one type of the compound is selected from the compound group of the compounds represented by General Formulas (i), and at least one type is selected from the compound group of the compounds represented by General Formulas (N), since it is easy to have a transmittance-gradation voltage characteristic curve of a slow curve, the divided gradation widths are equally spaced, and therefore the difference between the adjacent gradation voltages and the luminance displayed to correspond thereto becomes clear. This can solve the problem that the number of colors that can be displayed substantially decreases. In addition, since the problem of expressive power of gradation is alleviated, it is possible to suppress or prevent the occurrence of black defects in dark areas, halation in bright areas, or banding in intermediate gradation (vertical or horizontal streaks), color casts, and the like.

With respect to the liquid crystal composition according to the present invention including the compound represented by General Formula (i) and the compound represented by General Formula (N), as a favorable and specific range of the content of each compound, the content of the compound represented by General Formula (i) (entire liquid crystal composition is taken as 100%) is preferably 1% to 70% by mass, more preferably 3% to 50% by mass, still more preferably 5% to 45% by mass, still more preferably 7% to 40% by mass, and particularly preferably 10% to 30% by mass. On the other hand, the content of the compound represented by General Formula (N) (entire liquid crystal composition is taken as 100%) is preferably 1% to 74% by mass, more preferably 5% to 73% by mass, still more preferably 10% to 70% by mass, still more preferably 15% to 68% by mass, and particularly preferably 20% to 65% by mass.

The compound represented by General Formula (M) is preferably at least one compound selected from the group consisting of the compound represented by General Formula (K), the compound represented by General Formula (IX), the compound represented by General Formula (M-1), the compound represented by General Formula (B), the compound represented by General Formula (X-2), the compound represented by General Formula (IX-2), the compound represented by General Formula (VIII), and the compound represented by General Formula (XI).

If within these ranges, since it is easy to have a transmittance-gradation voltage characteristic curve of a slow curve, the divided gradation widths are equally spaced, and therefore the difference between the adjacent gradation voltages and the luminance displayed to correspond thereto becomes clear. This can solve the problem that the number of colors that can be displayed substantially decreases.

The preferable liquid crystal composition described above may contain at least one compound selected from the group consisting of the compound represented by the other nonpolar component (General Formula (L)), and the compound represented by the other polar component (General Formula (M)), as necessary.

In addition, the content of at least one compound selected from the compound group of the compounds represented by General Formula (i) and at least one compound selected from the compound group of the compounds represented by General Formula (N) (the total amount of the compound represented by General Formula (i) and the compound represented by General Formula (N)) is preferably 1% to 95% by mass, preferably 5% to 90% by mass, preferably 10% to 87% by mass, preferably 15% to 85% by mass, preferably 20% to 82% by mass, preferably 23% to 80% by mass, preferably 25% to 75% by mass, preferably 1% to 50% by mass, preferably 2% to 45% by mass, preferably 3% to 40% by mass, preferably 4% to 38% by mass, and preferably 5% to 35% by mass, with respect to the entire liquid crystal composition.

The liquid crystal composition according to the present invention preferably contains the nonpolar component having a dielectric anisotropy of −2 to 2, and the polar component having a positive dielectric anisotropy of more than 2, and the content of the nonpolar component in the entire liquid crystal composition is preferably 30% to 95% by mass, preferably 35% to 90% by mass, preferably 40% to 85% by mass, preferably 45% to 80% by mass and preferably 50% to 75% by mass with respect to the entire liquid crystal composition being taken as 100% by mass.

In addition, a total content of the compounds represented by General Formulas (i) and (N) in the nonpolar component is preferably 50% to 100% by mass, preferably 55% to 100% by mass, preferably 60% to 100% by mass, preferably 65% to 100% by mass, preferably 70% to 100% by mass, preferably 75% to 100% by mass, and preferably 80% to 95% by mass with respect to the entire nonpolar component being taken as 100% by mass.

In the preferable embodiment of the liquid crystal composition according to the present invention, at least one compound selected from the compound group of the compounds represented by General Formula (i), at least one compound selected from the compound group of the compounds represented by General Formula (N), and at least one compound selected from the compound group of the compounds represented by General Formula (M) or at least one compound selected from the compound group of the compounds represented by General Formula (K) are included in an amount of preferably 50% to 100% by mass, more preferably 55% to 98% by mass, still more preferably 60% to 95% by mass, still more preferably 65% to 90% by mass, and particularly preferably 68% to 85% by mass, with respect to the entire liquid crystal composition.

In another preferable embodiment of the liquid crystal composition according to the present invention, the compound group of the compounds represented by General Formula (L) may be further contained, and at least one compound selected from the compound group of the compounds represented by General Formula (i), at least one compound selected from the compound group of the compounds represented by General Formula (N), and at least one compound selected from the compound group of the compounds represented by General Formula (L) are included in an amount of preferably 40% to 90% by mass, more preferably 50% to 90% by mass, still more preferably 55% to 85% by mass, still more preferably 60% to 80% by mass, and particularly preferably 65% to 75% by mass, with respect to the entire liquid crystal composition.

In the case where improving the viscosity and improving Tni are important, it is preferable to reduce the content of a compound having, in the molecule, a 2-methylbenzene-1,4-diyl group in which a hydrogen atom may be substituted with a halogen, and it is preferable that the content of the compound having the 2-methylbenzene-1,4-diyl group in the molecule, is 10% by mass or less with respect to the total mass of the composition, the content is more preferably 5% by mass or less, and substantially containing no compound is still more preferable.

In order to suppress deterioration due to oxidation of the liquid crystal composition, it is preferable to reduce the content of the compound having a cyclohexenylene group as a ring structure, and it is preferable that the content of the compound having the cyclohexenylene group is 10% by mass or less with respect to the total mass of the composition, the content is more preferably 5% by mass or less, and substantially containing no compound is still more preferable.

In the case of the composition containing the compound represented by General Formula (i), the compound represented by General Formula (M), and the compound represented by General Formula (N), the content of these three compounds is preferably 3% to 75% by mass, more preferably 6% to 70% by mass, still more preferably 9% to 65% by mass, still more preferably 12% to 60% by mass, and particularly preferably 15% to 55% by mass, with respect to the entire liquid crystal composition.

With respect to the liquid crystal composition of the present invention, the refractive index anisotropy (Δn) at 25° C. is from 0.06 to 0.20, but is preferably from 0.07 to 0.18, particularly preferably from 0.08 to 0.16. For further description, in the case of corresponding to a small cell gap, the range of 0.11 to 0.14 is preferable, and in the case of corresponding to a large cell gap, the range of 0.08 to 0.11 is preferable.

With respect to the liquid crystal composition of the present invention, the nematic phase-isotropic liquid phase transition temperature ($T_{ni}$) is from 60° C. to 120° C., preferably from 70° C. to 110° C., particularly preferably from 70° C. to 100° C.e.

With respect to the liquid crystal composition of the present invention, the viscosity (η) at 25° C. is from 5 to 20 mPa·s, more preferably 18 mPa·s or less, particularly preferably 15 mPa·s or less.

With respect to the liquid crystal composition of the present invention, the rotational viscosity ($γ_1$) at 25° C. is from 20 to 60 mPa·s, more preferably 50 mPa·s or less, particularly preferably 40 mPa·s or less.

Kaverage (also called as Kavg) according to the present invention is preferably 12 pN or more, more preferably from to 20, still more preferably from 12 to 19, further preferably from 12 to 18, still further preferably from 12 to 17, particularly preferably from 13 to 16. K11, K22, and K33 can be obtained from the applied voltage-electrostatic capacity curve characteristic of the cell in a state of being filled with the liquid crystal, and Kaverage can be calculated as the average value thereof.

The polymerizable compound-containing liquid crystal composition according to the present invention has a liquid crystal alignment capability by polymerizing a polymerizable compound included therein using irradiation with ultraviolet rays, and is preferably used in the liquid crystal display element which controls the light transmission amount using birefringence of the liquid crystal composition.

In the liquid crystal composition according to the present invention, in order to manufacture a liquid crystal display element of a PSA mode or a horizontal electric field type PSA mode, a polymerizable compound may be contained. As the polymerizable compound capable of being used, a photopolymerizable monomer which is polymerized by energy rays such as light is exemplified, and as the structure, a polymerizable compound having a liquid crystal skeleton in which plural 6-membered rings such as biphenyl derivatives or terphenyl derivatives is connected is exemplified. In addition, specifically, the bifunctional monomer represented by General Formula (XX) is preferable.

[Chem. 354]

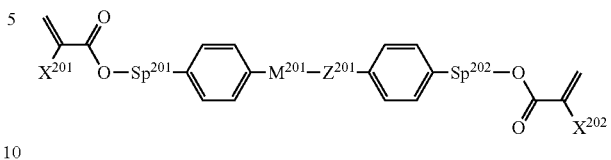

(XX)

In General Formula (XX), $X^{201}$ and $X^{202}$ each independently represents a hydrogen atom or an alkyl group having 1 to 3 carbon atoms (a methyl group, an ethyl group, or a propyl group), $Sp^{201}$ and $Sp^{202}$ each independently represents a single bond, an alkylene group having 1 to 8 carbon atoms, or —O—$(CH_2)_s$— (in the formula, s represents an integer of 2 to 7, and an oxygen atom is bonded to an aromatic ring), $X^{201}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (in the formula, each of $Y^1$ and $Y^2$ independently represents a fluorine atom or a hydrogen atom), —C≡C—, or a single bond, $M^{201}$ represents a trans-1,4-cyclohexylene group, a single bond, or a 1,4-phenylene group in which any hydrogen atom may be substituted with a fluorine atom, and in all 1,4-phenylene groups in General Formula (XX), any hydrogen atom may be substituted with a fluorine atom.

As the preferable form of the polymerizable compound according to the present invention, a diacrylate derivative in which both $X^{201}$ and $X^{202}$ represent hydrogen atoms and a dimethacrylate derivative in which both $X^{201}$ and $X^{202}$ have methyl groups are preferable, and a compound in which one of $X^{201}$ and $X^{202}$ represents a hydrogen atom, and the other represents a methyl group is also preferable. In the polymerization rate of these compounds, diacrylate derivatives are the fastest, diacrylate derivatives are slow, and asymmetric compounds are therebetween. It is possible to use a more preferable embodiment according to the application thereof. In a PSA display element, a dimethacrylate derivative is particularly preferable.

$Sp^{201}$ and $Sp^{202}$ each independently represents a single bond, an alkylene group having 1 to 8 carbon atoms, or —O—$(CH_2)_s$—, and in a PSA display element, at least one of $Sp^{201}$ and $Sp^{202}$ is preferably a single bond, and compounds in which both $Sp^{201}$ and $Sp^{202}$ represent single bonds, or an embodiment in which one of $Sp^{201}$ and $Sp^{202}$ represents a single bond and the other represents an alkylene group having 1 to 8 carbon atoms or —O—$(CH_2)_s$— are preferable. In this case, an alkylene group having 1 to 4 carbon atoms is more preferable, and s is preferably 1 to 4.

$Z^{201}$ is preferably —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably —COO—, —OCO—, or a single bond, and particularly preferably a single bond.

$M^{201}$ represents a 1,4-phenylene group in which any hydrogen atom may be substituted with a fluorine atom, a trans-1,4-cyclohexylene group, or a single bond, and a 1,4-phenylene group in which any hydrogen atom may be substituted with a fluorine atom or a single bond is preferable. In the case where $M^{201}$ represents a ring structure other than a single bond, $Z^{201}$ is preferably a linking group other than a single bond, and in the case where $M^{201}$ is a single bond, $Z^{201}$ is preferably a single bond.

From these points of view, in General Formula (XX), as the ring structure between $Sp^{201}$ and $Sp^{202}$, specifically, the structures of Formulas (XXa-1) to (XXa-5) described below are preferable.

In General Formula (XX), $M^{201}$ represents a single bond, and in the case where the ring structure is formed of two rings, the ring structure preferably represents the following Formulas (XXa-1) to (XXa-5), more preferably represents Formulas (XXa-1) to (XXa-3), and particularly preferably represents Formula (XXa-1).

[Chem. 355]

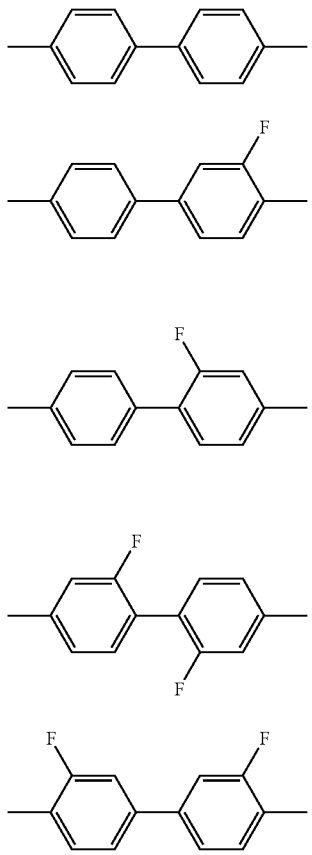

In Formulas (XXa-1) to (XXa-5), both ends of a binding hand are bonded to $Sp^{201}$ or $Sp^{202}$.

In polymerizable compound including these skeleton, since a force for restricting the alignment after polymerization is optimal to the PSA type liquid crystal display element, and excellent alignment state is obtained, display unevenness is suppressed, or is not generated.

From the above, the polymerizable compound is preferably at least one compound selected from the compound group of the compounds represented by General Formulas (XX-1) to (XX-4), and among these, more preferably the compound represented by General Formula (XX-2).

[Chem. 356]

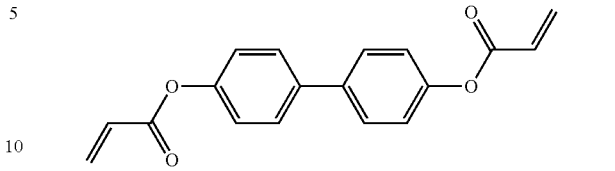

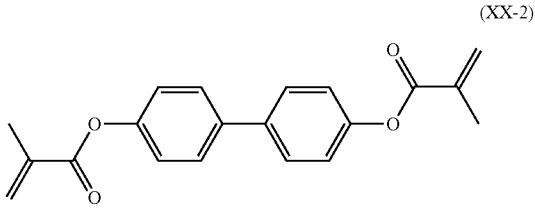

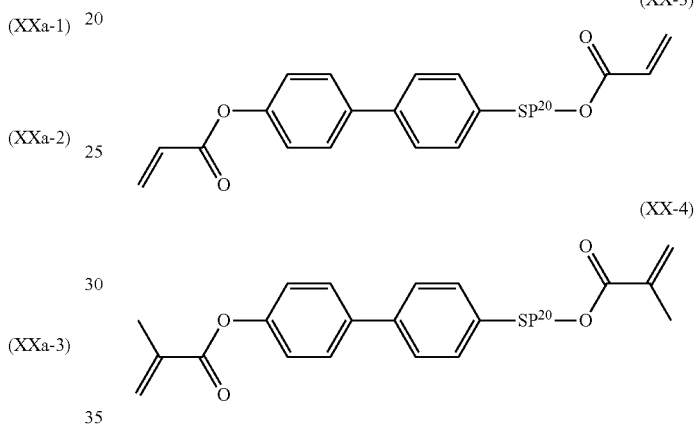

In General Formulas (XX-3) and (XX-4), $Sp^{20}$ represents an alkylene group having 2 to 5 carbon atoms.

In the case where a polymerizable compound is added to the liquid crystal composition according to the present invention, polymerization proceeds even in the case where the polymerization initiator is not present; however, the polymerization initiator may be contained in order to promote the polymerization. Examples of the polymerization initiator include benzoin ethers, benzophenones, acetophenones, benzyl ketals, and acyl phosphine oxides.

The liquid crystal composition according to the present invention can further contain the compound represented by General Formula (Q) as an antioxidant.

[Chem. 357]

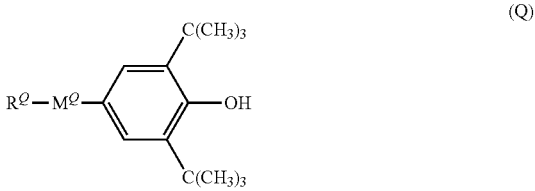

In General Formula (Q), $R^Q$ represents an alkyl group or an alkoxy group having 1 to 22 carbon atoms, one or more $CH_2$ groups in the alkyl group may be substituted with —O—, —CH=CH—, —CO—, —OCO—, —COO—, —C≡C—, —$CF_2$O—, or —O$CF_2$— such that the oxygen atom does not become directly adjacent, and $M^Q$ represents a trans-1,4-cyclohexylene group, a 1,4-phenylene group, or a single bond.

In General Formula (Q), $R^Q$ is preferably an alkyl group or an alkoxy group having 1 to 22 carbon atoms, the alkyl group (which includes an alkyl group in the alkoxy group) may be linear or branched. In addition, $R^Q$ represents a linear or branched alkyl group or a linear or branched alkoxy group having 1 to 22 carbon atoms, and one or more $CH_2$ groups in the alkyl group (which includes the alkyl group in the alkoxy group) may be substituted with —O—, —CH=CH—, —CO—, —OCO—, —COO—, —C≡C—, —CF$_2$O—, or —OCF$_2$—, such that an oxygen atom does not become directly adjacent. $R^Q$ in General Formula (Q) is preferably at least one selected from the group consisting of a linear alkyl group or a linear alkoxy group having 1 to 20 carbon atoms, a linear alkyl group in which one $CH_2$ group has been substituted with —OCO— or —COO—, a branched alkyl group, a branched alkoxy group, and a branched alkyl group in which one $CH_2$ group has been substituted with —OCO— or —COO—, and more preferably at least one selected from the group consisting of a linear alkyl group having 1 to 10 carbon atoms, a linear alkyl group in which one $CH_2$ group has been substituted with —OCO— or —COO—, a branched alkyl group, a branched alkoxy group, and a branched alkyl group in which one $CH_2$ group has been substituted with —OCO— or —COO—.

$M^Q$ represents a trans-1,4-cyclohexylene group, a 1,4-phenylene group, or a single bond, and a trans-1,4-cyclohexylene group or a 1,4-phenylene group is preferable.

The compound represented by General Formula (Q) is preferably at least one compound selected from the compound group of the compounds represented by the following General Formulas (Q-a) to (Q-d), and more preferably the compound represented by each of General Formulas (Q-a) and/or (Q-c).

[Chem. 358]

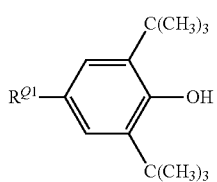
(Q-a)

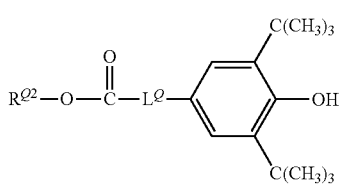
(Q-b)

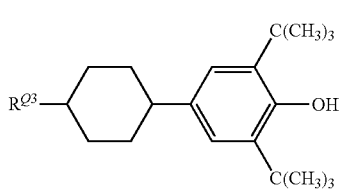
(Q-c)

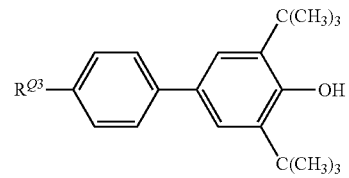
(Q-d)

In General Formulas (Q-a) to (Q-d), $R^{Q1}$ is preferably a linear alkyl group or a branched alkyl group having 1 to 10 carbon atoms, $R^{Q2}$ is preferably a linear alkyl group or a branched alkyl group having 1 to 20 carbon atoms, $R^{Q3}$ is preferably a linear alkyl group, a branched alkyl group, a linear alkoxy group, or a branched alkoxy group, having 1 to 8 carbon atoms, and $L^Q$ is preferably a linear alkylene group or a branched alkylene group, having 1 to 8 carbon atoms. Among these, the compound represented by General Formula (Q) is more preferably the compound represented by each of the following Formulas (Q-a-1) and/or (Q-c-1).

[Chem. 359]

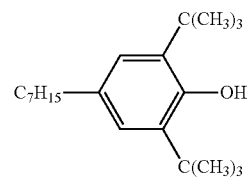
(Q-a-1)

[Chem. 360]

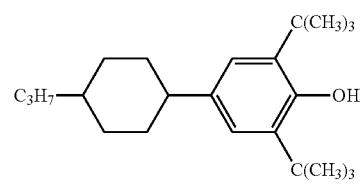
(Q-c-1)

In the liquid crystal composition of the present invention, one type or two types of compounds represented by General Formula (Q) are preferably contained, one to five types are more preferably contained, and the content thereof is preferably 0.001% to 1% by mass, preferably 0.001% to 0.1% by mass, and preferably 0.001% to 0.05% by mass, with respect to the total mass of the liquid crystal composition of the present invention.

The second aspect of the present invention is a liquid crystal display element that includes a liquid crystal composition having the compound represented by General Formula (i) and the compound represented by General Formula (M-1), and having dielectric anisotropy that is greater than 0 and 6 or less at 25° C.

The liquid crystal display element according to the present invention is useful for an active-matrix liquid-crystal display element (AM-LCD) and can be used for a transmissive or reflective liquid crystal display element.

In addition, the driving method (also called a mode) of the liquid crystal display element according to the present invention is useful for an ECB-LCD, a VA-LCD, a VA-IPS-LCD, a FFS-LCD (fringe field switching), a TN (nematic liquid crystal display element), an STN-LCD (super twisted nematic liquid crystal display element), an OCB-LCD, and an IPS-LCD (in-plane switching liquid crystal display element), but the liquid crystal display element of the IPS mode or the FFS mode is particularly preferable.

Regarding liquid crystal displays used for portable tablets represented by smartphones recently, in lateral electric field type liquid crystal displays such as the IPS mode and the FFS mode in which development and diffusion have rapidly progressed, a liquid crystal composition having a positive dielectric anisotropy with a high $\Delta\varepsilon$ is mainly and frequently used since low power consumption is important. In this case, the response speed thereof is not sufficient because that the viscosity of the liquid crystal itself tends to become high, and that time loss is likely to occur due to charge to not only the liquid crystal layer but also the FFS substrate insulating layer (for example, the insulating layer 18 in FIGS. 5 and 7 described below). In order to solve this, it is considered that induced polarization in the liquid crystal layer can be reduced by using a liquid crystal composition that decreases the capacitance of the liquid crystal layer, that is, that has a very low and positive $\Delta\varepsilon$. As a result, the viscosity of the liquid crystal composition itself also decreases, and it is possible to achieve an extremely fast response speed in the IPS or the FFS mode.

As two substrates of the liquid crystal cell used in the liquid crystal display element, a transparent material having flexibility such as glass or plastic can be used, and the other substrate may be an opaque material such as silicon. For example, a transparent substrate having a transparent electrode layer can be obtained by sputtering indium tin oxide (ITO) onto a transparent substrate such as a glass plate.

For example, the color filter can be produced by a pigment dispersion method, a printing method, an electrodeposition method, or a staining method. To describe a method for producing the color filter by the pigment dispersion method as an example, a curable coloring composition for a color filter is coated onto the transparent substrate, a patterning process is performed, and heating or light irradiation is performed for curing. By performing the step on each of three colors of red, green, and blue, it is possible to produce a pixel portion for the color filter. In addition, a pixel electrode in which an active element such as a TFT or a thin-film diode is provided may be installed on the substrate.

The substrate is disposed such that the transparent electrode layer becomes the inner side. At that time, the space between substrates may be adjusted through a spacer. At this time, the space is preferably adjusted such that the thickness of the obtained light adjusting layer (liquid crystal layer) is in the range of 1 to 100 µm. The thickness is still more preferably in the range of 1.5 to 10 µm, and in the case where a polarizing plate is used, the product of the refractive index anisotropy $\Delta n$ of the liquid crystal and the cell thickness G is preferably adjusted such that the contrast is maximum. Moreover, in the case where there are two polarizing plates, a polarization axis of each polarizing plate can be adjusted such that a viewing angle and a contrast are good. In addition, a phase difference film for widening the viewing angle can also be used. For example, as the spacer, a post spacer consisting of glass particles, plastic particles, alumina particles, photoresist material, and the like is exemplified. Thereafter, a sealing agent such as an epoxy-based thermosetting composition is screen-printed onto the substrate in the form provided with the liquid crystal injection port, and the substrates are bonded to each other and are heated, whereby the sealing agent is cured.

As a method of sandwiching the liquid crystal composition (which contains a polymerizable compound, as necessary) between two substrates, a general vacuum injection method or an ODF method can be used. In the vacuum injection method, dropping marks are less likely to be generated, but there is a problem in that injection marks may remain. In the present invention, the display element which is manufactured using the ODF method can be more suitably used. In the liquid crystal display element manufacturing step by the ODF method, a sealing agent of an epoxy-based photo-heat combination curable type is drawn in a closed loop bank shape on any substrate between a back plane or a front plane using a dispenser, and after dropping a predetermined amount of the liquid crystal composition in a degassed state therein, the front plane and the back plane are joined, whereby a liquid crystal display element can be manufactured. Since dropping of the liquid crystal composition in the ODF step can be stably performed, the liquid crystal composition of the present invention can be suitably used.

As a method for polymerizing polymerizable compounds, since in order to obtain a good alignment capability of liquid crystal, an appropriate polymerization rate is desirable, a method in which polymerization is performed by radiating active energy rays such as ultraviolet rays or electron beams singly or sequentially or in combination thereof is preferable. In the case where ultraviolet rays are used, a polarized light source may be used, and a non-polarized light source may be used. In addition, in the case where polymerization is performed in a state where the polymerizable compound-containing liquid crystal composition is sandwiched between two substrates, appropriate transparency with respect to active energy rays is necessarily applied to at least the substrate of the irradiation surface side. In addition, a method in which after polymerizing only a specific portion using a mask during light irradiation, the alignment state of the unpolymerized portion is changed by changing conditions such as an electric field, a magnetic field, or temperature, and irradiation with active energy rays is further performed to polymerize may be used. In particular, when ultraviolet ray exposure is performed, ultraviolet ray exposure is preferably performed while applying an AC electric field to the polymerizable compound-containing liquid crystal composition. The AC electric field to be applied is an alternating current having a frequency preferably in the range of 10 Hz to 10 kHz, and more preferably in the range of 60 Hz to 10 kHz, and voltage is selected according to a desired pretilt angle of the liquid crystal display element. In other words, the pretilt angle of the liquid crystal display element can be controlled by an applied voltage. In the liquid crystal display element of a horizontal electric field type MVA mode, the pretilt angle is preferably controlled to be in the range of 80° to 89.9° from the viewpoint of alignment stability and contrast.

The temperature at the time of the irradiation is preferably in the temperature range in which liquid crystal state of the liquid crystal composition of the present invention is maintained. The polymerization is preferably performed at a temperature around room temperature, that is, typically, at a temperature in the range of 15 to 35° C. As the lamp for generating ultraviolet rays, a metal halide lamp, a high pressure mercury lamp, an ultrahigh pressure mercury lamp can be used. In addition, as the wavelength of ultraviolet rays with which are irradiated, ultraviolet rays in a wavelength range which is not an absorption wavelength range of the liquid crystal composition are preferably applied, and if necessary, ultraviolet rays are preferably cut to use. The intensity of ultraviolet rays with which are irradiated is preferably in the range of 0.1 mW/cm$^2$ to 100 W/cm$^2$, and more preferably in the range of 2 mW/cm$^2$ to 50 W/cm$^2$. The amount of energy of ultraviolet rays with which are irradiated can be suitably adjusted, and is preferably in the range of 10 mJ/cm² to 500 J/cm², and more preferably in the range of 100 mJ/cm² to 200 J/cm². When ultraviolet rays are applied, the intensity may be changed. The application time of ultraviolet rays is suitably selected according to the intensity of ultraviolet rays applied, and is preferably in the range of 10 seconds to 3,600 seconds, and more preferably in the range of 10 seconds to 600 seconds.

The liquid crystal display element using the liquid crystal composition of the present invention is useful one which satisfies both a high speed response and suppression of display defects, and in particular, is useful for the liquid crystal display element for driving active matrix, and can be applied to a liquid crystal display element for a VA mode, a PSVA mode, a PSA mode, an IPS (in-plane switching) mode, a VA-IPS mode, a FFS (fringe field switching) mode, or an ECB mode.

Hereinafter, the preferred embodiments of the liquid crystal display element (one example of a liquid crystal display) according to the present invention will be described in detail with reference to the drawings.

FIG. 1 is a sectional view showing a liquid crystal display element having two substrates facing each other, a seal material provided between the substrates, and a liquid crystal sealed in the sealing region surrounded by the seal material.

Specifically, a specific embodiment of the liquid crystal display element having a back plane in which a TFT layer 102 and a pixel electrode 103 are provided on a first substrate 100, and a passivation film 104 and a first alignment film 105 are provided thereon, a front plane in which a black matrix 202, a color filter 203, a planarization film (overcoat layer) 201, and a transparent electrode 204 are provided on a second substrate 200, and a second alignment film 205 is provided thereon, and which is disposed to face the back plane, a seal material 301 provided between the substrates, and a liquid crystal layer 303 sealed in a sealing region surrounded by the seal material, and provided with projections (post spacers) 302 and 304 on the substrate surface with which the seal material 301 comes into contact is shown.

The first substrate or the second substrate is not particularly limited as long as the material is substantially transparent, and glass, ceramics, plastics, and the like can be used. As the plastic substrate, cellulose, cellulose derivatives such as triacetyl cellulose, and diacetyl cellulose, polycycloolefin derivatives, polyesters such as polyethylene terephthalate and polyethylene naphthalate, polyolefins such as polypropylene and polyethylene, polycarbonate, polyvinyl alcohol, polyvinyl chloride, polyvinylidene chloride, polyamide, polyimide, polyimideamide, polystyrene, polyacrylate, polymethyl methacrylate, polyether sulfone, polyarylate, and inorganic-organic composite materials such as a glass fiber-epoxy resin, and a glass fiber-acrylic resin can be used.

Moreover, when a plastic substrate is used, a barrier film is preferably provided. The function of the barrier film is to reduce moisture permeability of the plastic substrate, and to improve the reliability of the electrical characteristics of the liquid crystal display element. As the barrier film, which is not particularly limited as long as the transparency is high and the water vapor permeability is low, respectively, a thin film formed by a vapor deposition or sputtering, chemical vapor deposition method (CVD method) using an inorganic material such as silicon oxide is generally used.

In the present invention, the material of the first substrate or the second substrate may be the same, or different, and it is not particularly limited. If a glass substrate is used, a liquid crystal display element having excellent heat resistance and dimensional stability can be produced, and therefore the glass substrate is preferably used. If a plastic substrate is used, the plastic substrate is suitable for manufacturing by a roll-to-roll method, and reducing weight or making flexible, and therefore the plastic substrate is preferably used. When to impart flatness and heat resistance, it is possible to obtain excellent results by combining the plastic substrate and the glass substrate.

Moreover, in the examples described below, a substrate is used as the material of the first substrate 100 or the second substrate 200.

In the back plane, the TFT layer 102 and the pixel electrode 103 are provided on the first substrate 100. These are manufactured by a general array process. The back plane is obtained by providing the passivation film 104 and the first alignment film 105 thereon.

The passivation film 104 (also referred to as inorganic protective film) is a film to protect the TFT layer, and in general, nitride film (SiNx), oxide film (SiOx), or the like is formed by the chemical vapor deposition (CVD) technique.

In addition, the first alignment film 105 is a film having a function of aligning the liquid crystal, and generally, a polymeric material such as polyimide is used in many cases. As a coating solution, an alignment agent solution consisting of a polymeric material and a solvent is used. Since the alignment film has the possibility of inhibiting the adhesive force with a seal material, the alignment film is pattern-coated in the sealing region. In coating, a printing method such as a flexographic printing method or a liquid droplet discharge method such as an ink-jet is used. After the solvent of the coated alignment agent solution is evaporated by temporary drying, the coated alignment agent solution is cross-linked and cured by baking. Thereafter, the alignment processing is performed in order to give the aligning function.

The alignment processing is performed by a general rubbing method. By rubbing the polymer film formed as described above in one direction using a rubbing cloth made of fibers such as rayon, a liquid crystal alignment capability is generated.

In addition, a photo-alignment method can also be used. The photo-alignment method is a method of generating the alignment capability by irradiating with polarized light on the alignment film including an organic material having photosensitivity, and generation of scratches and dust on the substrate by the rubbing method does not occur. As the organic material in the photo-alignment method, a material containing a dichroic dye is exemplified. As the dichroic dye, a dye having a group generating a photoreaction which is the origin of the liquid crystal alignment capability (hereinafter, referred to as photo-alignment group), such as an alignment induction of molecules or an isomerization reaction by Weigert's effect due to photodichroism (example: an azobenzene group), a dimerization reaction (example: a cinnamoyl group), a photo-crosslinking reaction (example: a benzophenone group), or a photodegradation reaction (example: a polyimide group) can be used. After the solvent of the coated alignment agent solution is evaporated by temporary drying, it is possible to obtain an alignment film having an alignment capability in an arbitrary direction by irradiating with light (polarized light) having an arbitrary polarization.

The front plane is provided with the black matrix 202, the color filter 203, the planarization film 201, the transparent electrode 204, and the second alignment film 205 on the second substrate 200.

For example, the black matrix 202 is produced by the pigment dispersion method. Specifically, a color resin liquid in which a black colorant for forming a black matrix is homogeneously dispersed is coated on the second substrate 200 provided with a barrier film 201 to form a coloration layer. Subsequently, the coloration layer is baked to cure. A photoresist is coated on this, and the resultant product is pre-baked. After the photoresist is exposed through a mask pattern, development is performed to pattern the coloration layer. After this, the photoresist layer is peeled off, and the coloration layer is baked to complete the black matrix 202.

Alternatively, a photoresist type pigment dispersion may be used. In this case, the photoresist type pigment dispersion is coated, the resultant product is pre-baked and exposed through a mask pattern, and development is performed to pattern the coloration layer. After this, the photoresist layer is peeled off, and the coloration layer is baked to complete the black matrix 202.

The color filter 203 is produced by the pigment dispersion method, the electrodeposition method, the printing method, the staining method, or the like. To provide an example of the pigment dispersion method, a color resin liquid in which a pigment (for example, red) is homogeneously dispersed is coated on the second substrate 200, the resultant product is baked to cure, the photoresist is coated on this, and the resultant product is pre-baked. After the photoresist is exposed through a mask pattern, patterning is performed by developing. After this, the photoresist layer is peeled off, and baked again to complete the (red) color filter 203. There is no particular limitation to the order of colors which are produced. In the same manner, a green color filter 203 and a blue color filter 203 are formed.

The transparent electrode 204 is provided on the color filter 203 (the overcoat layer (201) is provided on the color filter 203 for surface planarization, as necessary). The transparent electrode 204 preferably has higher transmittance, and lower electric resistance. The transparent electrode 204 is manufactured by forming an oxide film such as ITO by a sputtering method or the like.

In addition, in order to protect the transparent electrode 204, a passivation film may also be provided on the transparent electrode 204.

The second alignment film 205 is the same as the first alignment film 105 described above.

A specific aspect of the back plane and the front plane used in the present invention has been described above, however, the application is not limited to the specific aspect, and modifications thereof may be made according to the desired liquid crystal display element without restriction.

A shape of the post spacer is not particularly limited, and the horizontal cross-section thereof can be various shapes such as a circular shape and a polygonal shape including a quadrangular shape and the like. In consideration of a misalignment margin during a process, the horizontal cross-section is particularly preferably a circular shape or a regular polygonal shape. In addition, the shape of the projection is preferably a truncated cone shape or a truncated pyramid shape.

The material of the post spacer is not particularly limited as long as it is a seal material, an organic solvent used in the seal material, or a material which is not dissolved in the liquid crystal, and in terms of processing and decreasing weight, a synthetic resin (curable resin) is preferable. On the other hand, by a method by photolithography or a droplet discharge method, the projection can be provided on a surface with which the seal material on a first substrate comes into contact. For this reason, a photocurable resin which is suitable for the method by photolithography or the droplet discharge method is preferably used.

Figure 2:
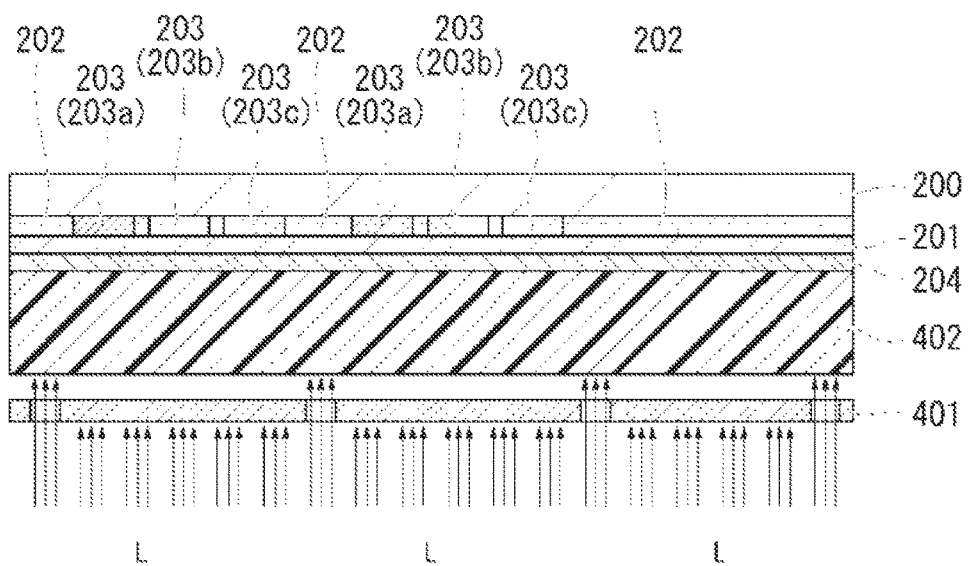
FIG. 2 is a view schematically showing one example of a configuration of the liquid crystal display element according to the present invention.

As an example, the case where the post spacer is obtained by the photolithography method will be described. FIG. 2 is a diagram of an exposure processing step using a pattern for producing a post spacer to be formed on a black matrix as a photomask pattern.

A resin solution (not including colorant) for forming the post spacer is coated on the transparent electrode 204 of the front plane. Subsequently, the resin layer 402 is baked to cure. A photoresist is coated on this, and the resultant product is pre-baked. After the photoresist is exposed through a mask pattern 401, development is performed to pattern the resin layer. After this, the photoresist layer is peeled off, and the resin layer is baked to complete the post spacer (302 and 304 in FIG. 1).

The formation position of the post spacer can be determined at a desired position by the mask pattern. Therefore, it is possible to simultaneously make both the inside of the sealing region and the outside of the sealing region (seal material coated portion) of the liquid crystal display element. In addition, the post spacer is preferably formed so as to be positioned on the black matrix to prevent quality degradation of the sealing region. The post spacer produced by the photolithography method as described above is referred to as a column spacer or a photospacer.

As the material of the spacer, a negative type water soluble resin such as a PVA-Stilbazo photosensitive resin, and a mixture of a polyfunctional acryl-based monomer, acrylic acid copolymer, a triazole-based initiator, and the like are used. Alternatively, a color resin in which a colorant is dispersed in a polyimide resin may also be used. It is possible to obtain a spacer formed of a known material according to compatibility with the liquid crystal to be used and the seal material, and the present invention is not particularly limited thereto.

In this manner, after providing the post spacer on a surface which is the sealing region on the front plane, the seal material (301 in FIG. 1) is coated on the surface with which the seal material of the back plane comes into contact.

The material of the seal material is not particularly limited, and a curable resin composition in which a polymerization initiator is added to an epoxy-based or acryl-based photocurable, a thermosetting, or a photo-heat combination curable resin is used. In addition, fillers formed of an inorganic substance or an organic substance may be added in order to control moisture permeability, elastic modulus, viscosity, and the like. The shape of these fillers, which is not particularly limited, is spherical, fibrous, or amorphous. Furthermore, a spherical or fibrous gap material having a monodisperse diameter is mixed in order to favorably control a cell gap, or a fibrous material that is likely to be entangled with a projection on the substrate may be mixed in order to further enhance adhesive force with the substrate. The diameter of the fibrous material used at this time is desirably ⅕ to ⅒ or less of the cell gap, and the length of the fibrous material is desirably shorter than the seal coating width.

In addition, the material of the fibrous material is not particularly limited as long as a predetermined shape is obtained, and synthetic fibers such as cellulose, polyamide, and polyester, or inorganic materials such as glass and carbon can be suitably selected as the material.

As the method of coating the seal material, a printing method and a dispensing method are exemplified, and the dispensing method in which a small amount of the seal material is used is desirable. The coating position of the seal material is generally on the black matrix such that the sealing region is not adversely affected. As the seal material coating shape, a closed loop shape is used in order to form a liquid crystal dropping region of a next step (such that a liquid crystal is not leaked).

A liquid crystal is dropped to the closed loop shape (sealing region) of the front plane coated with the seal material. In general, a dispenser is used. The amount of liquid crystal to be dropped is basically the same amount of the volume obtained by multiplying a height of the post spacer and a seal coating area in order to match the amount of liquid crystal to be dropped to the liquid crystal cell volume. However, in order to optimize a liquid crystal leakage and display characteristics in the cell bonding step, the amount of liquid crystal to be dropped may be suitably adjusted, or the liquid crystal dropping position may be dispersed.

Next, the back plane is bonded to the front plane on which the seal material is coated and a liquid crystal is dropped. Specifically, the front plane and the back plane are adhered to a stage having a mechanism for adhering the substrate as an electrostatic chuck, and the second alignment film of the front plane and the first alignment film of the back plane are disposed to face each other at a position (distance) with which the seal material and the other substrate do not come into contact. In this state, the inside of the system is decompressed. After the decompression ends, while checking the bonding position of the front plane and the back plane, the positions of both substrates are adjusted (alignment operation). After adjustment of the bonding position ends, the substrate is caused to approach a position where the seal material on the front plane and the back plane come into contact with each other. In this state, an inert gas is introduced into the inside of the system, and the pressure of the inside of the system is slowly reduced to return to atmospheric pressure. At this time, the front plane and the back plane are compressed by atmospheric pressure, and the cell gap is formed at a position of height of the post spacer. In this state, the seal material is irradiated with ultraviolet rays to be cured, whereby a liquid crystal cell is formed. Thereafter, in some cases, a heating step is added to promote curing of the seal material. In order to enhance the adhesive force or improve the reliability of electrical characteristics of the seal material, a heating step is added in many cases.

Hereinafter, the more preferable embodiments of the liquid crystal display element of the present invention will be described.

A second preferable embodiment of the liquid crystal display element according to the present invention is a liquid crystal display element in which a first substrate having an electrode layer including a first alignment layer and a thin film transistor on the surface and a second substrate having a second alignment layer on the surface are disposed such that the alignment layers face each other with a gap, and the gap between the first substrate and the second substrate is filled with a liquid crystal layer including a liquid crystal composition, and an electrode layer including the thin film transistor is preferably provided with plural gate wirings and data wirings disposed in a mesh shape, a thin film transistor provided at each intersection between the data wirings and the gate wirings, a pixel electrode connected to the thin film transistor, and a common electrode provided on the first substrate being separated from the pixel electrode. In addition, the first alignment layer and the second alignment layer provided in proximity to the liquid crystal layer are preferably alignment films which induce a homogeneous alignment with respect to the liquid crystal composition.

That is, the liquid crystal display element preferably has a configuration in which a second polarizing plate, a second substrate, an electrode layer (or also referred to as a thin film transistor layer) including a thin film transistor, an alignment film, a liquid crystal layer including a liquid crystal composition, an alignment film, a color filter, a first substrate, and a first polarizing plate are sequentially stacked.

By providing a common electrode and a pixel electrode on the same substrate (or an electrode layer) with a gap, the electric field (E) generated between the common electrode and the pixel electrode can have a planar direction component. Therefore, for example, in the case where an alignment film which induces a homogeneous alignment with respect to the liquid crystal composition is used in the alignment layer, it is possible to provide an element in which before a voltage is applied between the common electrode and the pixel electrode, the liquid crystal molecules arranged in the surface direction which is the alignment direction of the alignment film blocks light, and when a voltage is applied, the liquid crystal molecules are rotated horizontally by the electric field (E) applied in the planar direction and arranged along the electric field direction, and due to this, light is blocked.

In addition, the form of the liquid crystal display element according to the present invention may be a so-called color filter-on-array (COA), and a color filter may be provided between the electrode layer including a thin film transistor and the liquid crystal layer, or a color filter may be provided between the electrode layer including the thin film transistor and the second substrate. That is, the preferable configuration of liquid crystal display element according to the present invention is that the color filter 6 is formed on the same substrate side as the first substrate on which the electrode layer 3 including the thin film transistor is formed.

Moreover, "on a substrate" in the present specification also includes a so-called state of being supported by a substrate, that is, a state of not only coming into direct contact with but also coming into indirect contact with a substrate.

Another more preferable form (FFS) of the second embodiment of the liquid crystal display composition according to the present invention is a liquid crystal display element in which a first substrate having an electrode layer including a first alignment layer and a thin film transistor on the surface and a second substrate having a second alignment layer on the surface are disposed such that the alignment layers face each other with a gap, and the gap between the first substrate and the second substrate is filled with a liquid crystal layer including a liquid crystal composition, and an electrode layer including the thin film transistor is preferably provided with plural gate wirings and data wirings disposed in a mesh shape, a thin film transistor provided at each intersection between the data wirings and the gate wirings, a pixel electrode connected to the thin film transistor, and common electrodes provided side by side together with the pixel electrode on the first substrate being apart therefrom, and the shortest distance d between the common electrode and the pixel electrode which are adjacent is preferably shorter than the shortest distance G between the alignment layers.

Moreover, in the present specification, a liquid crystal display element under the condition that the shortest distance d between the common electrode and the pixel electrode is longer than the shortest distance G between the alignment layers is called a liquid crystal display element of the IPS mode, and an element under the condition that the shortest distance d between the common electrode and the pixel electrode which are adjacent is shorter than the shortest distance G between the alignment layers is called FFS. Therefore, since it is only the condition of the FFS mode that the shortest distance d between the common electrode and the pixel electrode which are adjacent is shorter than the shortest distance G between the alignment layers, there is no limitation to the positional relationship in the thickness direction between the surface of the common electrode and the surface of the pixel electrode. For that reason, as the liquid crystal display element of the FSS mode according to the present invention, as shown in FIGS. 3 to 7, the pixel electrode may be provided on the liquid crystal layer side compared to the common electrode, or the pixel electrode and the common electrode may be provided on the same plane.

If the liquid crystal composition according to the present invention is used, in particular, in a liquid crystal display element of the FFS driving method (FFS-LCD), induced polarization in the liquid crystal layer can be reduced. In addition, it is preferable from the viewpoint of a high speed response and reduction of burn-in.

Figure 3:
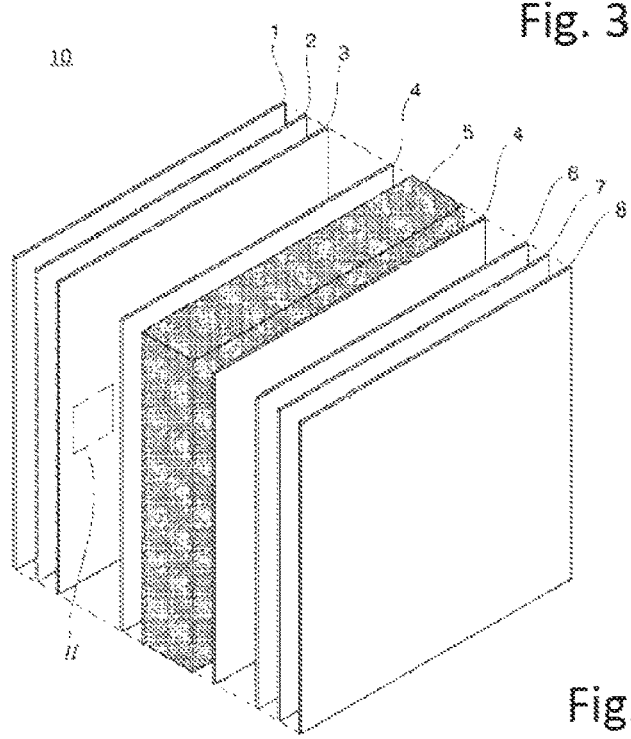
FIG. 3 is a view schematically showing one example of a configuration of the liquid crystal display element according to the present invention.

One example of a more preferable embodiment of the second embodiment according to the present invention will be described below using FIGS. 3 to 7. FIG. 3 is an exploded perspective view schematically showing a structure of one embodiment of a liquid crystal display element, and is a liquid crystal display element of the so-called FFS mode. The liquid crystal display element 10 according to the present invention preferably has a configuration in which a second polarizing plate 8, a second substrate 7, an electrode layer (or also referred to as a thin film transistor layer) 3 including a thin film transistor, an alignment film 4, a liquid crystal layer 5 including a liquid crystal composition, the alignment film 4, a color filter 6, a first substrate 2, and a first polarizing plate 1 are sequentially stacked. As shown in FIG. 3, the second substrate 7 and the first substrate 2 may be sandwiched between a pair of polarizing plates 1 and 8. In FIG. 3, the color filter 6 is provided between the second substrate 7 and the alignment film 4. Furthermore, a pair of the alignment films 4 may be formed on the (transparent) electrode (layer) 3 such that the pair of the alignment films 4 are adjacent to the liquid crystal layer 5 according to the present invention and come into direct contact with the liquid crystal composition configuring the liquid crystal layer 5.

Another suitable form of the liquid crystal display element 10 according to the present invention may be a so-called color filter-on-array (COA), and the color filter 6 may be provided between the thin film transistor layer 3 and the liquid crystal layer 5, or the color filter 6 may be provided between the thin film transistor layer 3 and the first substrate 2.

In the liquid crystal display element of the FFS mode, a fringe electric field is used, and in the case where the shortest distance d between the common electrode and the pixel electrode which are adjacent is shorter than the shortest distance G between the alignment layers, a fringe electric field is formed between the common electrode and the pixel electrode, and it is possible to efficiently use the alignment of the horizontal direction and the vertical direction of the liquid crystal molecules. That is, in the case of a liquid crystal display element of the FFS mode, it is possible to use a horizontal electric field formed in the vertical direction with respect to the line of a pixel electrode 21 that forms a comb-tooth shape and a parabolic electric field.

Figure 4:
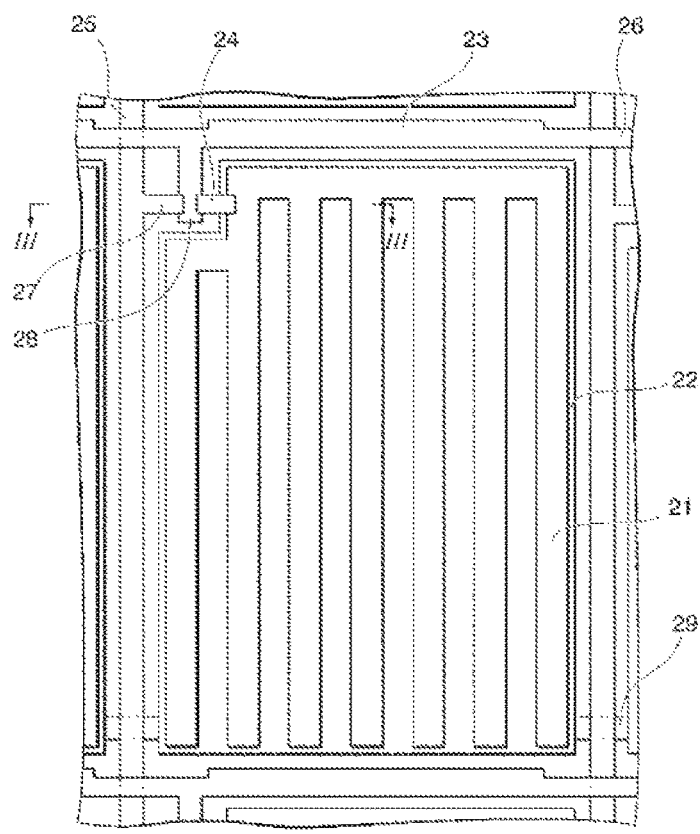
FIG. 4 is an enlarged plan view of a region surrounded by II line of an electrode layer 3 formed on a substrate 2 in FIG. 3.

FIG. 4 is an enlarged plan view of a region II of the electrode layers 3 (or also referred to as the thin film transistor layer 3) including the thin film transistor formed on the substrate in FIG. 3. In the vicinity of the intersection at which a gate wiring 26 and a data wiring 25 intersect each other, a thin film transistor 20 including a source electrode 27, a drain electrode 24, and a gate electrode 28 is provided in connection with the pixel electrode 21 as a switching element for supplying a display signal to the pixel electrode 21. In the FIG. 4, as an example, a configuration in which a flat plate shaped common electrode 22 is formed on one surface through an insulating layer (not shown) on the back surface of the comb-tooth shaped pixel electrode 21 is shown. In addition, the surface of the pixel electrode 21 may be covered with a protective insulating film and an alignment film layer. In the region surrounded by the plurality of gate wirings 26 and the plurality of data wirings 25, a storage capacitor 23 for storing a display signal supplied through the data wiring 25 may be provided. Furthermore, a common line 29 is provided in parallel with the gate wiring 26. The common line 29 is connected to the common electrode 22 for supplying a common signal to the common electrode 22.

Figure 5:
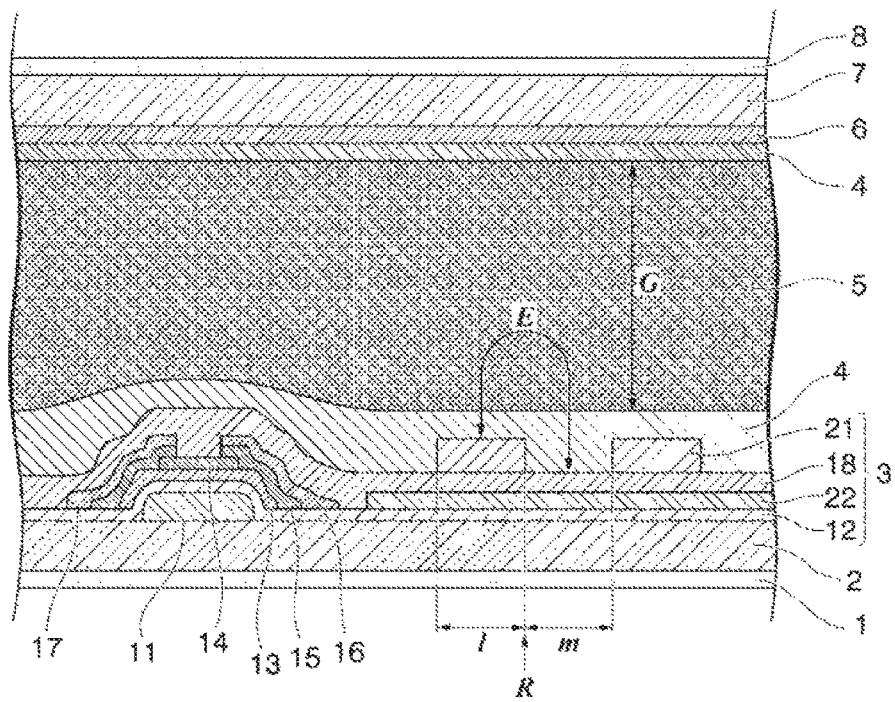
FIG. 5 is a sectional view obtained by cutting the liquid crystal display element in a direction of III-III line in FIG. 4.

FIG. 5 is one example of a sectional view obtained by cutting the liquid crystal display element in the III-III line direction in FIG. 4. The first substrate 2 in which an alignment layer 4 and the electrode layer 3 including the thin film transistor 20 (11, 12, 13, 14, 15, 16, and 17) are formed on the surface and the second substrate 7 in which the alignment layer 4 is formed on the surface are disposed such that the alignment layers face each other with a predetermined interval G, and the liquid crystal layer 5 including a liquid crystal composition is filled in this space. The gate insulating film 12 is formed on a part of the surface of the first substrate 2, the common electrode 22 is formed on a part of the surface of the gate insulating film 12, and an insulating film 18 which covers the common electrode 22 and the thin film transistor 20 is formed. In addition, the pixel electrode 21 is provided on the insulating film 18, and the pixel electrode 21 is in contact with the liquid crystal layer 5 through the alignment layer 4. Therefore, the minimum distance d between the pixel electrode and the common electrode can be adjusted as the (average) film thickness of the gate insulating film 12. In other words, in the embodiment of FIG. 5, the distance between the common electrode and the pixel electrode in the horizontal direction on the substrate becomes 0. It is preferable that an electrode width 1 of the comb-tooth shaped portion of the pixel electrode 21 and the gap width m of the comb-tooth shaped portion of the pixel electrode 21 are formed in a width of an extent that all the liquid crystal molecules in the liquid crystal layer 5 can be driven by the electric field generated.

As shown in FIGS. 3 to 7, in the case of a liquid crystal display element of the FFS mode under the condition that the shortest distance d between the common electrode and the pixel electrode which are adjacent is shorter than the shortest distance G between the alignment layers, when a voltage is applied to the liquid crystal molecules whose the long axis direction is disposed to be parallel to the alignment direction of the alignment layer, an equipotential line of the parabolic electric field between the pixel electrode 21 and the common electrode 22 is formed to the upper portion of the pixel electrode 21 and the common electrode 22, and the liquid crystal molecules in the liquid crystal layer 5 exhibits an action as a switching element by rotating in the liquid crystal layer 5 along the formed electric field. In more detail, for example, in the case where an alignment film which induces a homogeneous alignment with respect to the liquid crystal composition is used in the alignment layer, before a voltage is applied between the common electrode and the pixel electrode, the liquid crystal molecules arranged in the surface direction which is the alignment direction of the alignment film blocks light, and when a voltage is applied, the electric field of the planar direction component due to the fact that the common electrode and the pixel electrode are provided on the same substrate (or an electrode layer) with a gap and the electric field (fringe electric field) of the vertical direction component derived from the edge of these electrodes generated due to the fact that the shortest distance d between the common electrode and the pixel electrode which are adjacent is shorter than the shortest distance G between the alignment layers are generated, and thus, even the liquid crystal molecules having a low dielectric anisotropy can be driven. Therefore, since the characteristics of the liquid crystal composition itself can cause the amount of the compound having high dielectric anisotropy ($\Delta\varepsilon$) to be minimized, a large amount of compound having low viscosity can be contained in the liquid crystal composition itself.

In addition, also regarding problems relating to the low temperature stability such as precipitation of the liquid crystal compound occurred in the case where a large amount of compound having low viscosity is contained as the liquid crystal composition according to the present invention, such problems can be solved by adopting a combination of General Formulas (i) and (M-1), more preferably, a combination of General Formulas (i), (M-1), and (L), and thus, in the case where the liquid crystal composition according to the present invention is applied to FFS, it is possible to exhibit the characteristics thereof at the maximum.

Since liquid crystal molecules having a relatively low dielectric anisotropy $\Delta\varepsilon$ of 5 or less are used in the liquid crystal composition according to the present invention, the long axis direction of the liquid crystal molecules is arranged along the electric field direction generated, but since the distance between the electrodes is short compared to the IPS mode, from the viewpoint of being capable of low voltage driving, even liquid crystal molecules having a relatively low dielectric anisotropy $\Delta\varepsilon$ of 5 or less can be driven. Therefore, it is possible to obtain excellent characteristics compared to a liquid crystal display element of a driving method other than the FFS mode in which the liquid crystal molecules having a large dielectric anisotropy are used.

The configuration (FFS) of still another more preferable form of the second embodiment of the liquid crystal display composition according to the present invention is a liquid crystal display element in which a first substrate having an electrode layer including a first alignment layer and a thin film transistor on the surface and a second substrate having a second alignment layer on the surface are disposed such that the alignment layers face each other with a gap, and the gap between the first substrate and the second substrate is filled with a liquid crystal layer including a liquid crystal composition, and an electrode layer including the thin film transistor is preferably provided with a common electrode, plural gate wirings and data wirings disposed in a mesh shape, a thin film transistor provided at each intersection between the data wirings and the gate wirings, and a pixel electrode connected to the thin film transistor, and the pixel electrode is preferably provided to protrude to the second substrate side compared to the common electrode. In addition, the first alignment layer and the second alignment layer provided in proximity to the liquid crystal layer are preferably alignment films which induce a homogeneous alignment with respect to the liquid crystal composition.

Figure 6:
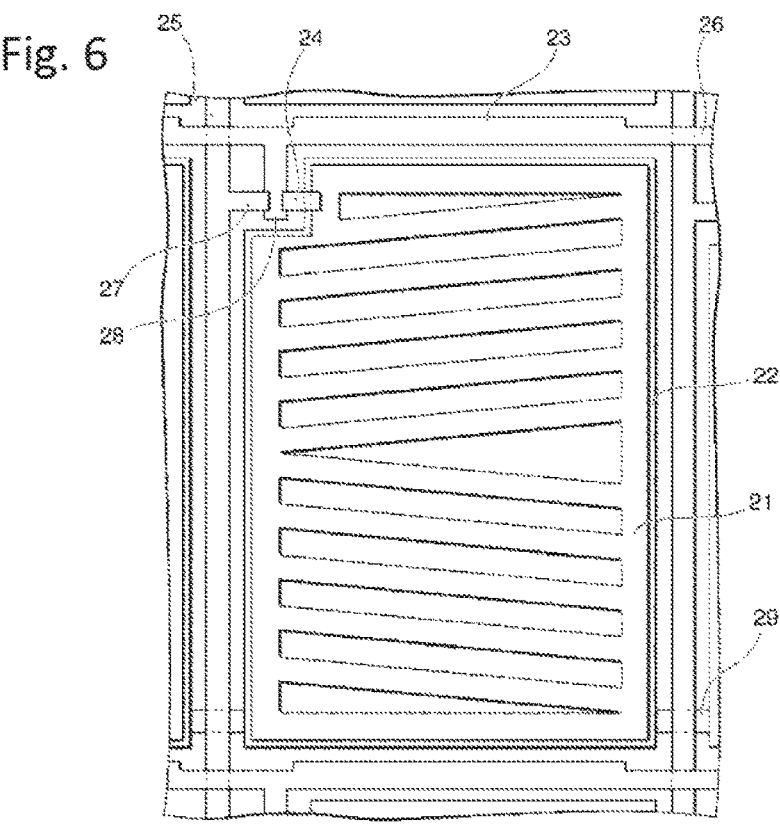
FIG. 6 is an enlarged plan view of another example of the region surrounded by the II line of the electrode layer 3 formed on the substrate 2 in FIG. 3.

FIG. 6 is another form of an enlarged plan view of the region II of the electrode layers 3 (or also referred to as the thin film transistor layer 3) including the thin film transistor formed on the substrate in FIG. 3. In the vicinity of the intersection at which a gate wiring 26 and a data wiring 25 intersect each other, a thin film transistor 20 including a source electrode 27, a drain electrode 24, and a gate electrode 28 is provided in connection with the pixel electrode 21 as a switching element for supplying a display signal to the pixel electrode 21. In addition, the pixel electrode 21 may have a structure in which is hollowed out in at least one notch portion, and one example thereof is shown in FIG. 6. The pixel electrode 21 has a shape in which the central portion and both ends of a square flat plate body are hollowed out in a triangular notch portion and the remaining region is hollowed out in eight rectangular notch portion, and the common electrode 22 is a comb-tooth body (not shown). In addition, the surface of the pixel electrode may be covered with a protective insulating film and an alignment film layer. In the region surrounded by the plurality of gate wirings 25 and the plurality of data wirings 24, a storage capacitor 23 for storing a display signal supplied through the data wiring 24 may be provided. Moreover, the shape and the number of the notch portions are not particularly limited.

Figure 7:
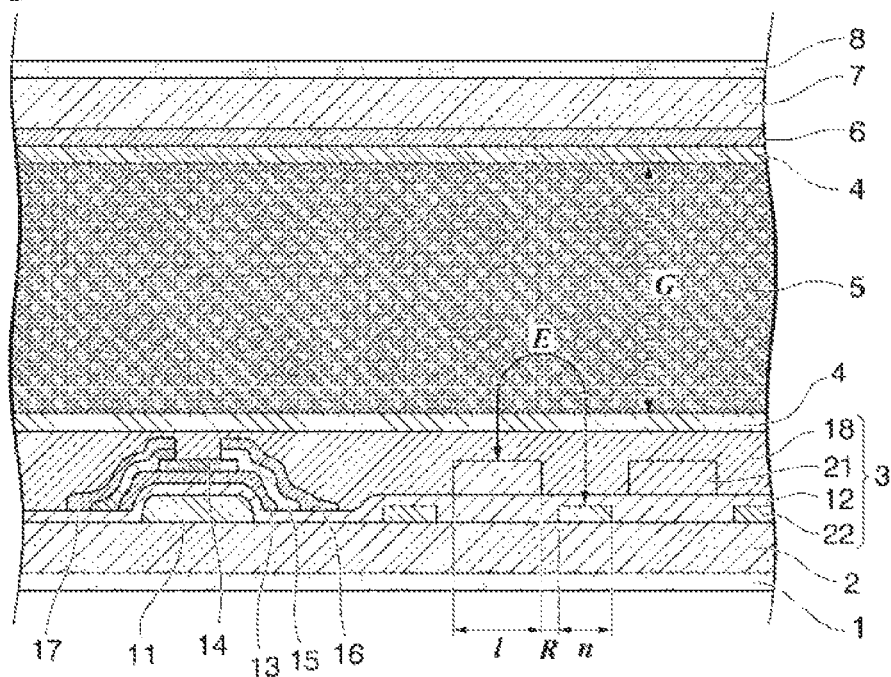
FIG. 7 is a sectional view of another example obtained by cutting the liquid crystal display element in the same direction of the line as in FIG. 4 in FIG. 6.

FIG. 7 is one example of another form of a sectional view obtained by cutting the liquid crystal display element at the same position in the III-III direction as FIG. 4, in FIG. 6. That is, as the difference from the structure of the liquid crystal display element in FIG. 5, in the liquid crystal display element shown in FIG. 5, the common electrode is a flat plate body, and the pixel electrode is a comb-tooth body. On the other hand, as described above, in the liquid crystal display element shown in FIG. 7, the pixel electrode 21 has a shape in which the central portion and both ends of a square flat plate body are hollowed out in a triangular notch portion and the remaining region is hollowed out in eight rectangular notch portion, and the common electrode has a structure of a comb-tooth body. Therefore, the minimum distance d between the pixel electrode and the common electrode is an (average) film thickness of the gate insulating film 12 or greater and less than the distance G between the alignment layers. In FIG. 7, the common electrode has a structure of the comb-tooth body, but the common electrode may be a flat plate body also in this embodiment. In any case, the liquid crystal display element of the FFS mode according to the present invention only needs to satisfy the condition that the shortest distance d between the common electrode and the pixel electrode which are adjacent is shorter than the shortest distance G between the alignment layers. Furthermore, in the configuration of the liquid crystal display element shown in FIG. 7, the pixel electrode is covered with the protective film 18, but, in the configuration of the liquid crystal display element shown in FIG. 5, the pixel electrode 21 is covered with the alignment layer 4. In the present invention, the pixel electrode may be covered with any of the protective film or the alignment film.

In FIG. 7, a polarizing plate is formed on one surface of the first substrate 2, the gate insulating film 12 which covers the comb-tooth shaped common electrode 22 formed on a part of the other surface is formed, the pixel electrode 21 is formed on a part of the surface of the gate insulating film 12, and the insulating film 18 which covers the pixel electrode 21 and the thin film transistor 20 is formed. In addition, the alignment layer 4, the liquid crystal layer 5, the alignment layer 4, the color filter 6, the second substrate 7, and the polarizing plate 8 are stacked on the insulating film 18. Therefore, the minimum distance d between the pixel electrode and the common electrode can be adjusted by both electrode positions, the electrode width 1 of the comb-tooth shaped portion of the pixel electrode 21, or the gap width m of the comb-tooth shaped portion of the pixel electrode 21.

As shown in FIG. 7, in the case where the pixel electrode protrudes to the second substrate side compared to the common electrode and both are provided in parallel on the first substrate, the electric field in the planar direction component is formed between the common electrode and the pixel electrode, and the heights of the surface of the pixel electrode and the surface of the common electrode in the thickness direction are different, and thus, the electric field (E) in the thickness direction component can also be applied at the same time.

Moreover, in the liquid crystal display element of the FFS mode, a fringe electric field is used, and the liquid crystal display element is not particularly limited as long as it is under the condition that the shortest distance d between the common electrode and the pixel electrode which are adjacent is shorter than the shortest distance G between the alignment layers, and thus, for example, the liquid crystal display element may have a configuration in which plural teeth portions of the comb-tooth shaped pixel electrode and plural teeth portions of the comb-tooth shaped common electrode are provided on a substrate in an engaged state with each other with a gap. In this case, if the distance between the teeth portion of the common electrode and the teeth portion of the pixel electrode is shorter than the shortest distance G between the alignment layers, the fringe electric field can be used.

In the case where the composition and the liquid crystal composition of the present invention are used in a liquid crystal display element of the FFS mode, from the viewpoint of low Δε of the liquid crystal composition used, effects of a high speed response and reduction of burn-in can be exhibited.

Examples

Hereinafter, the present invention will be described in more detail with examples, and the present invention is not limited to the examples. In addition, "%" in the compositions of the following examples and comparative examples means "% by mass".

In the examples, the measured characteristics are as follows.

Tni: nematic phase-isotropic liquid phase transition temperature (° C.)

Δn: refractive index anisotropy at 25° C. (another name: birefringence)

Δε: dielectric anisotropy at 25° C.

γ1: rotational viscosity coefficient (mPa·s) at 25° C.

Low temperature storage test: A sealed glass vial enclosing about 0.5 g of the liquid crystal composition was stored in a freezer at a predetermined temperature, and the presence or absence of liquid crystal phase transition (smectic) and crystallization was visually confirmed. For example, in the case where a smectic transition is observed after 168 hours, it is noted as "168 hr smectic".

Kaverage (pN) (also called as Kavg):

Mean values of elastic constants K11, K22, and K33 at 25° C. K11 and K33 were calculated by filling a horizontally aligned cell having a cell gap of 30 μm with liquid crystals and then fitting a curve of change in electrostatic capacity (C) obtained by applying 30→0 volt (V) (CV curve) using a constant apparatus EC-1 (manufactured by TOYO-TECHNICA CO., LTD.). K22 was calculated using the following Equation (1) by filling a TN cell of 20 μm with the same liquid crystal and fitting a CV curve obtained by applying the voltage in the same manner to obtain a threshold voltage (Vc).

$$K_{22} = \{K_{33} - 4[(Vc/\pi)^2 \times \varepsilon_0 \cdot \Delta\varepsilon - K_{11}]\}/2 \quad [\text{Math. 1}]$$

In Equation (1), $\varepsilon_0$ represents the vacuum permittivity.

Shown below is liquid crystal cell driving characteristics when an FFS cell was set to have a cell thickness of 3.5 μm and a comb electrode width and an electrode interval of 10 μm, was filled with the liquid crystal composition (of the present invention and the following comparative example), and was sandwiched between two polarizing plates whose transmission axes are set to the crossed Nicol prism so as to be in the extinction position (point where the amount of transmitted light becomes minimum) when no voltage is applied at 25° C. Driving was performed by applying a square wave of 100 Hz.

Vop: Voltage (V) at which the transmittance becomes maximum

Vth: Voltage (V) at which the transmittance becomes 10% when the transmittance at the time of applying Vop is set to 100%

VT curve slowness: A value obtained by dividing the above Vop by Vth

τon: Liquid crystal response speed (ms) when Vop is applied in 0V state

τoff: Liquid crystal response speed (ms) when Vop-applied state is switched to 0V In the examples, the following abbreviations are used for describing the compounds.

(Side Chain and Linking Group)

-n —$C_nH_{2n+1}$ linear alkyl group having n carbon atoms

-On —$OC_nH_{2n+1}$ linear alkoxy group having n carbon atoms

-V —C=$CH_2$ vinyl group

-Vn —C=C—$C_nH_{2n+1}$ 1-alkene having (n+1) carbon atoms

—COO— —COO— (ester group)

—CF2O— —$CF_2O$— group

—OCF3- —$OCF_3$ group

—OCH2- —$OCH_2$— group

-CL Chlorine (Cl)

(Ring Structure)

[Chem. 361]

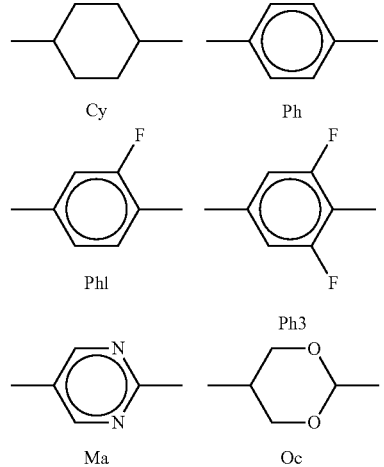

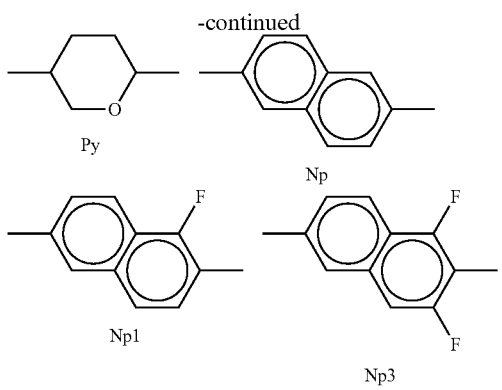

Comparative Examples

Examples 3, 9, and 13 described in WO2006/038443 were used as a comparative example. The reason is that the liquid crystal composition contains a component close to General Formula (i) of the invention of the present application, contains a component corresponding to General Formula (N) in the invention of the present application, has a relatively high Δn suitable for a small cell gap, and satisfies Δε≤6 which is a particularly preferable embodiment in the invention of the present application. Table 1 shows the results of measuring the elastic constant, the storage stability at a low temperature of −20° C., the voltage on the FFS panel, and the response characteristics by adjusting the composition ratio of these liquid crystal compositions and the liquid crystal. For TNI, Δn, Δε, γ1, and Vth, the values described in WO2006/038443 were used. The component ratios in the table are expressed in weight %.

TABLE 1

| | Comparative Example 1 (WO2006/ 038443 Example 9) | Comparative Example 1 (WO2006/ 038443 Example 3) | Comparative Example 3 (WO2006/ 038443 Example 13) |
|---|---|---|---|
| TNI/° C. | 79.0 | 79.8 | 84.0 |
| Δn | 0.131 | 0.111 | 0.140 |
| Δε | 5.2 | 5.4 | 4.0 |
| γ1/mPa · s | 66 | 62 | 73 |
| η/mPa · s | | | |
| Vth/Vrms | 2.08 | 1.88 | 2.23 |
| K11 | 11.8 | 12.3 | 11.7 |
| K22 | 6.5 | 6.7 | 6.2 |
| K33 | 14.2 | 14.3 | 13.6 |
| Kavg | 10.8 | 11.1 | 10.5 |
| Low temperature storage test (−20° C.) | 240 hrs smectic | 240 hrs nematic | 168 hrs smectic |
| Vop/V | 7.8 | 7.5 | 8.3 |
| Vth/V | 4.3 | 4.2 | 4.9 |
| VT curve slowness | 1.81 | 1.79 | 1.69 |
| τon/ms | 15.3 | 15.0 | 17.0 |
| τoff/ms | 11.7 | 11.5 | 14.1 |
| 3-Cy-Cy-V | 15 | 16 | 20 |
| 3-Cy-Cy-V1 | 8 | 10 | |
| V-Cy-Cy-Ph-1 | 9 | 10 | |
| V2-Cy-Cy-Ph-1 | 9 | 10 | |
| 3-Cy-Cy-Ph-1 | | | 3 |
| 5-Cy-Ph-Ph1-Ph-2 | | | 7 |
| 2-Ph-Ph1-Ph-3 | 8 | 4 | |
| 2-Ph-Ph1-Ph-5 | | | 6 |
| 3-Ph-Ph1-Ph-4 | | | 6 |
| 3-Ph-Ph1-Ph-5 | 8 | | 7 |
| 3-Ph-Ph3-CF2O-Ph3-F | 22 | 24 | 10 |
| 3-Cy-Cy-CF2O-Ph3-F | 8 | | |

TABLE 1-continued

| | Comparative Example 1 (WO2006/ 038443 Example 9) | Comparative Example 1 (WO2006/ 038443 Example 3) | Comparative Example 3 (WO2006/ 038443 Example 13) |
|---|---|---|---|
| 3-Cy-Ph-CL | 5 | 5 | 13 |
| 3-Cy-Cy-Ph-CL | | 6 | |
| 2-Cy-Ph-Ph-F | | 5 | 6 |
| 3-Cy-Ph-Ph-F | | 5 | 6 |
| 5-Cy-Ph-Ph-F | | 5 | 6 |
| 3-Cy-Ph-Ph3-F | | | 10 |

With respect to Comparative Example 1, the Kavg was 10.8 pN, and transition to the smectic phase was observed after 240 hours in the low temperature storage test at −20° C. In addition, the VT curve slowness in the IPS panel was 1.81, the response speed (τoff) was 11.7 ms, and the total of τon and τoff was 27.0 ms. Furthermore, Kavg in Comparative Example 2 was 11.1 pN, and the nematic phase was maintained even after 240 hours in the low temperature storage test at −20° C. In addition, the VT curve slowness in the FFS panel was 1.79, the response speed (τoff) was 11.5 ms, the total of τon and τoff was 26.5 ms.

With respect to Comparative Example 3, the Kavg was 10.5 pN, and transition to the smectic phase was observed after 168 hours in the low temperature storage test at −20° C. In addition, the VT curve slowness in the FFS panel was 1.69, the response speed (τoff) was 14.1 ms, and the total of τon and τoff was 31.1 ms.

Examples

The liquid crystal composition having Δn corresponding to Comparative Example 1, the liquid crystal composition having Δn corresponding to Comparative Example 2, and the liquid crystal composition having Δn corresponding to Comparative Example 3 were prepared as Examples 1 to 3, respectively, and physical properties, storage stability at a low temperature, voltage in the FFS panel and response characteristics were measured.

TABLE 2

| | Example 1 | Example 2 | Example 3 |
|---|---|---|---|
| TNI/° C. | 95.6 | 95.1 | 97.1 |
| Δn | 0.132 | 0.111 | 0.142 |
| Δε | 5.3 | 6.0 | 7.4 |
| γ1/mPa · s | 62 | 59 | 75 |
| η/mPa · s | 12.8 | 12.8 | 19.4 |
| Vth/Vrms | 2.35 | 2.20 | 2.01 |
| K11 | 13.4 | 13.3 | 12.8 |
| K22 | 6.8 | 7.5 | 7.4 |
| K33 | 16.6 | 17.3 | 19.1 |
| Kavg | 12.3 | 12.7 | 13.1 |
| Low temperature storage test (−20° C.) | 336 hrs nematic | 240 hrs nematic | 168 hrs nematic |
| Vop/V | 9.1 | 8.7 | 6.3 |
| Vth/V | 4.6 | 4.1 | 2.9 |

TABLE 2-continued

|  | Example 1 | Example 2 | Example 3 |
|---|---|---|---|
| VT curve slowness | 1.98 | 2.12 | 2.17 |
| τon/ms | 14.3 | 14.1 | 16.8 |
| τoff/ms | 9.8 | 9.4 | 11.0 |
| 3-Cy-Cy-V | 25 | 25 |  |
| 2-Cy-Cy-V1 | 10 |  |  |
| 3-Cy-Cy-V1 | 10 | 15 | 16 |
| 1V-Cy-Cy-V1 |  |  | 10 |
| V-Cy-Cy-Ph-1 |  | 10 | 5 |
| V2-Cy-Cy-Ph-1 |  |  | 4 |
| 3-Cy-Cy-Ph-1 |  | 5 |  |
| 5-Ph-Ph-1 |  |  | 6 |
| V2-Ph-Ph-1 |  |  | 8 |
| V-Cy-Ph-Ph-3 |  | 5 |  |
| 1V-Cy-Ph-Ph-3 | 5 |  |  |
| 3-Cy-Cy-COO-Ph-Cy-3 |  | 5 |  |
| 4-Cy-Ph-Ph1-Ph-3 | 5 |  |  |
| 1V-Cy-Ph-Ph1-Ph-3 |  |  | 5 |
| 3-Cy-Ph1-Ph-Cy-3 | 5 |  |  |
| 1-Ph-Ph1-Ph-2V | 5 | 5 | 4 |
| 2-Ph-Ph1-Ph-2V | 5 | 5 | 4 |
| 3-Ph-Ph1-Ph-2V | 5 |  | 4 |
| 3-Ph-Ph3-CF2O-Ph3-F | 10 | 15 | 6 |
| 3-Cy-Cy-CF2O-Ph3-F | 5 |  | 8 |
| 3-Ph-Ph1-Ph3-CF2O-Ph3-F | 5 | 5 | 4 |
| 4-Ph-Ph1-Ph3-CF2O-Ph3-F | 5 | 5 | 4 |
| 3-Py-Ph-Ph3-CF2O-Ph3-F |  |  | 8 |
| 3-Cy-Ph-Ph3-Ph1-OCF3 |  |  | 4 |

With respect to Example 1, the Kavg was 12.3 pN, and the VT curve slowness in the FFS panel was 1.98, which is excellent in that more slower VT characteristics can be obtained. In addition, the response speed (τoff) was 9.8 ms, the total of τon and τoff was 24.1 ms, which is excellent in that the response speed was increased even with the same Δε as in Comparative Example 1. Furthermore, the nematic phase was maintained even after 336 hours in the low temperature storage test at −20° C., which is improved compared to Comparative Example 1.

With respect to Example 2, the Kavg was 12.7 pN, and the VT curve slowness in the FFS panel was 2.17, which is excellent in that extremely slow VT characteristics can be obtained. In addition, the response speed (τoff) was 11.0 ms, the total of τon and τoff was 27.8 ms, which is excellent in that the response speed was increased even with significantly higher Δε than that of Comparative Example 3.

With respect to Example 3, the Kavg was 13.1 pN, and the VT curve slowness in the FFS panel was 1.98, which is excellent in that more slower VT characteristics can be obtained. In addition, the response speed (τoff) was 9.8 ms, the total of τon and τoff was 24.1 ms, which is excellent in that the response speed was increased even with the same Δε as in Comparative Example 1. Furthermore, the nematic phase was maintained even after 168 hours in the low temperature storage test at −20° C., which is improved compared to Comparative Example 3.

The liquid crystal compositions of Examples 4 to 9 were prepared and then measured for the physical properties in the same manner as in Examples 1 to 3.

TABLE 3

|  | Example 4 | Example 5 | Example 6 | Example 7 | Example 8 | Example 9 |
|---|---|---|---|---|---|---|
| TNI/° C. | 102.3 | 88.8 | 85.1 | 87.2 | 83.3 | 96.8 |
| Δn | 0.123 | 0.121 | 0.122 | 0.119 | 0.124 | 0.119 |
| Δε | 5.4 | 8.1 | 10.6 | 7.6 | 10.4 | 6.3 |
| γ1/mPa · s | 64 | 63 | 71 | 64 | 70 | 60 |
| η/mPa · s | 13.2 | 14.2 | 16.3 | 14.0 | 16.2 | 13.4 |
| Vth/Vrms | 2.42 | 1.76 | 1.45 | 1.73 | 1.42 | 2.03 |
| K11 | 14.3 | 13.9 | 13.2 | 13.5 | 13.4 | 14.0 |
| K22 | 8.0 | 8.0 | 7.1 | 8.2 | 7.4 | 9.2 |
| K33 | 18.3 | 18.1 | 17.3 | 18.8 | 17.7 | 19.6 |
| Kavg | 13.5 | 13.3 | 12.5 | 13.5 | 12.8 | 14.3 |
| 3-Cy-Cy-V | 25 | 25 | 20 | 21 | 20 | 27 |
| 3-Cy-Cy-V1 | 15 | 16 | 15 | 16 | 15 | 15 |
| 1V-Cy-Cy-V1 |  |  |  | 8 | 4 | 8 |
| V-Cy-Cy-Ph-1 | 10 | 5 | 4 | 5 |  |  |
| 1V-Cy-Ph-Ph-3 | 5 | 5 | 3 | 3 | 3 |  |
| 1V-Cy-Ph-Ph-2 |  | 5 |  |  |  |  |
| 3-Cy-Cy-COO-Ph-Cy-3 | 5 |  |  |  |  |  |
| 1V-Cy-Ph-Ph1-Ph-3 |  |  | 2 |  | 2 | 6 |
| 1V-Cy-Ph-Ph-Cy-V1 |  |  |  |  |  | 3 |
| 1-Ph-Ph1-Ph-2V | 5 | 4 | 5 | 4 | 5 | 5 |
| 2-Ph-Ph1-Ph-2V | 5 | 5 | 6 | 4 | 6 | 5 |
| 3-Ph-Ph1-Ph-2V |  | 5 |  | 4 |  | 3 |
| 3-Ph-Ph3-CF2O-Ph3-F | 10 | 10 | 15 | 10 | 15 | 10 |
| 3-Cy-Cy-CF2O-Ph3-F | 5 | 4 | 8 | 4 | 6 |  |
| 3-Ph-Ph1-Ph3-CF2O-Ph3-F | 5 | 6 | 5 | 6 | 5 |  |
| 4-Ph-Ph1-Ph3-CF2O-Ph3-F | 5 | 6 | 6 | 6 | 6 | 5 |
| 3-Py-Ph-Ph3-CF2O-Ph3-F |  | 6 | 8 | 6 | 9 | 8 |
| 3-Cy-Ph-Ph3-Ph1-OCF3 |  | 3 | 3 | 3 | 4 | 5 |

With respect to Example 4, the Kavg was 13.8 and Kavg in Example 5 was 13.3, which are high values. In addition, the nematic phase of the composition of Examples 4 to 9 was maintained even after 240 hours in the storage test at −20° C. As shown in Example 5 and Example 6, the liquid crystal composition of the invention of the present application can be adjusted to a relatively high Δε while maintaining excellent storage stability and low γ1.

The liquid crystal compositions of Examples 10 to 15 were prepared and then measured for the physical properties in the same manner as in Examples 1 to 3.

TABLE 4

|  | Example 10 | Example 11 | Example 12 | Example 13 | Example 14 | Example 15 |
|---|---|---|---|---|---|---|
| TNI/° C. | 116.2 | 97.7 | 98.0 | 88.6 | 92.4 | 98.0 |
| Δn | 0.130 | 0.142 | 0.123 | 0.126 | 0.127 | 0.120 |
| Δε | 6.7 | 9.3 | 5.2 | 5.5 | 5.5 | 5.4 |
| γ1/mPa·s | 83 | 88 | 62 | 64 | 65 | 61 |
| η/mPa·s | 17.9 | 20.9 | 13.2 | 13.2 | 13.0 | 12.8 |
| Vth/Vrms | 2.03 | 1.73 | 2.60 | 2.30 | 2.40 | 2.30 |
| K11 | 15.2 | 14.5 | 14.7 | 14.2 | 14.7 | 13.9 |
| K22 | 10.1 | 9.3 | 8.6 | 7.9 | 8.3 | 7.9 |
| K33 | 21.7 | 18.4 | 20.1 | 18.3 | 18.9 | 18.2 |
| Kavg | 15.7 | 14.1 | 14.5 | 13.5 | 14.0 | 13.3 |
| 3-Cy-Cy-V | 12 |  | 25 | 35 | 30 | 25 |
| 2-Cy-Cy-V1 |  |  |  |  |  | 10 |
| 3-Cy-Cy-V1 | 15 | 16 | 15 |  | 5 | 5 |
| 1V-Cy-Cy-V1 | 10 | 10 | 6 | 10 | 10 |  |
| V-Cy-Cy-Ph-1 | 10 | 5 | 4 | 6 | 9 | 10 |
| V2-Ph-Ph-1 |  | 8 |  |  | 4 |  |
| 1V-Cy-Ph-Ph-3 | 5 |  | 5 | 6 |  | 5 |
| 1V-Cy-Ph-Ph-2 |  |  | 5 |  |  | 5 |
| 3-Cy-Cy-COO-Ph-Cy-3 |  |  |  |  |  | 5 |
| 1V-Cy-Ph-Ph1-Ph-3 | 4 | 5 | 2 | 4 | 4 |  |
| 1V-Cy-Ph-Ph-Cy-V1 |  |  | 3 |  |  |  |
| 1-Ph-Ph1-Ph-2V | 5 | 4 | 5 | 4 | 4 | 5 |
| 2-Ph-Ph1-Ph-2V | 6 | 4 | 5 | 4 | 4 | 5 |
| 3-Ph-Ph1-Ph-2V |  | 4 |  | 4 | 4 |  |
| 3-Ph-Ph3-CF2O-Ph3-F |  | 10 | 8 | 10 | 7 | 10 |
| 3-Cy-Cy-CF2O-Ph3-F | 8 | 8 | 5 | 5 | 3 | 5 |
| 3-Ph-Ph1-Ph3-CF2O-Ph3-F | 6 | 4 | 5 | 5 |  | 5 |
| 4-Ph-Ph1-Ph3-CF2O-Ph3-F | 6 | 5 |  | 5 | 6 | 5 |
| 3-Py-Ph-Ph3-CF2O-Ph3-F | 8 | 8 | 7 | 2 | 6 |  |
| 3-Cy-Ph-Ph3-Ph1-OCF3 | 5 | 4 |  |  | 4 |  |

With respect to each of Examples 10 to 15, their Kavgs were fell within the range of 13.3 to 15.7, which are high values. In addition, with respect to each of Examples 10, 12, and 15, the nematic phase was maintained even after 168 hours in the low temperature storage test at −20° C., and with respect to each of Examples 11, 13, and 14, the nematic phase was maintained even after 240 hours.

From the above, the liquid crystal composition of the invention of the present application has a wide range of driving temperature since a range of nematic temperature is wide, exhibits excellent responsiveness due to relatively reduced γ1, can be used for various driving voltages since the adjustable range of Δε is wide, is excellent in gradation reproducibility with the slow VT curve according to the high elastic constant, and can be suitably used as the liquid crystal composition for thin liquid crystal displays, particularly for the FFS and the IPS modes since it can be adjusted to have a relatively high Δn.

REFERENCE SIGNS LIST

100 FIRST SUBSTRATE
102 TFT LAYER
103 PIXEL ELECTRODE
104 PASSIVATION FILM
105 FIRST ALIGNMENT FILM
200 SECOND SUBSTRATE
201 PLANARIZATION FILM (OVERCOAT LAYER)
202 BLACK MATRIX
203 COLOR FILTER
204 TRANSPARENT ELECTRODE
205 SECOND ALIGNMENT FILM
301 SEAL MATERIAL
302 PROJECTION (POST SPACER)
303 LIQUID CRYSTAL LAYER
304 PROJECTION (POST SPACER)
401 MASK PATTERN
402 RESIN LAYER
L LIGHT
1, 8 POLARIZING PLATE
2 FIRST SUBSTRATE
3 ELECTRODE LAYER
4 ALIGNMENT FILM
5 LIQUID CRYSTAL LAYER
6 COLOR FILTER
6G COLOR FILTER GREEN
6R COLOR FILTER RED
7 SECOND SUBSTRATE
11 GATE ELECTRODE
12 GATE INSULATING FILM
13 SEMICONDUCTOR LAYER
14 INSULATING LAYER
15 OHMIC CONTACT LAYER
16 DRAIN ELECTRODE
17 SOURCE ELECTRODE
18 INSULATION PROTECTING LAYER
21 PIXEL ELECTRODE
22 COMMON ELECTRODE
23 STORAGE CAPACITOR
24 DRAIN ELECTRODE
25 DATA WIRING
27 SOURCE WIRING
29 COMMON LINE
30 BUFFER LAYER

The invention claimed is:
1. A liquid crystal composition comprising:
a component A including a liquid crystal compound having a positive dielectric anisotropy; and
a component B including a compound represented by General Formula (i) and a compound represented by General Formula (N), the total amount of the compound represented by General Formula (i) being 10% by mass or greater,
the total amount of the compound represented by General Formula (N) being 12% by mass to 45% by mass:

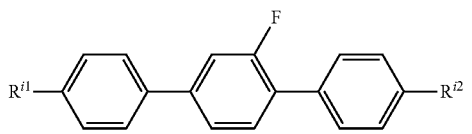

(i)

wherein $R^{i1}$ and $R^{i2}$ each independently represents an alkyl group having 1 to 10 carbon atoms, an alkenyl group having 2 to 10 carbon atoms, or an alkoxy group having 1 to 10 carbon atoms, provided that at least one of $R^{i1}$ or $R^{i2}$ is the alkenyl group,

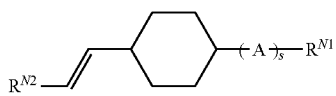

(N)

wherein ring A each independently represents a group selected from the group consisting of:
(a) a 1,4-cyclohexylene group (one —CH$_2$— or at least two non-adjacent —CH$_2$—'s present in the group may be substituted with —O—),
(b) a 1,4-phenylene group (one —CH= or at least two non-adjacent —CH='s present in the group may be substituted with —N=), and
the groups (a) and (b) each may be independently substituted with a fluorine atom,
$R^{N1}$ represents an alkyl group having 1 to 10 carbon atoms, an alkenyl group having 2 to 10 carbon atoms, an alkoxy group having 1 to 10 carbon atoms,
$R^{N2}$ represents methyl group, and
s represents an integer of 1 to 3.

2. The liquid crystal composition according to claim 1, which has a $K_{avg}$ of 12.0 pN or more, wherein the $K_{avg}$ is a mean value of elastic constants $K_{11}$, $K_{22}$, and $K_{33}$.

3. The liquid crystal composition according to claim 1, further comprising:
at least one liquid crystal compound having a dielectric anisotropy of −2 to +2, which is represented by General Formula (L) as the component B:

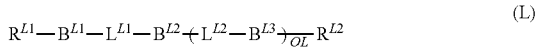

(L)

wherein $R^{L1}$ and $R^{L2}$ each independently represents an alkyl group having 1 to 8 carbon atoms, and one —CH$_2$— or at least two non-adjacent —CH$_2$—'s present in the alkyl group may be independently substituted with —C≡C—, —O—, —CO—, —COO—, or —OCO—;
OL represents 0, 1, 2, or 3;
$B^{L1}$, $B^{L2}$, and $B^{L3}$ each independently represents a group selected from the group consisting of:
(a) a 1,4-cyclohexylene group (one —CH$_2$— or at least two non-adjacent —CH$_2$—'s present in the group may be substituted with —O—),
(b) a 1,4-phenylene group (one —CH= or at least two non-adjacent —CH='s present in the group may be substituted with —N=), and
the above groups (a) and (b) each may be independently substituted with a cyano group, a fluorine atom, or a chlorine atom;
$L^{L1}$ and $L^{L2}$ each independently represents a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—; and
in the case where OL is 2 or 3 and plural $L^{L2}$'s are present, plural $L^{L2}$'s may be the same as or different from each other, and in the case where OL is 2 or 3 and plural $B^{L3}$'s are present, plural $B^{L3}$'s may be the same as or different from each other.

4. The liquid crystal composition according to claim 1, further comprising:
at least one liquid crystal compound having a dielectric anisotropy of +3 to +40, which is represented by General Formula (M) as the component A including the liquid crystal compound having a positive dielectric anisotropy:

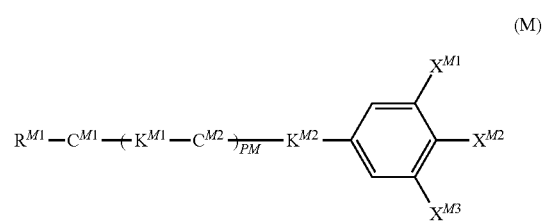

(M)

wherein $R^{M1}$ represents an alkyl group having 1 to 8 carbon atoms, and one —CH$_2$— or at least two non-adjacent —CH$_2$—'s present in the alkyl group may be independently substituted with —CH=CH—, —C≡C—, —O—, —CO—, —COO—, or —OCO—;
PM represents 0, 1, 2, 3, or 4;
$C^{M1}$ and $C^{M2}$ each independently represents a group selected from the group consisting of:
(d) a 1,4-cyclohexylene group (one —CH$_2$— or at least two non-adjacent —CH$_2$—'s present in the group may be substituted with —O— or —S—),
(e) a 1,4-phenylene group (one —CH= or at least two non-adjacent —CH='s present in the group may be substituted with —N=), and
the above groups (d) and (e) each may be independently substituted with a cyano group, a fluorine atom, or a chlorine atom;
$K^{M1}$ and $K^{M2}$ each independently represents a single bond, —CH$_2$CH$_2$—, —(CH$_2$)$_4$—, —OCH$_2$—, —CH$_2$O—, —OCF$_2$—, —CF$_2$O—, —COO—, —OCO—, or —C≡C—;
in the case where PM is 2, 3 or 4 and plural $K^{M1}$'s are present, plural $K^{M1}$'s may be the same as or different from each other, and in the case where PM is 2, 3 or 4 and plural $C^{M2}$'s are present, plural $C^{M2}$'s may be the same as or different from each other;
$X^{M1}$ and $X^{M3}$ each independently represents a hydrogen atom, a chlorine atom, or a fluorine atom; and
$X^{M2}$ represents a fluorine atom, a chlorine atom, a cyano group, a trifluoromethyl group, a fluoromethoxy group, a difluoromethoxy group, a trifluoromethoxy group or a 2,2,2-trifluoroethyl group.

5. A liquid crystal display element using the liquid crystal composition according to claim 1.

6. A liquid crystal display element for an IPS mode, an OCB mode, an ECB mode, a VA mode, or an FFS mode, the element using the liquid crystal composition according to claim 1.

7. A liquid crystal display using the liquid crystal display element according to claim 5.

8. The liquid crystal composition according to claim 2, which has the $K_{avg}$ of 12.0 pN to 20 pN.

9. The liquid crystal composition according to claim 2, wherein the $K_{avg}$ is the mean value of elastic constants $K_{11}$, $K_{22}$, and $K_{33}$ at 25° C.

* * * * *